(12) United States Patent
Tanobe et al.

(10) Patent No.: US 7,298,974 B2
(45) Date of Patent: Nov. 20, 2007

(54) OPTICAL COMMUNICATION NETWORK SYSTEM

(75) Inventors: Hiromasa Tanobe, Tokyo (JP); Akira Okada, Tokyo (JP); Kazuto Noguchi, Atsugi (JP); Morito Matsuoka, Atsugi (JP); Takashi Sakamoto, Zama (JP); Osamu Moriwaki, Zama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 10/542,316

(22) PCT Filed: Feb. 13, 2004

(86) PCT No.: PCT/JP2004/001600

§ 371 (c)(1),
(2), (4) Date: Jul. 13, 2005

(87) PCT Pub. No.: WO2004/073225

PCT Pub. Date: Aug. 26, 2004

(65) Prior Publication Data

US 2006/0153496 A1    Jul. 13, 2006

(30) Foreign Application Priority Data

| Feb. 13, 2003 | (JP) | ............................. 2003-035188 |
| May 22, 2003 | (JP) | ............................. 2003-145228 |
| May 28, 2003 | (JP) | ............................. 2003-151474 |
| Aug. 20, 2003 | (JP) | ............................. 2003-296582 |

(51) Int. Cl.
*H04J 14/00* (2006.01)
*H04B 10/20* (2006.01)

(52) U.S. Cl. ............................... 398/63; 398/49; 398/7
(58) Field of Classification Search .................... 398/5, 398/7, 58, 61, 63, 45, 48–50, 55–57
See application file for complete search history.

(56) References Cited

U.S. PATENT DOCUMENTS 5,530,575 A * 6/1996 Acampora et al. ............ 398/58

(Continued)

FOREIGN PATENT DOCUMENTS

CA    2 316 253 A    12/2003

(Continued)

OTHER PUBLICATIONS

K. Noguchi, "Scalability of Full-Mesh WDM AWG-STAR Network", IEICE Transactions on Communications, vol. E86-B, No. 5, pp. 1493-1497, May 2003.

(Continued)

*Primary Examiner*—Dalzid Singh
(74) *Attorney, Agent, or Firm*—Harness, Dickey & Pierce, P.L.C.

(57) ABSTRACT

A fiber optic communication system includes a device of switching and setting wavelength of optical signals used in communication by network-node equipments, which sets the mapping of the wavelength of the optical signal used in communication by the network node equipments, and the input/output ports of an array waveguide grating (AWG), so as to construct a predetermined logical network topology by a plurality of network node equipments which are connected via optical fibers to the array waveguide grating that outputs optical signals inputted to optical input ports, to predetermined optical output ports in accordance with the wavelength thereof. As well as enabling a simple construction, it is easy to realize flexible network design, construction, and operation, and different network groups can also be easily connected to each other. Moreover, a fiber optic communication system having robust security and which can be stably operated even at the time of failure is realized at low cost.

31 Claims, 122 Drawing Sheets

U.S. PATENT DOCUMENTS

| | | | |
|---|---|---|---|
| 5,781,537 A * | 7/1998 | Ramaswami et al. | 370/254 |
| 6,414,767 B1 * | 7/2002 | Blair et al. | 398/59 |
| 6,519,062 B1 * | 2/2003 | Yoo | 398/49 |
| 6,643,463 B1 * | 11/2003 | Suzuki et al. | 398/49 |
| 6,718,140 B1 | 4/2004 | Kamei et al. | |
| 6,741,811 B2 | 5/2004 | Nishi et al. | |
| 6,782,210 B1 | 8/2004 | Okada et al. | |
| 6,889,010 B2 * | 5/2005 | Trezza | 398/130 |
| 2001/0026384 A1 | 10/2001 | Sakano et al. | |
| 2002/0197007 A1 * | 12/2002 | Liu | 385/24 |

FOREIGN PATENT DOCUMENTS

| | | |
|---|---|---|
| JP | 06-311108 | 11/1994 |
| JP | H07-202845 | 8/1995 |
| JP | 2000-134649 | 5/2000 |
| JP | 2000-184408 | 6/2000 |
| JP | 2000-201112 | 7/2000 |
| JP | 2000-201112 A | 7/2000 |
| JP | 2001-008244 | 1/2001 |
| JP | 2001-053760 | 2/2001 |
| JP | 2001-103523 | 4/2001 |
| JP | 2001-197006 | 7/2001 |
| JP | 2001-285323 | 10/2001 |
| JP | 2001-333021 | 11/2001 |
| JP | 2001-346235 | 12/2001 |
| JP | 2002/165238 | 6/2002 |
| JP | 2002-262319 | 9/2002 |
| JP | 2002/300137 | 10/2002 |
| WO | 00/25457 A1 | 5/2000 |

OTHER PUBLICATIONS

K. Kato et al., "32 ×32 Full-Mesh (1024 Path) Wavelength Routing WDM Network based on Uniform Loss Cyclic-Frequency Arrayed-Waveguide Grating," IEE Electronics Letters, vol. 36, No. 15, pp. 1294-1296, Jul. 2000.

K. Kato, A. Okada, Y. Sakai, K. Noguchi, T. Sakamoto, A. Takahara, S. Kamei, A. Kaneko, S. Suzuki and M. Matsuoka, "10-Tbps Full-Mesh WDM Network Based on Cyclic-Frequency Arrayed-Waveguide Grating Router", ECOC 2000, vol. 1, pp. 105-107, 2000.

Y. Sakai, "Full-Mesh Wavelength-Routing WDM Network Based on Arrayed-Waveguide Grating", IEEE LEOS Annual Meeting, vol. 2, ThQ1, pp. 832-833, 2000.

Y. Sakai, K. Noguchi, R. Yoshimura, T. Sakamoto, A. Okada, and M. Matsuoka, "Management System for Full-Mesh WDM AWG-STAR Network", ECOC 2001, No. We.B.1.5, pp. 264-265, 2001.

K. Noguchi, S. Kamei, Y. Sakai, A. Okada, T. Kitagawa, and M. Matsuoka, "Scalability of Full-Mesh WDM AWG-STAR Network", OECC 2002, 10A1-2, pp. 72-73, Jul. 2002.

K. Rookstool, "Economic Considerations of Central Office (CO) Broadband Distribution Terminal vs. Remote Terminal (RT) Broadband Distribution Terminals for Deploying Fiber to the Home (FTTH)", OFC 2003, vol. 2, pp. 610-613, Mar. 2003.

K. Noguchi, H. Tanobe, and M. Matsuoka, "The First Field Trial of a Wavelength Routing WDM Full-Mesh Network System (AWG-STAR) in a Metropolitan/Local Area", OFC 2003, ThAA5, pp. 611-613.

H. Tanobe, A. Okada, K. Noguchi and M. Matsuoka, "Demonstration of Logical-Topology Reconfiguration in Full-Mesh WDM Networks (AWG-STAR) Based on Wavelength routing Technology", ECOC 2003, Th2.4.5, 2003.

O. Moriwaki, K. Noguchi, H. Tanobe, A. Okada, and M. Matsuoka, "Reconfigurable Wavelength-Routed Network with NxN AWG Arranged in CWDM Bands for Bandwidth on Demand", OFC 2003, MF90, 2003.

Y. Sakai et al., "Full-Mesh WDM Network Based on Cyclic-Frequency Arrayed-Waveguide Grating", Techincal Report of IEICE, OCS2000-9, pp. 47-52, May 2000.

Y. Sakai et al., "Full-mesh Wavelength-Routing Network System (AWG-STAR)", Technical Report of IEICE, OCS2001-55, pp. 61-66, Jul. 2001.

K. Noguchi et al., "Scalability of AWG-STAR Network System", Technical Report of IEICE, OCS2001-56, pp. 67-72, Jul. 2001.

K. Noguchi et al., "Full-Mesh-Star Network System with Cyclic Frequency Arrayed Waveguide Grating", Technical Report of IEICE, OCS2001-80, pp. 47-52, Nov. 2001.

Y. Koike et al., "Field Trial of AWG-STAR Network", Technical Report of IEICE, PS2002-52, pp. 17-22, Oct. 2002.

Y. Koike et al., "A Monitoring and Control for AWG-STAR Network", Technical Report of IEICE, NS2002-195, pp. 53-56, Dec. 2002.

H. Tanobe et al., "Logical Topology Dynamically-Reconfigurable Network with Wavelength Routing Full-Mesh (AWG-STAR) Technology", Technical Report of IEICE, NS2002-283, pp. 133-136, Mar. 2003.

K. Kato et al., "10Tbps Full-Mesh WDM Network Based on 32×32 Cyclic-Frequency AWG", Proceedings of the 2000 IEICE General Conference (Spring), B-10-100, p. 475, 2000, with English translation.

K. Tanaka et al., "Wavelength-Routing Experiment in WDM Star Network Using a Cyclic Arrayed-Waveguide Grating", Proceedings of the 2000 IEICE General Conference (Spring), B-10-102, p. 477, 2000, with English translation.

Y. Sakai et al., "Optical Interface Board for Wavelength Division Multiplexing", Proceedings of the 2000 IEICE General Conference (Spring), B-10-103, p. 478, 2000, with English translation.

K. Noguchi et al., "Transmission Characteristic in Full-Mesh WDM Network Based on Cyclic-Frequency AWG (AWG-STAR)", Proceedings of the 2000 IEICE Society Conference, B-10-118, p. 341, 2000, with English translation.

Y. Sakai et al., "a Study on Full-Mesh WDM Network Topology", Proceedings of the 2000 IEICE Society Conference, B-10-119, p. 342, 2000, with English translation.

K. Noguchi et al., "AWG-STAR Network Based on Grouped Wavelength-Path Routing", Proceedings of the 2002 IEICE Society Conference, B-12-2, p. 442, 2002, with English translation.

K. Kato et al., "Full-Mesh Network Based on Cyclic-Frequency Arrayed-Waveguide Grating", NTT-R&D, vol. 49, No. 6, pp. 298-308, 2000.

K. Tanaka et al., "Scalability of AWG-STAR Optical Network", NTT-R&D, vol. 49, No. 6, pp. 318-323, 2000.

Y. Sakai et al., "Optical Interface Board for Wavelength Division Multiplexing", NTT-R&D, vol. 49, No. 6, pp. 324-330, 2000.

M. Matsuoka et al., "Starting an Intranet Joint Experiment Using Optical Wavelength Routing Technology", NTT Technical Journal, vol. 14, No. 10, pp. 50-53, Oct. 2002, with English translation.

M. Matsuoka et al., "Full-Mesh WDM Networks; AWG-STAR, A Wavelength Routing Full-Mesh Network", NTT Technical Journal, vol. 14 No. 2, pp. 55-61, Feb. 2002, with English translation.

News Release, "NTT Develops Logical-Topology Reconfigurable WDM Network System", http://www.ntt.co.jp/news/news03e/0309/030917.html, Sep. 17, 2003.

Press Release, "Sales launch of 'AWG Router'—a Key to Next-Generation Optical Networks, Making Economically Feasible Full-Mesh Networks With Optical Fibers Connected In a Star Configuration", http://www.nel.co.jp/new/information/2003_03_20.html, Mar. 20, 2003, with English translation.

C. Shimura, "Proposal for Local Electronic Government Synergistic IDC Operation for Local Electronic Government Implementation", Local management newsletter, Nomura Research Institute, vol. 34, pp. 1-5, Jun. 2001, with English translation.

R. Ramaswami, and K. N. Sivarajan, Optical Networks, pp. 340-343, Morgan Kaufmann Publishers, Inc., 1998.

Chang-Joon Chae, A Flexible and Protected Virtual Optical Ring Network, IEEE Photonics Technology Letters, vol. 14, No. 11, Nov. 2002, pp. 1626 to 1628.

Chang-Joon Chae, A Protected Optical Star-Shaped Ring Network Using an NxN Arrayed Waveguide Grating and Incoherent Light Sources, IEEE Photonics Technology Letters, vol. 13, No. 8, Aug. 2001, pp. 878 to 880.

C.-J. Chae and R. S. Tucher, Virtual Optical Self-Healing Ring Network Over Star-Configured Optical Cable Plant Using NxN Arrayed Waveguide Grating, Electronics Letters, Sep. 27, 2001, vol. 37, No. 20, pp. 1241 to 1243.

Chang-Joon Chae, "A Flexible and Protected Virtual Optical Ring Network", IEEE Photonics Technology Letters, vol. 14, No. 11, Nov. 2002, 3 pages.

Chang-Joon Chae, et al., "A Protected Optical Star-Shaped Ring Network Using an *NxN* Arrayed Waveguide Grating and Incoherent Light Sources", IEEE Photonics Technology Letters, vol. 13, No. 8, Aug. 2001, 3 pages.

Chang-Joon Chae, et al., "Virtual Optical Self-Healing Ring Network Over Star-Configured Optical Cable Plant Using *NxN* Arrayed Waveguide Grating", Electronics Letters, vol. 37, No. 20, Sep. 27, 2001, pp. 1241-1243.

* cited by examiner

FIG. 1-6

OPTICAL OUTPUT PORT

|  | 1-301 | 1-302 | 1-303 | 1-304 | 1-305 |
|---|---|---|---|---|---|
| 1-201 | λ1 | λ2 | λ3 | λ4 | λ5 |
| 1-202 | λ5 | λ1 | λ2 | λ3 | λ4 |
| 1-203 | λ4 | λ5 | λ1 | λ2 | λ3 |
| 1-204 | λ3 | λ4 | λ5 | λ1 | λ2 |
| 1-205 | λ2 | λ3 | λ4 | λ5 | λ1 |

OPTICAL INPUT PORT

STAR(MESH)-SHAPED LOGICAL NETWORK TOPOLOGY

FIG. 1-7

OPTICAL OUTPUT PORT

|  | 1-301 | 1-302 | 1-303 | 1-304 | 1-305 |
|---|---|---|---|---|---|
| 1-201 | λ1 | λ2 | λ3 | λ4 | λ5 |
| 1-202 | λ5 | λ1 | λ2 | λ3 | λ4 |
| 1-203 | λ4 | λ5 | λ1 | λ2 | λ3 |
| 1-204 | λ3 | λ4 | λ5 | λ1 | λ2 |
| 1-205 | λ2 | λ3 | λ4 | λ5 | λ1 |

OPTICAL INPUT PORT

RING-SHAPED LOGICAL NETWORK TOPOLOGY

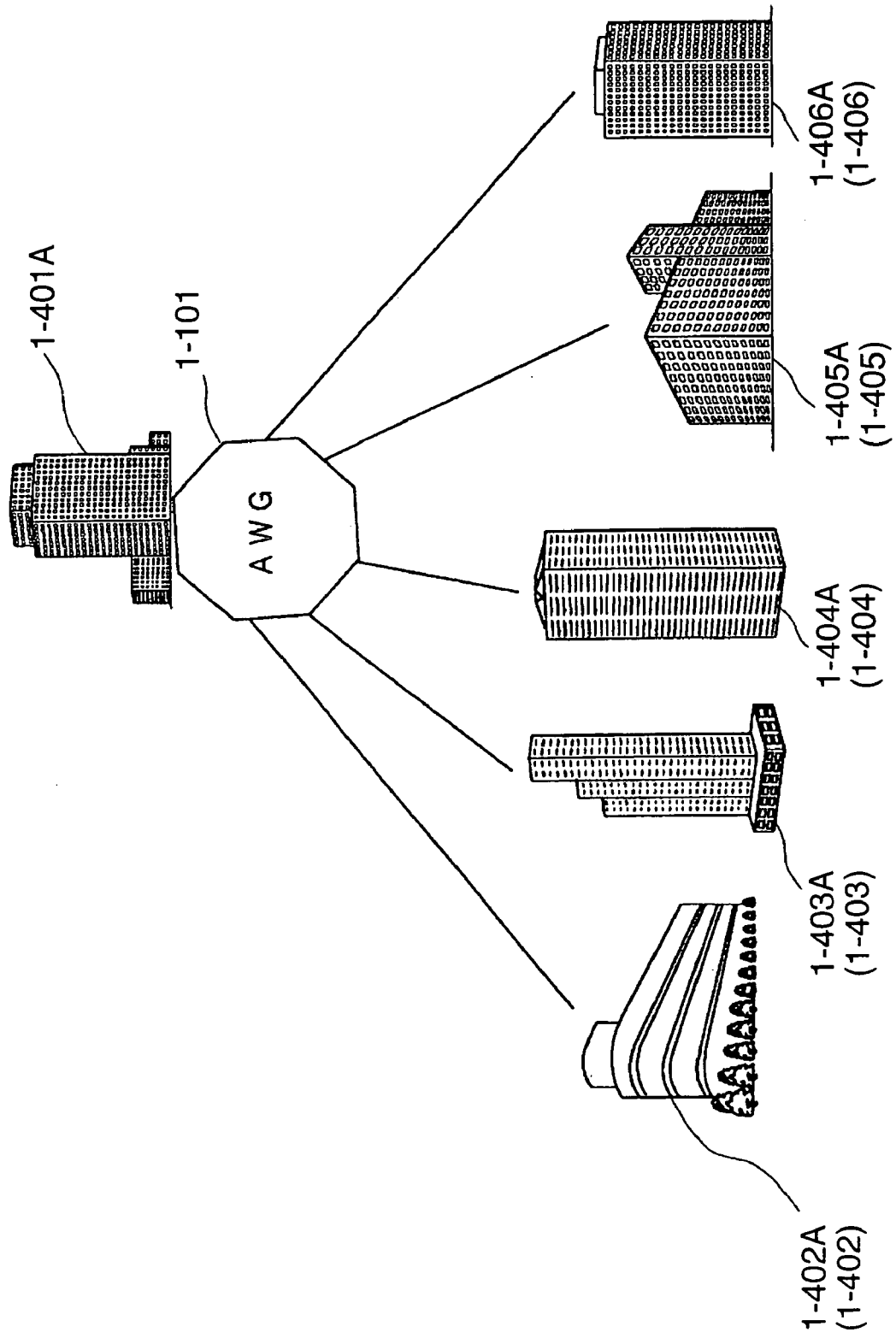

FIG. 1-14

| SPECIFIC NUMBER OF NETWORK-NODE EQUIPMENT | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | λ1 | λ2 | λ3 | λ4 | λ5 | λ6 | λ7 | λ8 | λ9 | λ10 | λ11 | λ12 | λ13 | λ14 | λ15 | λ16 |
| 2 | λ2 | λ3 | λ4 | λ5 | λ6 | λ7 | λ8 | λ9 | λ10 | λ11 | λ12 | λ13 | λ14 | λ15 | λ16 | λ1 |
| 3 | λ3 | λ4 | λ5 | λ6 | λ7 | λ8 | λ9 | λ10 | λ11 | λ12 | λ13 | λ14 | λ15 | λ16 | λ1 | λ2 |
| 4 | λ4 | λ5 | λ6 | λ7 | λ8 | λ9 | λ10 | λ11 | λ12 | λ13 | λ14 | λ15 | λ16 | λ1 | λ2 | λ3 |
| 5 | λ5 | λ6 | λ7 | λ8 | λ9 | λ10 | λ11 | λ12 | λ13 | λ14 | λ15 | λ16 | λ1 | λ2 | λ3 | λ4 |
| 6 | λ6 | λ7 | λ8 | λ9 | λ10 | λ11 | λ12 | λ13 | λ14 | λ15 | λ16 | λ1 | λ2 | λ3 | λ4 | λ5 |
| 7 | λ7 | λ8 | λ9 | λ10 | λ11 | λ12 | λ13 | λ14 | λ15 | λ16 | λ1 | λ2 | λ3 | λ4 | λ5 | λ6 |
| 8 | λ8 | λ9 | λ10 | λ11 | λ12 | λ13 | λ14 | λ15 | λ16 | λ1 | λ2 | λ3 | λ4 | λ5 | λ6 | λ7 |
| 9 | λ9 | λ10 | λ11 | λ12 | λ13 | λ14 | λ15 | λ16 | λ1 | λ2 | λ3 | λ4 | λ5 | λ6 | λ7 | λ8 |
| 10 | λ10 | λ11 | λ12 | λ13 | λ14 | λ15 | λ16 | λ1 | λ2 | λ3 | λ4 | λ5 | λ6 | λ7 | λ8 | λ9 |
| 11 | λ11 | λ12 | λ13 | λ14 | λ15 | λ16 | λ1 | λ2 | λ3 | λ4 | λ5 | λ6 | λ7 | λ8 | λ9 | λ10 |
| 12 | λ12 | λ13 | λ14 | λ15 | λ16 | λ1 | λ2 | λ3 | λ4 | λ5 | λ6 | λ7 | λ8 | λ9 | λ10 | λ11 |
| 13 | λ13 | λ14 | λ15 | λ16 | λ1 | λ2 | λ3 | λ4 | λ5 | λ6 | λ7 | λ8 | λ9 | λ10 | λ11 | λ12 |
| 14 | λ14 | λ15 | λ16 | λ1 | λ2 | λ3 | λ4 | λ5 | λ6 | λ7 | λ8 | λ9 | λ10 | λ11 | λ12 | λ13 |
| 15 | λ15 | λ16 | λ1 | λ2 | λ3 | λ4 | λ5 | λ6 | λ7 | λ8 | λ9 | λ10 | λ11 | λ12 | λ13 | λ14 |
| 16 | λ16 | λ1 | λ2 | λ3 | λ4 | λ5 | λ6 | λ7 | λ8 | λ9 | λ10 | λ11 | λ12 | λ13 | λ14 | λ15 |

OPTICAL OUTPUT PORT

OPTICAL INPUT PORT 1-722, 1-724, 1-725, 1-725

FIG. 1-16

| SPECIFIC NUMBER OF NETWORK-NODE EQUIPMENT | OPTICAL OUTPUT PORT | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 1 | λ1 | λ2 | λ3 | λ4 | λ5 | λ6 | λ7 | λ8 | λ9 | λ10 | λ11 | λ12 | λ13 | λ14 | λ15 | λ16 |
| 2 | λ2 | λ3 | λ4 | λ5 | λ6 | λ7 | λ8 | λ9 | λ10 | λ11 | λ12 | λ13 | λ14 | λ15 | λ16 | λ1 |
| 3 | λ3 | λ4 | λ5 | λ6 | λ7 | λ8 | λ9 | λ10 | λ11 | λ12 | λ13 | λ14 | λ15 | λ16 | λ1 | λ2 |
| 4 | λ4 | λ5 | λ6 | λ7 | λ8 | λ9 | λ10 | λ11 | λ12 | λ13 | λ14 | λ15 | λ16 | λ1 | λ2 | λ3 |
| 5 | λ5 | λ6 | λ7 | λ8 | λ9 | λ10 | λ11 | λ12 | λ13 | λ14 | λ15 | λ16 | λ1 | λ2 | λ3 | λ4 |
| 6 | λ6 | λ7 | λ8 | λ9 | λ10 | λ11 | λ12 | λ13 | λ14 | λ15 | λ16 | λ1 | λ2 | λ3 | λ4 | λ5 |
| 7 | λ7 | λ8 | λ9 | λ10 | λ11 | λ12 | λ13 | λ14 | λ15 | λ16 | λ1 | λ2 | λ3 | λ4 | λ5 | λ6 |
| 8 | λ8 | λ9 | λ10 | λ11 | λ12 | λ13 | λ14 | λ15 | λ16 | λ1 | λ2 | λ3 | λ4 | λ5 | λ6 | λ7 |
| 9 | λ9 | λ10 | λ11 | λ12 | λ13 | λ14 | λ15 | λ16 | λ1 | λ2 | λ3 | λ4 | λ5 | λ6 | λ7 | λ8 |
| 10 | λ10 | λ11 | λ12 | λ13 | λ14 | λ15 | λ16 | λ1 | λ2 | λ3 | λ4 | λ5 | λ6 | λ7 | λ8 | λ9 |
| 11 | λ11 | λ12 | λ13 | λ14 | λ15 | λ16 | λ1 | λ2 | λ3 | λ4 | λ5 | λ6 | λ7 | λ8 | λ9 | λ10 |
| 12 | λ12 | λ13 | λ14 | λ15 | λ16 | λ1 | λ2 | λ3 | λ4 | λ5 | λ6 | λ7 | λ8 | λ9 | λ10 | λ11 |
| 13 | λ13 | λ14 | λ15 | λ16 | λ1 | λ2 | λ3 | λ4 | λ5 | λ6 | λ7 | λ8 | λ9 | λ10 | λ11 | λ12 |
| 14 | λ14 | λ15 | λ16 | λ1 | λ2 | λ3 | λ4 | λ5 | λ6 | λ7 | λ8 | λ9 | λ10 | λ11 | λ12 | λ13 |
| 15 | λ15 | λ16 | λ1 | λ2 | λ3 | λ4 | λ5 | λ6 | λ7 | λ8 | λ9 | λ10 | λ11 | λ12 | λ13 | λ14 |
| 16 | λ16 | λ1 | λ2 | λ3 | λ4 | λ5 | λ6 | λ7 | λ8 | λ9 | λ10 | λ11 | λ12 | λ13 | λ14 | λ15 |

OPTICAL INPUT PORT

FIG. 1-18

| SPECIFIC NUMBER OF NETWORK-NODE EQUIPMENT | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | λ1 | λ2 | λ3 | λ4 | λ5 | λ6 | λ7 | λ8 | λ9 | λ10 | λ11 | λ12 | λ13 | λ14 | λ15 | λ16 |
| 2 | λ2 | λ3 | λ4 | λ5 | λ6 | λ7 | λ8 | λ9 | λ10 | λ11 | λ12 | λ13 | λ14 | λ15 | λ16 | λ1 |
| 3 | λ3 | λ4 | λ5 | λ6 | λ7 | λ8 | λ9 | λ10 | λ11 | λ12 | λ13 | λ14 | λ15 | λ16 | λ1 | λ2 |
| 4 | λ4 | λ5 | λ6 | λ7 | λ8 | λ9 | λ10 | λ11 | λ12 | λ13 | λ14 | λ15 | λ16 | λ1 | λ2 | λ3 |
| 5 | λ5 | λ6 | λ7 | λ8 | λ9 | λ10 | λ11 | λ12 | λ13 | λ14 | λ15 | λ16 | λ1 | λ2 | λ3 | λ4 |
| 6 | λ6 | λ7 | λ8 | λ9 | λ10 | λ11 | λ12 | λ13 | λ14 | λ15 | λ16 | λ1 | λ2 | λ3 | λ4 | λ5 |
| 7 | λ7 | λ8 | λ9 | λ10 | λ11 | λ12 | λ13 | λ14 | λ15 | λ16 | λ1 | λ2 | λ3 | λ4 | λ5 | λ6 |
| 8 | λ8 | λ9 | λ10 | λ11 | λ12 | λ13 | λ14 | λ15 | λ16 | λ1 | λ2 | λ3 | λ4 | λ5 | λ6 | λ7 |
| 9 | λ9 | λ10 | λ11 | λ12 | λ13 | λ14 | λ15 | λ16 | λ1 | λ2 | λ3 | λ4 | λ5 | λ6 | λ7 | λ8 |
| 10 | λ10 | λ11 | λ12 | λ13 | λ14 | λ15 | λ16 | λ1 | λ2 | λ3 | λ4 | λ5 | λ6 | λ7 | λ8 | λ9 |
| 11 | λ11 | λ12 | λ13 | λ14 | λ15 | λ16 | λ1 | λ2 | λ3 | λ4 | λ5 | λ6 | λ7 | λ8 | λ9 | λ10 |
| 12 | λ12 | λ13 | λ14 | λ15 | λ16 | λ1 | λ2 | λ3 | λ4 | λ5 | λ6 | λ7 | λ8 | λ9 | λ10 | λ11 |
| 13 | λ13 | λ14 | λ15 | λ16 | λ1 | λ2 | λ3 | λ4 | λ5 | λ6 | λ7 | λ8 | λ9 | λ10 | λ11 | λ12 |
| 14 | λ14 | λ15 | λ16 | λ1 | λ2 | λ3 | λ4 | λ5 | λ6 | λ7 | λ8 | λ9 | λ10 | λ11 | λ12 | λ13 |
| 15 | λ15 | λ16 | λ1 | λ2 | λ3 | λ4 | λ5 | λ6 | λ7 | λ8 | λ9 | λ10 | λ11 | λ12 | λ13 | λ14 |
| 16 | λ16 | λ1 | λ2 | λ3 | λ4 | λ5 | λ6 | λ7 | λ8 | λ9 | λ10 | λ11 | λ12 | λ13 | λ14 | λ15 |

OPTICAL OUTPUT PORT

OPTICAL INPUT PORT

FIG. 1-23.1
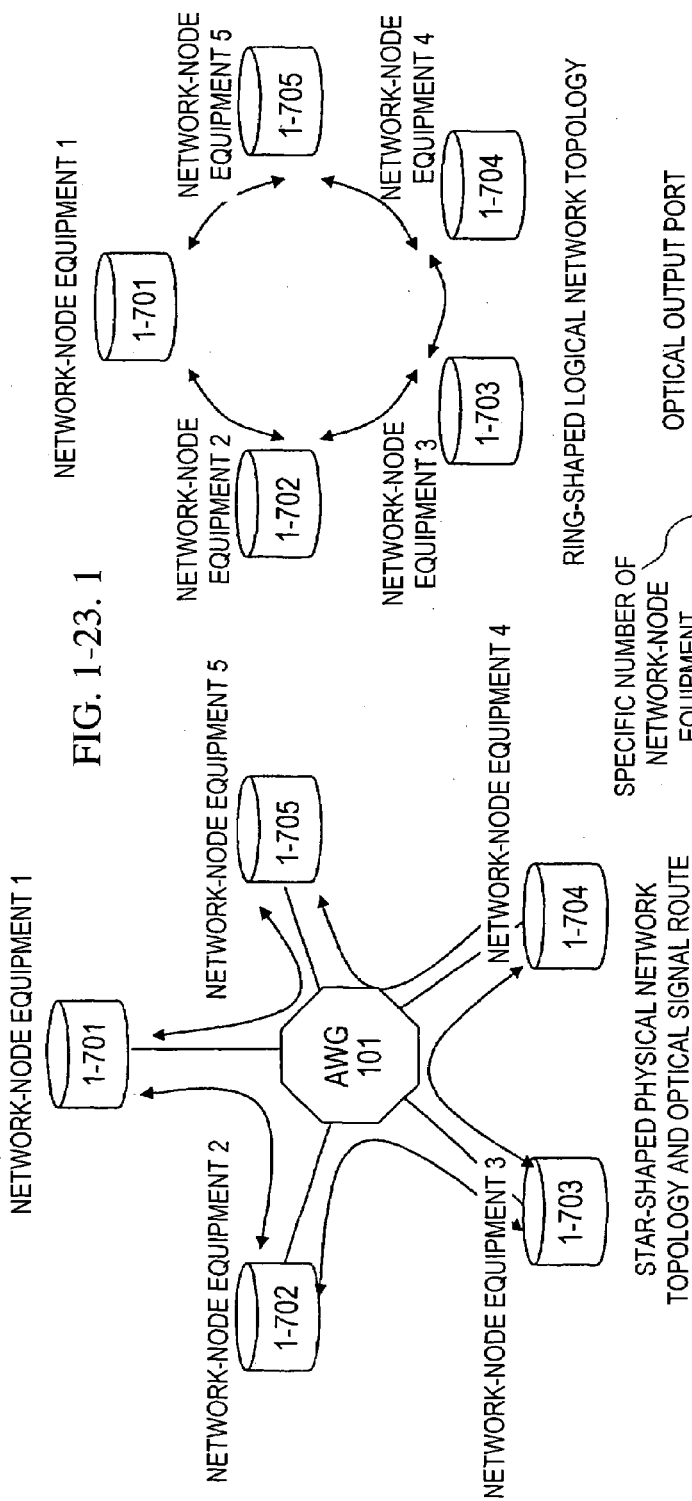
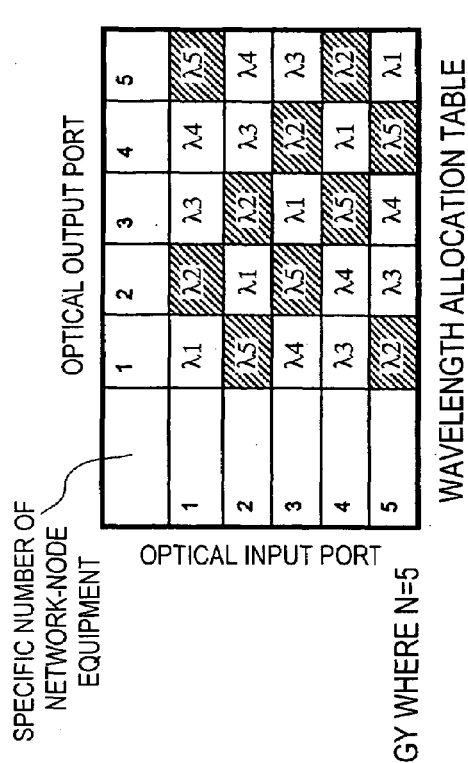

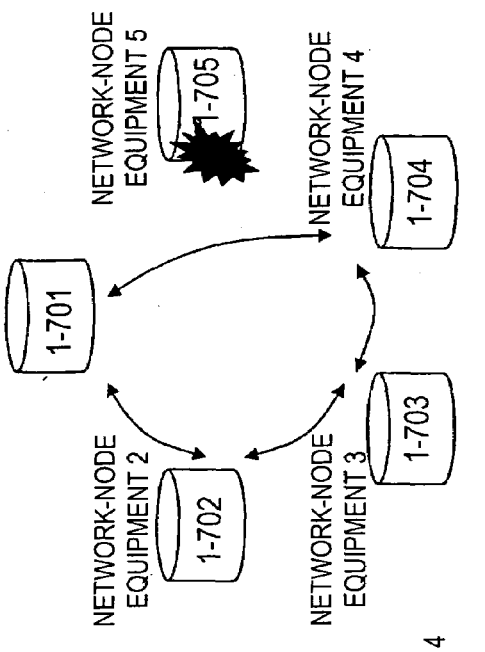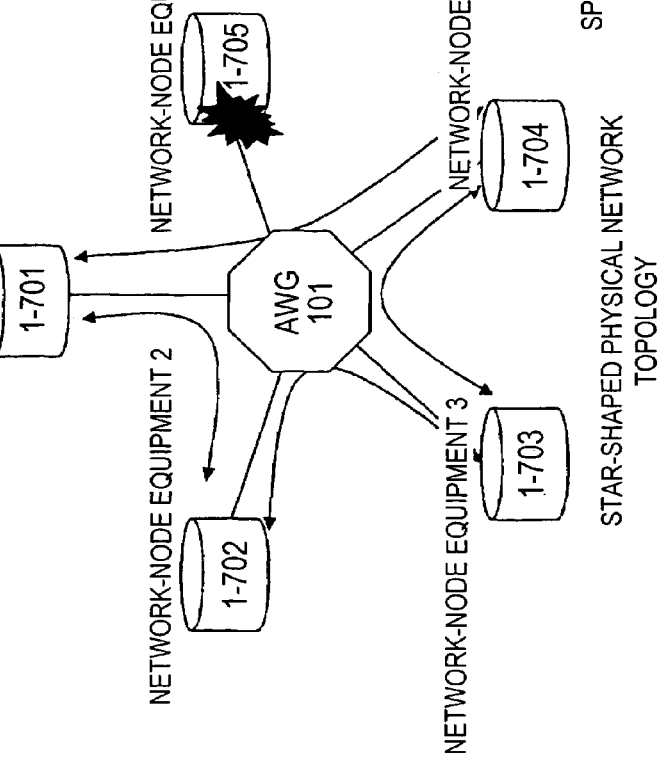
FIG. 1-23.2

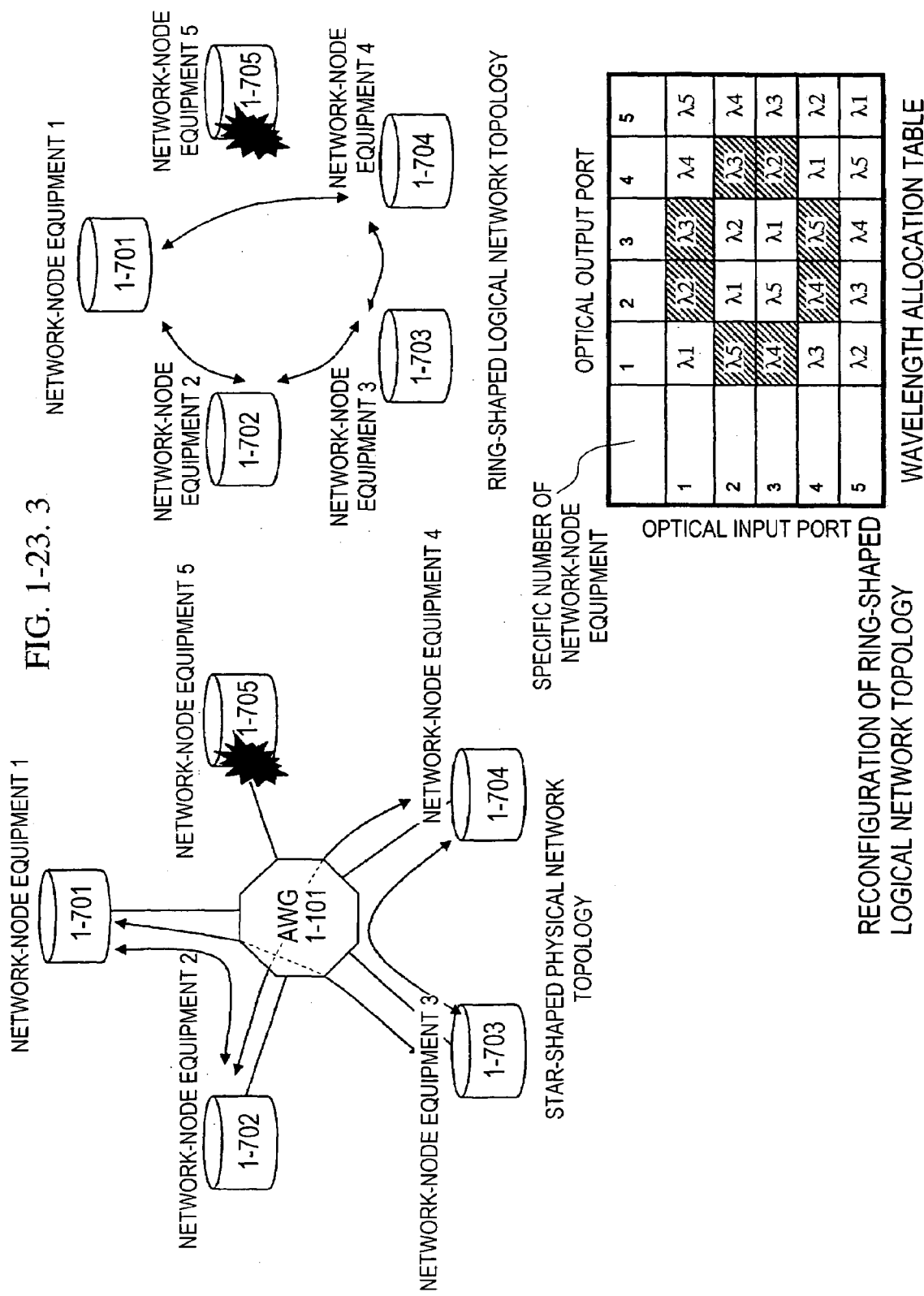
FIG. 1-23.3

FIG. 1-25

NETWORK-NODE EQUIPMENT
(RECEIVING)

| | 1-701 | 1-702 | 1-703 | 1-704 |
|---|---|---|---|---|
| 1-701 | λ1 | λ2 | λ3 | λ4 |
| 1-702 | λ4 | λ1 | λ2 | λ3 |
| 1-703 | λ3 | λ4 | λ1 | λ2 |
| 1-704 | λ2 | λ3 | λ4 | λ1 |

NETWORK-NODE EQUIPMENT
(TRANSMITTING)

| SPECIFIC MANAGEMENT NUMBER OF NETWORK-NODE EQUIPMENT | GRID INTERVAL | USABLE WAVELENGTH | | | | | | | | |
|---|---|---|---|---|---|---|---|---|---|---|
| 1 | 50GHz | λ1 | λ2 | λ3 | λ4 | λ5 | λ6 | λ7 | λ8 | λ9 |

| SPECIFIC MANAGEMENT NUMBER OF NETWORK-NODE EQUIPMENT | GRID INTERVAL | USABLE WAVELENGTH | | | | | | | | |
|---|---|---|---|---|---|---|---|---|---|---|
| 2 | 50GHz | λ1 | λ2 | λ3 | λ4 | λ5 | λ6 | λ7 | λ8 | λ9 |

• • •

| SPECIFIC MANAGEMENT NUMBER OF NETWORK-NODE EQUIPMENT | GRID INTERVAL | USABLE WAVELENGTH | | | | | | | | |
|---|---|---|---|---|---|---|---|---|---|---|
| 10 | 50GHz | λ1 | λ2 | λ3 | λ4 | λ5 | λ6 | λ7 | λ8 | λ9 |

FIG. 2-5

| SPECIFIC MANAGEMENT NUMBER OF NETWORK-NODE EQUIPMENT | GRID INTERVAL | USABLE WAVELENGTH | | | | | | | | |
|---|---|---|---|---|---|---|---|---|---|---|
| 1 | 50GHz | $\lambda 1$ | $\lambda 2$ | $\lambda 3$ | $\lambda 4$ | $\lambda 5$ | $\lambda 6$ | $\lambda 7$ | $\lambda 8$ | $\lambda 9$ |
| 2 | 50GHz | $\lambda 1$ | $\lambda 2$ | $\lambda 3$ | $\lambda 4$ | $\lambda 5$ | $\lambda 6$ | $\lambda 7$ | $\lambda 8$ | $\lambda 9$ |
| 3 | 50GHz | $\lambda 1$ | $\lambda 2$ | $\lambda 3$ | $\lambda 4$ | $\lambda 5$ | $\lambda 6$ | $\lambda 7$ | $\lambda 8$ | $\lambda 9$ |
| 4 | 50GHz | $\lambda 1$ | $\lambda 2$ | $\lambda 3$ | $\lambda 4$ | $\lambda 5$ | $\lambda 6$ | $\lambda 7$ | $\lambda 8$ | $\lambda 9$ |
| 5 | 50GHz | $\lambda 1$ | $\lambda 2$ | $\lambda 3$ | $\lambda 4$ | $\lambda 5$ | $\lambda 6$ | $\lambda 7$ | $\lambda 8$ | $\lambda 9$ |
| 6 | 50GHz | $\lambda 1$ | $\lambda 2$ | $\lambda 3$ | $\lambda 4$ | $\lambda 5$ | $\lambda 6$ | $\lambda 7$ | $\lambda 8$ | $\lambda 9$ |
| 7 | 50GHz | $\lambda 1$ | $\lambda 2$ | $\lambda 3$ | $\lambda 4$ | $\lambda 5$ | $\lambda 6$ | $\lambda 7$ | $\lambda 8$ | $\lambda 9$ |
| 8 | 50GHz | $\lambda 1$ | $\lambda 2$ | $\lambda 3$ | $\lambda 4$ | $\lambda 5$ | $\lambda 6$ | $\lambda 7$ | $\lambda 8$ | $\lambda 9$ |
| 9 | 50GHz | $\lambda 1$ | $\lambda 2$ | $\lambda 3$ | $\lambda 4$ | $\lambda 5$ | $\lambda 6$ | $\lambda 7$ | $\lambda 8$ | $\lambda 9$ |
| 10 | 50GHz | $\lambda 1$ | $\lambda 2$ | $\lambda 3$ | $\lambda 4$ | $\lambda 5$ | $\lambda 6$ | $\lambda 7$ | $\lambda 8$ | $\lambda 9$ |

| TYPE OF LOGICAL NETWORK TOPOLOGY | MESH | MESH | MESH |
|---|---|---|---|
| SPECIFIC MANAGEMENT NUMBER OF NETWORK-NODE EQUIPMENT | 1 | 1 | 2 |
| SPECIFIC USER NUMBER OF NETWORK-NODE EQUIPMENT | 1 | | 2 |
| USER ID | 1 | | 1 |
| WAVELENGTH IN USE | λ2 λ2 λ2 λ2 | λ2 λ2 λ2 λ2 | λ2 λ2 λ2 λ2 |
| SPECIFIC MANAGEMENT NUMBER OF OTHER END OF NETWORK-NODE EQUIPMENT | 2 3 4 | 2 3 4 | 1 3 4 |
| TRANSMITTING STATUS OF WDM SIGNAL | Ok Ok Ok Ok | Ok Ok Ok Ok | Ok Ok Ok Ok |
| RECEIVING STATUS OF WDM SIGNAL | Ok Ok Ok Ok | Ok Ok Ok Ok | Ok Ok Ok Ok |
| CONNECTING STATUS OF NETWORK-NODE EQUIPMENT | Ok Ok Ok Ok | Ok Ok Ok Ok | Ok Ok Ok Ok |
| NUMBER OF OPTICAL LINKS OF NETWORK-NODE EQUIPMENT | 3 | 3 | 3 |
| ADDING BANDWIDTH OF LINK | | | |
| LENGTH OF TIME FOR INCREASING BANDWIDTH | | | |

2-3601

| MESH | MESH | RING | RING | RING | RING, STAR | STAR | STAR | STAR |
|---|---|---|---|---|---|---|---|---|
| 3 | 4 | 5 | 6 | | 7 | 8 | 9 | 10 |
| 3 | 4 | 1 | 2 | | 3 | 4 | 5 | 6 |
| 1 | 1 | 2 | 2 | | 2 | 2 | 2 | 2 |
| λ2 λ2 λ2 λ2 | λ2 λ2 λ2 λ2 | λ2 λ2 λ2 λ2 | λ2 λ2 λ2 λ2 | λ2 λ2 λ2 λ2 | λ2 λ2 λ2 λ2 | λ2 | λ2 | λ2 |
| 1 2 3 | 1 2 | 6 7 | 5 7 | 5 6 | 8 9 10 | 7 | 7 | 7 |
| Ok Ok Ok Ok | Ok Ok Ok Ok | Ok Ok Ok Ok | Ok Ok Ok Ok | Ok Ok Ok Ok | Ok Ok Ok Ok | Ok | Ok | Ok |
| Ok Ok Ok Ok | Ok Ok Ok Ok | Ok Ok Ok Ok | Ok Ok Ok Ok | Ok Ok Ok Ok | Ok Ok Ok Ok | Ok | Ok | Ok |
| Ok Ok Ok Ok | Ok Ok Ok Ok | Ok Ok Ok Ok | Ok Ok Ok Ok | Ok Ok Ok Ok | Ok Ok Ok Ok | Ok | Ok | Ok |
| 3 | 3 | 2 | 2 | 2 | 5 | 1 | 1 | 1 |
| | | | | | | | | |
| | | | | | | | | |

FIG. 2-8

| USER ID | YEAR AND MONTH | INCREASED/DECREASED NUMBER OF NETWORK-NODE EQUIPMENTS | NUMBER OF INCREASING BANDWIDTH | TOTAL NUMBER OF WAVELENGTH PATH LINKS | DISCOUNT | CHARGE |
|---|---|---|---|---|---|---|
| 1 | 2003.01 | 0 | 0 | 12 | 0 | A |
| 1 | 2003.02 | 0 | 0 | 12 | 0 | A |
| 1 | 2003.03 | 0 | 0 | 12 | 0 | A |
| 1 | 2003.04 | 0 | 0 | 12 | 0 | A |
| 1 | 2003.05 | 0 | 0 | 12 | 0 | A |
| 2 | 2003.01 | 0 | 0 | 12 | 0 | A |
| 2 | 2003.02 | 0 | 0 | 12 | 0 | A |
| 2 | 2003.03 | 0 | 0 | 12 | 0 | A |
| 2 | 2003.04 | 0 | 0 | 12 | 0 | A |
| 2 | 2003.05 | 0 | 0 | 12 | 0 | A |

| TYPE OF LOGICAL NETWORK TOPOLOGY | MESH | | | MESH | | | | MESH | | MESH | | |
|---|---|---|---|---|---|---|---|---|---|---|---|---|
| SPECIFIC USER NUMBER OF NETWORK-NODE EQUIPMENT | 1 | | | 2 | | | | 3 | | 4 | | |
| WAVELENGTH IN USE | λ2 | λ3 | λ4 | λ3 | λ4 | λ1 | λ4 | λ1 | λ2 | λ1 | λ2 | λ3 |
| SPECIFIC MANAGEMENT NUMBER OF OTHER END OF NETWORK-NODE EQUIPMENT | 2 | 3 | 4 | 1 | 3 | 4 | 4 | 1 | 2 | 3 | 1 | 2 |
| TRANSMITTING STATUS OF WDM SIGNAL | Ok | Ok | Ok | Ok | Ok | Ok | Ok | Ok | Ok | Ok | Ok | Ok |
| RECEIVING STATUS OF WDM SIGNAL | Ok | Ok | Ok | Ok | Ok | Ok | Ok | Ok | Ok | Ok | Ok | Ok |
| CONNECTING STATUS OF NETWORK-NODE EQUIPMENT | Ok | Ok | Ok | Ok | Ok | Ok | Ok | Ok | Ok | Ok | Ok | Ok |
| NUMBER OF OPTICAL LINKS OF NETWORK-NODE EQUIPMENT | 3 | | | 3 | | | | 3 | | 3 | | |
| ADDING BANDWIDTH OF LINK | | | | | | | | | | | | |
| LENGTH OF TIME FOR INCREASING BANDWIDTH | | | | | | | | | | | | |

| USER ID | YEAR AND MONTH | INCREASED/DECREASED NUMBER OF NETWORK-NODE EQUIPMENTS | NUMBER OF INCREASING BANDWIDTH | TOTAL NUMBER OF WAVELENGTH-PATH LINKS | DISCOUNT | CHARGE |
|---|---|---|---|---|---|---|
| 1 | 2003.01 | 0 | 0 | 12 | 0 | A |
| 1 | 2003.02 | 0 | 0 | 12 | 0 | A |
| 1 | 2003.03 | 0 | 0 | 12 | 0 | A |
| 1 | 2003.04 | 0 | 0 | 12 | 0 | A |
| 1 | 2003.05 | 0 | 0 | 12 | 0 | A |

| | RING | | RING | | RING, STAR | | | | | STAR | STAR | STAR |
|---|---|---|---|---|---|---|---|---|---|---|---|---|
| TYPE OF LOGICAL NETWORK TOPOLOGY | RING | | RING | | RING, STAR | | | | | STAR | STAR | STAR |
| SPECIFIC USER NUMBER OF NETWORK-NODE EQUIPMENT | 1 | | 2 | | 3 | | | | | 4 | 5 | 6 |
| WAVELENGTH IN USE | $\lambda a$ | $\lambda b$ | $\lambda b$ | $\lambda c$ | $\lambda c$ | $\lambda a$ | $\lambda d$ | $\lambda e$ | $\lambda f$ | $\lambda d$ | $\lambda e$ | $\lambda f$ |
| SPECIFIC MANAGEMENT NUMBER OF OTHER END OF NETWORK-NODE EQUIPMENT | 3 | 2 | 1 | 3 | 2 | 1 | 4 | 5 | 6 | 3 | 3 | 3 |
| TRANSMITTING STATUS OF WDM SIGNAL | Ok | Ok | Ok | Ok | Ok | Ok | Ok | Ok | Ok | Ok | Ok | Ok |
| RECEIVING STATUS OF WDM SIGNAL | Ok | Ok | Ok | Ok | Ok | Ok | Ok | Ok | Ok | Ok | Ok | Ok |
| CONNECTING STATUS OF NETWORK-NODE EQUIPMENT | Ok | Ok | Ok | Ok | Ok | Ok | Ok | Ok | Ok | Ok | Ok | Ok |
| NUMBER OF OPTICAL LINKS OF NETWORK-NODE EQUIPMENT | 2 | | 2 | | 5 | | | | | 1 | 1 | 1 |
| ADDING BANDWIDTH OF LINK | | | | | | | | | | | | |
| LENGTH OF TIME FOR INCREASING BANDWIDTH | | | | | | | | | | | | |

| USER ID | YEAR AND MONTH | INCREASED/DECREASED NUMBER OF NETWORK-NODE EQUIPMENTS | NUMBER OF INCREASING BANDWIDTH | TOTAL NUMBER OF WAVELENGTH PATH LINKS | DISCOUNT | CHARGE |
|---|---|---|---|---|---|---|
| 2 | 2003.01 | 0 | 0 | 12 | 0 | A |
| 2 | 2003.02 | 0 | 0 | 12 | 0 | A |
| 2 | 2003.03 | 0 | 0 | 12 | 0 | A |
| 2 | 2003.04 | 0 | 0 | 12 | 0 | A |
| 2 | 2003.05 | 0 | 0 | 12 | 0 | A |

| USER ID | YEAR AND MONTH | INCREASED/DECREASED NUMBER OF NETWORK-NODE EQUIPMENTS | NUMBER OF INCREASING BANDWIDTH | TOTAL NUMBER OF WAVELENGTH PATH LINKS | DISCOUNT | CHARGE |
|---|---|---|---|---|---|---|
| 1 | 2003.01 | 0 | 0 | 12 | 0 | A |
| 1 | 2003.02 | 0 | 0 | 12 | 0 | A |
| 1 | 2003.03 | 0 | 0 | 12 | 0 | A |
| 1 | 2003.04 | 1 | 0 | 14 | 0 | B |
| 1 | 2003.05 | 1 | 0 | 14 | 0 | B |
| 2 | 2003.01 | 0 | 0 | 12 | 0 | A |
| 2 | 2003.02 | 0 | 0 | 12 | 0 | A |
| 2 | 2003.03 | 0 | 0 | 12 | 0 | A |
| 2 | 2003.04 | 0 | 0 | 12 | 0 | A |
| 2 | 2003.05 | 0 | 0 | 12 | 0 | A |

FIG. 2-18

| | MESH | | | MESH, SATR | | | | MESH | | | MESH, SATR | | | | SATR | |
|---|---|---|---|---|---|---|---|---|---|---|---|---|---|---|---|---|
| TYPE OF LOGICAL NETWORK TOPOLOGY | MESH | | | MESH, SATR | | | | MESH | | | MESH, SATR | | | | SATR | |
| SPECIFIC USER NUMBER OF NETWORK-NODE EQUIPMENT | 1 | | | 2 | | | | 3 | | | 4 | | | | 5 | |
| WAVELENGTH IN USE | λ2 | λ3 | λ4 | λ3 | λ4 | λ1 | λh | λ4 | λ1 | λ2 | λ1 | λ2 | λ3 | λ1 | λh | λ1 |
| SPECIFIC MANAGEMENT NUMBER OF OTHER END OF NETWORK-NODE EQUIPMENT | 2 | 3 | 4 | 1 | 3 | 4 | 11 | 4 | 1 | 2 | 3 | 1 | 2 | 11 | 2 | 4 |
| TRANSMITTING STATUS OF WDM SIGNAL | Ok | Ok | Ok | Ok | Ok | Ok | Ok | Ok | Ok | Ok | Ok | Ok | Ok | Ok | Ok | Ok |
| RECEIVING STATUS OF WDM SIGNAL | Ok | Ok | Ok | Ok | Ok | Ok | Ok | Ok | Ok | Ok | Ok | Ok | Ok | Ok | Ok | Ok |
| CONNECTING STATUS OF NETWORK-NODE EQUIPMENT | Ok | Ok | Ok | Ok | Ok | Ok | Ok | Ok | Ok | Ok | Ok | Ok | Ok | Ok | Ok | Ok |
| NUMBER OF OPTICAL LINKS OF NETWORK-NODE EQUIPMENT | 3 | | | 4 | | | | 3 | | | 4 | | | | 2 | |
| ADDING BANDWIDTH OF LINK | | | | | | | | | | | | | | | | |
| LENGTH OF TIME FOR INCREASING BANDWIDTH | | | | | | | | | | | | | | | | |

FIG. 2-20 2-3709

| USER ID | YEAR AND MONTH | INCREASED/DECREASED NUMBER OF NETWORK-NODE EQUIPMENTS | NUMBER OF INCREASING BANDWIDTH | TOTAL NUMBER OF WAVELENGTH PATH LINKS | DISCOUNT | CHARGE |
|---|---|---|---|---|---|---|
| 1 | 2003.01 | 0 | 0 | 12 | 0 | A |
| 1 | 2003.02 | 0 | 0 | 12 | 0 | A |
| 1 | 2003.03 | 0 | 0 | 12 | 0 | A |
| 1 | 2003.04 | 1 | 0 | 14 | 0 | B |
| 1 | 2003.05 | 1 | 0 | 14 | 0 | B |

| TYPE OF LOGICAL NETWORK TOPOLOGY | MESH | | | | MESH | | | |
|---|---|---|---|---|---|---|---|---|
| SPECIFIC MANAGEMENT NUMBER OF NETWORK-NODE EQUIPMENT | 1 | | | | 2 | | | |
| SPECIFIC USER NUMBER OF NETWORK-NODE EQUIPMENT | 1 | | | | 1 | | | |
| USER ID | | | | | | | | |
| WAVELENGTH IN USE | λ2 | λ3 | λ4 | λ1 | λ4 | λ3 | λ4 | λ1 |
| SPECIFIC MANAGEMENT NUMBER OF OTHER END OF NETWORK-NODE EQUIPMENT | 2 | 3 | 4 | 1 | 4 | 1 | 3 | 4 |
| TRANSMITTING STATUS OF WDM SIGNAL | Ok | Ok | Ok | Ok | Ok | Ok | Ok | Ok |
| RECEIVING STATUS OF WDM SIGNAL | Ok | Ok | Ok | Ok | Ok | Ok | Ok | Ok |
| CONNECTING STATUS OF NETWORK-NODE EQUIPMENT | Ok | Ok | Ok | Ok | Ok | Ok | Ok | Ok |
| NUMBER OF OPTICAL LINKS OF NETWORK-NODE EQUIPMENT | 3 | | | | 3 | | | |
| ADDING BANDWIDTH OF LINK | | | | | | | | |
| LENGTH OF TIME FOR INCREASING BANDWIDTH | | | | | | | | |

2-3801

2-3802

(table with topologies MESH, MESH, RING, RING, STAR, STAR and wavelength/status entries showing BANDWIDTH ADDITION / ONE MONTH annotations)

| USER ID | YEAR AND MONTH | INCREASED/DECREASED NUMBER OF NETWORK-NODE EQUIPMENTS | NUMBER OF INCREASING BANDWIDTH | TOTAL NUMBER OF WAVELENGTH PATH LINKS | DISCOUNT | DISCOUNT CHARGE |
|---|---|---|---|---|---|---|
| 1 | 2003.01 | 0 | 0 | 12 | 0 | A |
| 1 | 2003.02 | 0 | 0 | 12 | 0 | A |
| 1 | 2003.03 | 0 | 0 | 12 | 0 | A |
| 1 | 2003.04 | 0 | 0 | 12 | 0 | A |
| 1 | 2003.05 | 0 | 0 | 12 | 0 | A |
| 2 | 2003.01 | 0 | 0 | 12 | 0 | A |
| 2 | 2003.02 | 0 | 0 | 12 | 0 | A |
| 2 | 2003.03 | 0 | 0 | 12 | 0 | A |
| 2 | 2003.04 | 0 | 0 | 12 | 0 | A |
| 2 | 2003.05 | 0 | 1 | 16 | 0 | C |

| | RING | | RING | | RING | | | | | STAR | | | STAR | STAR |
|---|---|---|---|---|---|---|---|---|---|---|---|---|---|---|
| TYPE OF LOGICAL NETWORK TOPOLOGY | RING | | RING | | RING | | | | | STAR | | | STAR | STAR |
| SPECIFIC USER NUMBER OF NETWORK-NODE EQUIPMENT | 1 | | 2 | | 3 | | | | | 4 | | | 5 | 6 |
| WAVELENGTH IN USE | λa | λb | λc | λ1 | λc | λa | λd | λe | λf | λd | λk | λi | λe | λf |
| SPECIFIC MANAGEMENT NUMBER OF OTHER END OF NETWORK-NODE EQUIPMENT | 3 | 2 | 3 | | 2 | 1 | 4 | 5 | 6 | 3 | | | 3 | 3 |
| TRANSMITTING STATUS OF WDM SIGNAL | 0k | 0k | 0k | 0k | 0k | 0k | 0k | 0k | 0k | 0k | 0k | 0k | 0k | 0k |
| RECEIVING STATUS OF WDM SIGNAL | 0k | 0k | 0k | 0k | 0k | 0k | 0k | 0k | 0k | 0k | 0k | 0k | 0k | 0k |
| CONNECTING STATUS OF NETWORK-NODE EQUIPMENT | 0k | 0k | 0k | 0k | 0k | 0k | 0k | 0k | 0k | 0k | 0k | 0k | 0k | 0k |
| NUMBER OF OPTICAL LINKS OF NETWORK-NODE EQUIPMENT | 3 | | 3 | | 5 | | | | | 3 | | | 1 | 1 |
| ADDING BANDWIDTH OF LINK | | | | | | | | | | | | | | |
| LENGTH OF TIME FOR INCREASING BANDWIDTH | | | | | | | | | | | | | | |

BANDWIDTH ADDITION — ONE MONTH 2-3808

FIG. 2-26

| USER ID | YEAR AND MONTH | INCREASED/DECREASED NUMBER OF NETWORK-NODE EQUIPMENTS | NUMBER OF INCREASING BANDWIDTH | TOTAL NUMBER OF WAVELENGTH PATH LINKS | DISCOUNT | CHARGE |
|---|---|---|---|---|---|---|
| 2 | 2003.01 | 0 | 0 | 12 | 0 | A |
| 2 | 2003.02 | 0 | 0 | 12 | 0 | A |
| 2 | 2003.03 | 0 | 0 | 12 | 0 | A |
| 2 | 2003.04 | 0 | 0 | 12 | 0 | A |
| 2 | 2003.05 | 0 | 1 | 16 | 0 | C |

| TYPE OF LOGICAL NETWORK TOPOLOGY | MESH |
|---|---|
| SPECIFIC MANAGEMENT NUMBER OF NETWORK-NODE EQUIPMENT | 1 |
| SPECIFIC USER NUMBER OF NETWORK-NODE EQUIPMENT | 1 |
| USER ID | 1 |
| WAVELENGTH IN USE | λ2 λ3 λ4 |
| | 2 3 4 |
| SPECIFIC MANAGEMENT NUMBER OF OTHER END OF NETWORK-NODE EQUIPMENT | ok ok ok |
| TRANSMITTING STATUS OF WDM SIGNAL | ok ok ok |
| RECEIVING STATUS OF WDM SIGNAL | ok ok ok |
| CONNECTING STATUS OF NETWORK-NODE EQUIPMENT | |
| NUMBER OF OPTICAL LINKS OF NETWORK-NODE EQUIPMENT | 3 |
| ADDING BANDWIDTH OF LINK | |
| LENGTH OF TIME FOR INCREASING BANDWIDTH | |

| USER ID | YEAR AND MONTH | INCREASED/DECREASED NUMBER OF NETWORK-NODE EQUIPMENTS | NUMBER OF INCREASING BANDWIDTH | TOTAL NUMBER OF WAVELENGTH PATH LINKS | DISCOUNT | CHARGE |
|---|---|---|---|---|---|---|
| 1 | 2003.01 | 0 | 0 | 12 | 0 | A |
| 1 | 2003.02 | 0 | 0 | 12 | 0 | A |
| 1 | 2003.03 | 0 | 0 | 12 | 0 | A |
| 1 | 2003.04 | 0 | 0 | 12 | 0 | A |
| 1 | 2003.05 | 0 | 1 | 16 | 0 | C |
| 2 | 2003.01 | 0 | 0 | 12 | 0 | A |
| 2 | 2003.02 | 0 | 0 | 12 | 0 | A |
| 2 | 2003.03 | 0 | 0 | 12 | 0 | A |
| 2 | 2003.04 | 0 | 0 | 12 | 0 | A |
| 2 | 2003.05 | 0 | 0 | 12 | $\alpha$ | D |

| TYPE OF LOGICAL NETWORK TOPOLOGY | MESH 1 | | | MESH 2 | | | | MESH 3 | | | MESH 4 | | | |
|---|---|---|---|---|---|---|---|---|---|---|---|---|---|---|
| SPECIFIC USER NUMBER OF NETWORK-NODE EQUIPMENT | 1 | | | 2 | | | | 3 | | | 4 | | | |
| WAVELENGTH IN USE | λ2 | λ3 | λ4 | λ3 | λ4 | λ1 | λh | λ4 | λ1 | λ2 | λ1 | λ2 | λ3 | λi |
| SPECIFIC MANAGEMENT NUMBER OF OTHER END OF NETWORK-NODE EQUIPMENT | 2 | 3 | 4 | 1 | 3 | 4 | 4 | 1 | 2 | 3 | 1 | 2 | 3 | 2 |
| TRANSMITTING STATUS OF WDM SIGNAL | Ok | Ok | Ok | Ok | Ok | Ok | Ok | Ok | Ok | Ok | Ok | Ok | Ok | Ok |
| RECEIVING STATUS OF WDM SIGNAL | Ok | Ok | Ok | Ok | Ok | Ok | Ok | Ok | Ok | Ok | Ok | Ok | Ok | Ok |
| CONNECTING STATUS OF NETWORK-NODE EQUIPMENT | Ok | Ok | Ok | Ok | Ok | Ok | Ok | Ok | Ok | Ok | Ok | Ok | Ok | Ok |
| NUMBER OF OPTICAL LINKS OF NETWORK-NODE EQUIPMENT | 3 | | | 4 | | | | 3 | | | 4 | | | |
| ADDING BANDWIDTH OF LINK | | | | | | | | | | | | | | |
| LENGTH OF TIME FOR INCREASING BANDWIDTH | | | | | | | | | | | | | | |

BANDWIDTH ADDITION — 2-3910

2-3909

BANDWIDTH ADDITION

BANDWIDTH ADDITION

BANDWIDTH ADDITION

ONE MONTH

ONE MONTH

| USER ID | YEAR AND MONTH | INCREASED/DECREASED NUMBER OF NETWORK-NODE EQUIPMENTS | NUMBER OF INCREASING BANDWIDTH | TOTAL NUMBER OF WAVELENGTH PATH LINKS | DISCOUNT | CHARGE |
|---|---|---|---|---|---|---|
| 1 | 2003.01 | 0 | 0 | 12 | 0 | A |
| 1 | 2003.02 | 0 | 0 | 12 | 0 | A |
| 1 | 2003.03 | 0 | 0 | 12 | 0 | A |
| 1 | 2003.04 | 0 | 0 | 12 | 0 | A |
| 1 | 2003.05 | 0 | 1 | 16 | 0 | C |

| USER ID | YEAR AND MONTH | INCREASED/DECREASED NUMBER OF NETWORK-NODE EQUIPMENTS | NUMBER OF INCREASING BANDWIDTH | TOTAL NUMBER OF WAVELENGTH PATH LINKS | DISCOUNT | CHARGE |
|---|---|---|---|---|---|---|
| 2 | 2003.01 | 0 | 0 | 12 | 0 | A |
| 2 | 2003.02 | 0 | 0 | 12 | 0 | A |
| 2 | 2003.03 | 0 | 0 | 12 | 0 | A |
| 2 | 2003.04 | 0 | 0 | 12 | 0 | A |
| 2 | 2003.05 | 0 | 0 | 12 | α | D |

| | | | | | |
|---|---|---|---|---|---|
| TYPE OF LOGICAL NETWORK TOPOLOGY | RING | RING | RING | RING | RING |
| SPECIFIC MANAGEMENT NUMBER OF NETWORK-NODE EQUIPMENT | 1 | 2 | 2 | 3 | 4 |
| SPECIFIC USER NUMBER OF NETWORK-NODE EQUIPMENT | 1 | | 2 | 3 | 4 |
| USER ID | 1 | | 1 | 1 | 1 |
| WAVELENGTH IN USE | λδ | λa | λa | λβ | λβ | λγ | λγ | λδ |
| | 1 | 2 | 1 | 3 | 2 | 4 | 3 | 1 |
| SPECIFIC MANAGEMENT NUMBER OF OTHER END OF NETWORK-NODE EQUIPMENT | Ok | Ok | Ok | Ok | Ok | Ok | Ok | Ok |
| TRANSMITTING STATUS OF WDM SIGNAL | Ok | Ok | Ok | Ok | Ok | Ok | Ok | Ok |
| RECEIVING STATUS OF WDM SIGNAL | Ok | Ok | Ok | Ok | Ok | Ok | Ok | Ok |
| CONNECTING STATUS OF NETWORK-NODE EQUIPMENT | | | | | | | | |
| NUMBER OF OPTICAL LINKS OF NETWORK-NODE EQUIPMENT | 2 | 2 | 2 | 2 | 2 |
| ADDING BANDWIDTH OF LINK | | | | | |
| LENGTH OF TIME FOR INCREASING BANDWIDTH | | | | | |

| | RING 1 | RING 2 | | RING 3 | | RING 4 | |
|---|---|---|---|---|---|---|---|
| TYPE OF LOGICAL NETWORK TOPOLOGY | RING | RING | | RING | | RING | |
| SPECIFIC USER NUMBER OF NETWORK-NODE EQUIPMENT | 1 | 2 | | 3 | | 4 | |
| WAVELENGTH IN USE | λδ | λα | λβ | λβ | λγ | λγ | λδ |
| SPECIFIC MANAGEMENT NUMBER OF OTHER END OF NETWORK-NODE EQUIPMENT | 2 | 1 | 3 | 2 | 4 | 3 | 1 |
| TRANSMITTING STATUS OF WDM SIGNAL | ok | ok | ok | ok | ok | ok | ok |
| RECEIVING STATUS OF WDM SIGNAL | ok | ok | ok | ok | ok | ok | ok |
| CONNECTING STATUS OF NETWORK-NODE EQUIPMENT | ok | ok | ok | ok | ok | ok | ok |
| NUMBER OF OPTICAL LINKS OF NETWORK-NODE EQUIPMENT | 2 | 2 | | 2 | | 2 | |
| ADDING BANDWIDTH OF LINK | | | | | | | |
| LENGTH OF TIME FOR INCREASING BANDWIDTH | | | | | | | |

FIG. 2-38

| TYPE OF LOGICAL NETWORK TOPOLOGY | RING | RING | | RING | | RING | | RING | |
|---|---|---|---|---|---|---|---|---|---|
| SPECIFIC MANAGEMENT NUMBER OF NETWORK-NODE EQUIPMENT | 1 | 2 | | 2 | | 3 | | 4 | |
| SPECIFIC USER NUMBER OF NETWORK-NODE EQUIPMENT | 1 | | | | | 3 | | 4 | |
| USER ID | 1 | 1 | | 1 | | 1 | | 1 | |
| WAVELENGTH IN USE | λδ | λα | λα | λβ | λβ | λγ | λγ--λδ | | |
| SPECIFIC MANAGEMENT NUMBER OF OTHER END OF NETWORK-NODE EQUIPMENT | 1 | 2 | 1 | 3 | 2 | 4 | 3 | | 1 |
| TRANSMITTING STATUS OF WDM SIGNAL | Ok | Ok | Ok | Ok | Ok | Ok | Off | | Off |
| RECEIVING STATUS OF WDM SIGNAL | Ok | Ok | Ok | Ok | Ok | Ok | NG | | NG |
| CONNECTING STATUS OF NETWORK-NODE EQUIPMENT | Ok | Ok | Ok | Ok | Ok | Ok | Ok | | Ok |
| NUMBER OF OPTICAL LINKS OF NETWORK-NODE EQUIPMENT | 2 | 2 | | 2 | | 2 | | 0 | |
| ADDING BANDWIDTH OF LINK | | | | | | | | | |
| LENGTH OF TIME FOR INCREASING BANDWIDTH | | | | | | | | | |

| USER ID | YEAR AND MONTH | INCREASED/DECREASED NUMBER OF NETWORK-NODE EQUIPMENTS | NUMBER OF INCREASING BANDWIDTH | TOTAL NUMBER OF WAVELENGTH PATH LINKS | DISCOUNT | CHARGE |
|---|---|---|---|---|---|---|
| 1 | 2003.01 | 0 | 0 | 8 | 0 | E |
| 1 | 2003.02 | 0 | 0 | 8 | 0 | E |
| 1 | 2003.03 | 0 | 0 | 8 | 0 | E |
| 1 | 2003.04 | 0 | 0 | 8 | 0 | E |
| 1 | 2003.05 | −1 | 0 | 6 | 00 | F |

| TYPE OF LOGICAL NETWORK TOPOLOGY | RING | | | RING | | | RING | | | RING | | |
|---|---|---|---|---|---|---|---|---|---|---|---|---|
| SPECIFIC USER NUMBER OF NETWORK-NODE EQUIPMENT | 1 | | | 2 | | | 3 | | | 4 | | |
| WAVELENGTH IN USE | λδ | λα | λα | λα | λβ | λβ | λβ | λγ | λγ | λγ | λδ |
| SPECIFIC MANAGEMENT NUMBER OF OTHER END OF NETWORK-NODE EQUIPMENT | 1 | 2 | 1 | 3 | 2 | 4 | | | | | |
| TRANSMITTING STATUS OF WDM SIGNAL | Ok | Ok | Ok | Ok | Ok | Ok | Off | Off | | | |
| RECEIVING STATUS OF WDM SIGNAL | Ok | Ok | Ok | Ok | Ok | Ok | NG | NG | | | |
| CONNECTING STATUS OF NETWORK-NODE EQUIPMENT | Ok | Ok | Ok | Ok | Ok | Ok | Ok | Ok | | | |
| NUMBER OF OPTICAL LINKS OF NETWORK-NODE EQUIPMENT | 2 | | | 2 | | | 2 | | | 0 | | |
| ADDING BANDWIDTH OF LINK | | | | | | | | | | | | |
| LENGTH OF TIME FOR INCREASING BANDWIDTH | | | | | | | | | | | | |

| USER ID | YEAR AND MONTH | INCREASED/DECREASED NUMBER OF NETWORK-NODE EQUIPMENTS | NUMBER OF INCREASING BANDWIDTH | TOTAL NUMBER OF WAVELENGTH PATH LINKS | DISCOUNT | CHARGE |
|---|---|---|---|---|---|---|
| 1 | 2003.01 | 0 | 0 | 8 | 0 | E |
| 1 | 2003.02 | 0 | 0 | 8 | 0 | E |
| 1 | 2003.03 | 0 | 0 | 8 | 0 | E |
| 1 | 2003.04 | 0 | 0 | 8 | 0 | E |
| 1 | 2003.05 | −1 | 0 | 6 | 0 | F |

OPTICAL INPUT PORT
OPTICAL OUTPUT PORT

|   | 1<br>(3-51e) | 2<br>(3-51f) | 3<br>(3-51g) | 4<br>(3-51h) |
|---|---|---|---|---|
| 1<br>(3-51a) | $\lambda 1$ | $\lambda 2$ | $\lambda 3$ | $\lambda 4$ |
| 2<br>(3-51b) | $\lambda 4$ | $\lambda 1$ | $\lambda 2$ | $\lambda 3$ |
| 3<br>(3-51c) | $\lambda 3$ | $\lambda 4$ | $\lambda 1$ | $\lambda 2$ |
| 4<br>(3-51d) | $\lambda 2$ | $\lambda 3$ | $\lambda 4$ | $\lambda 1$ |

FIG. 3-2B

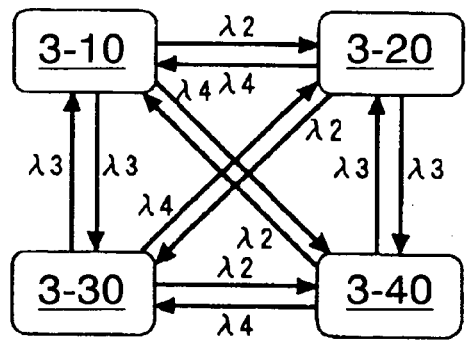

FIG. 3-3A

OPTICAL INPUT PORT
OPTICAL OUTPUT PORT

|   | 1<br>(3-51e) | 2<br>(3-51f) | 3<br>(3-51g) | 4<br>(3-51h) |
|---|---|---|---|---|
| 1<br>(3-51a) | $\lambda 1$ | $\lambda 2$ | $\lambda 3$ | $\lambda 4$ |
| 2<br>(3-51b) | $\lambda 4$ | $\lambda 1$ | $\lambda 2$ | $\lambda 3$ |
| 3<br>(3-51c) | $\lambda 3$ | $\lambda 4$ | $\lambda 1$ | $\lambda 2$ |
| 4<br>(3-51d) | $\lambda 2$ | $\lambda 3$ | $\lambda 4$ | $\lambda 1$ |

FIG. 3-3B

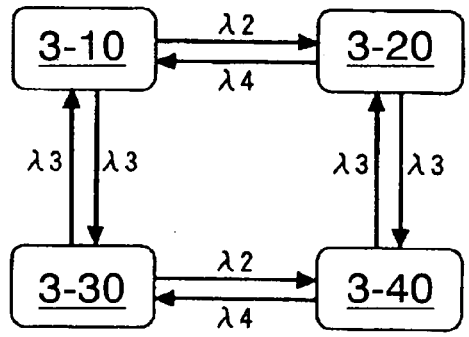

FIG. 3-4
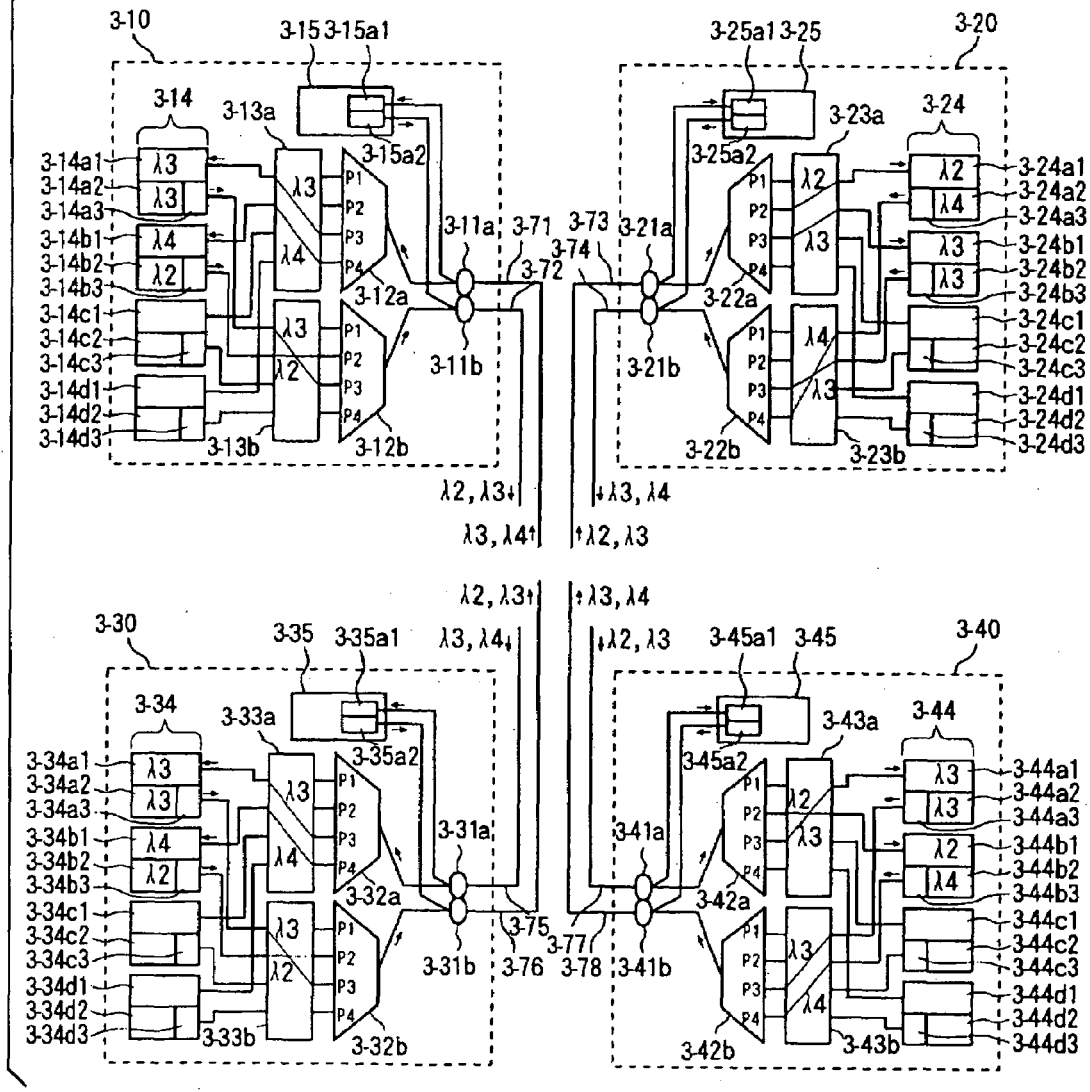
FIG. 3-5A
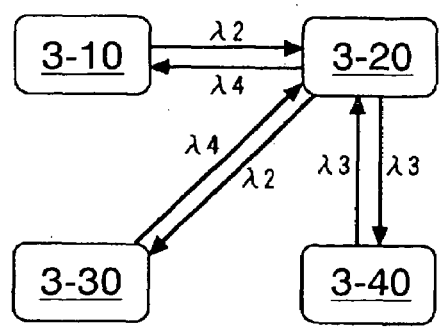
FIG. 3-5B

FIG. 3-6
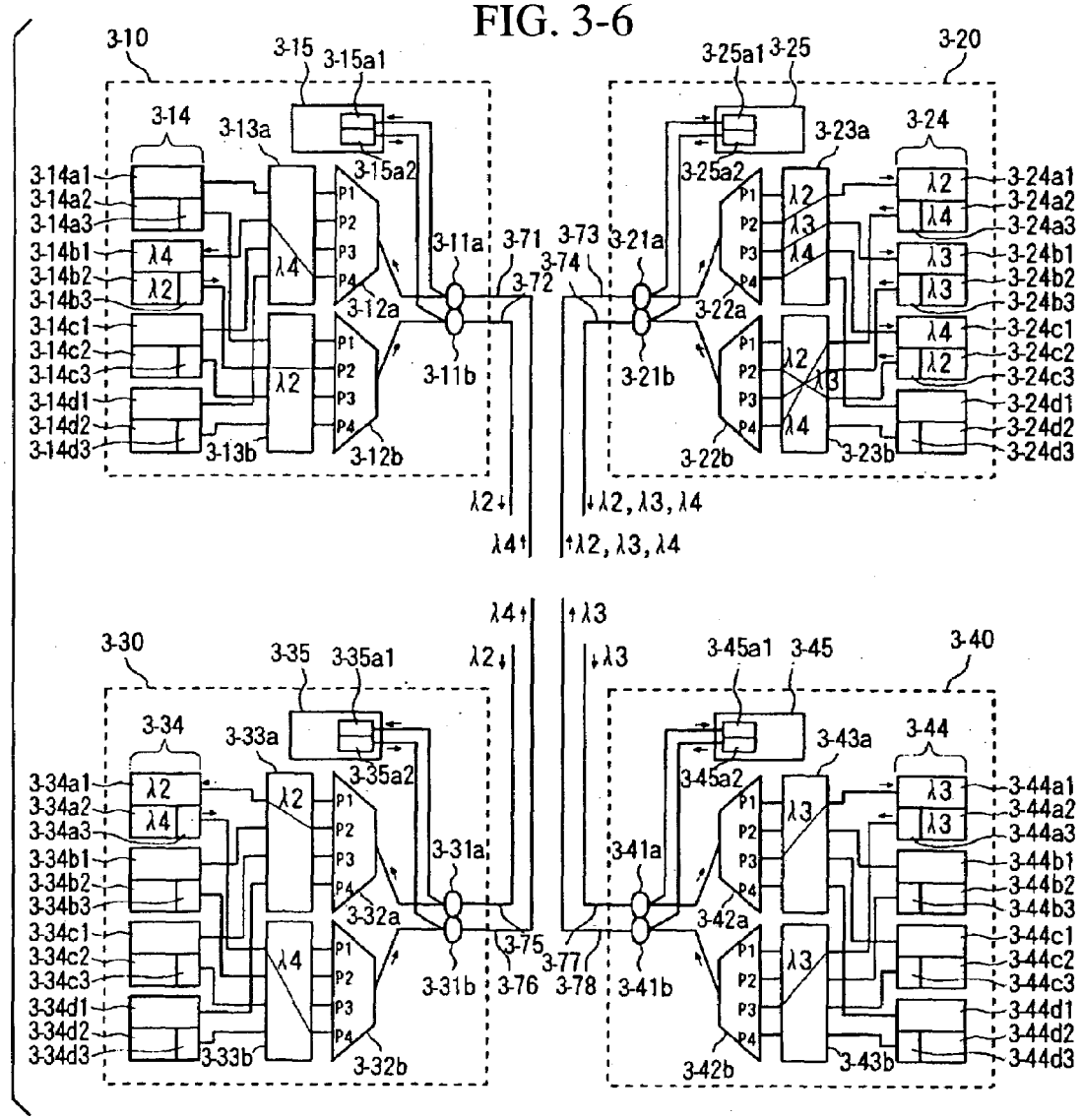
FIG. 3-7A
OPTICAL INPUT PORT
OPTICAL OUTPUT PORT
|  | 1 (3-51e) | 2 (3-51f) | 3 (3-51g) | 4 (3-51h) |
|---|---|---|---|---|
| 1 (3-51a) | λ1 | λ2 | λ3 | λ4 |
| 2 (3-51b) | λ4 | λ1 | λ2 | λ3 |
| 3 (3-51c) | λ3 | λ4 | λ1 | λ2 |
| 4 (3-51d) | λ2 | λ3 | λ4 | λ1 |
FIG. 3-7B
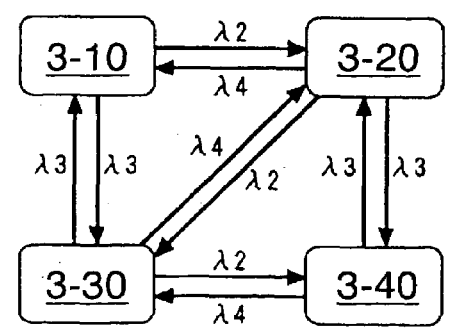

| | 1 | 2 | 3 | 4 |
|---|---|---|---|---|
| 1 | 3 2 | 3 3 (4-9001) | 3 4 (4-9009) | 3 5 (4-9002) |
| 2 | 3 5 (4-9003) | 3 2 | 3 3 (4-9004) | 3 4 (4-9010) |
| 3 | 3 4 (4-9011) | 3 5 (4-9005) | 3 2 | 3 3 (4-9006) |
| 4 | 3 3 (4-9007) | 3 4 (4-9012) | 3 5 (4-9008) | 3 2 |

| Status bits | Network-node equipment status |
|---|---|
| 000 | Initial status |
| 001 | Topology reconfiguration reserved status |
| 010 | Completion of acceptance of topology reconfiguration request from other network-node equipment status |
| 011 | Rejection of topology reconfiguration request from other network-node equipment status |
| 100 | Completion of reception of wavelength and reconfiguration clock-time class status |
| 101 | Completion of reconfiguration to new wavelength status |

OPTICAL COMMUNICATION NETWORK SYSTEM

TECHNICAL FIELD

The present invention relates to a fiber optic communication system, a wavelength tunable light source unit thereof, a network-node equipment having a wavelength tunable optical receiver unit installed, and a central processing unit and a computer program thereof, that are applied to a geographically-distributed iDC (Internet Data Center) implemented for a local administrative network, and to an IX (Internet exchange) network, and in which, by changing the wavelengths of optical signals used for the connection between network-node equipments, the logical network topology can be easily reconfigured on M network-node equipments (M is an integer no smaller than 2, nor greater than M) that are connected to a uniform-loss and cyclic-frequency (ULCF) arrayed wavelength grating (AWG) having N inputs and N outputs (N is an integer greater than or equal to 2).

BACKGROUND ART

Conventionally, the amount of traffic traveling through fiber optic communication networks has been steadily changing and increasing explosively as is represented by data centers. Moreover, the number of network-node equipments accommodated on a fiber optic communication network and the types of data are becoming various, and it is becoming necessary to dynamically change the network topology, connection configuration, or even traffic capacity. For instance, in the current local public network described in "Proposal for local electronic government synergistic IDC operation for local electronic government implementation" (Chikafumi Shimura, Local management newsletter, vol. 34, June 2001, Nomura Research Institute), there has been a call for: interconnection of municipal networks having different network topologies; installation of additional network-nodes or network-node removal; network topology reconfiguration following organizational integration or organizational expansion; and dynamic implementation of wavelength path reconfiguration in order to bypass failures. Also, there has been a strong call for integration of networks having different network topologies while maintaining their securities, and for superposing and operating networks having different signal formats and operation policies simply and inexpensively. Accordingly a fiber optic communication system has been expected in which connections with any network-node can be selectively established and logical network topologies can be arbitrarily reconfigured, by changing the wavelength of optical signals used for the connection between network nodes, by a wavelength tunable light source unit and a wavelength tunable optical receiver unit installed on network-node equipments in a fiber optic communication network that is physically connected to a uniform-loss and cyclic-frequency (ULCF) arrayed wavelength grating (AWG) in a star-shape via an optical wave guide such as an optical fiber (see also: K. Kato et al, "32×32 full-mesh (1024 path) wavelength-routing WDM network based on uniform-loss cyclic-frequency arrayed-waveguide grating", Electronics Letters, vol. 36, 1294-1296, 2000).

On the other hand, in investigations so far, networks are being advanced in which the connection configuration of optical wave guided paths such as optical fibers, which are transmission paths, physically has a ring topology (for example, Japanese Unexamined Patent Application, First Publication No. 2001-285323, Japanese Unexamined Patent Application, First Publication No. Hei 7-202845, and Japanese Unexamined Patent Application, First Publication No. 2001-184408).

For example, the network-node equipment disclosed in Japanese Unexamined Patent Application, First Publication Hei 7-202845 is constructed as shown in FIG. 4-37. An optical splitter (4-1) is one which splits an input optical signal into two regardless of its wavelength. An optical signal having eight wavelengths which is transmitted through the optical fiber is input thereto, and signals are output to an optical filter 4-2, a fixed-wavelength receiver unit A (4-4), and a fixed-wavelength receiver unit B (4-11).

The optical filter 4-2 has a function of intercepting from among the optical signals of eight wavelengths outputted from the optical splitter 4-1, two wavelengths, $\lambda s$ (short wavelength) and $\lambda e$ (long wavelength) that the network terminal transmits and receives, and transmitting the other wavelengths.

An optical combiner 4-3 combines the optical signals of six wavelengths transmitted from the optical filter 4-2 and optical signals of two wavelengths ($\lambda s$, $\lambda e$) outputted from a wavelength tunable transponder unit A (4-7) and a wavelength tunable transponder unit B14, and transmits them to optical fibers (not shown). The optical signals transmitted are inputted to the optical splitter 1 of the neighboring network-node equipment via an optical fiber (not shown in the diagram).

The fixed-wavelength receiver unit A (4-4) comprises a fixed-wavelength optical filter and a photodetector, and has a function of receiving only the optical signal of wavelength $\lambda s$ from among the optical signals of two wavelengths ($\lambda s$, $\lambda e$) outputted from the optical splitter 4-1, and converting the signal into an electrical signal. Similarly, the fixed-wavelength receiver unit B (4-11) receives only the optical signal of wavelength $\lambda e$, and converts it into an electrical signal.

Selectors A and B (4-5 and 4-12) respectively reference received destination information assigned to the received data, and output the received data to a data processing module if the received data is addressed to the own network-node equipment. Also, if the received data is not addressed to the own network-node equipment and is to be relayed, the received data is outputted to a predetermined dual port memory of memory units A and B according to the received destination information.

Memory units A and B (4-6 and 4-13) have two dual port memories for data that specifies the wavelength of launched optical signal for every wavelength of launched optical signal, and one dual port memory for the data that does not specify the wavelength of launched optical signal.

The wavelength tunable transponder units A and B (4-7 and 4-14) have a function to convert the transmitted data into an optical signal and transmit it with two respective wavelengths: wavelength $\lambda s$ and wavelength $\lambda e$. The wavelength tunable transponder unit A (4-7) is paired with the fixed-wavelength receiver unit A, and the wavelength tunable transponder unit 4-14 is paired with the fixed-wavelength receiver unit B (4-11).

A data processing module 4-8 of the network-node equipment performs the requested process for the data transmitted from other network-node equipment while performing processes such as assigning received destination information for the data that is to be transmitted from the own network-node equipment to another network-node equipment, and outputs the data to the memory unit A (4-6) or the memory unit B (4-13).

An end of transmission detection unit 4-9 detects the transmission end of the data stored in each of the dual port memories of the memory unit A (4-6) and the memory unit B (4-13), and outputs a wavelength switch signal to a wavelength controlling unit 4-10. The wavelength controlling unit 4-10 controls the oscillating wavelengths used for the wavelength tunable transponder units A and B to be $\lambda$s and $\lambda$e, by regulating the injection current of a tunable laser diode (hereunder referred to as TLD), which is described later.

However, when designing a network or changing a network configuration, although there are methods for configuring a plurality of different virtual LANs (VLAN) as different respective logical network topologies in the reconfiguration of logical network topologies, in the installation of a new network-node equipment or removal of network-node equipment, and in the reconfiguration of a logical network topology in order to circumvent failure, there is complexity in each of the various kinds of settings, and a few months to six months is required for the construction. Also these operations have required a lot of work and there has been the problem of the risk of network collapse and so forth caused by human error. Moreover, although it has been possible, by using technology such as traffic engineering (TE) that is capable of selecting routes. according to the amount of traffic, to reconfigure the logical network-topology according to the load on the network, cases in which the amount of traffic exceeds expected traffic are conceivable, such as distributing live concert video images or providing information in a time of disaster, and the complexity of network setting operations and the problems in stable network operation still remain for the present technology. Moreover cases in which it has been necessary to review and reconfigure the physical network topology that have been determined according to the connection configuration of optical fibers have not been few.

Also, the same is true even with reconfiguration of logical network topology using wavelength path by wavelength division multiplexing (WDM) technology, and this operation also requires work, and dynamic and quick reconfiguration of a logical network topology has been comparatively difficult.

When automatizing in order to treat these problems, although a collective management method by central-management-equipment or a method of assigning a setting to each individual equipment are common, in the former method, since multiple control information is required to control the wavelength tunable light source and wavelength tunable filter that are provided for the network-node equipments, then when performing network topology reconfiguration, the number of network-node equipments and the load on the central-management-equipment increase, and fast topology reconfiguration has been made difficult. Moreover, in the latter method, since settings for the wavelength tunable light source and the wavelength tunable filter need to be assigned separately to different network-node equipments, the load on the network administrator has increased in initial network configuration or in network reconfiguration when changing the network topology.

Furthermore, in the network system described in Japanese Unexamined Patent Application, First Publication No Hei 7-202845 mentioned above, in which a management method is explained, a network-node equipment autonomously performs controls related to search and determination of the wavelength of optical signals used for connection with other network-node equipments. However the two wavelengths to be used are not regulated to be just two successive adjacent wavelengths, and when the case of connections with many network-node equipments using more than two wavelengths is considered, there is concern of an increase in processing time required for the data processing module in the network-node equipment shown in FIG. 4-34.

However, in actual fiber optic communication systems, topology reconfiguration needs to be performed promptly according to changes in traffic pattern or efficient network usage, and in terms of stable network operation it is preferable not to require a long time from the start of the topology reconfiguration to its completion, and it has been desirable that high-speed topology reconfiguration be made possible.

In view of the problems mentioned above, it is an object of the present invention to provide a logical topology reconfigurable optical network system, a central-management-equipment, and a wavelength tunable light source unit thereof, and a network-node equipment into which is installed a wavelength tunable optical receiver unit and a computer program thereof, which are applicable to a geographically-distributed iDC (Internet Data Center) implemented for a local administrative network and to an IX (Internet exchange) network, and in which, installation and utilization of the logical topology reconfigurable optical network system, which is realized with a wavelength path routing function of an arrayed waveguide grating (AWG) and wavelength tunable light sources mounted on network-node equipments that are physically connected to the AWG in a star shape via optical waveguides such as optical fibers, can be achieved.

Moreover it is an object to provide an actual fiber optic communication system in which clock time synchronization of all network-node equipments can be performed by a central-management-equipment, and wavelength information for forwarding data signals and wavelength information for receiving data signals required for logical network topology reconfiguration, are transmitted along with trigger time information for logical topology reconfiguration from the central-management-equipment to network-node equipments, and in which network-node equipments can autonomously change wavelengths of launched optical signals and receiving optical signals at high speed when the reconfiguring time of the logical network topology is reached.

DISCLOSURE OF THE INVENTION

In order to solve the above-mentioned problems, according to one aspect of the present invention there is provided a fiber optic communication system comprising an arrayed waveguide grating (AWG) that has N optical input ports (where N is an integer greater than or equal to 2) and N optical output ports, and that has a routing function that outputs to predetermined optical output ports in accordance with a wavelength of optical signals inputted to respective optical input ports, and M (where M is an integer no smaller than 2, nor greater than an integer N) network-node equipments connected via optical transmission paths so as to form a geometrically star-shaped physical star topology having the AWG in the center, wherein the network-node equipments comprise a device of wavelength switching that switches the wavelength of the optical signals in order to dynamically change a logical network topology that indicates a geometrical form of routes of the optical signals used for transmitting/receiving data (hereunder referred to as optical signals) between network-node equipments.

Preferably, in the above-mentioned fiber optic communication system, the network-node equipments belong to at least one or more logical network topologies, and configure two or more mutually independent logical network topologies.

Preferably, in the above-mentioned fiber optic communication system, the device of wavelength switching switches wavelengths of optical signals when connecting or transferring the network-node equipments belonging to a predetermined logical network topology, to another logical network topology.

Preferably, in the above mentioned fiber optic communication system, a logical network topology is configured with two or more network-node equipments, and the device of wavelength switching switches wavelengths of optical signals so that at a predetermined time, all of the two or more network-node equipments configure a new logical network topology that is different from the logical network topology.

Preferably, in the above mentioned fiber optic communication system, the logical network topology configures at least one kind of either: a ring-shaped logical network topology having geometrically a ring shape, a star-shaped logical network topology having a star shape, and a mesh-shaped logical network topology having a mesh shape, or configures a logical network topology that is a combination of these.

Preferably, in the above mentioned fiber optic communication system, the device of wavelength switching comprises a wavelength tunable light source unit capable of changing the wavelength of an output signal, and a wavelength tunable optical receiver unit capable of selecting the wavelength of a receiving optical signal; and the wavelength tunable light source unit comprises L (L being an integer no smaller than 2, nor greater than M) optical elements installed therein, the optical elements comprising an elemental structure in which a wavelength tunable laser and a modulator are connected in series or mutually integrated, or comprising a semiconductor laser diode with direct modulation capability, and being connected by an L×1 optical coupler; and the wavelength tunable optical receiver unit comprises L (L being an integer no smaller than 2, nor greater than M) optical elements installed therein, said optical elements comprising an optical receiver and a wavelength tunable filter connected in series with the optical receiver and passing only a predetermined wavelength, and being connected to an L×1 optical coupler.

Preferably, in the above mentioned fiber optic communication system, the device of wavelength switching comprises a wavelength tunable light source unit capable of changing the wavelength of an output signal, and a wavelength tunable optical receiver unit capable of selecting the wavelength of a receiving optical signal; and the wavelength tunable light source unit comprises L (L being an integer no smaller than 2, nor greater than M) optical elements installed therein, the optical elements comprising an elemental structure in which a wavelength tunable laser and a modulator are connected in series or mutually integrated, or comprising a semiconductor laser diode with direct modulation capability, and being connected in series to L×N switches and N×1 combiners which are connected in series, and the wavelength tunable optical receiver unit comprises L (L is an integer no smaller than 2, nor greater than M) optical receivers installed therein, the optical receivers being connected in series to the L×N switches and the N×1 combiners.

Preferably, in the above mentioned fiber optic communication system, the network-node equipment comprises: L (L is an integer no smaller than 2, nor greater than M) optical signal in/output ports of network terminals that are connectable to network-terminal equipments, the optical signal in/output ports of network terminals comprising optical signal input ports of network terminals and optical signal output ports of network terminals; L O/E converters that convert optical signals from the L optical signal input ports of network terminals into electrical signals; an E/O converter that converts into optical signals, output electrical signals from the L receivers that constitute the wavelength tunable optical receiver unit; and optical waveguides such as optical fibers by which output electrical signals from the L O/E converters are inputted to said wavelength tunable light source, and by which the converted optical signals are outputted from the L optical signal output ports of network terminals.

Preferably, in the above mentioned fiber optic communication system, the network-node equipment comprises L (L being an integer no smaller than 2, nor greater than M) optical signal in/output ports of network terminals that are connectable to network-terminal equipments, the optical signal in/output ports of network terminals comprising optical signal input ports of network terminals and optical signal output ports of network terminals; and the L optical signal input ports of network terminals are connected in series to L O/E converters which convert optical signals into electrical signals, and to 2L×2L switches; and the L optical signal output ports of network terminals are connected in series to L E/O converters which convert electrical signals into optical signals, and to the 2L×2L electrical switches; and furthermore the 2L×2L electrical switches are connected to the wavelength tunable light source unit, and to the wavelength tunable optical receiver unit; and by predetermined operation of the 2L×2L electrical switches, optical signals delivered to the network-node equipment from the arrayed waveguide grating (AWG) are wavelength converted in the network-node equipment without being transmitted to network-node terminals that are physically connected to the network-node equipments, and are re-transmitted to the arrayed waveguide grating (AWG).

Preferably, in the above mentioned fiber optic communication system, each of the network-node equipments and the arrayed waveguide grating comprise an optical circulator that changes the directions of input light signals and output light signals, and input/output ports of the optical circulator provided for the network-node equipments are respectively connected to the wavelength tunable optical receiver unit and the wavelength tunable light source unit via optical waveguides such as optical fibers, and input/output ports of the optical circulator provided for the arrayed waveguide grating (AWG) are respectively connected to an optical output port and an optical input port of the AWG, and by respectively connecting common ports of the optical circulators provided for the network-node equipments and the AWG via optical waveguides such as single-core optical fibers, each of the network-node equipments and the AWG are respectively connected via optical waveguides such as single-core optical fibers.

Preferably, in the above mentioned fiber optic communication system, the arrayed waveguide grating (AWG) has uniform-loss and cyclic-frequency (ULCF).

Preferably, in the above mentioned fiber optic communication system, the network-node equipment has two different wavelength paths connected to the arrayed waveguide grating (AWG), and a ring-shaped logical network topology is formed as the logical network topology having two or more of the network-node equipments.

Preferably, in the above mentioned fiber optic communication system, each of the network-node equipments that configure the ring-shaped logical network topology has two communication channels that allow backward communication, and the device of wavelength switching, when one of the communication channels is disconnected, switches the wavelength of an optical signal so as to form a new ring-shaped logical network topology, so that the optical signal, which is inputted from the other communication channel to be outputted to the one (now disconnected) communication channel, is transmittable back to the other communication channel.

Preferably, in the above mentioned fiber optic communication system, each of the network-node equipments belonging to the ring-shaped logical network topology has two communication channels that allow backward communication, and the device of wavelength switching, when communication with a network-node equipment that communicates using one communication channel fails, switches the wavelengths of an optical signal so as to configure a new ring-shaped logical network topology, so that the network-node equipment experiencing communication failure is bypassed, and communication with an arbitrary network-node equipment is established.

Preferably, the above mentioned fiber optic communication system further comprises a central-management-equipment, and the central-management-equipment includes a controlling device that transmits to the network-node equipment a control signal that includes information of changing wavelength, and that receives a control signal that includes information of communication status from the network-node equipment, and the device of wavelength switching of the network-node equipment switches the wavelength of an optical signal based on the control signal received from the central-management-equipment.

Preferably, in the above mentioned fiber optic communication system, the wavelength of the control signal that is transmitted and received on each of the network-node equipments is set to be of a different wavelength bandwidth to that of the optical signal, and the network-node equipment comprises a WDM coupler having an optical combiner that combines the optical signal and the optical signal of the control signal, and an optical splitter that splits the combined signal of the optical signal and the optical signal of the control signal into the optical signal and the optical signal of the control signal; and the arrayed waveguide grating (AWG) comprises a WDM coupler having an optical combiner that combines the optical signal of the control signal from the central-management-equipment and the optical signal of the signal outputted from the arrayed waveguide grating (AWG), and an optical splitter that splits the combined signal of the optical signal transmitted from each network-node and the optical signal of the control signal into the optical signal and the optical signal of the control signal, and the optical transmission path that the optical signal uses is also shared as an optical transmission path for the control signal.

Preferably, in the above mentioned fiber optic communication system, between the network-node equipment and the central-management-equipment, the control signal is transmitted physically separated from the communication channel that transmits the optical data signal.

Preferably, in the above mentioned fiber optic communication system, the network-node equipment further comprises: a node database that is provided in at least one of either inside or outside of the equipment and that stores wavelength data, and a device of updating the data of the node database when the wavelength of the optical signal has been switched; and the central-management-equipment further comprises a central database that is provided in at least one of either inside or outside of the equipment and that stores wavelength data of all of the network-node equipments, and a device of updating the data of the central database when the wavelengths used between the network-node equipments change.

Preferably, in the above mentioned fiber optic communication system, the network-node equipment has a device of storing in the node database information on: available wavelength bandwidth, all wavelengths currently in use, transmitting optical power status and receiving optical power status of the optical signal of each wavelength, connection status between the network-node equipments, and logical network topology currently connected; and notifying the information to the central-management-equipment in response to a request therefrom.

Preferably, in the above mentioned fiber optic communication system, the network-node equipment has a device of always monitoring the transmitting optical power status and receiving optical power status of the optical signal of each wavelength, and detecting an abnormality and notifying the central-management-equipment, if an abnormality in these statuses occurs; and the central-management-equipment comprises a device of detecting abnormality in the connection status between all of the network-node equipments, and the transmitting optical power status and receiving optical power status of the optical signal of each wavelength of the wavelength tunable light source unit, and of sharing the abnormal status information with all of the network-node equipments.

Preferably, in the above mentioned fiber optic communication system, the central-management-equipment comprises a device which, when a control signal is received including a request for a network-node equipment currently connected to a logical network topology to change connection to another different logical network topology, determines whether or not to conform by querying the central database and performing a computation, and if the result of the determination is to conform, transmits a control signal including notification of disengagement and wavelength reconfiguration of the network-node equipment to all of the network-node equipments within the logical network topology to which the network-node equipment that launched the request of logical network topology connection change is connected, and transmits a control signal including notification of the joining of the network-node equipment and wavelength reconfiguration to all of the network-node equipments within the logical network topology to which the network-node equipment that launched the request of logical network topology connection change, is to be connected.

Preferably, in the above mentioned fiber optic communication system, the central-management-equipment comprises at least one of either: a device which, when the amount of traffic between specific network-node equipments increases and a network load is generated, and a control signal including a request for a bandwidth increase between the network-node equipments is received, determines whether or not the request for a bandwidth increase is possible by querying the central database and performing a computation to form a new wavelength path, and transmits a control signal including notification of wavelength reconfiguration to set a rerouting wavelength path that is configured by routing through other network-node equipments to which the network-node equipment has not been connected, to each of the network-node equipments to perform setting of the rerouting wavelength path; or a device which, when the amount of traffic between specific network-node equipments increases and a network load is generated and a control signal including a request for a bandwidth increase between the network-node equipments is received, determines whether or not the request for a bandwidth increase is possible by querying the central database and performing a computation to form a new wavelength path, and transmits a control signal including notification of wavelength reconfiguration for providing a new rerouting wavelength path by using a wavelength that has not been used by the network-node equipment connected to another logical network topology to which the network-node equipment is not connected, to each of the network-node equipments to perform setting of the rerouting wavelength path.

Preferably, in the above mentioned fiber optic communication system, the network-node equipment further comprises: a device of synchronizing the clock time of each of the network-node equipments; and a device of information-storing that stores new information of changing wavelength of the optical signals, and the information of reconfiguring time of the logical network topology including the time at which wavelength change should be executed, and the device of wavelength switching switches the wavelengths of the optical signals at a predetermined time in accordance with the information of reconfiguring time of the logical network topology and the information of changing wavelength.

Preferably, in the above mentioned fiber optic communication system, the central-management-equipment further comprises a device of distributing clock time information that distributes clock time information to each of the network-node equipments; the controlling unit comprises a device of generating new information of changing wavelength of the optical signals of each of the network-node equipments, and information of reconfiguring time of the logical network topology including the time the wavelength change should be executed, and transmitting them separately or all together to the network-node equipment; the network-node equipment comprises: a device of adjusting clock time that adjusts its own clock time in accordance with the information of clock time distributed from the central-management-equipment, and a device of information-storing that receives and stores the information of changing wavelength and the information of reconfiguring time of the logical network topology transmitted from the central-management-equipment; and the device of wavelength switching switches the wavelength of the optical signals at a predetermined time in accordance with the information of reconfiguring time of the logical network topology and the information of changing wavelength.

Preferably, in the above mentioned fiber optic communication system, a specific network-node equipment among the network-node equipments comprises a device of distributing clock time information that distributes clock time information to other network-node equipments; the other network-node equipments comprise a device of adjusting clock time that adjusts their own clock time in accordance with the clock time information distributed from the specific network-node equipment; the specific network-node equipment comprises a device of generating information of changing wavelength of the optical signals of the network-node equipment, and information of reconfiguring time of the logical network topology including the time the wavelength change should be executed, and transmitting them separately or all together to the network-node equipments; and the other network-node equipments comprise a device of information-storing that stores the information of changing wavelength and the information of reconfiguring time of the logical network topology received from the specific network-node equipment; and the device of wavelength switching of the other network-node equipments switches the wavelengths of the optical signals at a predetermined time in accordance with the information of reconfiguring time of the logical network topology and the information of changing wavelength.

According to another aspect of the present invention, there is provided a central-management-equipment that is connected to M (where M is an integer no smaller than 2, nor greater than an integer N) network-node equipments connected via optical transmission paths and configured so as to form a geometrically star-shaped physical star topology having in the center an arrayed waveguide grating (AWG) that has N optical input ports (where N is an integer greater than or equal to 2) and N optical output ports and a routing function that outputs to predetermined optical output ports in accordance with a wavelength of optical signals inputted to respective optical input ports, wherein the central-management-equipment comprises a device of controlling that transmits to the network-node equipments a control signal that includes information of changing wavelength of the optical signals and causes the switching of the wavelength of the optical signals, and receives from the network-node equipments a control signal that includes information of communication status, in order to dynamically change a logical network topology that indicates a geometrical form of routes of the optical signals used for transmitting/receiving data (hereunder referred to as optical signals) between the network-node equipments.

According to still another aspect of the present invention, there is provided a network-node equipment that is connected to M (M is an integer greater than or equal to 1 and less than or equal to N−1) other network-node equipments via an arrayed waveguide grating (AWG) that has N (N is an integer greater than or equal to 2) optical input ports and N optical output ports and a routing function that outputs to predetermined optical output ports in accordance with a wavelength of optical signals inputted to respective optical input ports, comprising: a device of synchronizing clock time that synchronizes the clock time of each of the other network-node equipments; a device of information-storing that stores new information of changing wavelength of optical signal, for dynamically changing a logical network topology that indicates a geometrical form of routes of the optical signals used for transmitting/receiving data between other network-node equipments (hereunder referred to as optical signals), and information of reconfiguring time of the logical network topology that includes the time at which changing wavelength should be executed; and a device of wavelength switching that switches a wavelengths of the optical signals in accordance with the information of changing wavelength and the information of reconfiguring time of the logical network topology.

The fiber optic communication system of the present invention dynamically reestablishes a communication destination or logical network topology by dynamically reconfiguring optical paths by means of the wavelength tunable light source, an optical switch, or a wavelength tunable filter arranged in the network-node equipment; and enables topology reconfiguration from a central-management-equipment that unifies the network, or a network-node equipment, in a network where optical signals and control signals can be transmitted and received through the same optical transmission path, between the network-node equipment and the uniform-loss and cyclic-frequency (ULCF) arrayed waveguide grating (AWG), and enables control of competition of requests for topology reconfiguration from random network-node equipment; and enables speedy topology reconfiguration at specified scheduled times by synchronizing the clock time of all the network-node equipments.

Moreover, the above-mentioned fiber optic communication system can be easily configured by using the central-management-equipment and the network-node equipments of the present invention.

According to another aspect of the present invention, there is provided a fiber optic communication system comprising: an array waveguide grating (AWG) that has N (N is an integer greater than or equal to 2) optical input ports, M (M is an integer greater than or equal to 2) optical output ports, and a routing function that outputs to predetermined optical output ports in accordance with the wavelength of the optical signals inputted to respective optical input ports; L (L is an integer greater than or equal to 2) network-node equipments; and optical fibers that physically connect the network-node equipments with the array waveguide grating to form communication routes; and having a device of setting wavelength switching of the optical signals used in communication by the network-node equipments, which sets the mapping of the wavelengths of the optical signal used in communication by the network node equipments, and the input/output ports of the array waveguide grating (AWG), so as to construct a predetermined logical network topology by two or more network node equipments.

Preferably, the fiber optic communication system has: two or more logical network topologies configured with two or more network-node equipments; and a device of wavelength switching that switches wavelengths of optical signals used by the network node equipments for communication, when network node equipments belonging to a predetermined logical network topology are connected or moved to another logical network topology.

Preferably, the device of wavelength switching is constructed having either one of a multi-wavelength light source array provided in the network-node equipment, a plurality of transceivers that transmit and receive optical signals of different wavelengths, or a wavelength tunable light source.

Preferably, the device of wavelength switching is provided in the network-node equipment, and is constructed with a wavelength tunable filter, which transmits only light of a predetermined wavelength, provided on the receiving side.

Preferably, in the above mentioned fiber optic communication system, more than two mutually independent logical network topologies are provided.

Preferably, in the above-mentioned fiber optic communication system, at least one of either a ring-shaped logical network topology, a star-shaped logical network topology, or a mesh-shaped logical network topology is provided as the above mentioned logical network topology.

Preferably, in the above mentioned fiber optic communication system two or more arrayed waveguide gratings that are connected to enable mutual communication are provided.

Preferably, in the above mentioned fiber optic communication system, the network-node equipment has two or more different wavelength paths connected to the arrayed waveguide grating (AWG), and a ring-shaped logical network topology that includes two or more communication terminals or network-node equipments is formed as a logical network topology.

Preferably, in the above mentioned fiber optic communication system, the network-node equipment has two or more different communication channels connected to the arrayed waveguide grating as primary communication channels, and secondary channels constructed similarly to the primary channels.

Preferably, in the above mentioned fiber optic communication system, a ring-shaped logical network topology is formed as the above mentioned logical network topology, and each of the network-node equipments belonging to the logical network topology has two communication channels that allow forward and backward communications, and the network-node equipment has a device that, when one communication channel is disconnected, returns and transmits through another communication channel, a signal that was to be inputted from this other communication channel and outputted to the one (disconnected) communication channel.

Preferably, in the above mentioned fiber optic communication system, a ring-shaped logical network topology is formed as the logical network topology, and in each of the network-node equipments belonging to the ring-shaped logical network topology, two communication channels that allow forward and backward communications are provided, and the network-node equipment is provided with a device of switching and setting the wavelength of optical signals that, in the case where communication with a network-node equipment that uses one communication channel for communication has become unavailable, enables it to bypass this network-node equipment that has lost communication ability, and communicate with an arbitrary network-node equipment.

Preferably, in the above mentioned fiber optic communication system, by arranging an optical circulator at each of the optical input/output ports of the network-node equipment and the arrayed waveguide grating, and connecting the common ports of the optical circulators via optical fiber, each network-node equipment is connected to the arrayed waveguide grating via single-core optical fiber.

Preferably, in the above mentioned fiber optic communication system, the arrayed waveguide grating (AWG) comprises a uniform-loss and cyclic-frequency (ULCF) arrayed waveguide grating (AWG).

Preferably, in the above mentioned fiber optic communication system, a central-management-equipment is provided to control and manage the wavelength switching device installed in each network-node equipment, and by connecting a transceiver for management that is installed in the central-management-equipment, and a transceiver for management that is installed in the network-node equipment to each other, transmitting and receiving of management data signals is enabled.

Preferably, each of the network-node equipments and the arrayed waveguide gratings is provided with a device of combining, which combines the optical signals of the data signals transmitted between each of the network-node equipments with the optical signals of the data signals for management, and a device of splitting, which splits the combined optical signals of the optical signals of the data signals, and the optical signals of the data signals for management, into optical signals of the data signals and optical signals of the data signals for management, and the channel that transmits the optical signals of the data signals for management is physically shared with the optical fiber that transmits the optical signal of the data signals.

Preferably, between the network-node equipment and the central-management-equipment, the network that transmits the optical signals of the data signals for management and the optical. signals of the data signals, transmits them through different communication channels.

According to another aspect of the present invention, there is provided a topology reconfigurable optical network system which, in a network system in which a network-node equipment is provided with three kinds of optical input/output ports, namely; optical in/output ports for network-terminal equipments for connecting to a communication terminal such as a router or computer, optical in/output ports for WDM data-signals that function as an interface for transmitting and receiving optical signals with other network-node equipments, and optical in/output ports for control signals; and the optical in/output ports for WDM data-signals of the two or more of the network-node equipments are physically connected via optical paths. such as optical fibers to the optical input/output ports of an arrayed waveguide grating that performs wavelength routing of the optical signal according to the wavelength of the optical signal; and furthermore, the optical input/output ports for control signals of the central-management-equipment that is provided to remotely control the oscillating wavelengths of one or more wavelength tunable light sources installed in the network-node equipments, and the transmitted wavelengths of the wavelength tunable filters, are connected to the optical input/output ports for control-signals that are installed in the network-node equipment; and which constructs a distributed iDC (Internet Data Center) network or a distributed IX (Internet Exchange) network in which the network terminal equipments can configure at least one of either a star-shaped logical topology, a ring-shaped logical topology, a mesh-shaped logical topology, or a logical topology network that is a combination of these, by respectively controlling the wavelength tunable light sources installed in the network-node equipments, and the oscillating wavelengths and the transmitted wavelengths of the wavelength tunable filters from the central-management-equipment, the network-node equipment is provided with a node database in at least one of either inside or outside of the equipment, and the node database is provided with a device of recording a list of available wavelengths for the network-node equipment, and a list of wavelengths currently in use, and a device of updating the list of wavelengths currently in use in the node database, with the change of wavelength of optical signal when the connection between the network-node equipments changes due to the wavelength routing; and furthermore, the network-node equipment has a device of monitoring the connection status between the network-node equipment and the network terminal equipment;

and the central-management-equipment is provided with a central database provided in at least one of either inside or outside of the equipment; and the central database is provided with a device of registering a list of used wavelengths that indicates wavelengths of optical signals currently in use on all of the network-node equipments, and updating the list of used wavelengths, with the changes in the wavelengths of the optical signal when a connection between the network-node equipments is switched due to the wavelength routing; and furthermore, the central-management-equipment is provided with a device of monitoring transmitting optical power status and receiving optical power status for every wavelength of optical signals, and of recording monitoring information in the central database, and a device of monitoring the connection status between the network-node equipments, and recording it in the central database, and a device of monitoring the connection status between the network-node equipment and the network terminal equipment, and recording it in the central database; and moreover, the central-management-equipment has a device of controlling disconnection of a wavelength signal that connects the network-node equipments, and a device of controlling the changing of the wavelength that is used for the connection between the network-node equipments.

Preferably, in the above mentioned optical fiber optic network, the network-node equipment is provided with 2N (N is an integer greater than or equal to 2) E/O converters that convert optical signals inputted from the network terminal equipment through the optical in/output ports for network-terminal, into electrical signals, or convert electrical signals into optical signals and transmit them to the network-node equipments, and regarding these 2N E/O converters, the N output ports of a 2N×2N switch that is disposed in the network-node equipment are connected in series to N wavelength tunable light sources and N optical receivers, and the N wavelength tunable light sources are connected in series to an N×1 optical coupler installed in the network-node equipment, and the optical in/output ports for WDM data-signals, and the N input ports of the 2N×2N switch are connected in series to N optical receivers installed in the network-node equipment, an N×1 optical splitter, and the optical in/output ports for WDM data-signal. A device is provided in which the 2N×2N switch is controlled so as to establish a channel for an optical signal that arrives at the optical in/output ports for WDM data-signal from the arrayed waveguide grating, to travel through: the N×1 splitter—the optical receivers—the 2N×2N electrical switch—the wavelength tunable light sources—the N×1 optical couplers—the optical in/output port for WDM data-signal in this order, so that without allowing the optical signal to reach the network terminal equipment, the wavelength of optical signals is converted and is re-transmitted to and received by the arrayed waveguide grating.

Preferably, in the above-mentioned fiber optic communication system, the central-management-equipment is provided with: a device of transmitting and receiving control signals that serves as the control signal interface between all the network node equipments, and that performs transmission and reception of control signals between the optical input/output port for control signals and the network node equipments via the optical input/output port for control signals; a device of monitoring that monitors the status of all of the network-node equipments in accordance with the control signals; a device of charge calculation that calculates a charge for every wavelength path of each network-node equipment used in the network in accordance with the result of the monitoring; and a device of controlling display of a topology administrator console interface.

Preferably, in the above-mentioned fiber optic communication system, there is provided a device of reading from the node database of the network-node equipment in response to a request from the central-management-equipment, respective information for the network-node equipment on: the available wavelength bandwidth, all wavelengths currently in use, transmitting optical power status and receiving optical power status of the optical signals of each wavelength, connection status between the network node equipments, and the logical network topology currently connected, and notifying this to the central-management-equipment.

Preferably, in the above-mentioned fiber optic communication system, the central-management-equipment has a device of detecting abnormalities in the connection status of all of the network-node equipments, and the transmitting optical power status and receiving optical power status of the wavelength signal in the network-node equipment, and notifying all of the network-node equipments, and the network-node equipment has a device of always monitoring the transmitting optical power status and receiving optical power status of the wavelength signal, and detecting an abnormality if it occurs in these statuses, and notifying the central-management-equipment.

Preferably, in the above-mentioned fiber optic communication system, there is provided a device which in the case where a ring-shaped logical network topology is configured, when there occurs any one of: a failure in the network terminal connected to a predetermined network-node equipment, or a failure in the predetermined network-node equipment, or a disconnection failure in the optical waveguide connecting the predetermined network-node equipment and the array waveguide grating (AWG), transmits from the central-management-equipment to the network-node equipment in which the failure has occurred, a command that shuts down the wavelength tunable light source, and transmits to each of the two network-node equipments being closest to and connected to the network-node equipment in which the failure occurred, a command that reconfigures the wavelength allocation so as to bypass the network node equipment in which the failure has occurred, and reconfigures a logical network topology in which the network-node equipment in which the failure occurred is bypassed.

Preferably, in the above-mentioned fiber optic communication system, there is provided a device which in the case where a ring-shaped logical network topology is configured, when there occurs any one of: a failure in the network terminal connected to a predetermined network-node equipment, or a failure in the predetermined network-node equipment, or a disconnection failure in the optical waveguide connecting the predetermined network-node equipment and the array waveguide grating (AWG), notifies a command from the central-management-equipment to the network-node equipment in which the failure has occurred to shut down the wavelength tunable light source, and notifies to each of the two network-node equipments being closest to and connected to the network-node equipment in which the failure occurred, a command that reconfigures the wavelength allocation so as to bypass the network node equipment in which the failure has occurred, and reconfigures a logical network topology in which the network-node equipment in which the failure occurred is bypassed.

Preferably, in the above mentioned fiber optic communication system, a status of currently using wavelength that the network-terminal administrator of the network-node equipment is using on the network-node equipment, and a connected current logical topology network, a logical topology reconfiguration schedule, a failure notification, and a request for failure history, are configured as a management gateway for the network-node equipment to report to the network-terminal administrator.

Preferably, in the above-mentioned fiber optic communication system, the central-management-equipment is provided with: a device which, when a network-node-equipment launches a request to the central management equipment for changing connection from a logical network topology to which it is currently connected to a different logical network topology, determines whether or not to conform by querying the central database and performing a computation; and a device which, if the result of the determination is to conform, notifies all of the network-node equipments within the logical network topology to which the network-node equipment that launched the request of logical network topology connection change is connected, of disengagement of the network-node equipment and wavelength resetting of the optical signal, and updates the stored information of the central database and the node databases; and a device that notifies all of the network-nodes of the logical network topology to which the network-node equipment which launched the request of logical network topology connection change is transferring, of the addition and wavelength resetting of the network-node equipment, and updates the stored information of the central database and the node databases.

Preferably, in the above-mentioned fiber optic communication system, the central-management equipment is provided with: a device of referencing the central database, and computing the additional charge required for the new wavelength path channel, and recording the result of the computation in the central database, when a request of changing logical topology is performed in a specific network-node equipment, and a new wavelength path channel is established when topology reconfiguration is performed; and a device of notifying information of the additional charge to the network-node equipment.

Preferably, in the above-mentioned fiber optic communication system, the central-management equipment is provided with a device of referencing the central database and computing a waiver of the charge for a terminated wavelength path channel and recording the result of the computation in the central database, when a request for changing logical topology is performed in a specific network-node equipment, and a wavelength path channel is terminated when the topology reconfiguration is performed, and the information of the waiver of the charge for the terminated wavelength path channel is notified to the network-node equipment.

Preferably, in the above-mentioned fiber optic communication system, the central-management equipment is provided with at least one of either: a device which, when traffic flow between specific network-node equipments increases and network load occurs, and a request is launched to the central-management-equipment from the network-node equipment for a bandwidth increase between the network-node equipments, determines whether or not the bandwidth increase is possible by querying the central database and computing, and when determined that a bandwidth increase between the network-node equipments is possible by connecting through a predetermined network-node equipment to which the network-node equipment has not hitherto been connected, and adding a new rerouting wavelength path, notifying the wavelength configuration for configuring a new wavelength path channel between the predetermined network-node equipment for rerouting and the specific network-node equipment, to respective network-node equipments of the network-node equipment, and executing the configuration of the new wavelength path channel, and updating information stored in the central database; or a device which, when traffic flow between specific network-node equipments increases and network load occurs, and a request is launched to the central-management-equipment from the network-node equipment for a bandwidth increase between the network-node equipments, determines whether or not the bandwidth increase is possible, by querying the central database and computing, and when determined that a bandwidth increase between the network-node equipments is possible by using a hitherto unused wavelength of a network-node equipment connected to another network topology to which the network-node equipment is not connected and adding a new rerouting wavelength path, notifying wavelength reconfiguration for configuring a new wavelength path channel between the network-node equipment for rerouting and the specific network-node equipment, to the respective network-node equipments, and executing the configuration of the new wavelength path channel, and updating the information stored in the central database; and the central-management-equipment also comprises a device of referencing the central database, and calculating an additional charge required for the new wavelength path channel, and recording it in the central database, and notifying the charge to the network-node equipment; and a device of computing a reduction in the charge of the network-node equipment that has provided the wavelength path channel, and recording it in the central database, and notifying the reduction in charge to the network-node equipment.

According to another aspect of the present invention, there is provided a network-node equipment comprising: a device of controlling wavelength tunable light source that outputs a wavelength control signal that individually controls the oscillating wavelength of the wavelength tunable light source; a device of monitoring that monitors the power of the optical output outputted from the wavelength tunable light source and the power of the optical signal inputted to the optical receiver; a device of switch controlling that outputs the 2N×2N switch control signal; a device of management that has a node database, and that holds the available wavelength list in the node database, and also records the wavelength currently in use in the node database, and changes the data of wavelengths in use registered on the database according to the information monitored by the device of monitoring, when the wavelength in use between network-node equipments changes; a display control device that displays information monitored by the monitoring device and information that is managed by the management device; and a device of transmitting and receiving control signals that connects the optical in/output port for control signals.

According to another aspect of the present invention, there is provided a central-management-equipment which in a central-management-equipment that is connected to the network-node equipment via optical waveguides in a fiber optic communication system having two or more network-node equipments and an arrayed waveguide grating (AWG) connecting these network-node equipments, and that performs operation control of the network-node equipment, comprising: a central database provided at in least one of either inside or outside of the equipment; a device of recording all wavelengths in use in each of the network-node equipments, and monitoring transmitting optical power status and receiving optical power status of the wavelengths in use in each of all these network-node equipments and recording them in the central database; a device of monitoring connection status between the network-node equipments and recording it in the central database; a device of monitoring connection status between the network-node equipment and a network terminal equipment and recording it in the central database; a device of changing the wavelength used that is registered in the central database when the wavelength used between the network-node equipments changes; a device of controlling disconnection of the wavelength signal connected between the network-node equipments; and a device of controlling change of wavelength used for the connection between the network-node equipments.

Preferably, in the above-mentioned central-management-equipment there is provided: a device of transmitting and receiving control signals that performs transmission and reception of control signals between the optical input/output port for control signals that serves as the control signal interface between all the network node equipments and the network node equipments via the optical input/output port for control signals; a device of monitoring that monitors the status of all of the network-node equipments in accordance with the control signals; a device of charge calculation that calculates a charge for every wavelength path of each network-node equipment used in the network according to the result of the monitoring; and a device of controlling display of a topology administrator console interface.

According to another aspect of the present invention there is provided a computer program for a network-node equipment which, in a computer program that operates a network-node equipment that has three kinds of input/output ports namely: optical in/output ports for network-terminal equipments; optical in/output ports for WDM data-signals, that convert, transmit, and receive optical signal wavelengths from a network terminal equipment; and control signal input/output ports, and that is provided with 2N (N is an integer greater than or equal to 2) E/O converters that convert optical signals inputted from the network terminal equipment through the optical in/output ports for network-terminal equipments into electrical signals, or convert electrical signals into optical signals and transmit them to the network terminal equipment, and these 2N E/O are connected in series to N output ports of a 2N×2N switch that is disposed on the network-node equipment, and connected in series to N wavelength tunable light sources and N optical receivers, and the N wavelength tunable light sources are connected in series to an N×1 optical coupler installed in the network-node equipment and the optical in/output ports for WDM data-signals, and the N input ports of the 2N×2N switch are connected to N optical receivers installed in the network-node equipment, and to an N×1 optical splitter; wherein the computer program comprises: a step for outputting the wavelength control signal that individually controls the oscillating wavelength of the wavelength tunable light source; a step for monitoring the power of the optical output outputted from the wavelength tunable light source and the power of the optical signal inputted to the optical receiver; a step for outputting the control signal of the 2N×2N switch; a step for recording a list of available wavelengths, and the wavelength currently in use in the node database, and updating data of the used wavelength registered in the node database in accordance with the monitoring information when the wavelength used between network-node equipments changes; and a step for displaying the monitoring information and the management information.

According to another aspect of the present invention there is provided a computer program of a central-management-equipment which, in a computer program that operates a central-management-equipment that comprises a computer equipment that performs operation control and operation processing of a network-node equipment, and that is connected to the wavelength tunable light source equipment via optical waveguides in a fiber optic communication system having two or more network-node equipments and an arrayed waveguide grating (AWG) connecting these network-node equipments, and performs operation control of the network-node equipment, comprising: a step for recording all of the wavelengths in use in each of the network-node equipments and monitoring transmitting optical power status and receiving optical power status for every wavelength in use in each of all these network-node equipments and recording them in the central database; a step for monitoring connection status between the network-node equipments and recording it in the central database; a step for monitoring connection status between the network-node equipment and a network terminal equipment and recording it in the central database; a step for changing the wavelength used that is registered in the central database when the wavelength used between the network-node equipments changes; a step for controlling disconnection of the wavelength signal connected between the network-node equipments; and a step for controlling change of wavelength used for the connection between the network-node equipments.

Preferably, the above mentioned computer program comprises: a step for performing transmitting and receiving of control signals between the network-node equipments; a step for monitoring the status of all the network-node equipments according to the control signals; and a step for performing charge calculation for each wavelength path of respective network-node equipments used in the network.

According to another aspect of the present invention there is provided a fiber optic communication system which, in a fiber optic communication system having a star-shaped physical network topology configured by connecting M (M is an integer no smaller than 2, nor greater than N) network-node equipments having data-signal transmitting and receiving units to an arrayed waveguide grating provided with an N×N wavelength routing device having N (N is an integer greater than or equal to 2) input ports and N output ports via optical waveguides, comprising: a device of reconfiguration that sweeps transmitting and receiving wavelengths used in the data-signal transmitting and receiving unit of each network-node equipment and dynamically reconfigures the logical network topology of the network, and the device of reconfiguration comprises: a network-management-system equipment capable of transmitting control signals that include information of changing wavelength, and receiving control signals from each network node; and a controlling unit of network-node equipment that receives control signals from the network-management-system equipment provided on each network-node equipment and sweeps transmitting and receiving wavelengths used in the data-signal transmitting and receiving unit and transmits a control signal that includes information of communication status to the network-management-system equipment.

Preferably, in the above mentioned fiber optic communication system, the arrayed waveguide grating is provided with a WDM coupler that combines the control signal from the network-management-system equipment with the output signal from the arrayed waveguide grating, and also with a WDM coupler that splits input signals from each network-node equipment into data-signals and control signals, and transmits the control signals to the network-management-system equipment and inputs the data-signals to the arrayed waveguide grating (AWG).

Preferably, in the above mentioned fiber optic communication system, the data-signal transmitting and receiving unit of each network-node equipment is provided with L (L is an integer no smaller than 2, nor greater than M) wavelength tunable light sources having a modulator on the output side or having a direct modulation function, and L optical receivers.

Preferably, each network-node equipment is provided with: a first WDM coupler that splits the input signal from the arrayed waveguide grating into a data-signal and a control signal, and transmits the control signal to the controlling unit of network-node equipment; an optical splitter that splits the data-signal from the first WDM coupler by wavelength; N×L first optical switches that change the channel of the data-signal from the optical splitter and transmit it to the L optical receivers; N×L optical switches that change the channel of the data signal from the L wavelength tunable light sources; an optical combiner that combines the data-signal from the optical switches; and a second WDM coupler that combines the data-signal from the optical combiner with the control signal from the controlling unit of network-node equipment, and outputs it.

Preferably, in the above mentioned fiber optic communication system, the data-signal transmitting and receiving unit of each network-node equipment is provided with; L (L is an integer no smaller than 2, nor greater than M) wavelength tunable light sources having a modulator on the output side or having a direct modulation function, and L optical receivers having wavelength tunable filters on their input side.

Preferably, each network-node equipment is provided with: the first WDM coupler that splits the input signal from the arrayed waveguide grating into a data-signal and a control signal and transmits the control signal to the controlling unit of network-node equipment; a first coupler that distributes and transmits the data-signals from the first WDM coupler respectively into the L optical receivers; a second coupler that combines the data-signals from the L wavelength tunable light sources; and a second WDM coupler that combines the data-signal from the second coupler with the control signal from the controlling unit of network-node equipment, and outputs it.

Preferably, in the above mentioned fiber optic communication system, each network-node equipment and the arrayed waveguide grating are respectively provided with an optical circulator that changes the channels of the input signal and the output signal, and each network-node equipment and the arrayed waveguide grating are respectively connected via single-core optical transmission lines.

Preferably, in the above mentioned fiber optic communication system, the arrayed waveguide grating is provided with a wavelength routing device not having uniform loss and cyclic frequency characteristics, comprising an arrayed waveguide grating type optical combiner/splitter.

Preferably, in the above mentioned fiber optic communication system, the arrayed waveguide grating is provided with a wavelength routing device having uniform loss and cyclic frequency characteristics, comprising an arrayed waveguide grating type optical combiner/splitter.

According to another aspect of the present invention, there is provided a network-node equipment which, in a network-node equipment in a fiber optic communication system having a star-shaped physical network topology configured by connecting M (M is an integer no smaller than 2, nor greater than N) network-node equipments having data-signal transmitting and receiving units to an arrayed waveguide grating provided with an N×N wavelength routing device having N (N is an integer greater than or equal to 2) input ports and N output ports via optical waveguides, comprising a controlling unit of network-node equipment that receives a control signal including information of changing wavelength and sweeps transmitting and receiving wavelengths used in the data-signal transmitting and receiving unit, and also transmits a control signal including information of communication status.

Preferably, in the above mentioned fiber optic communication system, the data-signal transmitting and receiving unit is provided with L (L is an integer no smaller than 2, nor greater than M) wavelength tunable light sources having a modulator on the output side or having a direct modulation function, and L optical receivers.

Preferably, there is provided: a first WDM coupler that splits the input signal from the arrayed waveguide grating into a data-signal and a control signal, and transmits the control signal to a controlling unit of network-node equipment; an optical splitter that splits the data-signal from the first WDM coupler by wavelength; N×L optical switches that change the channel of the data-signal from the optical splitter and transmit it to the L optical receivers; N×L second optical switches that change the channel of the data signal from the L wavelength tunable light sources; an optical combiner that combines the data-signal from the second optical switches; and a second WDM coupler that combines the data-signal from the optical combiner with the control signal from the controlling unit of network-node equipment, and outputs it.

Preferably, in the above mentioned fiber optic communication system, the data-signal transmitting and receiving unit is provided with L (L is an integer no smaller than 2, nor greater than M) wavelength tunable light sources having a modulator on the output side or having a direct modulation function, and L optical receivers having wavelength tunable filters on their input side.

Preferably there is provided: the first WDM coupler that splits the input signal from the arrayed waveguide grating into data-signals and a control signal and transmits the control signal to the controlling unit of network-node equipment; a first coupler that distributes and transmits the data-signals from the first WDM coupler respectively into the L optical receivers; a second coupler that combines the data-signals from the L wavelength tunable light sources; and a second WDM coupler that combines the data-signals from the second coupler with the control signal from the controlling unit of network-node equipment, and outputs it.

Preferably, in the above mentioned fiber optic communication system, an optical circulator that changes the channel of the input signal and the output signal is provided.

According to another aspect of the present invention there is provided a fiber optic communication system which, in a fiber optic communication system that is configured with: an arrayed waveguide grating and N (N is an integer that satisfies 2≦N≦M, where M is an integer greater than or equal to 2) network-node equipments, and the arrayed waveguide grating is provided with respectively M optical input ports and optical output ports; and the N network-node equipments are provided with L (L is an integer no smaller than 2, nor greater than N) wavelength tunable optical receiver units constructed with L wavelength tunable light source units and wavelength tunable filters, and a controlling unit that controls the wavelength tunable light source units and wavelength tunable optical receiver units, and are connected to the arrayed waveguide grating via optical transmission lines and form a star-shaped physical topology; and by controlling the output wavelength of the wavelength tunable light source and the receiving wavelength of the wavelength tunable optical receiver unit by the controlling unit, different network-node equipments that are counter-connected are arbitrarily selected according to the wavelength routing characteristics on the arrayed waveguide grating, and reconfiguration of the network topology that is configured by connecting a plurality of the network-node equipments is possible; comprising: a device of synchronizing time clock that synchronizes the clock time of each network-node equipment; a device of information storing that stores the respective new information of changing wavelength of the wavelength tunable light source unit and the wavelength tunable optical receiver unit, which is required for network topology reconfiguration, and the information of reconfiguring time of the logical network topology; and a device of changing wavelength that, when the clock time reaches the reconfiguring time of the logical network topology that is stored in the device of information storing, automatically changes the output wavelength of the wavelength tunable light source unit and the receiving wavelength of the wavelength tunable optical receiver unit simultaneously in accordance with the information of changing wavelength that is stored in the device of information storing.

Preferably, in the above mentioned fiber optic communication system, a central-management-equipment having a device of distributing clock time information that distributes clock time information to each network-node equipment is provided, and the network-node equipment has a device of adjusting clock time that corrects own clock time according to information of clock time distributed from the central-management-equipment, and the clock times of all the network-node equipments are synchronized according to the information of clock time distributed from the central-management-equipment.

Preferably, the central-management-equipment is provided with a device of individually transmitting to the network-node equipments, information of changing wavelength and information of reconfiguring time of the logical network topology for each of the network-node equipments, which is required when the logical network topology is reconfigured, and the device of information storing of the network-node equipments has a device of storing information of changing wavelength and information of reconfiguring time of the logical network topology received from the central-management-equipment.

Preferably, in the above mentioned fiber optic communication system, a specific network-node equipment is provided with a device of distributing clock time information that distributes clock time information to other network-node equipments, and the other network-node equipments have a device of adjusting clock time that corrects own clock time according to the information of clock time distributed from the specific network-node equipment, and the clock times of all the network-node equipments are synchronized in accordance with the information of clock time distributed from the specific network-node equipment.

Preferably, the above mentioned specific network-node equipment is provided with a device of individually transmitting to the network-node equipments, information of changing wavelength and information of reconfiguring time of the logical network topology for each of the network-node equipments, which is required when the logical network topology is reconfigured, and the device of information storing of the other network-node equipments has a device of storing information of changing wavelength and information of reconfiguring time of the logical network topology received from the specific network-node equipment.

Preferably, the above mentioned central-management-equipment is provided with a network management equipment having a device of logical network topology reconfiguring operation for an administrator to input information of the logical network topology reconfiguration, and the logical network topology can be reconfigured by the administrator.

Preferably, the above mentioned specific network-node equipment is provided with a network management equipment having a device of logical network topology reconfiguring operation for an administrator to input information of the logical network topology reconfiguration, and the logical network topology can be reconfigured by the administrator.

Preferably, all of the network-node equipments are provided with a network management equipment having a device of logical network topology reconfiguring operation for an administrator to input information of the logical network topology reconfiguration, and the logical network topology can be reconfigured by the administrator.

Preferably, the above mentioned network-node equipment is provided with: a device of generating network-node equipment status information that indicates the status of the network-node equipment before and after logical network topology reconfiguration; a device of transmitting and receiving status information of network-node equipment that transmits and receives status information of network-node equipment between the network-node equipments; and a device of recording status information of network-node equipment that records status information of network-node equipment of each network-node equipment.

Preferably, the above mentioned network-node equipment is provided with: a device of generating network-node equipment status information that indicates the status of the network-node equipment before and after logical network topology reconfiguration; and a device of transmitting the network-node equipment status information to the central-management-equipment; and the central-management-equipment is provided with: a device of receiving and recording the network-node equipment status information that the network-node equipment, which reconfigures the logical network topology, transmits; and a device of managing status information of network-node equipment that performs uniform management of the network-node equipment status information of all the network-node equipments.

Preferably, the above mentioned network-node equipment is provided with: a device of generating network-node equipment status information that indicates the status of the network-node equipment before and after logical network topology reconfiguration; and a device of transmitting the network-node equipment status information to the specific network-node equipment; and the specific network-node equipment is provided with: a device of receiving and recording the network-node equipment status information that the network-node equipment, which reconfigures the logical network topology, transmits; and a device of managing status information of network-node equipment that performs uniform management of the network-node equipment status information of all the network-node equipments.

Preferably, all of the above mentioned network-node equipments are provided with a device that, before logical network topology reconfiguration begins, transmits a requesting status information of logical network topology reconfiguration, after the information of network node equipment status is changed into the requesting status information of network topology reconfiguration.

Preferably, the above mentioned network-node equipment is provided with a device of receiving requesting status information of logical network topology reconfiguration from other network-node equipment; and a device which when the requesting status information of logical network topology reconfiguration is received, returns an authorization message or a denial message of logical network topology reconfiguration to the network-node equipment of sender, and the network-node equipment, which is the sender of the requesting status information of logical network topology reconfiguration, is provided with a device of withholding reconfiguration of own logical network topology when the denial message of the logical network topology reconfiguration is received.

Preferably, the above mentioned network-node equipment is provided with: a device of searching for the presence of requesting status information of logical network topology reconfiguration in the recorded information of network node equipment status of the other network-node equipments; and a device that suppresses logical network topology reconfiguration when the requesting status information of logical network topology reconfiguration is found as a result of the search.

Preferably, in the above mentioned fiber optic communication system, the optical signal wavelength of the control signals transmitted between each of the network-node equipments is configured to be of a different wavelength from the wavelength bandwidth of the data-signal used for connecting the network-node equipments, and WDM couplers capable of combining and splitting the data-signal and the control signals are arranged in the network-node equipment and the arrayed waveguide grating respectively, and the optical transmission line used for the data-signal is shared as an optical transmission line for the control signals.

Preferably, in the above mentioned fiber optic communication system, the optical transmission lines of the control signal transmitted between each equipment are provided separately from the optical transmission lines of the data-signal used for connecting the network-node equipments.

Preferably, in the above mentioned fiber optic communication system, the transmission lines of the control signals transmitted between each of the equipments is formed by public networks or the Internet.

Preferably, in the above-mentioned fiber optic communication system, optical elements installed in the L wavelength tunable light source units are constructed in an elemental construction in which a wavelength tunable laser and a modulator are connected in series or are mutually integrated, or alternatively are comprised of a semiconductor laser that allows direct modulation, and a construction is provided in which these are connected by the L×1 optical coupler, and the L wavelength tunable optical receiver units have a construction in which optical receivers and wavelength tunable filters connected in series are connected to the L×1 optical coupler.

Preferably, in the above mentioned fiber optic communication system, the optical elements installed in the L wavelength tunable light source units are constructed in an elemental construction in which a wavelength tunable laser and a modulator are connected in series or are mutually integrated, or alternatively comprise a semiconductor laser that allows direct modulation, and a construction is provided in which these optical elements are connected in series to an L×N switch and an N×1 optical coupler which are connected in series, and the L wavelength tunable optical receiver units are comprised of optical receivers and wavelength tunable filters, which are respectively connected in series, and have a construction in which these wavelength tunable optical receiver units are connected in series to L×N switches and N×1 optical coupler which are connected in series.

Preferably, in the above mentioned fiber optic communication system, the arrayed waveguide grating is an arrayed waveguide grating having M inputs and M outputs.

Preferably, in the above mentioned fiber optic communication system, the arrayed waveguide grating is a uniform-loss and cyclic-frequency (ULCF) arrayed waveguide grating having M inputs and M outputs.

According to another aspect of the present invention, there is provided a central-management-equipment which, in a central-management equipment of a fiber optic communication system, of which the logical network topology is reconfigurable, that is configured with an arrayed waveguide grating, a central-management-equipment, and N (N is an integer that satisfies $2 \leq N \leq M$, where M is an integer greater than or equal to 2) network-node equipments; and the arrayed waveguide grating is respectively provided with M optical input ports and optical output ports; and the N network-node equipments are provided with L (L is an integer no smaller than 2, nor greater than N) wavelength tunable optical receiver units constructed with L wavelength tunable light source units and wavelength tunable filters and a controlling unit that controls the wavelength tunable light source units and wavelength tunable optical receiver units, and are connected to the arrayed waveguide grating via optical transmission lines, and form a star-shaped physical topology; and in which, by controlling output wavelength of the above mentioned wavelength tunable light source units and the receiving wavelength of wavelength tunable optical receiver units by the controlling unit in accordance with the instruction of the central-management-equipment, different network-node equipments that are counter-connected according to the wavelength routing characteristics in the arrayed waveguide grating are arbitrarily selected; and is formed by the connection of a plurality of the network-node equipments, comprising a device of distributing clock time information that distributes clock time information to each network-node equipment.

According to another aspect of the present invention, there is provided a network-node equipment which, in a network-node equipment of a fiber optic communication system: that is configured with an arrayed waveguide grating, and N (N is an integer that satisfies $2 \leq N \leq M$, where M is an integer greater than or equal to 2) network-node equipments; and the arrayed waveguide grating is provided with respectively M optical input ports and optical output ports; and the N network-node equipments are provided with L (L is an integer no smaller than 2, nor greater than N) wavelength tunable optical receiver units constructed with L wavelength tunable light source units and wavelength tunable filters, and a controlling unit that controls the wavelength tunable light source units and wavelength tunable optical receiver units, and are connected to the wavelength router equipment via optical transmission lines and form a star-shaped physical topology; and in which, by controlling the output wavelength of the wavelength tunable light source units and the receiving wavelength of the wavelength tunable optical receiver units by the controlling unit, different network-node equipments that are counter-connected according to the wavelength routing characteristics in the arrayed waveguide grating are arbitrarily selected; and reconfiguration of the network topology that is configured by connecting a plurality of the network-node equipments is possible, comprising: a device of clock time synchronization that synchronizes the clock time with that of the other network-node equipments; a device of information storing that stores the respective new information of changing wavelength of the wavelength tunable light source unit and the wavelength tunable optical receiver unit, which is required for network topology reconfiguration, and the information of reconfiguring time of the logical network topology; and a device of changing wavelength that, when the clock time reaches the reconfiguring time of the logical network topology that is stored in the device of information storing, automatically changes the output wavelength of the above mentioned wavelength tunable light source unit and the receiving wavelength of the above mentioned wavelength tunable optical receiver unit simultaneously in accordance with the information of changing wavelength that is stored in the device of information storing.

According to another aspect of the present invention, there is provided a computer program for a topology reconfiguration controlling equipment which, in a computer program for a topology reconfiguration controlling equipment of a fiber optic communication system, of which the logical network topology is reconfigurable, that is configured with an arrayed waveguide grating, and N (N is an integer that satisfies $2 \leq N \leq M$, where M is an integer greater than or equal to 2) network-node equipments; and the arrayed waveguide grating is respectively provided with M optical input ports and optical output ports; and the N network-node equipments are provided with L (L is an integer no smaller than 2, nor greater than N) wavelength tunable optical receiver units constructed with L wavelength tunable light source units and wavelength tunable filters, and a controlling unit that controls the wavelength tunable light source units and wavelength tunable optical receiver units, and are connected to the wavelength router via optical transmission lines, and form a star-shaped physical topology; and in which, by controlling output wavelength of the wavelength tunable light source units and the receiving wavelength of the wavelength tunable optical receiver units by the controlling unit according to the instruction of the network topology reconfiguration equipment, which is comprised of a computer equipment, different network-node equipments counter-connected according to the wavelength routing characteristics in the arrayed waveguide grating are arbitrarily selected; and that is formed by the connection of a plurality of the network-node equipments, comprising: a step of performing a process of synchronizing the clock times of each network-node equipment; a step of obtaining the available range of wavelengths for transmitting and receiving data-signals in each network-node equipment; a step of specifying a predetermined logical network topology to be reconfigured, and externally inputting specifications of network-node equipments and wavelength paths and reconfiguration time of the logical network topology as information; a step of determining information of the new wavelength and trigger time information for logical topology reconfiguration of the network-node equipment whose logical network topology is to be reconfigured in accordance with the obtained wavelength range and the input information, and transmitting these to the network-node equipments whose logical network topology is to be reconfigured; a step of receiving an end of receiving message from the network-node equipments whose logical network topology is to be reconfigured; a step of notifying the operation of logical network topology reconfiguration to the network-node equipments whose logical network topology is not to be reconfigured; and a step of receiving an end of reconfiguring message from the network-node equipments whose logical network topology has been reconfigured after the time of topology reconfiguration operation has passed.

According to another aspect of the present invention, there is provided a computer program for a network-node equipment which, in a computer program for a network-node equipment of a fiber optic communication system of which the logical network topology is reconfigurable, that is configured with an arrayed waveguide grating, and N (N is an integer that satisfies $2 \leq N \leq M$, where M is an integer greater than or equal to 2) network-node equipments comprising computer equipments; and the arrayed waveguide grating is respectively provided with M optical input ports and optical output ports, and the N network-node equipments are provided with L (L is an integer no smaller than 2, nor greater than N) wavelength tunable optical receiver units constructed with L wavelength tunable light source units and wavelength tunable filters and a controlling unit that controls the wavelength tunable light source units and the wavelength tunable optical receiver units, and are connected to the arrayed waveguide grating via optical transmission lines, and form a star-shaped physical topology in which the connections formed by transmission lines formed by optical waveguides such as optical fibers have a physically star shape, and in which, by controlling output wavelength of the wavelength tunable light source units and the receiving wavelength of the wavelength tunable optical receiver units by the controlling unit in accordance with the instruction of the network topology reconfiguration equipment, which is comprised of a computer equipment, different network-node equipments which are counter-connected according to the wavelength routing characteristics in the arrayed waveguide grating are arbitrarily selected, and that is formed by the connection of a plurality of the network-node equipments, comprising: a step of performing process of clock time synchronization with other network-node equipments; a step of queuing until the trigger time of logical network topology reconfiguration, when the information of wavelength setup and trigger time information of logical network topology reconfiguration are received from the topology reconfiguration controlling equipment, and performing a process of changing the wavelength setup of the wavelength tunable light sources and the wavelength tunable filters when the trigger time of logical network topology reconfiguration has been reached; and a step of transmitting a message of completing of reconfiguring logical network topology to the topology reconfiguration controlling equipment after the reconfiguration process is completed.

According to another aspect of the present invention, there is provided a computer program for a network-node equipment which, in a computer program for a network-node equipment of a fiber optic communication system of which the logical network topology is reconfigurable, that is configured with an arrayed waveguide grating, and N (N is an integer that satisfies $2 \leq N \leq M$, where M is an integer greater than or equal to 2) network-node equipments comprising computer equipments; and the arrayed waveguide grating is respectively provided with M optical input ports and optical output ports, and the N network-node equipments are provided with L (L is an integer no smaller than 2, nor greater than N) wavelength tunable optical receiver units constructed with L wavelength tunable light source units and wavelength tunable filters and a controlling unit that controls the wavelength tunable light source units and the wavelength tunable optical receiver units, and are connected to the arrayed waveguide grating via optical transmission lines, and form a star-shaped physical topology in which the connections formed by transmission lines formed by optical waveguides such as optical fibers have a physically star shape, and in which by controlling output wavelength of the wavelength tunable light source units and the receiving wavelength of the wavelength tunable optical receiver units by the controlling unit in accordance with the instruction of the network topology reconfiguration equipment, which is comprised of a computer equipment, different network-node equipments which are counter-connected according to the wavelength routing characteristics in the arrayed waveguide grating are arbitrarily selected, and that is formed by the connection of a plurality of the network-node equipments, comprising: a step of performing process of clock time synchronization with other network-node equipments; a step of changing in the status of reservation reconfiguring logical topology, status information of initialized network-node equipment when executing reconfiguring of logical network topology; a step of transmitting status information of network-node equipment for which status of reservation reconfiguring logical topology has been changed, to the central management equipment and another network-node equipment; a step of checking whether the network-node equipment status information from another network node equipment is status of reservation reconfiguring logical topology; a step of inputting from outside the wavelength path of the nodes that are necessary to construct the new logical network topology when the result of the check is that the network-node equipment status information from another network node equipment is not status of reservation reconfiguring logical topology; a step of outputting the wavelength path input information to the central-management equipment; a step of transmitting to the other network-node equipments a confirming message of reconfiguring logical topology including the logical topology reconfiguring time information when the logical topology network reconfiguration has been allowed based on the wavelength path input information from the central-management equipment; a step of receiving from the central-management equipment, instruction information of reconfiguring logical topology including information of changing wavelength and trigger time for logical topology reconfiguration, and when the network-node equipment status information of the other network-node equipments is a status of finishing acceptance for requesting reconfiguring logical topology, then setting the own information of network node equipment status to finished receiving status, and transmitting to the central-management equipment; a step of changing wavelength of the output optical signal of the wavelength tunable light source unit and changing the input wavelength of the wavelength tunable optical receiver unit in accordance with the instruction information of reconfiguring logical topology; a step of setting the network-node equipment status information to status of finishing acceptance for requesting reconfiguring logical topology, and transmitting the status information of this network-node equipment to the central-management equipment and the network-node equipment that requested the change of logical topology when an advance notification message of reconfiguring logical topology has been received from the network-node equipment that requested the change of logical topology and the change of logical topology has been completed; and a step of setting the network-node equipment status information to rejecting status for requesting reconfiguration logical topology, and transmitting the status information of this network-node equipment to the central-management equipment and the network-node equipment that requested the change of logical topology when an advance notification message of reconfiguring logical topology has been received from the network-node equipment that requested the change of logical topology, and the logical network topology change is rejected.

According to yet another aspect of the present invention, there is provided a computer readable information storage media having the above mentioned computer program stored thereon.

BRIEF DESCRIPTION OF THE DRAWINGS

FIG. 1-2 is a construction diagram showing an example of an arrayed waveguide grating (AWG) connected to respective network-node equipments via a two-core optical fiber, in a fiber optic communication system of the first embodiment of the present invention.

FIG. 1-3 is a construction diagram showing an example of an arrayed waveguide grating (AWG) connected to respective network-node equipments via a one-core optical fiber, in the fiber optic communication system of the first embodiment of the present invention.

FIG. 1-4 is a diagram describing a case where a star (mesh)-shaped logical network topology is enabled, in the fiber optic communication system of the first embodiment of the present invention.

FIG. 1-5 is a diagram describing a case where a ring-shaped logical network topology is enabled, in the fiber optic communication system of the first embodiment of the present invention.

FIG. 1-6 is a diagram describing a wavelength allocation for a case where a star (mesh)-shaped logical network topology is enabled, in the fiber optic communication system of the first embodiment of the present invention.

FIG. 1-7 is a diagram describing a wavelength allocation for a case where a ring-shaped logical network topology is enabled, in the fiber optic communication system of the first embodiment of the present invention.

FIG. 1-8 is a diagram describing an initial physical configuration in a fiber optic communication system of a second embodiment of the present invention.

FIG. 1-9 is a diagram describing the physical configuration when expanded, in the fiber optic communication system of the second embodiment of the present invention.

FIG. 1-10 is a diagram describing a logical configuration when expanded in the fiber optic communication system of the second embodiment of the present invention.

FIG. 1-11 is a diagram describing a physical configuration in a fiber optic communication system of a third embodiment of the present invention.

FIG. 1-12 is a diagram describing a logical configuration in the fiber optic communication system of the third embodiment of the present invention.

FIG. 1-13 is a diagram describing the details of the logical configuration in the fiber optic communication system of the third embodiment of the present invention.

FIG. 1-14 is a diagram describing a wavelength allocation in the fiber optic communication system of the third embodiment of the present invention.

FIG. 1-15 is a diagram describing a logical configuration in the fiber optic communication system of a fourth embodiment of the present invention.

FIG. 1-16 is a diagram describing a wavelength allocation in the fiber optic communication system of the fourth embodiment of the present invention.

FIG. 1-17 is a diagram describing a logical configuration in the fiber optic communication system of a fifth embodiment of the present invention.

FIG. 1-18 is a diagram describing a wavelength allocation in the fiber optic communication system of the fifth embodiment of the present invention.

FIG. 1-19 is a diagram describing a physical configuration in a fiber optic communication system of a sixth embodiment of the present invention.

FIG. 1-20 is a diagram describing a wavelength allocation in the fiber optic communication system of the sixth embodiment of the present invention.

FIG. 1-21 is a diagram showing an example of a physical configuration at a time of failure, in the fiber optic communication system of the sixth embodiment of the present invention.

FIG. 1-22 is a diagram showing an example of the logical configuration at a time of failure, in the fiber optic communication system of the sixth embodiment of the present invention.

FIG. 1-23 is a diagram showing an example of the logical configuration at a time of failure, in the fiber optic communication system of the sixth embodiment of the present invention.

FIG. 1-23.1 is a diagram showing a ring-shaped logical network topology where N=5, and a wavelength allocation table, in a second part of the sixth embodiment of the present invention.

FIG. 1-23.2 is a diagram showing an example of reconfiguration of the ring-shaped logical network topology, and the wavelength allocation table, in the second part of the sixth embodiment of the present invention.

FIG. 1-23.3 is a diagram showing another example of reconfiguration of the ring-shaped logical network topology, and the wavelength allocation table, in the second part of the sixth embodiment of the present invention.

FIG. 1-24 is a diagram showing a physical configuration of a fiber optic communication of a seventh embodiment of the present invention.

FIG. 1-25 is a diagram describing a wavelength allocation of the fiber optic communication system in a seventh embodiment of the present invention.

FIG. 1-26 is a diagram showing a physical configuration of a fiber optic communication system of an eighth embodiment of the present invention.

FIG. 1-27 is a diagram showing a physical configuration of a fiber optic communication system of a ninth embodiment of the present invention.

FIG. 1-28 is a diagram showing a physical configuration of a fiber optic communication system of a tenth embodiment of the present invention.

FIG. 1-29 is a diagram showing a physical configuration of a fiber optic communication system of an eleventh embodiment of the present invention.

FIG. 1-30 is a diagram showing a logical configuration of a fiber optic communication system of the eleventh embodiment of the present invention.

FIG. 1-31 is a diagram showing a physical configuration of a fiber optic communication system of a twelfth embodiment of the present invention.

FIG. 1-32 is a diagram showing a physical configuration of a fiber optic communication system of a thirteenth embodiment of the present invention.

FIG. 2-1 is a schematic diagram showing a fiber optic communication system of a fourteenth embodiment of the present invention.

FIG. 2-2 is a schematic diagram showing a wavelength tunable light source equipment in a twentieth embodiment of the present invention.

FIG. 2-3 is a schematic diagram showing a central-management-equipment in a twenty-first embodiment of the present invention.

FIG. 2-4 is a diagram showing an internal database connected to a wavelength tunable light source equipment, and a wavelength tunable light source information that is held in an external database, in a twenty-second embodiment of the present invention.

FIG. 2-5 is a diagram showing an internal database connected to a central-management-equipment, and wavelength tunable light source information that is held in an external database, in the twenty-second embodiment of the present invention.

FIG. 2-6 is a diagram showing central controlled logical topology management information that manages a plurality of user Ids, in a twenty-third embodiment of the present invention.

FIG. 2-7 is a diagram showing a topology management window and a user information window, in the twenty-third embodiment of the present invention.

FIG. 2-8 is a diagram showing charge information calculated by a charge calculation unit, in the twenty-third embodiment of the present invention.

FIG. 2-9 is a diagram showing a user topology management information of user ID "1" in a twenty-fourth embodiment of the present invention.

FIG. 2-10 is a diagram showing a user information window for user ID "1" in the twenty-fourth embodiment of the present invention.

FIG. 2-11 is a diagram showing utilization information of user ID "1" in the twenty-fourth embodiment of the present invention.

FIG. 2-12 is a diagram showing a user topology management information of user ID "2" in a twenty-fifth embodiment of the present invention.

FIG. 2-13 is a diagram showing a user information window for user ID "2" in the twenty-fifth embodiment of the present invention.

FIG. 2-14 is a diagram showing utilization information of user ID "2" in the twenty-fifth embodiment of the present invention.

FIG. 2-15 is a diagram showing management information of central controlled logical topology when network-node equipment is newly established for the user ID "1", in a twenty-sixth embodiment of the present invention.

FIG. 2-16 is a diagram showing a topology management window and a user information window when network-node equipment is newly established for the user ID "1", in the twenty-sixth embodiment of the present invention.

FIG. 2-17 is a diagram showing charge information calculated by a charge calculation unit when network-node equipment is newly established for the user ID "1", in the twenty-sixth embodiment of the present invention.

FIG. 2-18 is a diagram showing a user topology management information of user ID "1" when network-node equipment is newly established for the user ID "1", in a twenty-seventh embodiment of the present invention.

FIG. 2-19 is a diagram showing a user information window of user ID "1" when network-node equipment is newly established for the user ID "1", in the twenty-seventh embodiment of the present invention.

FIG. 2-20 is a diagram showing a utilization information of user ID "1" when network-node equipment is newly established for the user ID "1", in the twenty-seventh embodiment of the present invention.

FIG. 2-21 is a diagram showing management information of central controlled logical topology when the bandwidth is increased for the user ID "2", in a twenty-eighth embodiment of the present invention.

FIG. 2-22 is a diagram showing a topology management window and a user information window when the bandwidth is increased for the user ID "2", in the twenty-eighth embodiment of the present invention.

FIG. 2-23 is a diagram showing charge information calculated by a charge calculation unit when the bandwidth is increased for the user ID "2", in the twenty-eighth embodiment of the present invention.

FIG. 2-24 is a diagram showing user topology management information of the user ID "2" when the bandwidth is increased for the user ID "2", in a twenty-ninth embodiment of the present invention.

FIG. 2-25 is a diagram showing a user information window for the user ID "2" when the bandwidth is increased for the user ID "2", in the twenty-ninth embodiment of the present invention.

FIG. 2-26 is a diagram showing utilization information of user ID "2" when the bandwidth is increased for the user ID "2", in the twenty-ninth embodiment of the present invention.

FIG. 2-27 is a diagram showing management information of central controlled logical topology when the bandwidth is increased for the user ID "1", in a thirtieth embodiment of the present invention.

FIG. 2-28 is a diagram showing a topology management window and a user information window when the bandwidth is increased for the user ID "1", in the thirtieth embodiment of the present invention.

FIG. 2-29 is a diagram showing charge information calculated by a charge calculation unit when the bandwidth is increased for the user ID "1", in the thirtieth embodiment of the present invention.

FIG. 2-30 is a diagram showing user topology management information of the user ID "1" when the bandwidth is increased for the user ID "1" in the thirtieth embodiment of the present invention.

FIG. 2-31 is a diagram showing a user information window of the user ID "1" when the bandwidth is increased for the user ID "1", in a thirty-first embodiment of the present invention.

FIG. 2-32 is a diagram showing utilization information of user ID "1" when the bandwidth is increased for the user ID "1", in the thirty-first embodiment of the present invention.

FIG. 2-33 is a diagram showing utilization information of user ID "2" when the bandwidth is increased for the user ID "1", in the thirty-first embodiment of the present invention.

FIG. 2-34 is a diagram showing center topology management information when the user ID "1" has a ring topology, in a thirty-second embodiment of the present invention.

FIG. 2-35 is a diagram showing a topology management window and a user information window when the user ID "1" has a ring topology, in the thirty-second embodiment of the present invention.

FIG. 2-36 is a diagram showing user management information when the user ID "1" has a ring topology, in the thirty-second embodiment of the present invention.

FIG. 2-37 is a diagram showing a user information window when the user ID "1" has a ring topology, in the thirty-second embodiment of the present invention.

FIG. 2-38 is a diagram showing central topology management information when failed network-node equipment is disconnected, in an embodiment of the present invention.

FIG. 2-39 is a diagram showing a topology management window and a user information window when failed network-node equipment is disconnected, in an embodiment of the present invention.

FIG. 2-40 is a diagram showing charge information calculated by a charge calculation unit when failed network-node equipment is disconnected, in an embodiment of the present invention.

FIG. 2-41 is a diagram showing user management information of the user ID "1" when failed network-node equipment is disconnected, in an embodiment of the present invention.

FIG. 2-42 is a diagram showing a user information window of the user ID "1" when failed network-node equipment is disconnected, in an embodiment of the present invention.

FIG. 2-43 is a diagram showing utilization information of the user ID "1" when failed network-node equipment is disconnected, in an embodiment of the present invention.

FIG. 3-1 is a diagram showing a fiber optic communication system of a fifteenth embodiment of the present invention.

FIG. 3-2 A and B are a diagram that shows a wavelength allocation of a uniform-loss and cyclic-frequency (ULCF) arrayed waveguide grating (AWG), and a diagram that shows a full-mesh shape logical network topology.

FIG. 3-3 A and B are a diagram that shows a wavelength allocation of a uniform-loss and cyclic-frequency (ULCF) arrayed waveguide grating (AWG), and a diagram that shows a ring shape logical network topology.

FIG. 3-4 is a signal path diagram showing an example case where a ring-shape logical network topology is configured with the system shown in FIG. 3-1.

FIG. 3-5 A and B are a diagram that shows a wavelength allocation of a uniform-loss and cyclic-frequency (ULCF) arrayed waveguide grating (AWG), and a diagram that shows a star-shape logical network topology.

FIG. 3-6 is a signal path diagram showing an example case where a star-shape logical network topology is configured with the system shown in FIG. 3-1.

FIG. 3-7 A and B are a diagram that shows a wavelength allocation of a uniform-loss and cyclic-frequency (ULCF) arrayed waveguide grating (AWG), and a diagram that shows a mesh shape logical network topology.

FIG. 3-8 is a signal path diagram showing an example case where a mesh-shape logical network topology is configured with the system shown in FIG. 3-1.

FIG. 3-9 is a diagram showing an example of a partial modification of the system shown in FIG. 3-1.

FIG. 3-10 is a diagram showing a wavelength allocation of an arrayed waveguide grating (AWG) without uniform-loss and cyclic-frequency (ULCF) characteristics.

FIG. 3-11 is a diagram showing a fiber optic communication system of a sixteenth embodiment of the present invention.

FIG. 3-12 is a signal path diagram showing an example case where a ring-shape logical network topology is configured with the system shown in FIG. 3-11.

FIG. 3-13 is a signal path diagram showing an example case where a star-shape logical network topology is configured with the system shown in FIG. 3-11.

FIG. 3-14 is a signal path diagram showing an example case where a mesh-shape logical network topology. is configured with the system shown in FIG. 3-11.

FIG. 3-15 is a diagram showing a fiber optic communication system of a seventeenth embodiment of the present invention.

FIG. 3-16 is a diagram showing a fiber optic communication system of an eighteenth embodiment of the present invention. is FIG. 3-17 is a diagram showing a fiber optic communication system of a nineteenth embodiment of the present invention.

FIG. 4-1 is a schematic diagram showing network node equipment of a fiber optic communication system of a thirty-fifth embodiment of the present invention.

FIG. 4-2 is a diagram describing clock time synchronization of the network-node equipment in the thirty-fifth embodiment of the present invention.

FIG. 4-3 is a diagram describing clock time synchronization of the network-node equipment in the thirty-fifth embodiment of the present invention.

FIG. 4-4 is a diagram describing control steps in the central-management-equipment in the thirty-fifth embodiment of the present invention.

FIG. 4-5 is a diagram describing control steps in the central-management-equipment in the thirty-fifth embodiment of the present invention.

FIG. 4-6 is a flow chart describing control steps of network-node equipment in which a change in wavelength occurs, in the thirty-fifth embodiment of the present invention.

FIG. 4-7 is a flow chart describing the control steps of network-node equipment in which a change in wavelength occurs, in the thirty-fifth embodiment of the present invention.

FIG. 4-8 is a flow chart describing the control steps of network-node equipment in which a change in wavelength does not occur, in the thirty-fifth embodiment of the present invention.

FIG. 4-9 is a diagram describing topology reconfiguration information classes and object configuration, in the thirty-fifth embodiment of the present invention.

FIG. 4-10 is a diagram describing components and connections of the network-node equipment and the central-management-equipment, in the thirty-fifth embodiment of the present invention.

FIG. 4-11 is a diagram describing components and logical connections of the network-node equipment and the central-management-equipment, in the thirty-fifth embodiment of the present invention.

FIG. 4-12 is a diagram describing wavelength path links in a ring-shaped logical network topology at optical input/output ports of the AWG arrayed waveguide grating, in the thirty-fifth embodiment of the present invention.

FIG. 4-13 is a diagram describing wavelength allocation in a ring-shaped logical network topology at optical input/output ports of the AWG arrayed waveguide grating, in the thirty-fifth embodiment of the present invention.

FIG. 4-14 is a diagram describing wavelength path links in a full-mesh logical network topology at optical input/output ports of the AWG arrayed waveguide grating, in the thirty-fifth embodiment of the present invention.

FIG. 4-15 is a diagram describing wavelength allocation in a full-mesh logical network topology at optical input/output ports of the AWG arrayed waveguide grating, in the thirty-fifth embodiment of the present invention.

FIG. 4-16 is a diagram describing topology reconfiguration information classes when changing from the ring-shaped logical network topology to the full-mesh logical network topology, in the thirty-fifth embodiment of the present invention.

FIG. 4-17 is a diagram describing topology reconfiguration information classes when changing from the ring-shaped logical network topology to the full-mesh logical network topology, in the thirty-fifth embodiment of the present invention.

FIG. 4-18 is a diagram describing topology reconfiguration information classes when changing from the ring-shaped logical network topology to the full-mesh logical network topology, in the thirty-fifth embodiment of the present invention.

FIG. 4-19 is a diagram describing topology reconfiguration information classes when changing from the ring-shaped logical network topology to the full-mesh logical network topology, in the thirty-fifth embodiment of the present invention.

FIG. 4-20 is a diagram describing an interface provided for a topology administrator console browser, in the thirty-fifth embodiment of the present invention.

FIG. 4-21 is a schematic diagram showing a fiber optic communication system of a thirty-sixth embodiment of the present invention.

FIG. 4-22 is a schematic diagram showing a fiber optic communication system of the thirty-sixth embodiment of the present invention.

FIG. 4-23 is a schematic diagram showing a fiber optic communication system of the thirty-sixth embodiment of the present invention.

FIG. 4-24 is a schematic diagram showing network node equipment of the fiber optic communication system of the thirty-sixth embodiment of the present invention.

FIG. 4-25 is a schematic diagram showing network node equipment of the fiber optic communication system of the thirty-sixth embodiment of the present invention.

FIG. 4-26 is a diagram describing clock time synchronization of the network-node equipment in the thirty-sixth embodiment of the present invention.

FIG. 4-27 is a diagram describing clock time synchronization of the network-node equipment in the thirty-sixth embodiment of the present invention.

FIG. 4-28 is a diagram describing authentication flow performed by a person being a node administrator, in the thirty-sixth embodiment of the present invention.

FIG. 4-29 is a diagram describing control steps when reconfiguring topology in the thirty-sixth embodiment of the present invention.

FIG. 4-30 is a diagram describing control steps when reconfiguring topology in the thirty-sixth embodiment of the present invention.

FIG. 4-31 is a diagram describing control steps when reconfiguring topology in the thirty-sixth embodiment of the present invention.

FIG. 4-32 is a diagram describing wavelength reconfiguration control steps in the thirty-sixth embodiment of the present invention.

FIG. 4-33 is a diagram describing status bits of the network-node equipment in the thirty-sixth embodiment of the present invention.

FIG. 4-34 is a diagram describing components and connections of the network-node equipment and the central-management-equipment, in the thirty-sixth embodiment of the present invention.

FIG. 4-35 is a diagram describing components and logical connections of the network-node equipment and the central-management-equipment, in the thirty-sixth embodiment of the present invention.

FIG. 4-36 is a diagram describing an interface provided for a network node equipment administrator console browser in the thirty-sixth embodiment of the present invention.

FIG. 4-37 is a diagram describing a conventional example.

BEST MODE FOR CARRYING OUT THE INVENTION

Hereunder, embodiments of the present invention are described, with reference to the drawings.

In the embodiments described below, for descriptions, the numbers 4, 5, 13 or 14 are respectively given for the number of optical input/output ports of an arrayed waveguide grating (AWG) N, and for the number of network-node equipments M, however, they are not limited to these numbers, and need only be two or more.

Moreover, although a case is described where the number of logical networks included in the network configuration of the present invention is one, the case where two or more similar networks are consolidated is the same.

Similarly, when the present invention is multiply redundantized, even if a plurality of similar networks, that is two or more networks without being limited to two, is configured serially, it does not exceed the scope of the claims of the present invention.

Furthermore, an optical amplifier may be needed due to the optical transmission loss when configuring the network, and this optical amplifier may be installed anywhere between transmitting and receiving equipment.

First Embodiment

Figure 1:
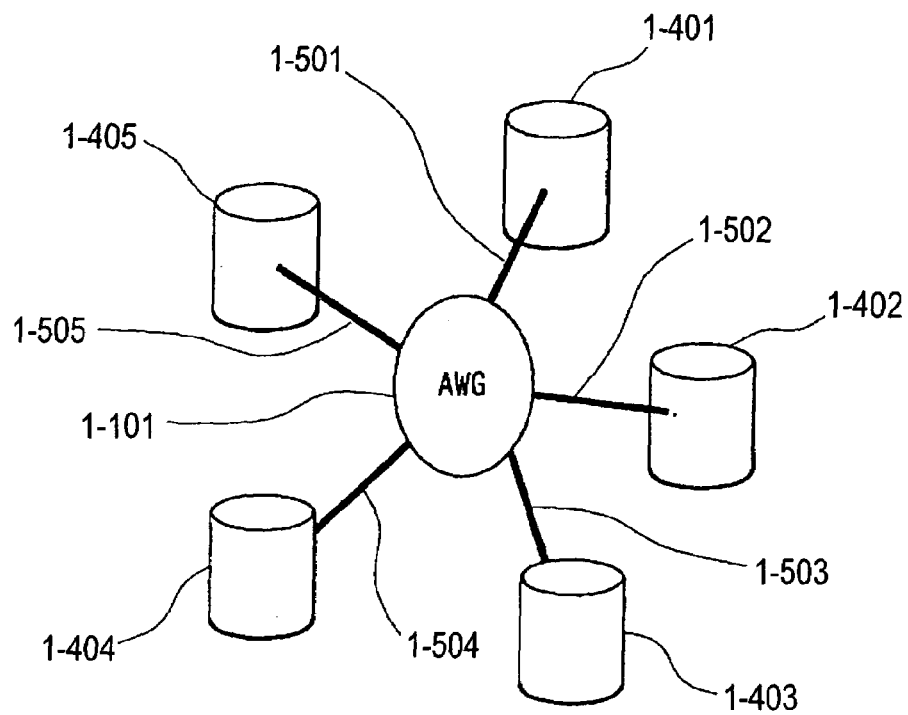
FIG. 1-1 is a diagram showing a physical topology of a fiber optic communication system of a first embodiment of the present invention.

Network-node equipment and a physical network topology that is physically connected via optical fibers of an arrayed waveguide grating (AWG) of a first embodiment according to the fiber optic communication system of the present invention is shown in FIG. 1-1.

Figures 1, 2:
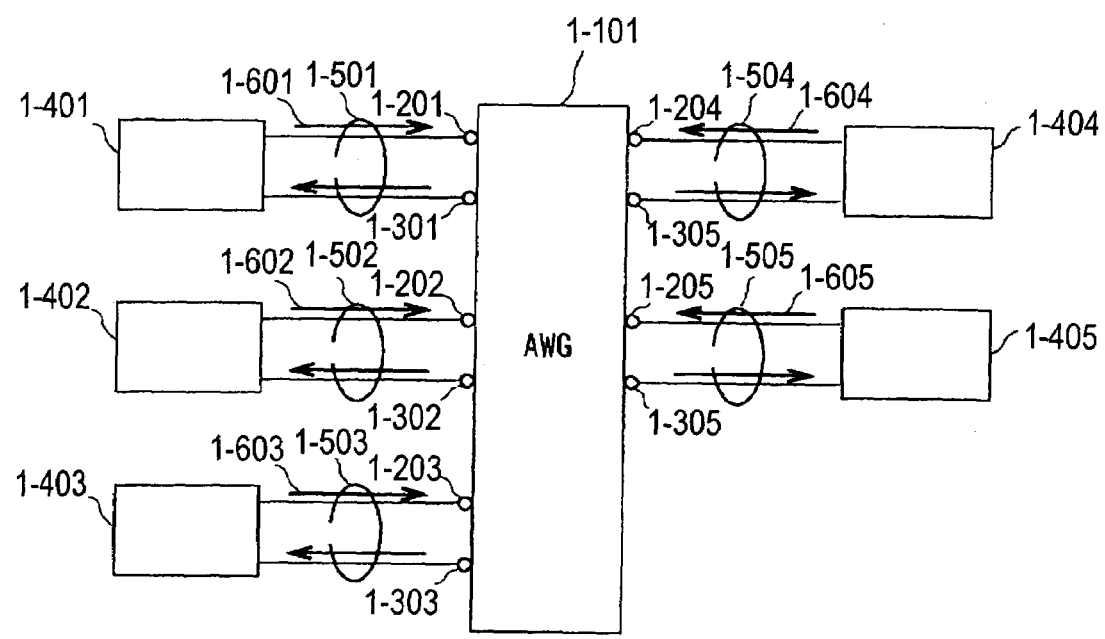
Figures 1, 2, 3:
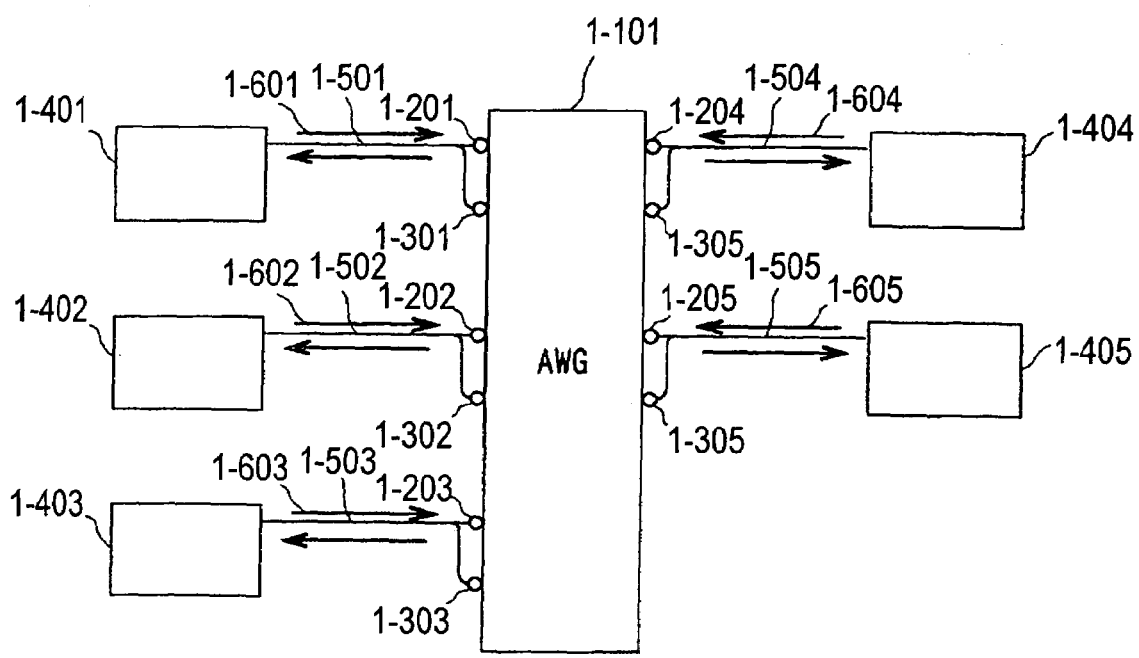

As shown in FIG. 1-2 and FIG. 1-3, an arrayed waveguide grating (AWG) 1-101 has optical input ports 1-201 to 1-205 and optical output ports 1-301 to 1-305, and each of these optical input/output ports 1-201 to 1-205 and 1-301 to 1-305 is connected to network-terminal equipments such as personal computers, or network-node equipments such as routers that are nodal points of a communication network 1-404 to 1-405, which are disposed in the periphery. Also, each of the network-node equipments 1-401 to 1-405 is provided with a device of switching the wavelength of optical signals used for communication (not shown in the diagram).

FIG. 1-2 is an example of connecting the arrayed-waveguide grating (AWG) 1-101 and each network-node equipment 1-401 to 1-405 by two-core optical fibers, and FIG. 1-3 is an example of connecting the arrayed-waveguide grating (AWG) 1-101 and each network-node equipment 1-401 to 1-405 by single-core optical fibers.

This has a construction in which each of the optical input/output ports 1-201 to 1-205 and 1-301 to 1-305 of the provided arrayed-waveguide grating (AWG) are connected by optical fibers 1-501 to 1-505 to the network-node equipments 1-401 to 1-405 disposed in the periphery.

In the arrayed-waveguide grating (AWG)1-101, optical signals 1-601 to 1-605 that are transmitted from each network-node equipment 1-401 to 1-405 and inputted to the optical input ports 1-201 to 1-205, are outputted for each of their wavelengths to the optical output ports 1-301 to 1-305 that correspond to the wavelengths.

In this way, optical signals having wavelengths set in the destination (transmission destination) network-node equipment 1-401 to 1-405 may be switched and selected and transmitted from each of the network-node equipments 1-401 to 1-405, and logically a star-shaped (mesh-shaped) network topology as shown in FIG. 1-4 or a different logical network topology such as a ring-shaped network topology as shown in FIG. 1-5 can be easily realized, while physically having a simple star-shaped configuration as in the physical network topology shown in FIG. 1-1.

FIG. 1-4 and FIG. 1-5 respectively show an image of the signal transmission route (wavelength path) and the logical network topology configuration of the communication route.

When the star-shaped (mesh-shaped) logical network topology shown in FIG. 1-4 is to be configured, the connection relationships, which are based on the wavelengths of the optical signals of the optical input/output ports 1-201 to 1-205 and 1-301 to 1-305 in the arrayed waveguide grating (AWG) 1-101, and the wavelengths of the optical signals used on each network-node equipment 1-401 to 1-405 need only to be set according to the wavelength allocation in FIG. 1-6. In FIG. 1-4, the wavelengths highlighted with hatching are to be used.

When the ring-shaped logical network topology shown in FIG. 1-5 is to be configured, the connection relationships, which are based on the wavelengths of the optical signals of the optical input/output ports 1-201 to 1-205 and 1-301 to 1-305 in the arrayed waveguide grating (AWG) 1-101, and the wavelengths of the optical signals used on each network-node equipment 1-401 to 1-405 need only to be set according to the wavelength allocation in FIG. 1-7. In FIG. 1-5, the wavelengths highlighted with hatching are to be used.

Changing a group of network-node equipments that configure a logical network topology into another logical network topology can be achieved by having each network-node equipment switch the wavelengths of the optical signals in accordance with the wavelength allocation for the other logical network topology.

Furthermore, two or more arrayed waveguide gratings (AWG) may be connected allowing communication, and a predetermined logical network topology may be formed between network-node equipment connected to these AWGs.

Second Embodiment

A second embodiment according to the fiber optic communication system of the present invention is shown in FIG. 1-8 to FIG. 1-10. In the present embodiment, the characteristics of the present invention are described in detail, taking as an example a method of extending the fiber optic communication system.

The second embodiment is a case where a simple physical star-shaped network topology configuration as shown in FIG. 1-8 is realized on a small scale. Here, a case is shown in which five base stations 1-402A to 1-406A provided with network-node equipments 1-402 to 1-406 are connected to a center base station 1-401A having the arrayed waveguide grating (AWG) 1-101 described in the first embodiment.

FIG. 1-9 shows the physical network configuration when the network configuration shown in FIG. 1-8 is extended and the number of network-node equipments is increased, and FIG. 1-10 shows the configuration of the logical network topology in the configuration of FIG. 1-9.

The fiber optic communication network shown in FIG. 1-9 is an example providing extended base stations 1-407A to 1-418A having network-node equipments 1-407 to 1-418 that are connected to the arrayed waveguide grating (AWG) 1-101 of the center base station 1-401 A. Also, in the fiber optic communication network shown in FIG. 1-9, as shown in FIG. 1-10: a ring-shaped logical network topology is configured with base stations 1-401A and 1-402A and extended base stations 1-407A and 1-408A; a star-shaped logical network topology is configured with base stations 1-401A and 1-406A and extended base stations 1-413A to 1-416A; a ring-shaped logical network topology is configured with base stations 1-401A and 1-405A and extended base stations 1-409A to 1-412A; and a star-shaped logical network topology is configured with base stations 1-401A, 1-403A and 1-404A and extended base stations 1-417A and 1-418A. Furthermore, a star-shaped (mesh-shaped) logical network topology is configured with base stations 1-401A and 1-405A and extended base stations 1-412A and 1-418A.

When actually configuring a network, a large-scale network such as that shown in FIG. 1-9 is not usually constructed in the initial stage of network construction, and it is usual to expand the scale of the network step by step from a network configuration such as the one shown in FIG. 1-8, by expansion of the scale of the network while the network is operating. In the second embodiment, taking the scale of the number of optical input/output ports of the arrayed waveguide gratings (AWG) 1-101 disposed in the center as an upper limit, according to the network configuration in FIG. 1-8, when extending, by connecting the network-node equipments 1-407 to 1-418 to the arrayed waveguide grating (AWG) 1-101 via optical fibers to establish additional extended base stations 1-407A to 1-418A, the size of the network can be easily upscaled without interrupting or stopping the communication status of the network-node equipments 1-401 to 1-406 that have already been established.

Furthermore, since not only a star-shaped (mesh-shaped) logical network topology but also a ring-shaped logical network topology can be easily configured in the network configuration of the present embodiment as shown in the first embodiment (FIG. 1-1) above, a fiber optic communication system can be constructed in which different logical network topologies such as a mesh-shaped one, a star-shaped one, and a ring-shaped one coexist on the same star-shaped physical star network topology, as shown in FIG. 1-10.

In the present configuration, since the network-node equipments that are to be connection destinations can be selected simply by changing the wavelengths of the optical signals that each of the network-node equipments 1-401 to 1-418 transmit and receive, then when reconfiguring a logical network topology, reconnection of optical fibers in the initial physical network configuration does not require a long time and high-cost construction work is not required, so that the logical network topology can be reconfigured extremely easily in a short period of time at low cost. Moreover, the logical network topology may also be reconfigured by changing the wavelength allocation of the optical input/output ports in the arrayed-waveguide grating (AWG) 1-101.

Third Embodiment

A third embodiment according to the fiber optic communication system of the present invention is shown in FIG. 1-11 to FIG. 1-14. FIG. 1-11 shows a physical network topology that is a physical network configuration, and FIG. 1-12 shows the logical network topology thereof. Also, FIG. 1-13 is a diagram that describes in detail the logical configuration in the network configuration of the third embodiment, and FIG. 1-14 is a diagram showing the wavelength allocation relationships of the optical input/output ports of an arrayed-waveguide grating (AWG) 1-101 of the third embodiment. Here an example of application to an Internet data center (iDC) network is described.

Specifically, data centers 1-701A to 1-705A provided with network-node equipments 1-701 to 1-705 are connected via optical fibers to a center base station 1-101 A provided with the arrayed-waveguide grating (AWG) 1-101, and base stations 1-706A to 1-713A provided with network-node equipments 1-706 to 1-713 are connected via optical fibers to the center base station 1-101A.

Also, according to the setting of the arrayed-waveguide grating (AWG) 1-101 and the wavelengths of the optical signals of each of the network-node equipments 1-701 to 1-713, the data centers 1-701A to 1-705A configure a mesh-shaped logical network topology and form a distributed data-center WDM (Wavelength Division Multiplexing) core network 1-721, and the network-node equipments 1-701 to 1-705 of the data centers 1-701A to 1-705A and the network-node equipments 1-706 and 1-710 form a MPLS (Multi-Protocol Label Switching) core network 1-722 (Full-mesh logical network topology). Moreover, the network-node equipments 1-706 to 1-709 form a RPR (Resilient Packet Ring) network 1-723 (ring-shaped logical network topology), and the network-node equipments 1-710 to 1-713 form an ether network 1-724 (star-shaped logical topology), and then an inter-building connection network 1-725 created by point-to-point connection in a simple star-shaped configuration is formed between the network-node equipment 1-707 and the network-node equipment 1-713.

As described in the first and second embodiments above, the present embodiment is characterized not only in that the logical network topology can combine a star-shaped (mesh-shaped) logical network topology and a ring-shaped logical network topology despite being a simple star-shaped physical network topology such as that shown in FIG. 1-11, but also in that MPLS (Multi-protocol Label Switching), which is widely known as a routing control method, and a networking technology called RPR (Resilient Packet Ring), which is known as a system that realizes a high-speed method of circumventing failures, can be superposed, and a network in which the network-node equipments 1-701 to 1-705 of the data centers 1-701A to 1-705A are distributed, and an extremely stable and highly secured network such as Internet exchange (IX), can be constructed in an extremely simple manner in a short period of time at low cost.

In FIG. 1-14, node numbers 1 to 16 denote port numbers of the optical input/output ports of the arrayed-waveguide grating (AWG) 1-101, and in the present embodiment, the respective optical input/output ports having each of node numbers 1 to 13 are connected to the network-node equipments 1-701 to 1-713, and the wavelength allocation of optical signals for each of the network-node equipments 1-701 to 1-713 is set. In this case, as mentioned above, the number of optical input/output ports of the arrayed waveguide grating (AWG) (N) and the number of network-node equipments (M) respectively correspond to the case where N=16 and M=13.

According to this wavelength allocation, as shown in FIG. 1-11 and 1-12, the network-node equipments 1-706 to 1-709 connected to the ring-shaped logical network topology are connected to the network-node equipments 1-701 to 1-705 of the data centers 1-701A to 1-705A configured with a mesh-shaped logical network topology. At this time, the network-node equipments 1-701 to 1-705, 1-706, and 1-710 are LSR (Label Switch Routers) of the MPLS, and the network-node equipment 1-706 is a LSR (Label Switch Router) boundary of the MPLS. Also, the network-node equipments 1-710 to 1-713 easily realize a logical network configuration that is connected in a simple star-shape, and the network-node equipments 1-710 to 1-713 are connected to the network-node equipments 1-701 to 1-705 of the mesh-connected data centers 1-701A to 1-705A. At this time, the network-node equipment 1-710 is a LSR (Label Switch Router) boundary of the MPLS.

Moreover, in the present embodiment, as shown in FIG. 1-14, wavelengths $\lambda 1$ to $\lambda 9$ are used in the MPLS core network 1-721 configured with the mesh-shaped logical network topology, wavelengths $\lambda 12$ to $\lambda 16$ are used in the PRP network 1-723 configured with the ring-shaped logical network topology, wavelengths $\lambda 4$ to $\lambda 9$ are used in the ether network 1-724 configured with the star-shaped logical topology, and wavelength $\lambda 3$ is used in the inter-building connection network 1-725.

Here, although the wavelength allocation shown is for a case where the AWG disposed as the arrayed-waveguide grating (AWG) 1-101 disposed at the center base station is of a scale having 16×16 optical input/output ports, of course this scale is not limited to 16×16, and needs only to be greater than the capacity size of the network-node equipment.

Fourth Embodiment

Next, a fourth embodiment according to the fiber optic communication system of the present invention is described, with reference to FIG. 1-15 and FIG. 1-16. The fourth embodiment describes an example case in which a new network-node equipment 714 is additionally inserted into the configuration of the above mentioned third embodiment. FIG. 1-15 is a diagram showing the logical network topology of the fourth embodiment, and FIG. 1-16 is a diagram showing the wavelength allocations of the optical input/output ports of the arrayed-waveguide grating (AWG) 1-101 of the fourth embodiment. In FIG. 1-16 the network-node equipments and the arrayed-waveguide grating are shown physically connected via optical fibers so that unique numbers 1 to 16 assigned to network-node equipments match to port numbers of optical input/output ports of the arrayed-waveguide grating 1-101. Moreover the wavelength allocations of optical signals at each of network-node equipments 1-701 to 1-714 has been set. This case corresponds to a case in which the number of network-node equipments is 14.

In the present embodiment, the new network-node equipment 714 is additionally inserted between the network-node equipment 1-708 and the network-node equipment 1-709 in the ring-shaped logical network topology of the RPR network 1-723 of the above-mentioned third embodiment. In this case, as shown in FIG. 1-16, whereas the optical signal of wavelength $\lambda 16$ was used for the communication between the network-node equipment 1-708 and the network-node equipment 1-709 before reconfiguration, only the setting of the wavelengths of the optical data-signals of each of the network-node equipments 1-708, 1-709 and 1-714 needs to be changed in order to use the wavelength $\lambda 5$ for communication between the network-node equipment 1-708 and the network-node equipment 1-714, and to use the wavelength $\lambda 6$ for the communication between the network-node equipment 1-709 and the network-node equipment 1-714. In this manner, the new network-node 714 can be easily established in the network by simply changing the wavelength of the optical data-signals of the network-node equipments 1-708, 1-709 and 1-714. Here, although the wavelength allocation shown is for a case where the AWG disposed as the arrayed-waveguide grating (AWG) 1-101 is of a scale having 16×16 optical input/output ports, as related in the above example, of course this scale is not limited to 16×16, and needs only to be greater than the capacity size of network-node equipment.

Fifth Embodiment

Next, a fifth embodiment according to the fiber optic communication system of the present invention is described, with reference to FIG. 1-17 and FIG. 1-18. The fifth embodiment is an example of transferring the network-node equipment 1-707 that has existed in the ring-shaped logical network topology of the RPR network 1-723, to the ether network 1-724 configured with a star-shaped logical topology in the above mentioned fourth embodiment. FIG. 1-17 is a diagram showing the logical network topology of the fifth embodiment, and FIG. 1-18 is a diagram showing the wavelength allocations of the optical input/output ports of the arrayed-waveguide grating (AWG) 1-101. In FIG. 1-18, as related above, the network-node equipments and the arrayed-waveguide grating (AWG) are shown physically connected via optical fibers so that unique numbers 1 to 16 assigned to network-node equipments match to port numbers of optical input/output ports of the arrayed-waveguide grating (AWG) 1-101. Moreover the wavelength allocations of optical signals at each of network-node equipments 1-701 to 1-714 have been set. This case, as related above, corresponds to a case in which the number of network-node equipments is 14.

In the present embodiment, the logical network configuration and the wavelength allocations of each network-node equipment are described in the case where the network-node equipment 1-707, which was accommodated in the ring-shaped logical network topology into which the network-node equipment 714 was inserted, is newly transferred and established in the star-shaped logical network topology that attributes to the network-node equipment 1-710, and the logical topology is reconfigured. In this case, whereas before transferring, the network-node equipment 1-707 used wavelength λ12 and λ14 to communicate with the network-node equipment 1-706 and the network-node equipment 1-708 respectively, the wavelength of optical signals of the network-node equipment 1-707 is set to λ16, and communication may be made to be performed between the network-node equipment 1-707 and the network-node equipment 1-710 using this wavelength λ16. Also, before transferring, the wavelength λ12 was used for communication between the network-node equipment 1-706 and the network-node equipment 1-707, and wavelength λ14 was used for communication between the network-node equipment 1-707 and the network-node equipment 1-708. However, after transferring, the wavelengths of optical signals that are used at each of the network-node equipments 1-707, 1-708 and 1-709 may be changed so that the wavelength λ13 is used for communication between the network-node equipment 1-706 and the network-node equipment 1-708.

Thus, as with the above mentioned embodiment, by simply changing the wavelength allocations of the optical signals used for communication, the logical network topology can be dynamically changed. Here, although the wavelength allocation shown is for a case where the AWG disposed as the arrayed-waveguide grating (AWG) 1-101 disposed at the center in FIG. 18 is of a scale having 16×16 as the number of optical input/output ports (N×N), of course this scale is not limited to 16×16, and needs only to be greater than the capacity size of the network-node terminal.

Sixth Embodiment

Next, a sixth embodiment according to the fiber optic communication system of the present invention is described, with reference to FIG. 1-19 and FIG. 20. In the present embodiment, an example of a network configuration that has wavelength allocations for forming a ring-shaped logical network topology, and that accommodates four network-node terminals 1-701 to 1-704 is described.

FIG. 1-19 is a diagram showing the physical network topology of the sixth embodiment, and FIG. 1-20 is a diagram showing the logical network topology of the fiber optic communication system of the sixth embodiment and the wavelength allocations of the arrayed waveguide grating (AWG) 1-101. In the present embodiment, a 4×4 uniform-loss and cyclic-frequency (ULCF) AWG is used as the arrayed waveguide grating (AWG) 1-101. Furthermore, in the wavelength allocations shown in FIG. 1-20, the network node equipments and the arrayed-waveguide grating (AWG) are shown physically connected via optical fibers so that unique numbers 1 to 4 assigned to network-node equipments match to port numbers of optical input/output ports of the arrayed-waveguide grating (AWG) 1-101. Moreover the wavelength allocation of optical signals at each of network-node terminals 1-701 to 1-704 has been set. This case corresponds to a case in which the number of network-node equipments is 4.

In FIG. 1-19, each of the network-node equipments 1-701 to 1-704 has a WDM interface (hereunder referred to as WDM-IF) 1-700$a$ that can change the wavelength of the optical signals, and two media access control units 1-700$b$ and 700$c$ (hereunder referred to as MAC), and the wavelengths of the optical signals for each MAC 1-700$b$ and MAC 1-700$c$ have been set so that one MAC 1-700$b$ uses an optical signal of wavelength λ2 to perform communication via the WDM interface 1-700$a$, and the other MAC 1-700$c$ uses an optical signal of wavelength λ4 to perform communication via the WDM interface 1-700$a$. Moreover, each of the MAC1-700$b$ and 1-700$c$ is provided with a function of transmitting back a received signal.

Also, since the wavelength allocations of the arrayed waveguide grating (AWG) 1-101 are set as shown in FIG. 1-20, two-way communication is performed between the network-node equipment 1-701 and the network-node equipment 1-702 using an optical signal of wavelength λ2, two-way communication is performed between the network-node equipment 1-702 and the network-node equipment 1-703 using an optical signal of wavelength λ4, two-way communication is performed between the network-node equipment 1-703 and the network-node equipment 1-704 using an optical signal of wavelength λ2, and two-way communication is performed between the network-node equipment 1-704 and the network-node equipment 1-701 using an optical signal of wavelength λ4. As a result, outside communication Outer-TX and Outer-RX, and inside communication Inner-TX and Inner-RX at each of the MAC 1-700$b$ and the MAC 1-700$c$ are performed, and a ring-shaped logical network topology is formed.

The signals circuit around all the network-node equipments 1-701 to 1-704 according to the wavelength allocations shown in the diagram, however the present embodiment is characterized in that optical signals can be transmitted in both directions. Here, although the wavelengths of both directions are set to use the same wavelength, different wave allocations does not essentially create any difference. Also, although the wavelength allocation shown here is for a case where the AWG disposed as the arrayed-waveguide grating (AWG) 1-101 disposed at the center is of a 4×4 scale, of course this scale is not limited to 4×4, and needs only to be greater than the capacity size of the network-node equipment.

The recovery method for the network, in the case where in this configuration as shown in FIG. 1-21, the optical fiber that physically connects the network-node equipment 1-701 and the arrayed waveguide grating (AWG) 1-101 is cut, is described below.

In this case, as the logical network topology in FIG. 1-22 shows, by respectively turning back the communication that has been performed between the network-node equipment 1701 and the network-node equipment 1-702, and between the network-node equipment 1-701 and the network-node equipment 1-704 at each of the network-node equipments 1-702 and 1-704 after the optical fiber connecting the network-node equipment 1-701 and the arrayed waveguide grating (AWG) has been cut, an optical fiber disconnection failure can be bypassed. Specifically, when the optical fiber that physically connects the network-node equipment 1-701 and the arrayed waveguide grating (AWG) 1-101 is disconnected, the communication in the network-node equipments 1-702 to 1-704 can be maintained by turning back and transmitting the signal received from the network-node equipment 1-703 to the network-node equipment 1-703 by the MAC 1-700c of the network-node equipment 1-702, and turning back and transmitting the signal received from the network-node equipment 1-703 to the network-node equipment 1-703 by the MAC 1-700b of the network-node equipment 1-704.

The case in which the failure occurs at the network-node equipment 1-701 itself as shown in FIG. 1-23 is also the same. Moreover, when failures occur such as those mentioned above, detecting this and turning back signals automatically can be easily done, and by automatically turning back signals in this way, the recovery of a network in which a failure has occurred can be performed quickly and stably.

Sixth Embodiment PART TWO

With the above-mentioned ring-shaped logical network topology, in the method of recovering a network when a failure occurs due to optical fiber disconnection or breakdown of the network-node equipment, a new ring-shaped logical network topology can be reconfigured in the present fiber optic communication system to bypass the network-node equipment experiencing the failure. However, when there are more than 5 network node equipments there are a plurality of bypass routes when a failure occurs, and it is possible to construct a network that is very resilient to failures even when the number of network node equipments increases. An embodiment in which the number of network-node equipments is five is described here.

As shown in FIG. 1-23.1, in the optical signal route and wavelength allocations, in a ring-shaped logical network topology configured so that five network-node, equipments 1-701 to 1-705 are connected via optical fibers to a 5×5 arrayed waveguide grating (AWG) having respectively five optical input/output ports, when the optical fiber connected to the network-node equipment 5 (1-705) is disconnected, the network-node equipment 1 (1-701) bypasses the network-node equipment 5 (1-705) experiencing the failure and configures a new route for optical signals on the network-node equipment 4 (1-704). Hence it becomes possible to configure a ring-shaped logical network topology of, "network-node equipment 1 (1-701)→network-node equipment 2 (1-702)→network-node equipment 3 (1-703)→network-node equipment 4 (1-704)→network-node equipment 1 (1-701)". FIG. 1-23.2 shows the route and the wavelength allocations of the optical signals at this time. On the other hand, since the network-node equipment 1 is able to configure a route between other network-node equipments and itself by changing the wavelengths of optical signals, and since other network-node equipments are also able to configure arbitrary routes in the same way, the ring-shaped logical network topology that can be reconfigured is not limited to the alternate route that bypasses the network-node experiencing the failure, and a ring-shaped logical network topology that has a geometrical ring shaped route can be reconfigured. FIG. 1-23.3 shows a ring-shaped logical network topology configured with the route of optical signals, "network-node equipment 1 (1-701)→network-node equipment 3 (1-703)→network-node equipment 4 (1-704)→network-node equipment 2 (1-702)→network-node equipment 1 (1-701)", and the wavelength allocations at this time. In this way, since a plurality of bypassing routes exist in the ring-shaped logical network topology even when the number of network-node equipments has increased, the recovery of the network at the time of failure can be performed quickly and stably.

Seventh Embodiment

Next is a description of a seventh embodiment according to the fiber optic communication system of the present invention, with reference to FIG. 1-24 and 1-25. In the present embodiment, the construction uses single cored optical fibers, and non-reciprocal optical circuits 1-1001 to 1008 such as optical circulators are provided for respective network-node equipments and optical input/output ports 1-201 to 204 and 1-301 to 304 of an arrayed waveguide grating (AWG). FIG. 1-24 shows a physical network topology of the optical network system in the seventh embodiment, and the structure thereof. FIG. 1-25 is a diagram for explaining the wavelength arrangement in the seventh embodiment.

In FIG. 1-24, 1-101 denotes an arrayed waveguide grating (AWG) which has N optical input ports and N optical output ports (N is an integer). Four of the optical input ports 1-201 to 204 among the N ports and four of the optical output ports 1-301 to 304 among the N ports are used. They are connected to four network-node equipments 1-701 to 704 through the non-reciprocal optical circuits 1-1001 to 1008 and single cored optical fibers 1-501 to 504.

The network-node equipment 1-701 comprises an optical DEMUX (Demultiplexer) device 1-1401 which has a transmitter 1-1101, a receiver 1-1201 and a non-reciprocal optical circuit 1-1001. The non-reciprocal optical circuit 1-1001 is connected to an output port of the transmitter 1-1101 and an input port of the receiver 1-1201, and is also connected to the optical input port 1-201 and the optical output port 1-301 of the arrayed waveguide grating (AWG) 1-101 through the optical fiber 1-501 and the non-reciprocal optical circuit 1-1005.

The network-node equipment 1-702 comprises an optical DEMUX (Demultiplexer) device 1-1402 which has a transmitter 1-1102, a receiver 1-1202 and a non-reciprocal optical circuit 1-1002. The non-reciprocal optical circuits 1-1002 is connected to an output port of the transmitter 1-1102 and an input port of the receiver 1-1202, and is also connected to the optical input port 1-201 and the optical output port 1-302 of the arrayed waveguide grating (AWG) 1-101 through the optical fiber 1-502 and the non-reciprocal optical circuit 1-1006.

The network-node equipment 1-703 comprises an optical DEMUX (Demultiplexer) device 1-1403 which has a transmitter 1-1103, a receiver 1-1203 and a non-reciprocal optical circuit 1-1003. The non-reciprocal optical circuit 1-1003 is connected to an output port of the transmitter 1-1103 and an input port of the receiver 1-1203, and is also connected to the optical input port 1-203 and the optical output port 1-303 of the arrayed waveguide grating (AWG) 1-101 through the optical fiber 1-503 and the non-reciprocal optical circuit 1-1007.

The network-node equipment 1-704 comprises an optical DEMUX (Demultiplexer) device 1-1404 which has a transmitter 1-1104, a receiver 1-1204 and a non-reciprocal optical circuit 1-1004. The non-reciprocal optical circuit 1-1004 is connected to an output port of the transmitter 1-1104 and an input port of the receiver 1-1204, and is also connected to the optical input port 1-204 and the optical output port 1-304 of the arrayed waveguide grating (AWG) 1-101 through the optical fiber 1-504 and the non-reciprocal optical circuit 1-1008.

Moreover, regarding the arrayed waveguide grating (AWG) 1-101 and the respective non-reciprocal optical circuits 1-1001 to 1008, the routing of optical signals is set so as to satisfy the wavelength arrangement shown in FIG. 1-25. That is, optical signals of the wavelengths λ1, λ2, λ3 and λ4 which were transmitted from the network-node equipment 1-701 are transmitted to the network-node equipments 1-701,702,703 and 704 in the described order. Furthermore optical signals of the wavelengths λ4, λ1, λ2 and λ3 which were transmitted from the network-node equipment 1-702 are transmitted to the network-node equipments 1-701,702,703 and 704 in the described order. Optical signals of the wavelengths λ3, λ4, λ1 and λ2 which were transmitted from the network-node equipment 1-703 are transmitted to the network-node equipments 1-701,702,703 and 704 in the described order. Optical signals of the wavelengths λ2, λ3, λ4 and λ1 which were transmitted from the network-node equipment 1-704 are transmitted to the network-node equipments 1-701,702,703 and 704 in the described order. In the present embodiment, the ring-shaped logical network topology is constructed by setting the wavelengths of the transmitting and receiving optical signals of the transceivers of the respective network-node equipments 1-701 to 704 to λ2.

Eighth Embodiment

Next is a description of an eighth embodiment according to the fiber optic communication system of the present invention, with reference to FIG. 1-26. The present embodiment is a fiber optic communication system based on the seventh embodiment shown in FIG. 1-24 and 1-25, and is a system which has a structure which takes into consideration failure avoidance in the case of a failure occurrence such as fiber disconnection.

That is, in the sixth embodiment shown in FIG. 1-19 and 1-20 and the seventh embodiment shown in FIG. 1-24 and 1-25, single cored optical fibers are used to connect between the network-node equipments and the arrayed waveguide grating (AWG), causing a problem in that the specific network-node equipment 1-701 becomes isolated if the optical fiber therebetween is disconnected.

On the other hand, in the present embodiment, a method for duplicating the optical fiber of the transmitting and receiving system so as not to isolate the specific network-node equipment even at the time of failure such as optical fiber disconnection, is made realizable.

That is, in the eighth embodiment shown in FIG. 1-26, arrayed waveguide gratings (AWG) 1-101 and 1-102 which respectively contain N optical input ports and N optical output ports (N is an integer) are provided. Each of the four optical input ports 1-201 to 204 and 1-205 to 208 and the four optical output ports 1-301 to 304 and 1-305 to 308 are used in the present embodiment. These are connected to four network-node equipments 1-701 to 704 through the single cored optical fibers 1-501 to 516.

The network-node equipment 1-701 comprises a transceiver 1-1501 which has a transmitter 1-1101 and a receiver 1-1201, and a transceiver 1-1502 which has a transmitter 1-1102 and a receiver 1-1202. An output port of the transmitter 1-1101 of the transceiver 1-1501 is connected to the optical input port 1-201 of the arrayed waveguide grating (AWG) 1-101 through the optical fiber 1-502. An input port of the receiver 1-1201 is connected to the optical output port 1-301 of the arrayed waveguide grating (AWG) 1-101 through the optical fiber 1-501. An output port of the transmitter 1-1102 of the transceiver 1-1502 is connected to the optical input port 1-205 of the arrayed waveguide grating (AWG) 102 through the optical fiber 1-503. An input port of the receiver 1-1202 is connected to the optical output port 1-305 of the arrayed waveguide grating (AWG) 1-102 through the optical fiber 1-504.

The network-node equipment 1-702 comprises a transceiver 1-1503 which has a transmitter 1-1103 and a receiver 1-1203, and a transceiver 1-1504 which has a transmitter 1-1104 and a receiver 1-1204. An output port of the transmitter 1-1103 of the transceiver 1-1503 is connected to the optical input port 1-202 of the arrayed waveguide grating (AWG) 1-101 through the optical fiber 1-505. An input port of the receiver 1-1203 is connected to the optical output port 1-302 of the arrayed waveguide grating (AWG) 1-101 through the optical fiber 1-506. An output port of the transmitter 1-1104 of the transceiver 1-1504 is connected to the optical input port 1-206 of the arrayed waveguide grating (AWG) 1-102 through the optical fiber 1-507. An input port of the receiver 1-1204 is connected to the optical output port 1-306 of the arrayed waveguide grating (AWG) 1-102 through the optical fiber 1-508.

The network-node equipment 1-703 comprises a transceiver 1-1505 which has a transmitter 1-1105 and a receiver 1-1205, and a transceiver 1-1506 which has a transmitter 1-1106 and a receiver 1-1206. An output port of the transmitter 1-1105 of the transceiver 1-1505 is connected to the optical input port 1-203 of the arrayed waveguide grating (AWG) 1-101 through the optical fiber 1-509. An input port of the receiver 1-1205 is connected to the optical output port 1-303 of the arrayed waveguide grating (AWG) 1-101 through the optical fiber 1-510. An output port of the transmitter 1-1106 of the transceiver 1-1506 is connected to the optical input port 1-207 of the arrayed waveguide grating (AWG) 1-102 through the optical fiber 1-511. An input port of the receiver 1-1206 is connected to the optical output port 1-307 of the arrayed waveguide grating (AWG) 1-102 through the optical fiber 1-512.

The network-node equipment 1-704 comprises a transceiver 1-1507 which has a transmitter 1-1107 and a receiver 1-1207, and a transceiver 1-1508 which has a transmitter 1-1108 and a receiver 1-1208. An output port of the transmitter 1-1107 of the transceiver 1-1507 is connected to the optical input port 1-204 of the arrayed waveguide grating (AWG) 1-101 through the optical fiber 1-513. An input port of the receiver 1-1207 is connected to the optical output port 1-304 of the arrayed waveguide grating (AWG) 1-101 through the optical fiber 1-514. An output port of the transmitter 1-1108 of the transceiver 1-1508 is connected to the optical input port 1-208 of the arrayed waveguide grating (AWG) 1-102 through the optical fiber 1-515. An input port of the receiver 1-1208 is connected to the optical output port 1-308 of the arrayed waveguide grating (AWG) 1-102 through the optical fiber 1-516.

As with the above structure, the optical fibers of the transmitting and receiving system are duplicated by having a duplicated redundant structure so that the specific network-node equipment will not be isolated even at the time of failure such as optical fiber disconnection.

Double cored optical fibers may be used to connect between the transceivers 1-1501 to 1508 and the arrayed waveguide gratings (AWG) 1-101 and 1-102.

Ninth Embodiment

Next is a description of a ninth embodiment according to the fiber optic communication system of the present invention, with reference to FIG. 1-27. Similarly to the eighth embodiment, the present embodiment is a system based on the seventh embodiment shown in FIG. 1-24 and 1-25, and is a system which has a structure which takes into consideration failure avoidance in the case of a failure occurrence such as fiber disconnection.

That is, in the ninth embodiment, a method for superimposing two structures of the seventh embodiment so as not to isolate the specific network-node equipment even at the time of failure such as disconnection of the optical fiber which connects between the network-node equipments and the arrayed waveguide grating (AWG), is made realizable. In the structure of the ninth embodiment, single cored optical fibers are used. Non-reciprocal optical circuits such as optical circulators are provided for the respective network-node equipments and the transmitting and receiving ports of the arrayed waveguide grating (AWG).

In the ninth embodiment shown in FIG. 1-27, two of the arrayed waveguide gratings (AWG) 1-101 and 1-102 which respectively comprises N optical input ports and N optical output ports are provided. Four of the optical input ports 1-201 to 204 and 1-205 to 208 among the N ports and four of the optical output ports 1-301 to 304 and 1-305 to 308 among the N ports are used. They are connected to four network-node equipments 1-701 to 704 through the non-reciprocal optical circuits 1-1001 to 1016 and the single cored optical fibers 1-501 to 508.

The network-node equipment 1-701 comprises an optical DEMUX device 1-1401 which has a transmitter 1-1101, a receiver 1-1201 and a non-reciprocal optical circuit 1-1001, and an optical DEMUX device 1-1402 which has a transmitter 1-1102, a receiver 1-1202 and a non-reciprocal optical circuit 1-1002.

The non-reciprocal optical circuit 1-1001 is connected to the output port of the transmitter 1-1101 and the input port of the receiver 1-1201, and is also connected to the optical input port 1-201 and the optical output port 1-301 of the arrayed waveguide grating (AWG) 1-101 through the optical fiber 1-501 and the non-reciprocal optical circuit 1-1005.

The non-reciprocal optical circuit 1-1002 is connected to the output port of the transmitter 1-1102 and the input port of the receiver 1-1202, and is also connected to the optical input port 1-205 and the optical output port 1-305 of the arrayed waveguide grating (AWG) 1-102 through the optical fiber 1-502 and the non-reciprocal optical circuit 1-1013.

The network-node equipment 1-702 comprises an optical DEMUX device 1-1403 which has a transmitter 1-1103, a receiver 1-1203 and a non-reciprocal optical circuit 1-1003, and an optical DEMUX device 1-1404 which has a transmitter 1-1104, a receiver 1-1204 and a non-reciprocal optical circuit 1-1004.

The non-reciprocal optical circuit 1-1003 is connected to the output port of the transmitter 1-1103 and the input port of the receiver 1-1203, and is also connected to the optical input port 1-202 and the optical output port 1-302 of the arrayed waveguide grating (AWG) 1-101 through the optical fiber 1-503 and the non-reciprocal optical circuit 1-1006.

The non-reciprocal optical circuit 1-1004 is connected to the output port of the transmitter 1-1104 and the input port of the receiver 1-1204, and is also connected to the optical input port 1-206 and the optical output port 1-306 of the arrayed waveguide grating (AWG) 1-102 through the. optical fiber 1-504 and the non-reciprocal optical circuit 1-1014.

The network-node equipment 1-703 comprises an optical DEMUX device 1-1405 which has a transmitter 1-1105, a receiver 1-1205 and a non-reciprocal optical circuit 1-1009, and an optical DEMUX device 1-1406 which has a transmitter 1-1106, a receiver 1-1206 and a non-reciprocal optical circuit 1-1010.

The non-reciprocal optical circuit 1-1009 is connected to the output port of the transmitter 1-1105 and the input port of the receiver 1-1205, and is also connected to the optical input port 1-203 and the optical output port 1-303 of the arrayed waveguide grating (AWG) 1-101 through the optical fiber 1-505 and the non-reciprocal optical circuit 1-1007.

The non-reciprocal optical circuit 1-1010 is connected to the output port of the transmitter 1-1106 and the input port of the receiver 1-1206, and is also connected to the optical input port 1-207 and the optical output port 1-307 of the arrayed waveguide grating (AWG) 1-102 through the optical fiber 1-506 and the non-reciprocal optical circuit 1-1015.

The network-node equipment 1-704 comprises an optical DEMUX device 1-1407 which has a transmitter 1-1107, a receiver 1-1207 and a non-reciprocal optical circuit 1-1011, and an optical DEMUX device 1-1408 which has a transmitter 1-1108, a receiver 1-1208 and a non-reciprocal optical circuit 1-1012.

The non-reciprocal optical circuit 1-1011 is connected to the output port of the transmitter 1-1107 and the input port of the receiver 1-1207, and is also connected to the optical input port 1-204 and the optical output port 1-304 of the arrayed waveguide grating (AWG) 1-101 through the optical fiber 1-507 and the non-reciprocal optical circuit 1-1008.

The non-reciprocal optical circuit 1-1012 is connected to the output port of the transmitter 1-1108 and the input port of the receiver 1-1208, and is also connected to the optical input port 1-208 and the optical output port 1-308 of the arrayed waveguide grating (AWG) 1-102 through the optical fiber 1-508 and the non-reciprocal optical circuit 1-1016.

As with the above structure, the optical fibers of the transmitting and receiving system are duplicated by having a duplicated redundant structure so that the specific network-node equipment will not be isolated even at the time of failure such as optical fiber disconnection.

Moreover, in the case of having the above duplicated redundant structure, irrespective of whether the single cored optical fibers are used or the double cored optical fibers are used, optical signals are transmitted in two ways at the same time so that the specific network-node equipment will not be isolated even if the optical fiber for one way is disconnected, and a more stable network structure can be realized.

Tenth Embodiment

Next is a description of a tenth embodiment according to the fiber optic communication system of the present invention, with reference to FIG. 1-28. In FIG. 1-28, the same reference symbols are used for components the same as those in the ninth embodiment shown in FIG. 1-27, and description thereof is omitted. Moreover, the different point between the tenth embodiment and the ninth embodiment is that transmitters 1-901 to 908 using wavelength tunable light sources are provided instead of the transmitters 1-1101 to 1108 in the abovementioned ninth embodiment.

In this manner, by using the transmitters 1-901 to 908 which have wavelength tunable light sources, in the case of constructing the ring-shaped logical network topology, it is possible to tune the wavelengths of the optical signals so as to avoid failure, by skipping (jumping) the network-node equipment which became incommunicable due to the failure occurrence. Similar effects may be also obtained by using multi-wavelength light source arrays instead of wavelength tunable light sources.

Eleventh Embodiment

In an eleventh embodiment, an example where transmitters having wavelength tunable light sources such as in the above tenth embodiment, are applied to the fiber optic communication system of the sixth embodiment is explained with reference to FIG. 1-29 and 1-30. FIG. 1-29 shows a physical network topology of the fiber optic communication system in the eleventh embodiment and the structure thereof. FIG. 1-30 shows a logical network topology of the fiber optic communication system in the eleventh embodiment and the structure thereof.

In FIG. 1-29 and 1-30, the same reference symbols are used for components the same as those in the sixth embodiment shown in FIG. 1-19 and 1-20, and description thereof is omitted.

Similarly to the sixth embodiment, the present embodiment has a wavelength arrangement having the ring-shaped logical network topology, being a network structure containing four network-node equipments 1-701 to 704 where signals travel around all of the network-node equipments 1-701 to 704. In the present embodiment, a feature is that optical signals are transmitted in a single direction or in both directions. The transmitting wavelength is selected by the wavelength tunable light sources arranged in the respective network-node equipment 1-701 to 704 so as to transmit from the network-node equipment immediately prior to the failure point, to the next network-node equipment by skipping (jumping) the failure network-node equipment, with respect to a failure such as a disconnection of a specific optical fiber or a failure of a specific network-node equipment.

For example, as shown in FIG. 1-29, in the case where between the network-node equipment 1-701 and the arrayed waveguide grating (AWG) 1-101 becomes incommunicable, that is between the network-node equipment 1-701 and the network-node equipments 1-702 and 1-704 in the ring-shaped logical network topology, then as shown in FIG. 1-30, the wavelength of the optical signal used for communicating with the network-node equipment 1-701 is replaced by the wavelength λ1 in the respective network-node equipments 1-702 and 1-704 so as to skip (jump) the network-node equipment 1-701, enabling formation of a ring-shaped logical network topology which ensures the communication between the network-node equipment 1-702 and the network-node equipment 1-704. Therefore, in the case of failure occurrence, the ring-shaped logical network topology between communicable network-node equipments can be ensured and the communication can be maintained.

When a failure such as the above occurs, it is easily possible to detect the failure and automatically switch the wavelength of the optical signal. By automatically switching the wavelength of the optical signal in this manner, the failure can be dealt with when it occurs, stably at high speed.

Twelfth Embodiment

Next is a description of a twelfth embodiment according to the fiber optic communication system of the present invention, with reference to FIG. 1-31. FIG. 1-31 shows a physical network topology of the fiber optic communication system in the twelfth embodiment, and the structure thereof.

The system of the twelfth embodiment is a system where transmitters 1-901 to 904 having wavelength tunable light sources, are provided instead of the transmitters 1-1101 to 1104 in the abovementioned seventh embodiment, and wavelength tunable filters 1-1501 to 1504 are provided between the receivers 1-1201 to 1204 and the non-reciprocal optical circuits (optical circulators) 1-1001 to 1004. Here as an example is a description of a case where four network-node equipments 1-701 to 704 are connected by single cored optical fibers 801 to 804.

In the respective network-node equipments 1-701 to 704, there are arranged transmitters 1-901 to 904 which have wavelength tunable light sources for transmitting signals toward the desired network-node equipment, and wavelength tunable filters 1-1501 to 1504 for selecting the optical signal of one wavelength among optical signals of various wavelengths transmitted from other network-node equipments.

In this example, the example is shown where a pair of receiver 1-1201 to 1204 and the wavelength tunable filter 1-1501 to 1504 are contained in the respective network-node equipments one-to-one. Of course a plurality of pairs of receivers and wavelength tunable filters may be arranged so as to receive optical signals of a plurality of wavelengths, at the same time.

In the case of modifying the logical network topology, or in the case of adding the network-node equipment, it is necessary to change the wavelength of the light source for transmission in the network-node equipment associated with transmission and reception from and to the network-node equipment. However at the same time it is also necessary to select many wavelengths to be received on the reception side. Therefore, by installing wavelength tunable filters corresponding to the wavelengths received, there is no need to arrange receivers over and above what is needed, thus being economically superior.

In this embodiment, the case of a single path using single cored optical fibers was described, however a case of using a redundant structure or a double cored optical fibers is similar. Furthermore, the number of the network-node equipments is not limited to four either.

Thirteen Embodiment

Next is a description of a thirteenth embodiment according to the fiber optic communication system of the present invention, with reference to FIG. 1-32.

FIG. 1-32 shows a network structure of the thirteenth embodiment, showing as an example a structure where four network-node equipments 1-701 to 704 are connected by double cored optical fibers 1-501 to 508. The number of the network-node equipments is of course not limited to four.

In FIG. 1-32, 1-101 denotes an arrayed waveguide grating (AWG) similar to the above, 1-701 to 704 denote network-node equipments, 1-1601 denotes a central-management-equipment, and 1-1801 to 1816 denote WDM couplers.

The network-node equipments 1-701 to 704 comprise transceivers for control-signal 1-1701 to 1704 for communicating with the central-management-equipment, transceivers for data-signal 1-2501 to 2504 for communicating with other node equipments, WDM couplers 1-1801 to 1808, and optical splitters 1-2101 to 2104.

The transceivers for control-signal 1-1701 to 1704 comprise receiver units for control-signal 1-1901 to 1904 and transmitter units for control-signal 1-2001 to 2004. The input ports of the receiver units for control-signal 1-1901 to 1904 are connected to the WDM couplers 1-1 802, 1804, 1806 and 1808. The output ports of the transmitter units for control-signal 1-2001 to 2004 are connected to the WDM couplers 1-1801, 1803, 1805 and 1807. The receiver units for control-signal 1-1901 to 1904 receive control-signals transmitted from the central-management-equipment 1-1601. The transmitter units for control-signal 1-2001 to 2004 transmit the control-signals to the central-management-equipment 1-1601.

The transceivers 1-2501 to 2504 comprise transmitters 1-901 to 904 having wavelength tunable light sources, monitor photo detectors (hereunder, monitor PD) 1-2201 to 2204, and receivers 1-1201 to 1204 comprising wavelength tunable filters 1-1501 to 1504.

The output ports of the transmitters 1-901 to 904 are connected to the WDM couplers 1-1801, 1803, 1805 and 1807, and monitors PD 1-2201 to 2204 through the optical splitters 1-2101 to 2104. The input ports of the receivers 1-1201 to 1204 are connected to the WDM couplers 1-1802, 1804, 1806 and 1808 through the wavelength tunable filters 1-1501 to 1504.

The WDM couplers 1-1801, 1803, 1805 and 1807 are connected to the receiver units for control-signal 1-1905 to 1908 of the transceivers for control-signal 1-1705 to 1708, and the optical input ports 1-201 to 204 of the arrayed waveguide grating (AWG) 1-101 respectively through the WDM couplers 1-1809 to 1812 which are arranged in the other end position.

The central-management-equipment 1-1601 has four transceivers for control-signal 1-1705 to 1708 and its controlling unit 1-1600. The transceivers for control-signal 1-1705 to 1708 comprise the receiver units for control-signal 1-1905 to 1908 and the transmitter units for control-signal 1-2005 to 2008.

The output ports of the transmitter units for control-signal 1-2005 to 2008 are connected to one of the input ports of the WDM couplers 1-1813 to 1816. The other input ports of the WDM couplers 1-1813 to 1816 are connected to the optical output ports 1-301 to 304 of the arrayed waveguide grating (AWG) 1-101 in the order of description. Furthermore, the output ports of the WDM couplers 1-1813 to 1816 are connected to the input ports of the WDM couplers 1-1802, 1804, 1806 and 1808 which are arranged in the other end position.

Moreover, the arrayed waveguide grating (AWG) 1-101 is set so that output optical signals which are input to the optical input ports 1-201, 202, 203 and 204 can be output to the optical output ports 1-302, 303, 304 and 301 corresponding to the order of description.

In the fiber optic communication system of the above structure, optical signals with wavelength bandwidth around the range of 1.5 µm are used as the optical signals 1-2301 to 2308 transmitted and received by the respective network-node equipments 1-701 to 704. At the same time, in order to control the network, the optical signals with wavelength bandwidth for example around the range of 1.31 µm, which is different from the communication wavelength bandwidth (around the range of 1.5 µm), are used as the control-signals 1-2401 to 2408.

The optical signals 1-2301 to 2304 and the control-signals 1-2401 to 2404 sent from the respective network-node equipments 1-701 to 704 are combined by the WDM couplers 1-1801, 1803, 1805 and 1807 which are arranged in the respective network-node equipments 1-701 to 704, then transmitted toward the arrayed waveguide grating (AWG) 1-101. The optical signals 1-2301 to 2304 and the control-signals 1-2401 to 2404 transmitted toward the arrayed waveguide grating (AWG) 1-101 are split by the WDM couplers 1-1809 to 1812 before reaching to the arrayed waveguide grating (AWG) 1-101. The optical signals 1-2301 to 2304 are guided to the optical input ports 1-201 to 204 of the arrayed waveguide grating (AWG) 1-101. The control-signals 1-2401 to 2404 are guided to the receiver units for control-signal 1-1905 to 1908 of the transceiver units for control-signal 1-1705 to 1708 arranged in the central-management-equipment 1-1601. Accordingly, the communication status of the respective network-node equipments 1-701 to 704 can be controlled.

Furthermore, the monitors PD 1-2201 to 2204 are arranged in the respective network-node equipments 1-701 to 704 so that the optical status of the optical signals 1-2301 to 2304 can be monitored by guiding part of the light which was transmitted from the transmitters 1-901 to 904 having the wavelength tunable light sources arranged in the respective network-node equipments 1-701 to 704, to the monitors PD 1-2201 to 2204 through the optical splitters 1-2101 to 2104.

The control-signals 1-2405 to 2408 are transmitted from the central-management-equipment 1-1601 to the respective network-node equipments 1-701 to 704 by light with a wavelength bandwidth around the range of 1.3 µm. The control-signals 1-2405 to 2408 and the optical signals 1-2304, 2301, 2302 and 2303 which were output from the optical output ports 1-301 to 304 of the arrayed waveguide grating (AWG) 1-101 are combined using the WDM couplers 1-1813 to 1816, and are transmitted to the respective network-node equipments 1-701 to 704.

The optical signals 1-2301 to 2304 and the control-signals 1-2405 to 2408 which were received by the respective network-node equipments 1-701 to 704 are split by the WDM couplers 1-1802, 1804, 1806 and 1808 which are arranged in the respective network-node equipments 1-701 to 704. The optical signals 1-2301 to 2304 are guided to the respective receivers 1-1201 to 1204 through the wavelength tunable filters 1-1501 to 1504. The control-signals 1-2405 to 2408 are guided to the transceivers for control-signal 1-1701 to 1704 which are arranged in the respective network-node equipments 1-701 to 704.

According to this structure, unitary administration can be performed by the central-management-equipment 1-1601, for modifying the status of the respective network-node equipments 1-701 to 704 and the logical network topology, and for adding or dropping a network-node equipment. Here, optical signals with wavelength bandwidth around the range of 1.3 µm were used for the wavelength of the optical control-signals 1-2401 to 2408, however optical signals with any wavelength bandwidth may be used as long as they can be split from the wavelengths of the optical signals. Moreover, in the present embodiment, an example where the control-signals 1-2405 to 2408 are transmitted and received through the same optical fibers for the optical signals 1-2301 to 2304, is shown. However, the control-signals 1-2405 to 2408 may be transmitted and received through other optical fibers which are different from the pertinent optical fibers, or other communication path such as the Internet or the like.

The wavelength arrangement shown in the abovementioned respective embodiments is not limited to the abovementioned embodiments, and is determined according to the port to be connected among the optical input/output ports of the arrayed waveguide grating (AWG) 1-101 in use. Needless to say, any wavelength arrangement is possible.

Fourteenth Embodiment

FIG. 2-1 shows the overall structure of a logical topology reconfigurable optical network system in a fourteenth embodiment of the present invention. In the diagram, the number of the network-terminal equipments (2-1001 to 1004) and the optical input/output ports (2-201 to 204) of the arrayed waveguide grating (AWG) are four respectively. However it may be any integer of 2 or more. Moreover, in the diagram, one arrayed waveguide grating (AWG) (2-101) and one central-management-equipment (2-2001) are shown respectively. However a plurality of them may be set if a redundant structure is performed.

Optical signals with a wavelength bandwidth around a range of 1.5 μm arranged on the ITU grid are preferably used for the optical data-signals which will be described later. Optical signals with a wavelength bandwidth around a range of 1.3 μm are preferably used for the control-signals. However, they are not limited to this and optical signals with a wavelength so that both signals can be split, may be suitably used for the optical data-signals and the control-signals. Moreover, optical signals with wavelengths enabling splitting or combining of the optical data-signals and the control-signals having different wavelengths are used for a WDM coupler which will be described later.

The optical input/output ports (2-901 to 904) of the network-terminal equipments (2-1001 to 1004) are connected to the optical input/output ports for network-terminal equipments (2-601 to 604) of the network-node equipments (2-301 to 304) by optical guided wave paths (2-1801 to 1804) such as optical fibers. The optical signals from the aforementioned network-terminal equipments are wavelength converted to the WDM signal wavelength by the network-node equipments (2-301 to 304). WDM signals are output from the WDM optical input/output ports (2-401 to 404) of the network-node equipments (2-301 to 304), wave guided to the optical guided wave paths (2-1101 to 1104) such as optical fibers which become transmission paths, by the WDM couplers (2-1201 to 1204) connected by the optical guided wave paths (2-1401 to 1404) such as optical fibers, and reach to the WDM couplers (2-1301 to 1304) on the next stage. Then, they are wave guided to the optical guided wave paths (2-1601 to 1604) such as optical fibers and guided to the optical input/output ports (2-201 to 204) of the arrayed waveguide grating (AWG) (2-101).

In the arrayed waveguide grating (AWG)(2-101), the optical layer routing is performed to the different optical input/output ports according to the wavelength of the input optical signal. Accordingly, by converting the wavelength of the optical signals output from the network-terminal equipments (2-1001 to 1004) by the network-node equipments (2-301 to 304), it becomes possible to freely turn the paths toward any one of the network-terminal equipments (2-1001 to 1004) which is set in the other end position, by the arrayed waveguide grating (AWG) (2-101).

When controlling the wavelength converting function in the network-node equipments (2-301 to 304), the central-management-equipment (2-2001) collectively control with respect to the plurality of network-node equipments (2-301 to 304). The network-node equipments (2-301 to 304) and the central-management-equipment (2-2001) are communicated with each other when controlling. However in FIG. 2-1 the optical guided wave paths (2-1101 to 1104) such as optical fibers which transmit the WDM signals from the network-node equipments (2-301 to 304) are shared as the transmission path in this communication.

However, sharing is not always necessary, and optical guided wave paths such as other optical fibers may be set to connect to a concentrator switch (2-1901).

The control-signals from the optical input/output ports for control-signal (2-501 to 504) of the network-node equipments (2-301 to 304) reach the WDM couplers (2-1201 to 1204) by the optical guided wave paths (2-1501 to 1504) such as optical fibers, and reach the WDM couplers (2-1301 to 1304) on the other ends by the optical guided wave paths (2-1101 to 1104) such as optical fibers. Then, they reach the concentrator switch (2-1901) by the optical guided wave paths (2-1701 to 1704) such as optical fibers. The control-signals from all of the network-node equipments (2-301 to 304) reach the concentrator switch (2-1901) and reach to the optical input/output port for control-signal (2-2201) of the central-management-equipment (2-2001). The control-signals are calculated by the central-management-equipment (2001). Moreover, conversely, the control-signals from the central-management-equipment (2-2001) are propagated from the optical input/output ports (2-2201) of the central-management-equipment, to the concentrator switch (2-1901), the WDM couplers (2-1301 to 1304), and the WDM couplers (2-1201 to 1204), and then reach the optical input/output ports for control-signal (2-501 to 504) of the network-node equipments (2-301 to 304).

In the respective network-node equipments (2-301 to 304), the internal database of the network-node equipment (2-701 to 704) and the external database of the network-node equipment (2-801 to 804) (node database) are connected. In the central-management-equipment (2-2001), the internal database of the central-management-equipment (2-2301) and the external database of the central-management-equipment (2-2401) (central database) are connected.

Fifteenth Embodiment

FIG. 3-1 shows a fifteenth embodiment according to the fiber optic communication system of the present invention, illustrating the structure of the arrayed waveguide grating (AWG) and the concentrator switch together with the network structure, showing an example where optical switches are introduced inside the network-node equipments. In the drawing, 3-10, 20, 30 and 40 denote network-node equipments, 3-51 denotes an arrayed waveguide grating (AWG), 3-61 denotes a concentrator switch, 3-62 denotes a central-management-equipment, and 3-71 to 78 and 3-81 to 88 denote optical transmission paths such as optical fibers.

The system shown in FIG. 3-1 has a star-shaped physical network topology where four network-node equipments 3-10, 20, 30 and 40 are physically connected to the arrayed waveguide grating (AWG) 3-51 by optical fibers.

Optical signals with a wavelength bandwidth around a range of 1.5 μm arranged on the ITU grid are preferably used for the optical data-signals which will be described later. Optical signals with a wavelength bandwidth around a range of 1.3 μm are preferably used for the control-signals. However, they are not limited to this and optical signals with a wavelength so that both signals can be split may be suitably used for the optical data-signals and the control-signals. Moreover, optical signals with wavelengths enabling splitting or combining of the optical data-signals and the control-signals having different wavelengths are used for a WDM coupler which will be described later.

The network-node equipment 3-10 comprises a first WDM (Wavelength Division Multiplexing) coupler 3-11a which splits input signals from the arrayed waveguide grating (AWG) 3-51 into optical data-signals and control-signals, a demultiplexer 3-12a which splits optical data-signals from the first WDM coupler 3-11a into different wavelengths, 4×4 first optical switches 3-13a which change the direction of optical data-signals from the demultiplexer 3-12a, for sending, and four optical receivers 3-14a1, 1.4b1, 14c1 and 14d1 to which the optical data-signals from the first optical switches 3-13a are sent.

Moreover, the network-node equipment 3-10 comprises four wavelength tunable light sources 3-14a2, 14b2, 14c2 and 14d2 such as SSG-DBR lasers or the like respectively having modulators 3-14a3, 14b3, 14c3 and 14d3 on the output side, 4×4 second optical switches 3-13b which changes the direction of optical data-signals after modulation from the respective wavelength tunable light sources 3-14a2, 14b2, 14c2 and 14d2, a multiplexer 3-12b which combines optical data-signals from the second optical switches 3-13b, and a second WDM coupler 3-11b which combines the control-signals from the controlling unit of the network node equipment 3-15 with the optical data-signals from the multiplexer 3-12b for outputting. If wavelength tunable light sources having a direct modulating function are used as the respective wavelength tunable light sources 3-14a2, 14b2, 14c2 and 14d2, the respective modulators 3-14a3, 14b3, 14c3 and 14d3 are not always necessary. Moreover, the respective wavelength tunable light sources 3-14a2, 14b2, 14c2 and 14d2 form a pair with the respective optical receivers 3-14a1, 14b1, 14c1 and 14d1, to construct an optical data-signal transceiver unit 3-14 as a whole.

Furthermore, the network-node equipment 3-10 comprises an optical input port 3-15a1 which is connected to the first WDM coupler 3-11a, an optical input port 3-15a2 which is connected to the second WDM coupler 3-11b, and a controlling unit of network node equipment 3-15 having a control circuit of a microcomputerized structure (not shown). The control circuit serves to control the output wavelengths of the respective wavelength tunable light sources 3-14a2, 14b2, 14c2 and 14d2 and the optical paths of the respective optical switches 3-13a and 13b, based on the control-signals from the first WDM coupler 3-11a, and to send the control-signals including the information of the communication status of the network-node equipment 3-10 to the second WDM coupler 3-11b.

The structure of the other three network-node equipments 3-20, 30 and 40 has the same structure to that of the aforementioned network-node equipment 3-10. In this connection: 3-21a, 31a and 41a are first WDM couplers; 3-22a, 32a and 42a are demultiplexers; 3-23a, 33a and 3-43a are 4×4 first optical switches; 3-24, 34 and 44 are optical data-signal transceiver units; 3-24a1, 24b1, 24c1, 24d1, 34a1, 34b1, 34c1, 34d1, 44a1, 44b1, 44c1 and 44d1 are optical receivers; 3-24a2, 24b2, 24c2, 24d2, 34a2, 34b2, 34c2, 34d2, 44a2, 44b2, 44c2, 44d2 are wavelength tunable light sources; 3-24a3, 24b3, 24c3, 24d3, 34a3, 34b3, 34c3, 34d3, 44a3, 44b3, 44c3 and 44d3 are modulators; 3-23b, 33b and 43b are 4×4 second optical switches; 3-22b, 32b and 42b are multiplexers; 3-21b, 31b and 41b are second WDM couplers; 3-25, 35 and 45 are node controlling units; 3-25a1, 35a1 and 45a1 are optical input ports; and 3-25a2, 35a2 and 45a2 are optical output ports.

An arrayed waveguide grating (AWG) 3-51 is composed of a 4×4 AWG (arrayed waveguide grating) type multi/demultiplexer having four optical input ports 3-51a to 51d and four optical output ports 3-51e to 51h, comprising four WDM couplers 3-52a to 52d which are provided corresponding to the respective optical input ports 3-51a to 51d, and four WDM couplers 3-52e to 52h which are provided corresponding to the respective optical output ports 3-51e to 51h. The WDM couplers 3-52a to 52d on the optical input port side serve to split the input signals from the respective network-node equipments 3-10, 20, 30 and 40 into optical data-signals and control-signals, then send the control-signals to the concentrator switch 61 and send the optical data-signals to the respective optical input ports 3-51a to 51d. Moreover, the WDM couplers 3-52e to 52h on the output side serve to combine the control-signals from the concentrator switch 3-61 with the output signals from the arrayed waveguide grating (AWG) 3-51.

The concentrator switch 3-61 comprises four optical input ports 3-61a1, 61b1, 61c1 and 61d1 which are connected to the central-management-equipment 3-62 and correspond to the respective WDM couplers 3-52a to 52d of the arrayed waveguide grating (AWG) 3-51, four optical output ports 3-61a2, 61b2, 61c2 and 61d2 which correspond to the respective WDM couplers 3-52e to 52h, and form pairs with the optical input ports 3-61a1, 61b1, 61c1 and 61d1, and an uplink optical input port 3-61e1 and an uplink optical output port 3-61e2 which transmit and receive the control-signals to and from the central-management-equipment 3-62. The central-management-equipment 3-62 comprises the optical input port 3-62a1 which is connected to the uplink optical output port 3-61e2 of the concentrator switch 3-61, the optical output port 3-62a2 which is connected to the uplink optical input port 3-61e1, and a control circuit of a microcomputerized structure (not shown). The control circuit serves to switch to connect any one of the four pairs of optical input/output ports of the concentrator switch 3-61 to the uplink optical input port 3-61e1 and the uplink optical output port 3-61e2, to output the control-signals including information of the wavelength change from a predetermined uplink optical output port, and to take in the control-signals including information of the communication status from a predetermined optical input port to monitor the communication status of the respective network-node equipments, based on the control-signals.

The optical transmission path 3-71 connects the input side of the first WDM coupler 3-11a of the network-node equipment 3-10 and the output side of the WDM coupler 3-52e of the arrayed waveguide grating (AWG) 3-51. The optical transmission path 3-72 connects the output side of second WDM coupler 3-11b of the network-node equipment 3-10 and the input side of the WDM coupler 3-52a of the arrayed waveguide grating (AWG) 3-51. The optical transmission path 3-73 connects the input side of the first WDM coupler 3-21a of the network-node equipment 3-20 and the output side of the WDM coupler 3-52f of the arrayed waveguide grating (AWG) 3-51. The optical transmission path 3-74 connects the output side of second WDM coupler 3-21b of the network-node equipment 3-20 and the input side of the WDM coupler 3-52b of the arrayed waveguide grating (AWG) 3-51. The optical transmission path 3-75 connects the input side of the first WDM coupler 3-31a of the network-node equipment 3-30 and the output side of the WDM coupler 3-52g of the arrayed waveguide grating (AWG) 3-51. The optical transmission path 3-76 connects the output side of second WDM coupler 3-31b of the network-node equipment 3-30 and the input side of the WDM coupler 3-52c of the arrayed waveguide grating (AWG) 3-51. The optical transmission path 3-77 connects the input side of the first WDM coupler 3-41a of the network-node equipment 3-40 and the output side of the WDM coupler 3-52h of the arrayed waveguide grating (AWG) 3-51. The optical transmission path 3-78 connects the output side of second WDM coupler 3-41b of the network-node equipment 3-40 and the input side of the WDM coupler 3-52d of the arrayed waveguide grating (AWG) 3-51.

The optical transmission path 3-81 connects the output side of the WDM coupler 3-52a of the arrayed waveguide grating (AWG) 3-51 and the optical input port 3-61a1 of the concentrator switch 3-61. The optical transmission path 3-82 connects the input side of the WDM coupler 3-52e of the arrayed waveguide grating (AWG) 3-51 and the optical output port 3-61a2 of the concentrator switch 3-61. The optical transmission path 3-83 connects the output side of the WDM coupler 3-52b provided in the arrayed waveguide grating (AWG) 3-51 and the optical input port 3-61b1 of the concentrator switch 3-61. The optical transmission path 3-84 connects the input side of the WDM coupler 3-52f of the arrayed waveguide grating (AWG) 3-51 and the optical output port 3-61b2 of the concentrator switch 3-61. The optical transmission path 3-85 connects the output side of the WDM coupler 3-52c of the arrayed waveguide grating (AWG) 3-51 and the optical input port 3-61c1 of the concentrator switch 3-61. The optical transmission path 3-86 connects the input side of the WDM coupler 3-52g of the arrayed waveguide grating (AWG) 3-51 and the optical output port 3-61c2 of the concentrator switch 3-61. The optical transmission path 3-87 connects the output side of the WDM coupler 3-52d of the arrayed waveguide grating (AWG) 3-51 and the optical input port 3-61d1 of the concentrator switch 3-61. The optical transmission path 3-88 connects the input side of the WDM coupler 3-52h of the arrayed waveguide grating (AWG) 3-51 and the optical output port 3-61d2 of the concentrator switch 3-61.

Hereunder is a description of various logical network topologies which can be constructed by the system shown in FIG. 3-1 having the star-shaped physical network topology.

In the case where the full-mesh logical network topology as shown in FIG. 3-2B is constructed using the arrayed waveguide grating having the uniform-loss and cyclic-frequency as shown in FIG. 3-2A as the arrayed waveguide grating (AWG) 51, the wavelengths of the respective wavelength tunable light sources of the network-node equipments 3-10, 20, 30 and 40 are set to $\lambda 1$, $\lambda 2$, $\lambda 3$ and $\lambda 4$, the optical data-signals of the respective wavelengths are sent to the respective multiplexers 3-12b, 22b, 32b and 42b through the second optical switches 3-13b, 23b, 33b and 43b, and the optical data-signals of the respective wavelengths split by the respective demultiplexers 3-12a, 22a, 32a and 42a are sent to the respective optical receivers through the first optical switches 3-13a, 23a, 33a and 43a.

In the full-mesh logical network topology, as shown in FIG. 3-2B, the network-node equipment 3-10 and the network-node equipment 3-20 communicate by the optical data-signals of the wavelength $\lambda 2$ and the wavelength $\lambda 4$, the network-node equipment 3-10 and the network-node equipment 3-30 communicate by the optical data-signals of the wavelength $\lambda 3$ and the wavelength $\lambda 3$, the network-node equipment 3-10 and the network-node equipment 3-40 communicate by the optical data-signals of the wavelength $\lambda 2$ and the wavelength $\lambda 4$, the network-node equipment 3-20 and the network-node equipment 3-30 communicate by the optical data-signals of the wavelength $\lambda 2$ and the wavelength $\lambda 4$, the network-node equipment 3-20 and the network-node equipment 3-40 communicate by the optical data-signals of the wavelength $\lambda 3$ and the wavelength $\lambda 3$, and the network-node equipment 3-30 and the network-node equipment 3-40 communicate by the optical data-signals of the wavelength $\lambda 2$ and the wavelength $\lambda 4$.

Figures 1, 2, 3, 4:
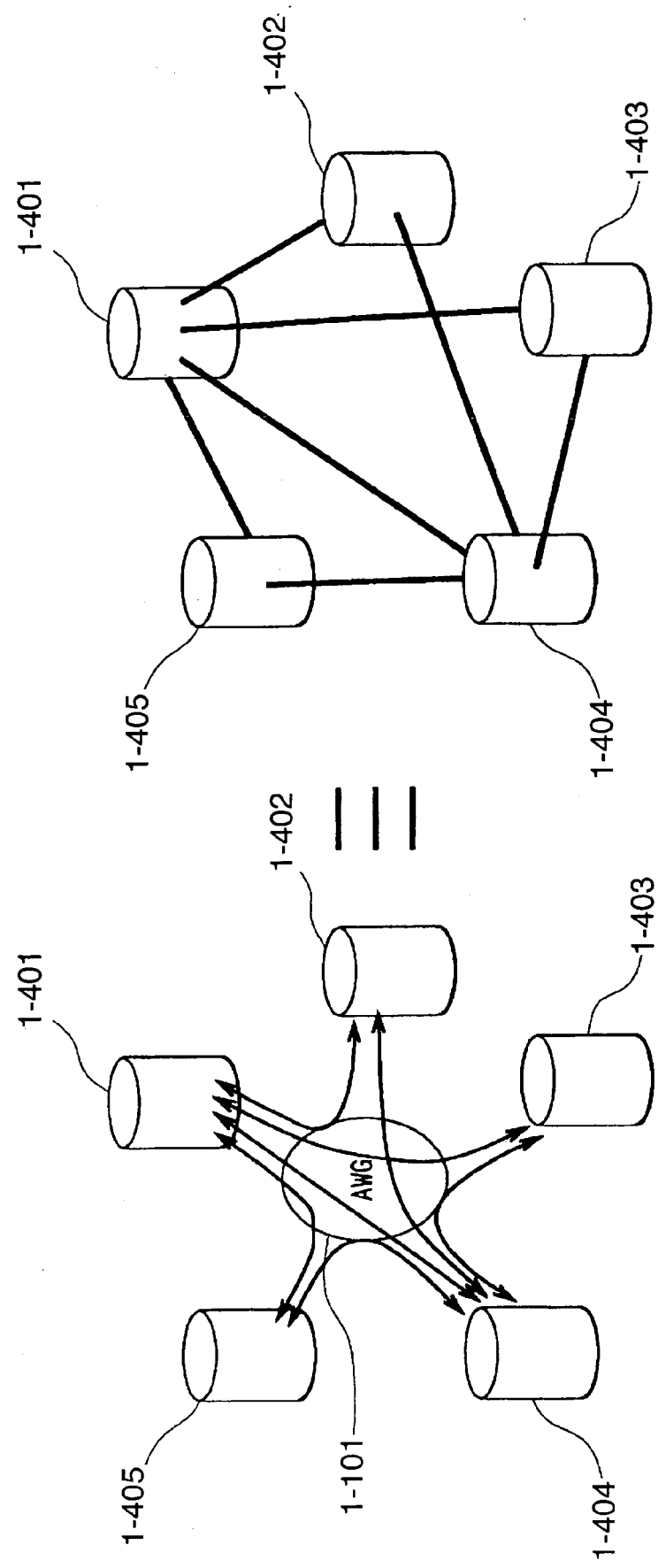

In the case where the ring-shaped logical network topology as shown in FIG. 3-3B is constructed using the arrayed waveguide grating having the uniform-loss and cyclic-frequency as shown in FIG. 3-3A as the arrayed waveguide grating (AWG) 3-51, and using the optical data-signals of the wavelengths shown by the mesh in the figure, then as shown in FIG. 3-4 the wavelength of the wavelength tunable light source 3-14a2 of the network-node equipment 3-10 is set to $\lambda 3$, the wavelength of the wavelength tunable light source 3-14b2 is set to $\lambda 2$, and the optical path of the second optical switch 3-13b is set so that the optical data-signals of the wavelength $\lambda 3$ from the wavelength tunable light source 3-14a2 are sent to the optical input port P3 of the multiplexer 3-12b, and the optical data-signals of the wavelength $\lambda 2$ from the wavelength tunable light source 3-14b2 are sent to the optical input port P2 of the multiplexer 3-12b. Moreover, the optical path of the first optical switch 3-13a is set so that the optical data-signals of the wavelength $\lambda 3$ from the optical output port P3 of the demultiplexer 3-12a are sent to the optical receiver 3-14a1, and the optical data-signals of the wavelength $\lambda 4$ from the optical output port P4 are input to the optical receiver 3-14b1.

The wavelength of the wavelength tunable light source 3-24a2 of the network-node equipment 3-20 is set to $\lambda 4$, the wavelength of the wavelength tunable light source 3-24b2 is set to $\lambda 3$, and the optical path of the second optical switch 3-23b is set so that the optical data-signals of the wavelength $\lambda 4$ from the wavelength tunable light source 3-24a2 are sent to the optical input port P4 of the multiplexer 3-22b, and the optical data-signals of the wavelength $\lambda 3$ from the wavelength tunable light source 3-24b2 are sent to the optical input port P3 of the multiplexer 3-22b. Moreover, the optical path of the first optical switch 3-23a is set so that the optical data-signals of the wavelength $\lambda 2$ from the optical output port P2 of the demultiplexer 3-22a are sent to the optical receiver 3-24a1 and the optical data-signals of the wavelength $\lambda 3$ from the optical output port P3 are input to the optical receiver 3-24b1.

The wavelength of the wavelength tunable light source 3-34a2 of the network-node equipment 3-30 is set to $\lambda 3$, the wavelength of the wavelength tunable light source 3-34b2 is set to $\lambda 2$, and the optical path of the second optical switch 3-33b is set so that the optical data-signals of the wavelength $\lambda 3$ from the wavelength tunable light source 3-34a2 are sent to the optical input port P3 of the multiplexer 3-32b, and the optical data-signals of the wavelength $\lambda 2$ from the wavelength tunable light source 3-34a2 are sent to the optical input port P3 of the multiplexer 3-32b. Moreover, the optical path of the first optical switch 3-33a is set so that the optical data-signals of the wavelength $\lambda 3$ from the optical output port P3 of the demultiplexer 3-32a are sent to the optical receiver 3-34a1 and the optical data-signals of the wavelength $\lambda 4$ from the optical output port P4 are input to the optical receiver 3-34b1.

The wavelength of the wavelength tunable light source 3-44a2 of the network-node equipment 3-40 is set to $\lambda 3$, the wavelength of the wavelength tunable light source 3-44b2 is set to $\lambda 4$, and the optical path of the second optical switch 3-43b is set so that the optical data-signals of the wavelength $\lambda 3$ from the wavelength tunable light source 3-44a2 are sent to the optical input port P3 of the multiplexer 3-42b, and the optical data-signals of the wavelength $\lambda 4$ from the wavelength tunable light source 3-44b2 are sent to the optical input port P4 of the multiplexer 3-42b. Moreover, the optical path of the first optical switch 3-43a is set so that the optical data-signals of the wavelength λ2 from the optical output port P2 of the demultiplexer 3-42a are sent to the optical receiver 3-44b1, and the optical data-signals of the wavelength λ3 from the optical output port P3 are input to the optical receiver 3-34a1.

In the ring-shaped logical network topology, as shown in FIG. 3-3B, the network-node equipment 3-10 and the network-node equipment 3-20 communicate by the optical data-signals of the wavelength λ2 and the wavelength λ4, the network-node equipment 3-20 and the network-node equipment 3-40 communicate by the optical data-signals of the wavelength λ3 and the wavelength λ3, the network-node equipment 3-30 and the network-node equipment 3-40 communicate by the optical data-signals of the wavelength λ2 and the wavelength λ4, and the network-node equipment 3-10 and the network-node equipment 3-30 communicate by the optical data-signals of the wavelength λ3 and the wavelength λ3.

In the case where the star-shaped logical network topology as shown in FIG. 3-5B is constructed using the arrayed waveguide grating having the uniform-loss and cyclic-frequency as shown in FIG. 3-5A as the arrayed waveguide grating (AWG) 3-51 and using the optical data-signals of the wavelengths shown by the mesh in the figure, then as shown in FIG. 3-6 the wavelength of the wavelength tunable light source 3-14b2 of the network-node equipment 3-10 is set to λ2, and the optical path of the second optical switch 3-13b is set so that the optical data-signals of the wavelength λ2 from the wavelength tunable light source 3-14b2 are sent to the optical input port P2 of the multiplexer 3-12b. Moreover, the optical path of the first optical switch 3-13a is set so that the optical data-signals of the wavelength λ4 from the optical output port P4 of the demultiplexer 3-12a are input to the optical receiver 3-14b1.

Furthermore, the wavelength of the wavelength tunable light source 3-24a2 of the network-node equipments 3-20 is set to λ4, the wavelength of the wavelength tunable light source 3-24b2 is set to λ3, the wavelength of the wavelength tunable light source 3-24c2 is set to λ2, and the optical path of the second optical switch 3-23b is set so that the optical data-signals of the wavelength λ4 from the wavelength tunable light source 3-24a2 are sent to the optical input port P4 of the multiplexer 3-22b, the optical data-signals of the wavelength λ3 from the wavelength tunable light source 3-24b2 are sent to the optical input port P3 of the multiplexer 3-22b, and the optical data-signals of the wavelength λ2 from the wavelength tunable light source 3-24c2 are sent to the optical input port P2 of the multiplexer 3-22b. Moreover, the optical path of the first optical switch 3-23a is set so that the optical data-signals of the wavelength λ2 from the optical output port P2 of the demultiplexer 3-22a are sent to the optical receiver 3-24a1, the optical data-signals of the wavelength λ3 from the optical output port P3 are sent to the optical receiver 3-24b1, and the optical data-signals of the wavelength λ4 from the optical output port P4 are input to the optical receiver 3-24c1.

Furthermore, the wavelength of the wavelength tunable light source 3-34a2 of the network-node equipment 3-30 is set to λ4, and the optical path of the second optical switch 3-33b is set so that the optical data-signals of the wavelength λ4 from the wavelength tunable light source 3-34a2 are sent to the optical input port P4 of the multiplexer 3-22b. Moreover, the optical path of the first optical switch 3-33a is set so that the optical data-signals of the wavelength λ2 from the optical output port P2 of the demultiplexer 3-32a are input to the optical receiver 3-34a1.

Furthermore, the wavelength of the wavelength tunable light source 3-44a2 of the network-node equipment 3-40 is set to λ3, and the optical path of the second optical switch 3-43b is set so that the optical data-signals of the wavelength λ3 from the wavelength tunable light source 3-44a2 are sent to the optical input port P3 of the multiplexer 3-42b. Moreover, the optical path of the first optical switch 3-43a is set so that the optical data-signals of the wavelength λ3 from the optical output port P3 of the demultiplexer 3-42a are input to the optical receiver 3-44a1.

In the star-shaped logical network topology, as shown in FIG. 3-5B, the network-node equipment 3-10 and the network-node equipment 3-20 communicate by the optical data-signals of the wavelength λ2 and the wavelength λ4, the network-node equipment 3-20 and the network-node equipment 3-40 communicate by the optical data-signals of the wavelength λ3 and the wavelength λ3, and the network-node equipment 3-20 and the network-node equipment 3-30 communicate by the optical data-signals of the wavelength λ2 and the wavelength λ4.

In the case where the mesh-shaped logical network topology as shown in FIG. 3-7B is constructed using the arrayed waveguide grating having the uniform-loss and cyclic-frequency as shown in FIG. 3-7A as the arrayed waveguide grating (AWG) 3-51 and using the optical data-signals of the wavelengths shown by the mesh in the figure, then as shown in FIG. 3-8 the wavelength of the wavelength tunable light source 3-14a2 of the network-node equipments 3-10 is set to λ3, the wavelength of the wavelength tunable light source 3-14b2 is set to λ2, and the optical path of the second optical switch 3-13b is set so that the optical data-signals of the wavelength λ3 from the wavelength tunable light source 3-14a2 are sent to the optical input port P3 of the multiplexer 3-12b, and the optical data-signals of the wavelength λ2 from the wavelength tunable light source 3-14b2 are sent to the optical input port P2 of the multiplexer 3-12b. Moreover, the optical path of the first optical switch 3-13a is set so that the optical data-signals of the wavelength λ3 from the optical output port P3 of the demultiplexer 12a are sent to the optical receiver 3-14a1 and the optical data-signals of the wavelength λ4 from the optical output port P4 are input to the optical receiver 3-14b1.

Furthermore, the wavelength of the wavelength tunable light source 3-24a2 of the network-node equipment 3-20 is set to λ4, the wavelength of the wavelength tunable light source 3-24b2 is set to λ3, the wavelength of the wavelength tunable light source 3-24c2 is set to λ2, and the optical path of the second optical switch 3-23b is set so that the optical data-signals of the wavelength λ4 from the wavelength tunable light source 3-24a2 are sent to the optical input port P4 of the multiplexer 3-22b, the optical data-signals of the wavelength λ3 from the wavelength tunable light source 3-24b2 are sent to the optical input port P3 of the multiplexer 3-22b, and the optical data-signals of the wavelength λ2 from the wavelength tunable light source 3-24c2 are sent to the optical input port P2 of the multiplexer 3-22b. Moreover, the optical path of the first optical switch 3-23a is set so that the optical data-signals of the wavelength λ2 from the optical output port P2 of the demultiplexer 3-22a are sent to the optical receiver 3-24a1, the optical data-signals of the wavelength λ3 from the optical output port P3 are sent to the optical receiver 3-24b1, and the optical data-signals of the wavelength λ4 from the optical output port P4 are input to the optical receiver 3-24c1.

Furthermore, the wavelength of the wavelength tunable light source 3-34a2 of the network-node equipment 3-30 is set to λ3, the wavelength of the wavelength tunable light source 3-34b2 is set to λ2, the wavelength of the wavelength tunable light source 3-34c2 is set to λ4, and the optical path of the second optical switch 3-33b is set so that the optical data-signals of the wavelength λ3 from the wavelength tunable light source 3-34a2 are sent to the optical input port P3 of the multiplexer 32b, the optical data-signals of the wavelength λ2 from the wavelength tunable light source 3-34b2 are sent to the optical input port P2 of the multiplexer 3-32b, and the optical data-signals of the wavelength λ4 from the wavelength tunable light source 3-34c2 are sent to the optical input port P4 of the multiplexer 3-32b. Moreover, the optical path of the first optical switch 3-33a is set so that the optical data-signals of the wavelength λ2 from the optical output port P2 of the demultiplexer 3-32a are sent to the optical receiver 3-34c1, the optical data-signals of the wavelength λ3 from the optical output port P3 are sent to the optical receiver 3-34a1, and the optical data-signals of the wavelength λ4 from the optical output port P4 are input to the optical receiver 3-34b1.

Furthermore, the wavelength of the wavelength tunable light source 3-44a2 of the network-node equipments 3-40 is set to λ3, the wavelength of the wavelength tunable light source 3-44b2 is set to λ4, and the optical path of the second optical switch 3-43b is set so that the optical data-signals of the wavelength λ3 from the wavelength tunable light source 3-44a2 are sent to the optical input port P3 of the multiplexer 3-42b, and the optical data-signals of the wavelength λ4 from the wavelength tunable light source 3-44b2 are sent to the optical input port P4 of the multiplexer 3-42b. Moreover, the optical path of the first optical switch 3-43a is set so that the optical data-signals of the wavelength λ2 from the optical output port P2 of the demultiplexer 3-42a are sent to the optical receiver 3-44b1, and the optical data-signals of the wavelength λ3 from the optical output port P3 are input to the optical receiver 3-44a1.

In the mesh-shaped logical network topology, as shown in FIG. 3-7B, the network-node equipment 3-10 and the network-node equipment 3-20 communicate by the optical data-signals of the wavelength λ2 and the wavelength λ4, the network-node equipment 3-10 and the network-node equipment 3-30 communicate by the optical data-signals of the wavelength λ3 and the wavelength λ3, the network-node equipment 3-20 and the network-node equipment 3-20 communicate by the optical data-signals of the wavelength λ2 and the wavelength λ4, the network-node equipment 3-20 and the network-node equipment 3-40 communicate by the optical data-signals of the wavelength λ3 and the wavelength λ3, and the network-node equipment 3-30 and the network-node equipment 3-40 communicate by the optical data-signals of the wavelength λ2 and the wavelength λ4.

In this manner, according to the system shown in FIG. 3-1, by setting the wavelengths of the respective wavelength tunable light sources of the respective network-node equipments 3-10, 20, 30 and 40, and the optical path of the respective optical switches based on the control-signals from the central-management-equipment 3-62, and by tuning the wavelength of transmitting and receiving optical data-signals which are treated by the respective optical data-signal transceiver units 3-14, 24, 34 and 44, the logical network topology of the network having the star-shaped physical network topology can be arbitrarily and easily changed into the full-mesh, ring-shaped, star-shaped, mesh-shaped, or a mixture thereof. Moreover, by sending the control-signals from the central-management-equipment 3-62 to the controlling units of network node equipment 3-15, 25, 35 and 45 of the respective network-node equipments 3-10, 20, 30 and 40, the aforementioned wavelength tuning can be instantaneously performed and the logical network topology can be dynamically changed.

Moreover, the optical transmission paths 3-71 to 78 can be used for transmitting and receiving the control-signals between the central-management-equipment 3-62 and the respective network-node equipments 3-10, 20, 30 and 40, which are the same for the optical data-signals, so that the problem in the cost for construction and operation and the problem of network delay, such as in the case of providing low speed leased lines for transmitting and receiving the control-signal are solved, and the communication control and the status monitoring of the respective network-node equipments 3-10, 20, 30 and 40 can be precisely performed.

In the case where the optical data-signals can not be received by the respective network-node equipments 3-10, 20, 30 and 40 due to low optical power of the optical data-signals, then as shown in FIG. 3-9, optical amplifiers 3-53a to 53d such as EDFA may be arranged corresponding to the respective optical output ports 51e to 51h of the arrayed waveguide grating (AWG) 3-51, or similar optical amplifiers may be provided in the respective network-node equipments 3-10, 20, 30 and 40.

The number of the network-node equipments is not necessarily four. Basically, in using network-node equipments of any integer of 2 or more, if the arrayed waveguide grating (AWG) having a corresponding number of optical input/output ports to the number is used, similar effects to the above may be obtained.

Furthermore, the present embodiment is shown with the arrayed waveguide grating (AWG) having the uniform-loss and cyclic-frequency. However other optical multi/demultiplexers having the uniform-loss and cyclic-frequency may be used. Even if multi/demultiplexers having the wavelength arrangement such as shown in FIG. 3-10 and not having the uniform-loss and cyclic-frequency are used, similar effects to the above may be obtained.

Sixteenth Embodiment

FIG. 3-11 shows a sixteenth embodiment according to the fiber optic communication system of the present invention, illustrating the structure of the arrayed waveguide grating (AWG) and the concentrator switch together with network structure, showing an example of optical couplers introduced inside the network-node equipments.

In the drawing, 3-10, 20, 30 and 40 denote network-node equipments, 3-51 denotes an arrayed waveguide grating (AWG), 3-62 denotes a central-management-equipment, and 3-71 to 78 and 3-81 to 88 denote optical transmission paths such as optical fibers.

The system shown in FIG. 3-11 has a star-shaped physical network topology where four network-node equipments 3-10, 20, 30 and 40 are optically connected to the arrayed waveguide grating (AWG) 3-51.

The different point between this system and the fiber optic communication system in the fifteenth embodiment shown in FIG. 3-1 is as follows.

(1) The demultiplexers 3-12a, 22a, 32a and 42a and the multiplexers 3-12b, 22b, 32b and 42b, the first optical switches 3-13a, 23a, 33a and 43a and the second optical switches 3-13b, 23b, 33b and 43b are removed from the respective network-node equipments 3-10, 20, 30 and 40. Instead of these, first couplers 3-16a, 26a, 36a and 46a which split the optical data-signals from the first WDM coupler 3-11a into four and respectively send these to the four optical receivers, and second couplers 3-16b, 26b, 36b and 46$b$ which combine the optical data-signals from the four wavelength tunable light sources and send these to the second WDM coupler 3-11$b$, are provided in the respective network-node equipments 3-10, 20, 30 and 40.

(2) Wavelength tunable filters 3-14$a$4, 14$b$4, 14$c$4, 14$d$4, 24$a$4, 24$b$4, 24$c$4, 24$d$4, 34$a$4, 34$b$4, 34$c$4, 34$d$4, 44$a$4, 44$b$4, 44$c$4 and 44$d$4 for selectively inputting the optical data-signals of the specific wavelengths are provided on the respective input sides of the four optical receivers of the respective network-node equipments 3-10, 20, 30 and 40.

(3) The controlling units of network node equipment 3-15, 25, 35 and 45 of the respective network-node equipments 3-10, 20, 30 and 40 control the output wavelengths of the respective wavelength tunable light sources and the input wavelengths of the respective wavelength tunable filters based on the control-signals from the central-management-equipment 3-62. Since the other structure is the same as for the system shown in FIG. 3-1, the same reference symbols are used and description thereof is omitted.

Hereunder is a description of various logical network topologies which can be constructed by the system shown in FIG. 3-11 having the star-shaped physical network topology.

In the case where the full-mesh logical network topology is constructed using the arrayed waveguide grating having the uniform-loss and cyclic-frequency as shown in FIG. 3-2A as the arrayed waveguide grating (AWG) 3-51, the wavelengths of the respective wavelength tunable light sources of the network-node equipments 3-10, 20, 30 and 40 and the input wavelengths of the respective wavelength tunable filters are set to $\lambda1$, $\lambda2$, $\lambda3$ and $\lambda4$, the optical data-signals of the respective wavelengths are sent to the second couplers 3-16$b$, 26$b$, 36$b$ and 46$b$, and the four optical data-signals split by the second couplers 3-16$b$, 26$b$, 36$b$ and 46$b$ are sent to the respective optical receivers through the respective wavelength tunable filters.

In the full-mesh logical network topology, as shown in FIG. 3-2B, the network-node equipment 3-10 and the network-node equipment 3-20 communicate by the optical data-signals of the wavelength $\lambda2$ and the wavelength $\lambda4$, the network-node equipment 3-10 and the network-node equipment 3-30 communicate by the optical data-signals of the wavelength $\lambda3$ and the wavelength $\lambda3$, the network-node equipment 3-10 and the network-node equipment 3-40 communicate by the optical data-signals of the wavelength $\lambda2$ and the wavelength $\lambda4$, the network-node equipment 3-20 and the network-node equipment 3-30 communicate by the optical data-signals of the wavelength $\lambda2$ and the wavelength $\lambda4$, the network-node equipment 3-20 and the network-node equipment 3-40 communicate by the optical data-signals of the wavelength $\lambda3$ and the wavelength $\lambda3$, and the network-node equipment 3-30 and the network-node equipment 3-40 communicate by the optical data-signals of the wavelength $\lambda2$ and the wavelength $\lambda4$.

In the case where the ring-shaped logical network topology as shown in FIG. 3-3B is constructed using the arrayed waveguide grating having the uniform-loss and cyclic-frequency as shown in FIG. 3-3A as the arrayed waveguide grating (AWG) 3-51, and using the optical data-signals of the wavelengths shown by the mesh in the figure, then as shown in FIG. 3-12 the wavelength of the wavelength tunable light source 3-14$a$2 of the network-node equipment 3-10 is set to $\lambda3$, the wavelength of the wavelength tunable light source 3-14$b$2 is set to $\lambda2$, the input wavelength of the wavelength tunable filter 3-14$a$4 is set to $\lambda3$ so that the optical data-signals of the wavelength $\lambda3$ are input to the optical receiver 3-14$a$1, and the input wavelength of the wavelength tunable filter 3-14$b$4 is set to $\lambda4$ so that the optical data-signals of the wavelength $\lambda4$ are input to the optical receiver 3-14$b$1.

Moreover, the wavelength of the wavelength tunable light source 3-24$a$2 of the network-node equipment 3-20 is set to $\lambda4$, the wavelength of the wavelength tunable light source 3-24$b$2 is set to $\lambda3$, the input wavelength of the wavelength tunable filter 3-24$a$4 is set to $\lambda2$ so that the optical data-signals of the wavelength $\lambda2$ are input to the optical receiver 3-24$a$1, and the input wavelength of the wavelength tunable filter 3-24$b$4 is set to $\lambda3$ so that the optical data-signals of the wavelength $\lambda3$ are input to the optical receiver 3-24$b$1.

Furthermore, the wavelength of the wavelength tunable light source 3-34$a$2 of the network-node equipment 3-30 is set to $\lambda3$, the wavelength of the wavelength tunable light source 3-34$b$2 is set to $\lambda2$, the input wavelength of the wavelength tunable filter 3-34$a$4 is set to $\lambda3$ so that the optical data-signals of the wavelength $\lambda3$ are input to the optical receiver 3-34$a$1, and the input wavelength of the wavelength tunable filter 3-34$b$4 is set to $\lambda4$ so that the optical data-signals of the wavelength $\lambda4$ are input to the optical receiver 3-34$b$1.

The wavelength of the wavelength tunable light source 3-44$a$2 of the network-node equipment 3-40 is set to $\lambda3$, the wavelength of the wavelength tunable light source 3-44$b$2 is set to $\lambda4$, the input wavelength of the wavelength tunable filter 3-44$a$4 is set to $\lambda3$ so that the optical data-signals of the wavelength $\lambda3$ are input to the optical receiver 3-44$a$1, and the input wavelength of the wavelength tunable filter 3-44$b$4 is set to $\lambda2$ so that the optical data-signals of the wavelength $\lambda2$ are input to the optical receiver 3-44$b$1.

In the ring-shaped logical network topology, as shown in FIG. 3-3B, the network-node equipment 3-10 and the network-node equipment 3-20 communicate by the optical data-signals of the wavelength $\lambda2$ and the wavelength $\lambda4$, the network-node equipment 3-20 and the network-node equipment 3-40 communicate by the optical data-signals of the wavelength $\lambda3$ and the wavelength $\lambda3$, the network-node equipment 3-30 and the network-node equipment 3-40 communicate by the optical data-signals of the wavelength $\lambda2$ and the wavelength $\lambda4$, and the network-node equipment 3-10 and the network-node equipment 3-30 communicate by the optical data-signals of the wavelength $\lambda3$ and the wavelength $\lambda3$.

In the case where the star-shaped logical network topology as shown in FIG. 3-5B is constructed using the arrayed waveguide grating having the uniform-loss and cyclic-frequency as shown in FIG. 3-5A as the arrayed waveguide grating (AWG) 3-51 and using the optical data-signals of the wavelengths shown by the mesh in the figure, then as shown in FIG. 3-13 the wavelength of the wavelength tunable light source 3-14$b$2 of the network-node equipment 3-10 is set to $\lambda2$, and the input wavelength of the wavelength tunable filter 3-14$b$4 is set to $\lambda4$ so that the optical data-signals of the wavelength $\lambda4$ are input to the optical receiver 3-14$b$1.

Moreover, the wavelength of the wavelength tunable light source 3-24$a$2 of the network-node equipment 3-20 is set to $\lambda4$, the wavelength of the wavelength tunable light source 3-24$b$2 is set to $\lambda3$, the wavelength of the wavelength tunable light source 3-24$c$2 is set to $\lambda2$, the input wavelength of the wavelength tunable filter 3-24$a$4 is set to $\lambda2$ so that the optical data-signals of the wavelength $\lambda2$ are input to the optical receiver 3-24$a$1, the input wavelength of the wavelength tunable filter 3-24$b$4 is set to $\lambda3$ so that the optical data-signals of the wavelength $\lambda3$ are input to the optical receiver 3-24$b$1, and the input wavelength of the wavelength tunable filter 3-24c4 is set to λ4 so that the optical data-signals of the wavelength λ4 are input to the optical receiver 3-24c1.

Furthermore, the wavelength of the wavelength tunable light source 3-34a2 of the network-node equipment 3-30 is set to λ4, and the input wavelength of the wavelength tunable filter 3-34a4 is set to λ2 so that the optical data-signals of the wavelength λ2 are input to the optical receiver 3-34a1.

Moreover, the wavelength of the wavelength tunable light source 3-44a2 of the network-node equipments 3-40 is set to λ3, and the input wavelength of the wavelength tunable filter 3-44a4 is set to λ3 so that the optical data-signals of the wavelength λ3 are input to the optical receiver 3-44a1.

In the star-shaped logical network topology, as shown in FIG. 3-5B, the network-node equipment 3-10 and the network-node equipment 3-20 communicate by the optical data-signals of the wavelength λ2 and the wavelength λ4, the network-node equipment 3-20 and the network-node equipment 3-40 communicate by the optical data-signals of the wavelength λ3 and the wavelength λ3, and the network-node equipment 3-20 and the network-node equipment 3-30 communicate by the optical data-signals of the wavelength λ2 and the wavelength λ4.

In the case where the mesh-shaped logical network topology as shown in FIG. 3-7B is constructed using the arrayed waveguide grating having the uniform-loss and cyclic-frequency as shown in FIG. 3-7A as the arrayed waveguide grating (AWG) 3-51 and using the optical data-signals of the wavelengths shown by the mesh in the figure, then as shown in FIG. 3-14, the wavelength of the wavelength tunable light source 3-14a2 of the network-node equipment 3-10 is set to λ3, the wavelength of the wavelength tunable light source 3-14b2 is set to λ2, the input wavelength of the wavelength tunable filter 3-14a4 is set to λ3 so that the optical data-signals of the wavelength λ3 are input to the optical receiver 3-14a1, and the input wavelength of the wavelength tunable filter 3-14b4 is set to λ4 so that the optical data-signals of the wavelength λ4 are input to the optical receiver 3-14b1.

Moreover, the wavelength of the wavelength tunable light source 3-24a2 of the network-node equipment 3-20 is set to λ4, the wavelength of the wavelength tunable light source 3-24b2 is set to λ3, the wavelength of the wavelength tunable light source 3-24c2 is set to λ2, the input wavelength of the wavelength tunable filter 3-24a4 is set to λ2 so that the optical data-signals of the wavelength λ2 are input to the optical receiver 3-24a1, the input wavelength of the wavelength tunable filter 3-24b4 is set to λ3 so that the optical data-signals of the wavelength λ3 are input to the optical receiver 3-24b1, and the input wavelength of the wavelength tunable filter 3-24c4 is set to λ4 so that the optical data-signals of the wavelength λ4 are input to the optical receiver 3-24c1.

Furthermore, the wavelength of the wavelength tunable light source 3-34a2 of the network-node equipment 3-30 is set to λ3, the wavelength of the wavelength tunable light source 3-34b2 is set to λ2, the wavelength of the wavelength tunable light source 3-34c2 is set to λ4, the input wavelength of the wavelength tunable filter 3-34a4 is set to λ3 so that the optical data-signals of the wavelength λ3 are input to the optical receiver 3-34a1, the input wavelength of the wavelength tunable filter 3-34b4 is set to λ4 so that the optical data-signals of the wavelength λ4 are input to the optical receiver 3-34b1, and the input wavelength of the wavelength tunable filter 3-34c4 is set to λ2 so that the optical data-signals of the wavelength λ2 are input to the optical receiver 3-34c1.

Moreover the wavelength of the wavelength tunable light source 3-44a2 of the network-node equipment 3-40 is set to λ3, the wavelength of the wavelength tunable light source 3-44b2 is set to λ4, the input wavelength of the wavelength tunable filter 3-44a4 is set to λ3 so that the optical data-signals of the wavelength λ3 are input to the optical receiver 3-44a1, and the input wavelength of the wavelength tunable filter 3-44b4 is set to λ2 so that the optical data-signals of the wavelength λ2 are input to the optical receiver 3-44b1.

In the mesh-shaped logical network topology, as shown in FIG. 3-7B, the network-node equipment 3-10 and the network-node equipment 3-20 communicate by the optical data-signals of the wavelength λ2 and the wavelength λ4, the network-node equipment 3-10 and the network-node equipment 3-30 communicate by the optical data-signals of the wavelength λ3 and the wavelength λ3, the network-node equipment 3-20 and the network-node equipment 3-20 communicate by the optical data-signals of the wavelength λ2 and the wavelength v4, the network-node equipment 3-20 and the network-node equipment 3-40 communicate by the optical data-signals of the wavelength λ3 and the wavelength λ3, and the network-node equipment 3-30 and the network-node equipment 3-40 communicate by the optical data-signals of the wavelength λ2 and the wavelength λ4.

In this manner, according to the system shown in FIG. 3-11, by setting the wavelengths of the respective wavelength tunable light sources of the respective network-node equipments 3-10, 20, 30 and 40, and the input wavelengths of the respective wavelength tunable filters, based on the control-signals from the central-management-equipment 3-62, and by tuning the wavelength of transmitting and receiving optical data-signals which are treated by the respective optical data-signal transceiver units 3-14, 24, 34 and 44, the logical network topology of the network having the star-shaped physical network topology can be arbitrarily and easily changed into the full-mesh, ring-shaped, star-shaped, mesh-shaped, or a mixture thereof. Moreover, by sending the control-signals from the central-management-equipment 3-62 to the controlling units of network node equipment 3-15, 25, 35 and 45 of the respective network-node equipments 3-10, 20, 30 and 40, the aforementioned wavelength tuning can be instantaneously performed and the logical network topology can be dynamically changed.

Moreover, the optical transmission paths 3-71 to 78 can be used for transmitting and receiving the control-signals between the central-management-equipment 3-62 and the respective network-node equipments 3-10, 20, 30 and 40, which are the same for the optical data-signals, so that the problem in the cost for construction and operation and the problem of network delay, such as in the case of providing low speed leased lines for transmitting and receiving the control-signal are solved, and the communication control and the status monitoring of the respective network-node equipments 3-10, 20, 30 and 40 can be precisely performed.

In the case where the optical data-signals can not be received by the respective network-node equipments 3-10, 20, 30 and 40 due to low optical power of the optical data-signals, then as shown in FIG. 3-9, optical amplifiers 3-53a to 53d such as EDFA may be arranged corresponding to the respective optical output ports 51e to 51h of the arrayed waveguide grating (AWG) 3-51, or similar optical amplifiers may be provided in the respective network-node equipments 3-10, 20, 30 and 40.

The number of the network-node equipments is not necessarily four. Basically, in using network-node equipments of any integer of 2 or more, if the arrayed waveguide grating (AWG) having a corresponding number of optical input/output ports to the number is used, similar effects to the above may be obtained.

Furthermore, the AWG type multi/demultiplexers having the uniform-loss and cyclic-frequency were shown for the arrayed waveguide grating (AWG) 3-51. However other optical multi/demultiplexers having the uniform-loss and cyclic-frequency may be used. Even if multi/demultiplexers having the wavelength arrangement such as shown in FIG. 3-10 and not having the uniform-loss and cyclic-frequency are used, similar effects to the above may be obtained.

Seventeenth Embodiment

FIG. 3-15 shows a seventeenth embodiment according to the fiber optic communication system of the present invention. In the drawing, 3-10, 20, 30 and 40 denote network-node equipments, 3-51 denotes an arrayed waveguide grating (AWG), 3-62 denotes a central-management-equipment, and 3-81 to 88, 3-91 to 94, and 3-101 to 104 denote optical transmission paths such as optical fibers.

The system shown in FIG. 3-15 has a star-shaped physical network topology where four network-node equipments 3-10,20,30 and 40 are optically connected to the arrayed waveguide grating (AWG) 3-51.

The different point between this system and the fiber optic communication system in the fifteenth embodiment shown in FIG. 3-1 is as follows.

(1) Circulators 3-17, 27, 37 and 47 which change the direction of input signals and output signals are respectively provided outside of the first WDM couplers 3-11a, 21a, 31a and 41a and the second WDM couplers 3-11b, 21b, 31/b and 41b of the respective network-node equipments 3-10, 20, 30 and 40.

(2) Circulators 3-54a, 54b, 54c and 54d which change the direction of input signals and output signals are respectively provided on the input side of the respective WDM couplers 3-52a to 52d which are connected to the arrayed waveguide grating (AWG) 3-51.

(3) The circulator 3-17 and the circulator 3-54a are connected by a single cored optical transmission path 3-91. The circulator 3-27 and the circulator 3-54b are connected by a single cored optical transmission path 3-92. The circulator 3-37 and the circulator 3-54c are connected by a single cored optical transmission path 3-93. The circulator 3-47 and the circulator 3-54d are connected by a single cored optical transmission path 3-94.

(4) The output side of the respective WDM couplers 3-52e to 52f which are connected to the arrayed waveguide grating (AWG) 3-51, and the circulators 3-54a to 54d, are respectively connected by single cored optical transmission paths 3-101 to 104. Since the other structure is the same as that shown in FIG. 3-1, the same reference symbols are used and description thereof is omitted.

In this system, by a similar method to the system shown in FIG. 3-1, the logical network topology of the network having the star-shaped physical network topology can be arbitrarily and easily changed into the full-mesh, ring-shaped, star-shaped, mesh-shaped, or a mixture thereof, and a similar effect to that described in the second embodiment may be obtained.

Moreover, the four network-node equipments 3-10, 20, 30 and 40 can be connected to a wavelength router equipment 3-50 through the single cored optical transmission paths 3-101 to 104 for both upward and downward. Therefore the number of optical transmission paths can be reduced by half, compared to the case of using two optical transmission paths, one for upward and one for downward. As a result, the cost for equipment, operation, and administration of the optical transmission paths can be reduced.

In the case where the optical data-signals can not be received by the respective network-node equipments 3-10, 20, 30 and 40 due to low optical power of the optical data-signals, then as shown in FIG. 3-9, optical amplifiers 3-53a to 53d such as EDFA may be arranged corresponding to the respective optical output port 51e to 51h of the arrayed waveguide grating (AWG) 3-51, or similar optical amplifiers may be provided in the respective network-node equipments 3-10, 20, 30 and 40.

The number of the network-node equipments is not necessarily four. Basically, in using network-node equipments of any integer of 2 or more, if the arrayed waveguide grating (AWG) having a corresponding number of optical input/output ports to the number is used, similar effects to the above may be obtained.

Furthermore, the AWG type multi/demultiplexers having the uniform-loss and cyclic-frequency were shown for the arrayed waveguide grating (AWG) 51. However other optical multi/demultiplexers having the uniform-loss and cyclic-frequency may be used. Even if multi/demultiplexers having the wavelength arrangement such as shown in FIG. 3-10 and not having the uniform-loss and cyclic-frequency are used, similar effects to the above may be obtained.

Eighteenth Embodiment

FIG. 3-16 shows an eighteenth embodiment according to the fiber optic communication system of the present invention, illustrating the structure of the arrayed waveguide grating (AWG) and the concentrator switch together with network structure. In the drawing, 3-10, 20, 30 and 40 denote network-node equipments, 3-51 denotes an arrayed waveguide grating (AWG), 3-62 denotes a central-management-equipment, and 3-81 to 88, 3-91 to 94, and 3-101 to 104 denote optical transmission paths such as optical fibers.

The system shown in FIG. 3-16 has a star-shaped physical network topology where four network-node equipments 3-10,20,30 and 40 are optically connected to the wavelength router equipment 3-50.

The different point between this system and the fiber optic communication system in the fifteenth embodiment shown in FIG. 3-11 is as follows.

(1) Circulators 3-17, 27, 37 and 47 which change the direction of input signals and output signals are respectively provided outside of the first WDM couplers 3-11a, 21a, 31a and 41a and the second WDM couplers 3-11b, 21b, 31b and 41b of the respective network-node equipments 3-10, 20, 30 and 40.

(2) Circulators 3-54a, 54b, 54c and 54d which change the direction of input signals and output signals are respectively provided on the input side of the respective WDM couplers 3-52a to 52d which are connected to the arrayed waveguide grating (AWG) 3-51.

(3) The circulator 3-17 and the circulator 3-54a are connected by a single cored optical transmission path 3-91. The circulator 3-27 and the circulator 3-54b are connected by a single cored optical transmission path 3-92. The circulator 3-37 and the circulator 3-54c are connected by a single cored optical transmission path 3-93. The circulator 3-47 and the circulator 3-54d are connected by a single cored optical transmission path 3-94.

(4) The output side of the respective WDM couplers 3-52e to 52f which are connected to the arrayed waveguide grating (AWG) 3-51, and the circulators 3-54a to 54d, are respectively connected by single cored optical transmission paths 3-101 to 104. Since the other structure is the same as that shown in FIG. 3-11, the same reference symbols are used and description thereof is omitted.

In this system, by a similar method to the system shown in FIG. 3-11, the logical network topology of the network having the star-shaped physical network topology can be arbitrarily and easily changed into the full-mesh, ring-shaped, star-shaped, mesh-shaped, or a mixture thereof, and a similar effect to that described in the third embodiment may be obtained.

Moreover, the four network-node equipments 3-10, 20, 30 and 40 can be connected to the arrayed waveguide grating (AWG) 3-51 through the single cored optical transmission paths 101 to 104 for both upward and downward. Therefore the number of optical transmission paths can be reduced by half compared to the case of using two optical transmission paths, one for upward and one for downward. As a result the cost for equipment, operation, and administration of the optical transmission paths can be reduced.

In the case where the optical data-signals can not be received by the respective network-node equipments 3-10, 20, 30 and 40 due to low optical power of the optical data-signals, then as shown in FIG. 3-9, optical amplifiers 3-53*a* to 53*d* such as EDFA may be arranged corresponding to the respective optical output port 51*e* to 51*h* of the arrayed waveguide grating (AWG) 3-51, or similar optical amplifiers may be provided in the respective network-node equipments 3-10, 20, 30 and 40.

The number of the network-node equipments is not necessarily four. Basically, in using network-node equipments of any integer of 2 or more, if the arrayed waveguide grating (AWG) having a corresponding number of optical input/output ports to the number is used, similar effects to the above may be obtained.

Furthermore, the AWG type multi/demultiplexers having the uniform-loss and cyclic-frequency were shown for the arrayed waveguide grating (AWG) 3-51. However other optical multi/demultiplexers having the uniform-loss and cyclic-frequency may be used. Even if multi/demultiplexers having the wavelength arrangement such as shown in FIG. 3-10 and not having the uniform-loss and cyclic-frequency are used, similar effects to the above may be obtained.

Nineteenth Embodiment

FIG. 3-17 shows a nineteenth embodiment according to the fiber optic communication system of the present invention, illustrating the structure of the arrayed waveguide grating (AWG) and the concentrator switch together with network structure. In the drawing, 3-10, 20, 30 and 40 denote network-node equipments, 3-51 denotes an arrayed waveguide grating (AWG), 3-62 denotes a central-management-equipment, 60 denotes a network-management-system equipment, and 3-81 to 88, 3-91 to 94, and 3-101 to 104 denote optical transmission paths such as optical fibers.

The system shown in FIG. 3-17 has a star-shaped physical network topology where four network-node equipments 3-10,20,30 and 40 are optically connected to the arrayed waveguide grating (AWG) 3-51.

The different point between this system and the fiber optic communication system in the fifteenth embodiment shown in FIG. 3-1 is as follows.

(1) The WDM couplers 3-11*a*, 11*b*, 3-21*a*, 21*b*, 3-31*a*, 31*b*, 3-41*a* and 41*b*, two of which were provided in each of the respective network-node equipments 3-10, 20, 30 and 40, are only provided as one (3-11, 3-21, 3-31 and 3-41) this time.

(2) The demultiplexers 3-12*a*, 22*a*, 32*a* and 42*a*, the multiplexers 3-12*b*, 22*b*, 32*b* and 42*b*, the first optical switches 3-13*a*, 23*a*, 33*a* and 43*a*, and the second optical switches 3-13*b*, 23*b*, 33*b* and 43*b*, are removed from the respective network-node equipments 3-10, 20, 30 and 40. Instead of these, 1×4 multi/demultiplexers 3-12, 22, 32 and 42, and 4×4 optical switches 3-13, 23, 33 and 43 are sequentially connected inside of the respective WDM couplers 3-11, 21, 31 and 41.

(3) Four circulators 3-18*a* to 18*d*, 3-28*a* to 28*d*, 3-38*a* to 38*d* and 3-48*a* to 48*d* which change the direction of input signals and output signals are respectively provided on the optical data-signals transceiver unit sides of the respective optical switches 3-13, 23, 33 and 43 of the respective network-node equipments 3-10, 20, 30 and 40, and are respectively connected to four wavelength tunable light sources and four optical receivers.

(4) Circulators 3-19, 29, 39 and 49 which change the direction of input signals and output signals are respectively provided between the respective controlling units of the network node equipment 3-15, 25, 35 and 45 of the respective network-node equipments 3-10, 20, 30 and 40.

(5) Circulators 3-54*a*, 54*b*, 54*c* and 54*d* which change the direction of input signals and output signals are respectively provided on the input side of the respective WDM couplers 3-52*a* to 52*d* which are connected to the arrayed waveguide grating (AWG) 3-51.

(6) The circulator 3-17 and the circulator 3-54*a* are connected by a single cored optical transmission path 3-91. The circulator 3-27 and the circulator 3-54*b* are connected by a single cored optical transmission path 3-92. The circulator 3-37 and the circulator 3-54*c* are connected by a single cored optical transmission path 3-93. The circulator 3-47 and the circulator 3-54*d* are connected by a single cored optical transmission path 3-94.

(7) The output side of the respective WDM couplers 3-52*e* to 52*f* which are connected to the arrayed waveguide grating (AWG) 3-51, and the circulators 3-54*a* to 54*d*, are respectively connected by single cored optical transmission paths 3-101 to 104. Since the other structure is the same as that shown in FIG. 3-11, the same reference symbols are used and description thereof is omitted.

In this system, by a similar method to the system shown in FIG. 3-1, the logical network topology of the network having the star-shaped physical network topology can be arbitrarily and easily changed into the full-mesh, ring-shaped, star-shaped, mesh-shaped, or a mixture thereof, and a similar effect to that described in the first embodiment may be obtained.

Moreover, the four network-node equipments 3-10, 20, 30 and 40 can be connected to the arrayed waveguide grating (AWG) 3-51 through the single cored optical transmission paths 3-101 to 104 for both upward and downward. Therefore the number of the optical transmission paths can be reduced by half compared to the case of using two of optical transmission path, one for upward and one for downward. As a result the cost for equipment, operation, and administration of the optical transmission paths can be reduced.

In the case where the optical data-signals can not be received by the respective network-node equipments 3-10, 20, 30 and 40 due to low optical power of the optical data-signals, then as shown in FIG. 3-9, optical amplifiers 3-53*a* to 53*d* such as EDFA may be arranged corresponding to the respective optical output port 51*e* to 51*h* of the arrayed waveguide grating (AWG) 3-51, or similar optical amplifiers may be provided in the respective network-node equipments 3-10, 20, 30 and 40.

The number of the network-node equipments is not necessarily four. Basically, in using network-node equipments of any integer of 2 or more, if the arrayed waveguide grating (AWG) having a corresponding number of optical input/output ports to the number is used, similar effects to the above may be obtained.

Furthermore, the AWG type multi/demultiplexers having the uniform-loss and cyclic-frequency were shown for the arrayed waveguide grating (AWG) 3-51. However other optical multi/demultiplexers having the uniform-loss and cyclic-frequency may be used. Even if multi/demultiplexers having the wavelength arrangement such as shown in FIG. 3-10 and not having the uniform-loss and cyclic-frequency are used, similar effects to the above may be obtained.

Twentieth Embodiment

FIG. 2-2 shows an inner structure of M network-node equipments (2-301 to 304) (M is an integer of N or less), being an embodiment which realizes a function of not terminating the optical data-signals arriving from the N×N (N is an integer greater than or equal to 2) arrayed waveguide gratings (AWG), at the network-terminal equipments, but turning them back after changing the wavelength in the network-node equipment, and again delivering the optical data-signals to the arrayed waveguide grating (AWG), and resending the optical data-signals to other network-node equipments.

The optical signals from the optical input/output ports for the network-terminal equipments (2-601 to 604) are converted into electric signals by O/E converters (2-3004 to 3006) and arrive at the 2L×2L (L is an integer of 2 or more and M or less) electrical matrix switch (2-2702). They are then converted into the wavelengths of WDM signals in the wavelength tunable light sources (2-2501 to 2503) and combined by an optical coupler (2-2801), and reach to the optical input/output ports for the WDM line connection (2-401 to 404) to be output to the outside.

Conversely, the WDM signals which were delivered from the outside to the optical input/output ports for the WDM line connection, arrive at the demultiplexer (2-2901) and are split into optical data-signal of different wavelengths. Then the respective wavelengths arrive at the optical receivers (2-2601 to 2603), and the optical signals are converted into electric signals, and reach to the 2L×2L electrical matrix switch (2-2702).

In the case where the optical signals having the specific wavelength among the WDM signals arriving from the outside, are not delivered to the network-terminal equipments (2-1001 to 1004), but are directed toward the wavelength tunable light sources (2-2501 to 2503) to skip the network-terminal equipments (2-1001 to 1004), they are switched in the 2L×2L electrical matrix switch (2-2702) and directed to the wavelength tunable light sources (2-2501 to 2503) having the specific signal path.

In the case where the signals from the outside are delivered to the network-terminal equipments (2-1001 to 1004), the path of the signals passing through the 2L×2L electrical matrix switch (2-2702) is directed toward the E/O converters (2-3001 to 3003) to convert the signals into the optical signals, then passed through the optical input/output ports on the network-terminal equipment side (2-601 to 604) and arrives at the network-terminal equipments (2-1001 to 1004).

In the network-node equipments (2-301 to 304), a controlling unit (2-3107) connects a controlling unit of wavelength tunable light source (2-3101), a monitoring unit (2-3102), a switch controlling unit (2-3103), a transmitting and receiving process unit for optical control-signals (2-3104), a management unit (2-3105) and a display controlling unit (2-3106), to collectively control by a combination of hardware and software such as a microcomputer.

The controlling unit of wavelength tunable light source (2-3101) is connected to the wavelength tunable light sources (2-2501 to 2503) to control the converted wavelengths. The monitoring unit (2-3102) is connected to the wavelength tunable light sources (2-2501 to 2503) to monitor the light output intensity, and is connected to the optical receivers (2-2601 to 2603) to monitor the light input intensity.

The switch controlling unit (2-3103) is connected to the 2L×2L electrical matrix switches (2-2701 and 2702) to control the switches. The transmitting and receiving process unit for optical control-signals (2-3104) is connected to the optical input/output ports for control-signal (2-501 to 504) to form the control-signals. The management unit (2-3105) acts as the input-output interface of the connected internal databases (2-701 to 704) and external databases (2-801 to 804). The display controlling unit (2-3106) acts as the interface with the administrator console for the network-node equipment (2-3201) to generate and control the display signals for providing information to the administrator of the network-node equipment (2-3202).

Twenty-First Embodiment

FIG. 2-3 shows an inner structure of a central-management-equipment (2-2001).

A controlling unit (2-3306) connects a transmitting and receiving process unit for optical control-signals (2-3301), a monitoring unit (2-3302), a management unit (2-3303), a display controlling unit (2-3304) and a charge calculation unit (2-3305), to respectively control by a combination of hardware and software such as a microcomputer.

The transmitting and receiving process unit for optical control-signals (2-3301) is connected to an optical input/output port for control-signal (2-2201) to function as the interface with the optical input/output port for control-signal (2-2201), having the function of delivering the control-signals which were received by the optical input/output port for control-signal (2-2201) to the controlling unit (2-3306), and conversely forming the signal of the control information formed by the controlling unit (2-3306) to deliver to the optical input/output port for control-signal (2-2201).

In the monitoring unit (2-3302) the parts included in the monitor information among the information delivered from all the network-node equipments (2-301 to 304), are monitored all the time to monitor the status of the network-node equipments (2-301 to 304). When the network-node equipments (2-301 to 304) are in the normal status, the information of normal status is delivered to the management unit (2-3303) through the controlling unit (2-3306) to record into the internal database (2-2301) and the external database (2-2401) which are connected to the management unit (2-3303). The parts included in the monitor information among the information delivered from all the network-node equipments (2-301 to 304) are monitored all the time. When an abnormal status is found, the information of the abnormal status is delivered to the management unit (2-3303) through the controlling unit (2-3306) to record into the internal database (2-2301) and the external database (2-2401) which are connected to the management unit (2-3303), and at the same time, to broadcast the information of the abnormal status occurring to all the network-node equipments (2-301 to 304) through the transmitting and receiving process unit for optical control-signals (2-3301) to the optical input/output port for control-signal (2-2201).

The display controlling unit (2-3304) functions as the interface of the administrator console for the topology (2-3401) to form the information obtained by the administrator of the topology (2-3402), and at the same time has the function of delivering all of the operations done by the administrator of the topology (2-3402) to the controlling unit (2-3306). In the charge calculation unit (2-3305), the information in the internal database (2-2301) and the external database (2-2401) connected to the management unit (2-2301) in which the current topology structure and the topology user information are recorded, is read out through the controlling unit (2-3306) so as to calculate the charge. Then, the latest charge is delivered to the management unit (2-3303) again through the controlling unit to record into the internal database (2-2301) and the external database (2-2401) connected to the management unit (2-2301).

Twenty-Second Embodiment

FIG. 2-4 shows information (2-3501) which is stored respectively into the internal databases (2-701 to 704) and the external databases (2-801 to 804) connected to the network-node equipments (2-301 to 304), and the information of "specific management number of network-node equipment", "grid interval" and "usable wavelength" which is stored in the internal database (2-2301) and the external database (2-2401) connected to the central-management-equipment (2-2001).

The respective network-node equipments (2-301 to 304) can be freely changed from the central-management-equipment or by the network-node equipments themselves, and have characteristic specific management numbers of network-node equipment which are not duplicated with other network-node equipments, and have information of grid interval and usable wavelength. Regarding the information, when starting up the network-node equipments, the control-signals are sent from the input/output ports for control-signal (2-501 to 504) to the central-management-equipment (2-2001), and integrated by the internal database (2-2301) and the external database (2-2401) which are connected to the central-management-equipment (2-2001), and then stored in the data format (2-3502) shown in FIG. 2-5.

Twenty-Third Embodiment

FIG. 2-6, FIG. 2-7 and FIG. 2-8 are diagrams for explaining the management information in the central-management-equipment (2-2001), in the case where there are two users of different logical network topologies.

FIG. 2-6 shows a management information of central controlled logical topology (2-3601) administrated by the internal database (2-2301) and the external database (2-2401), which are connected to the central-management-equipment (2-2001).

The following information are integrated; "type of logical network topology" which is currently in use, "specific management number of network-node equipment" corresponding to the central controlling characteristic number of network-node equipment which is needed when the central-management-equipment accesses to all the network-node equipments (2-301 to 304), "specific user number of network-node equipment" corresponding to the user controlling characteristic number of network-node equipment which is needed when the user of the network-node equipment accesses to the network-node equipments (2-301 to 304) constructing the logical network topology in use, "user ID" which is the user characteristic number of logical network topology, "wavelength in use" which is being used by the network-node equipment, "specific management number of the other end of network-node equipment" which is the central controlling characteristic number of wavelength tunable light source of the network-node equipments (2-301 to 304) to which specific network-node equipments (2-301 to 304) are connected on the other end thereof, "transmitting status of the WDM signal" which is the optical output intensity of the wavelength tunable light source in the network-node equipment, "receiving status of the WDM signal" which is the received optical power of the optical receiver in the network-node equipment, "connecting status of the network-node equipment" which is the connecting status between the network-node equipments (2-301 to 304) and the other network-node equipments, "number of optical links of the network-node equipment" which is the number of connections between the network-node equipments (2-301 to 304) and the other network-node equipments on the other end thereof, "adding bandwidth of the link" which shows whether or not bandwidth addition is performed between the specific network-node equipments (2-301 to 304), and "length of time for increasing bandwidth" which becomes the period for performing the aforementioned bandwidth addition.

Moreover, it is possible to graphically display the aforementioned management information of central controlled logical topology (2-3601) on the administrator console for the topology (2-3401) through the display controlling unit (2-3304), comprising; a management window for topology (2-3602), an information view window for ID1 user (2-3603) and an information view window for ID2 user (2-3604). Here, the user 1 uses the mesh-shaped topology and the user 2 uses the mixed topology of the ring-shaped topology and the star-shaped topology. However the number of the user and the type of logical network topology are not limited to this.

FIG. 2-8 is the charge information calculated by the charge calculation unit (2-3305) in the central-management-equipment (2-2001). The information of characteristic "user ID", "year and month of usage" of each user ID, "increased/decreased number of network-node equipments" of each user ID, "number of increasing bandwidths" of each user ID, "total number of optical links of the wavelength" of each user ID, "discount" of each user ID, and "charge" of each user ID are integrated in the data (2-3605) format, which is stored in the internal database (2-2301) and the external database (2-2401) connected to the central-management-equipment (2-2001), as the basic charge information corresponding to the number of optical links of the network-node equipment in use. The data is administered by the management unit (2-3303) and is delivered to the internal databases (2-701 to 704) and the external databases (2-801 to 804) which are connected to the network-node equipments (2-301 to 304) of each user ID by each month, and shows the past usage status. Moreover, a charge guide is executed for the user. In the present embodiment, the unit of charge period is by each month, however it is not limited to this and the unit may be by each day or each year.

Twenty-fourth Embodiment

FIG. 2-9 shows a management information of user topology (2-3606) administered by the internal databases (2-701 to 704) and the external databases (2-801 to 804) which are connected to the network-node equipments (2-301 to 304) used by the ID1 user.

Information related to the ID1 user is cut out from the management information of central controlled logical topology (2-3601), which is then transmitted to the management information of user topology (2-3606) held in the internal databases (2-701 to 704) and the external databases (2-801 to 804) connected to the network-node equipments (2-301 to 304) using the control-signals. The management information of user topology (2-3606) is updated and stored in the internal databases (2-701 to 704) and the external databases (2-801 to 804) connected to the network-node equipments (2-301 to 304) used by the ID1 user, so as to administer the management information of user topology (2-3606) by the management unit (2-3105) in the aforementioned network-node equipments (2-301 to 304).

The following information are integrated in the management information of user topology (2-3606); "type of logical network topology" which is currently in use, "specific user number of network-node equipment" which becomes the user controlling characteristic number of network-node equipment when the user voluntarily accesses to the network-node equipments (2-301 to 304) constructing the topology of user, "wavelength in use" which is being used by the network-node equipments (2-301 to 304), "specific management number of the other end of network-node equipment" which identifies the network-node equipments (2-301 to 304) which are connected on the other end by the specific wavelength from the network-node equipments (2-301 to 304), "transmitting status of the WDM signal" which is the optical output intensity of the wavelength tunable light source in the network-node equipments (2-301 to 304), "receiving status of the WDM signal" which is the received optical power of the optical receiver in the network-node equipments (2-301 to 304), "connecting status of the network-node equipment" which is the connecting status between the network-node equipments (2-301 to 304) and the network-node equipments, "number of optical links of the network-node equipment" which is the number of connections between the network-node equipments (2-301 to 304) and the other network-node equipments (2-301 to 304) on the other end thereof, "adding bandwidth of the link" which shows whether or not bandwidth addition is performed between the specific network-node equipments (2-301 to 304), and "length of time for increasing bandwidth" which becomes the period for performing the aforementioned bandwidth addition.

FIG. 2-10 shows a user window (2-3607). Regarding the user window (2-3607), the display controlling unit (2-3106) in the network-node equipments (2-301 to 304) delivers the data of the aforementioned management information of user topology (2-3601) to the administrator console for the network-node equipment (2-3201) so as to graphically display it to the ID1 user. Moreover, the diagram of topology status, the network-node equipment, and the connection structure are shown in the user window (2-3607).

FIG. 2-11 shows the usage information (2-3608) which is stored in the internal databases (2-701 to 704) and the external databases (2-801 to 804) connected to the network-node equipments (2-301 to 304) used by the ID1 user. User ID, year and month of usage, increased/decreased number of network-node equipments, number of increasing bandwidths, total number of optical links of the wavelength, charge discount and charge by each month, are integrally stored in the usage information (2-3608), enabling ensuring of the usage status and the charge information all the time. In the present embodiment, the unit of charge period is by each month, however it is not limited to this and the unit may be by each day or each year.

Twenty-Fifth Embodiment

FIG. 2-12 shows a management information of user topology (2-3609) administered by the internal databases (2-701 to 704).and the external databases (2-801 to 804) which are connected to the network-node equipments (2-301 to 304) used by the ID2 user.

Information related to the ID2 user is cut out from the management information of central controlled logical topology (2-3601) which is held in the internal database (2-2301) and the external databases (2-2401) connected to the central-management-equipment (2-2001), then transmitted to the aforementioned network-node equipments (2-301 to 304) using the control-signals. The management information of user topology (2-3609) is updated and stored in the internal databases (2-701 to 704) and the external databases (2-801 to 804) connected to the network-node equipments (2-301 to 304) used by the ID2 user, so as to administer the management information of user topology (2-3609) by the management unit (2-3105) in the aforementioned network-node equipments (2-301 to 304).

The following information are integrated in the management information of user topology (2-3609); "type of logical network topology" which is currently in use, "specific user number of network-node equipment" which becomes the user controlling characteristic number of network-node equipment when the user voluntarily accesses to the network-node equipments (2-301 to 304) constructing the topology of user, "wavelength in use" which is being used by the network-node equipments (2-301 to 304), "specific management number of the other end of network-node equipment" which is the user controlling characteristic number of wavelength tunable light source of the network-node equipments (2-301 to 304) to which the network-node equipments (2-301 to 304) are connected on the other end by the specific wavelength, "transmitting status of the WDM signal" which is the optical output intensity of the wavelength tunable light source in the network-node equipments (2-301 to 304), "receiving status of the WDM signal" which is the received optical power of the optical receiver in the network-node equipments (2-301 to 304), "connecting status of the network-node equipment" which is the connecting status between the network-node equipments (2-301 to 304) and the network-node equipments, "number of optical links of the network-node equipment" which is the number of connections between the network-node equipments (2-301 to 304) and the other network-node equipments (2-301 to 304) on the other end thereof, "adding bandwidth of the link" which shows whether or not bandwidth addition is performed between the specific network-node equipments (2-301 to 304), and "length of time for increasing bandwidth" which becomes the period for performing the aforementioned bandwidth addition.

FIG. 2-13 shows a user window (2-3610). Regarding the user window (2-3610), the display controlling unit (2-3106) in the network-node equipments (2-301 to 304 delivers the data of the aforementioned management information of user topology (2-3609) to the administrator console for the network-node equipment (2-3201) so as to graphically display it to the ID2 user. Moreover, the diagram of topology status, the network-node equipment and the connection structure are shown in the user window (2-3610).

FIG. 2-14 shows the usage information (2-3611) which is stored in the internal databases (2-701 to 704) and the external databases (2-801 to 804) connected to the network-node equipments (2-301 to 304) used by the ID2 user. User ID, year and month of usage, increased/decreased number of network-node equipments, number of increasing bandwidths, total number of optical links of the wavelength, charge discount and charge by each month, are integrally stored in the usage information (2-3611), enabling ensuring of the usage status and the charge information all the time. In the present embodiment, the unit of charge period is by each month, however it is not limited to this and the unit may be by each day or each year.

Twenty-Sixth Embodiment

FIG. 2-15 shows the management information of central controlled logical topology (2-3701) which is administered by the internal database (2-2301) and the external database (2-2401) connected to the central-management-equipment (2-2001), in the case where the ID1 user newly increases the network-node equipment. Here, a specific management number of network-node equipment is "11" and a specific user number of network-node equipment is "5" with respect to the newly increased network-node equipment. The new network-node equipment (specific management number of network-node equipment "11" and specific user number of network-node equipment "5") is connected to the existing network-node equipment (specific management number of network-node equipment "2" and specific user number of network-node equipment "2") and the other existing network-node equipment (specific management number of network-node equipment "4" and specific user number of network-node equipment "4") at the same time. At this time, the number of connections of the aforementioned two existing network-node equipments is respectively increased by two, so that the number of optical links of the network-node equipment in the management information of central controlled logical topology (2-3701) is increased by two, resulting in four in total. The information related to the ID2 user is not changed since the topology is not changed.

Moreover, it is possible to graphically display the aforementioned management information of central controlled logical topology (2-3701) on the administrator console for the topology (2-3401) through the display controlling unit (2-3304), comprising; a management window for topology (2-3602), an information view window for ID1 user (2-3702) and an information view window for ID2 user (2-3604).

FIG. 2-17 is link usage charge information (2-3703) calculated by the charge calculation unit (2-3305) in the central-management-equipment (2-2001). The information of characteristic "user ID", "year and month of usage" of each user ID, "increased/decreased number of network-node equipments" of each user ID, "number of increasing bandwidths" of each user ID, "total number of optical links of the wavelength" of each user ID, "discount" of each user ID, and "charge" of each user ID, are integrated in the data (2-3703) format, which is stored in the internal database (2-2301) and the external database (2-2401) connected to the central-management-equipment (2-2001), as the link usage charge information corresponding to the number of optical links of the network-node equipment in use. The data is administered by the management unit (2-3303) and delivered to the internal databases (2-701 to 704) and the external databases (2-801 to 804) which are connected to the network-node equipments of each user ID by each month, and shows the past usage status. Moreover a charge guide is executed for the user. The node is newly increased in the user IDI on April and May, 2003. Therefore, the number of optical links of the wavelength is increased by two corresponding to this, resulting in 14 in total. The change in the charge accompanied by this is shown (2-3704). In the present embodiment, the unit of charge period is by each month, however it is not limited to this and the unit may be by each day or each year.

Twenty-Seventh Embodiment

FIG. 2-18 shows a management information of user topology (2-3705) administered by the internal databases (2-701 to 704) and the external databases (2-801 to 804) which are connected to the network-node equipments (2-301 to 304) used by the ID1 user. Information related to the ID1 user is cut out from the management information of central controlled logical topology (2-3601) which is held in the internal database (2-2301) and the external database (2-2401) connected to the central-management-equipment (2-2001), then transmitted to the aforementioned network-node equipments using the control-signals. The management information of user topology (2-3705) is held and held and stored in the internal databases (2-701 to 704) and the external databases (2-801 to 804) connected to the network-node equipments (2-301 to 304) used by the ID1 user, so as to administer the management information of user topology (2-3705) by the management unit (2-3105) in the aforementioned network-node equipments (2-301 to 304).

The additional information (2-3706) by the link linking the specific user number of network-node equipment "5" and the specific user number of network-node equipment "2", and the additional information (2-3707) by the link linking the specific user number of network-node equipment "5" and the specific user number of network-node equipment "4", are respectively reflected in the management information of user topology (2-3705).

In FIG. 2-19, the display controlling unit (2-3106) in the network-node equipments (2-301 to 304) delivers the data of the aforementioned management information of user topology (2-3705) to the administrator console for the network-node equipment (2-3201), enabling it to be graphically displayed to the ID1 user. The diagram of topology status, the network-node equipment, and the connection structure are shown in the user window (2-3708), and the change in the topology by the new node addition (2-specific user number of network-node equipment "5") is shown.

FIG. 2-20 shows the link usage charge information (2-3709) which is stored in the internal databases (2-701 to 704) and the external databases (2-801 to 804) connected to the network-node equipments (2-301 to 304) used by the ID1 user. Information of "year and month of usage", "increased/decreased number of network-node equipments", "number of increasing bandwidths", "total number of optical links of the wavelength", "discount" and "charge", is integrated in the data (2-3709) format. The item of the user ID1 is cut out from the information stored by month in the internal database (2-2301) and the external database (2-2401) connected to the central-management-equipment (2-2001), as the link usage charge information corresponding to the number of optical links of the network-node equipment in use, then delivered to the internal databases (2-701 to 704) and the external databases (2-801 to 804)

connected to the network-node equipments (2-301 to 304) belonging to the user ID1, and shows the past usage status. Moreover charge to the user is performed. Here, the node is newly increased in the user ID1 on April and May, 2003. Therefore, the number of optical links of the wavelength is increased by two corresponding to this, resulting in 14 in total. The change in the charge accompanied by this is shown (2-3704). In the present embodiment, the unit of charge period is by each month, however it is not limited to this and the unit may be by each day or each year.

Twenty-Eighth Embodiment

FIG. 2-21 shows a management information of central controlled logical topology (2-3801) administered by the internal database (2-2301) and the external database (2-2401) which are connected to the central-management-equipment (2-2001), in the case where the ID2 user performs the bandwidth addition between the network-node equipment (specific user number of network-node equipment "1" and specific management number of network-node equipment "5") and the network-node equipment (specific user number of network-node equipment "2" and specific management number of network-node equipment "6").

In the case where the bandwidth addition is performed by the increase of the wavelength path between two network-node equipments, the bandwidth addition becomes possible by newly establishing a bypass wavelength path via a network-node equipment which has never been connected logically before.

By establishing a new wavelength path by the network-node equipment (specific user number of network-node equipment "1" and specific management number of network-node equipment "5") <-> the network-node equipment (specific user number of network-node equipment "5" and specific management number of network-node equipment "9") <-> and the network-node equipment (specific user number of network-node equipment "2" and specific management number of network-node equipment "6"), the bandwidth addition of the network-node equipment (specific user number of network-node equipment "1" and specific management number of network-node equipment "5") <-> and the network-node equipment (specific user number of network-node equipment "2" and specific management number of network-node equipment "6") is performed. In the 2L×2L electrical switch (2-2702) in the network-node equipments (2-301 to 304) of the network-node equipment (specific user number of network-node equipment "5" and specific management number of network-node equipment "9"), the switching operation for turning back the signals from the optical receivers (2-2601 to 2603) to the wavelength tunable light sources (2-2501 to 2503) is performed.

At this time, in the management information of central controlled logical topology (2-3801) which is administrated in the internal database (2-2301) and the external database (2-2401) connected to the central-management-equipment (2-2001), in the data related to the user ID2, the number of new optical links of the network-node equipment established by the bandwidth addition is increased by one respectively in the network-node equipment (specific user number of network-node equipment "1" and specific management number of network-node equipment "5") and the network-node equipment (specific user number of network-node equipment "5" and specific management number of network-node equipment "9"), and increased by two in the network-node equipment (specific user number of network-node equipment "2" and specific management number of network-node equipment "6") (2-3802). On the other hand, the Information related to the ID1 user in the management information of central controlled logical topology (2-3801) is not changed, since the topology is not changed.

Moreover, it is possible to graphically display the aforementioned management information of central controlled logical topology (2-3801) on the administrator console for the topology (2-3401) through the display controlling unit (2-3304). As shown in FIG. 2-22, the graphical display comprises; a management window for topology (2-3602), an information view window for ID1 user (2-3603), and an information view window for an ID2 user (2-3803).

FIG. 2-23 is link usage charge information (2-3805) calculated by the charge calculation unit (2-3305) in the central-management-equipment (2-2001). The information of characteristic "user ID", "year and month of usage" of each user ID, "increased/decreased number of network-node equipments" of each user ID, "number of increasing bandwidths" of each user ID, "total number of optical links of the wavelength" of each user ID, "discount" of each user ID, and "charge" of each user ID, are integrated in the data (2-3805) format, which is stored in the internal database (2-2301) and the external database (2-2401) connected to the central-management-equipment (2-2001) as the link usage charge information corresponding to the number of optical links of the network-node equipment in use. The data is administered by the management unit (2-3303) and delivered to the internal databases (2-701 to 704) and the external databases (2-801 to 804) which are connected to the network-node equipments (2-301 to 304) of each user ID by each month, and shows the past usage status. Moreover a charge guide is executed for the user. The number of optical links of the new wavelength is newly increased due to the bandwidth addition in the user ID2 on May, 2003. The change in the charge accompanied by this is shown (2-3806). In the present embodiment, the unit of charge period is by each month, however it is not limited to this and the unit may be by each day or each year.

Twenty-Ninth Embodiment

FIG. 2-24 shows a management information of user topology (2-3807) administered by the internal databases (2-701 to 704) and the external databases (2-801 to 804) which are connected to the network-node equipments (2-301 to 304) used by the ID2 user. Information related to the ID2 user is cut out from the management information of central controlled logical topology (2-3601) which is held in the internal database (2-2301) and the external database (2-2302) connected to the central-management-equipment (2-2001), then transmitted to the aforementioned network-node equipments using the control-signals. The management information of user topology (2-3807) is held and held and stored in the internal databases (2-701 to 704) and the external databases (2-801 to 804) connected to the network-node equipment used by the ID2 user, so as to administer the management information of user topology (2-3807) by the management unit (2-3105) in the aforementioned network-node equipments (2-301 to 304).

The additional information (2-3808) by the link linking the specific user number of network-node equipment "1" and the specific user number of network-node equipment "4", and the additional information (2-3803) by the link linking the specific user number of network-node equipment "2" and the specific user number of network-node equipment "4", are respectively reflected to the management information of user topology (2-3807).

In FIG. 2-25, the display controlling unit (2-3106) in the network-node equipments (2-301 to 304) delivers the data of the aforementioned management information of user topology (2-3807) to the administrator console for the network-node equipment (2-3201), enabling it to be graphically displayed to the ID2 user. The diagram of topology status, the network-node equipment, and the connection structure are shown in the user window (2-3809), and the change in the topology by the new node addition (specific user number of network-node equipment "5") is shown. A new logical path (2-3810) linking the specific user number of network-node equipment "1" <-> and the specific user number of network-node equipment "2" is displayed.

FIG. 2-26 shows the link usage charge information (2-3811) which is stored in the internal databases (2-701 to 704) and the external databases (2-801 to 804) connected to the network-node equipments (2-301 to 304) used by the ID2 user. Information of "year and month of usage", "increased/decreased number of network-node equipments", "number of increasing bandwidths", "total number of optical links of the wavelength", "discount" and "charge" is integrated in the data (2-3710) format. The item of the user ID2 is cut out from the information stored by month in the internal database (2-2301) and the external database (2-2401) connected to the central-management-equipment (2-2001), as the link usage charge information corresponding to the number of optical links of the network-node equipment in use, then delivered to the internal databases (2-701 to 704) and the external databases (2-801 to 804) connected to the network-node equipments (2-301 to 304) belonging to the user ID2, and shows the past usage status. Moreover charge to the user is performed.

Here, the number of optical links of the wavelength is increased according to the bandwidth addition in the user ID2 on May, 2003. Therefore, the number of optical links of the wavelength becomes 16 in total. The change in the charge accompanied by this is shown (2-3812). In the present embodiment, the unit of charge period is by each month, however it is not limited to this and the unit may be by each day or each year.

Thirtieth Embodiment

FIG. 2-27 shows a management information of central controlled logical topology (2-3901) administered by the internal database (2-2301) and the external database (2-2401) which are connected to the central-management-equipment (2-2001), in the case where the ID1 user performs the bandwidth addition between the network-node equipment (specific user number of network-node equipment "2" and specific management number of network-node equipment "2") and the network-node equipment (specific user number of network-node equipment "4" and specific management number of network-node equipment "4").

In the case where the bandwidth addition is performed by the increase of the wavelength path between two network-node equipments, the bandwidth addition becomes possible by newly establishing a wavelength path via a network-node equipment which has never been connected logically before. However, since all of the network-node equipments of the user ID1 are constructed by the full mesh topology, there is no selection regarding the establishment of the new wavelength path. Therefore, this is solved by using the resource of the specific network-node equipment of user ID2.

By establishing a new wavelength path by the user ID1 network-node equipment (specific user number of network-node equipment "2" and specific management number of network-node equipment "2") <-> the user ID2 network-node equipment (specific user number of network-node equipment "4" and specific management number of network-node equipment "8") <-> and the user ID1 network-node equipment (specific user number of network-node equipment "4" and specific management number of network-node equipment "4"), the bandwidth addition of the user ID1 network-node equipment (specific user number of network-node equipment "2" and specific management number of network-node equipment "2") <-> and the user ID1 network-node equipment (specific user number of network-node equipment "4" and specific management number of network-node equipment "4") is performed. In the 2L×2L electrical switch (2-2702) in the network-node equipments (2-301 to 304) of the user ID2 network-node equipment (specific user number of network-node equipment "4" and specific management number of network-node equipment "9"), the switching operation for turning back the signals from the optical receivers (2-2601 to 2603) to the wavelength tunable light sources (2-2501 to 2503) is performed.

At this time, in the management information of central controlled logical topology (2-3901) which is administrated in the internal database (2-2301) and the external database (2-2401) connected to the central-management-equipment (2-2001), in the data related to the user ID1 and the user ID2, the number of new optical links of the network-node equipment established by the bandwidth addition is increased by one respectively in the user ID1 network-node equipment (specific user number of network-node equipment "2" and user ID1 specific management number of network-node equipment "2") and the network-node equipment (specific user number of network-node equipment "4" and specific management number of network-node equipment "4"), and is increased by two in the user ID2 network-node equipment (specific user number of network-node equipment "4" and specific management number of network-node equipment "8") (2-3902).

Moreover, it is possible to graphically display the aforementioned management information of central controlled logical topology (2-3901) on the administrator console for the topology (2-3401) through the display controlling unit (2-3304). The graphical display comprises; a management window for topology (2-3602), an information view window for ID1 user (2-3603), and an information view window for an ID2 user (2-3803). Here, a new path (2-3905) is displayed.

FIG. 2-29 is link usage charge information (2-3805) calculated by the charge calculation unit (2-3305) in the central-management-equipment (2-2001). The information of characteristic "user ID", "year and month of usage" of each user ID, "increased/decreased number of network-node equipments" of each user ID, "number of increasing bandwidths" of each user ID, "total number of optical links of the wavelength" of each user ID, "discount" of each user ID, and "charge" of each user ID are integrated in the data (2-3805) format, which is stored in the internal database (2-2301) and the external database (2-2401) connected to the central-management-equipment (2-2001) as the link usage charge information corresponding to the number of optical links of the network-node equipment in use. The data is administered by the management unit (2-3303) and delivered to the internal databases (2-701 to 704) and the external databases (2-801 to 804) which are connected to the network-node equipments of each user ID by each month, and shows the past usage status. Moreover a charge guide is executed for the user. The number of optical links of the new wavelength is newly increased due to the bandwidth addition in the user ID1 on May, 2003. The change in the charge accompanied by this is shown (2-3907). At the same time, the discount and the discounted charge by using the resource of the wavelength tunable light source of the network-node equipment of the ID2 user who is independent of the ID1 user, are shown. In the present embodiment, the unit of charge period is by each month, however it is not limited to this and the unit may be by each day or each year.

Thirty-First Embodiment

FIG. 2-31 shows a management information of user topology (2-3909) administered by the internal databases (2-701 to 704) and the external databases (2-801 to 804) which are connected to the network-node equipments used by the ID1 user. Information related to the ID1 user is cut out from the management information of central controlled logical topology (2-3601) which is held in the internal database (2-2301) and the external database (2-2401) connected to the central-management-equipment (2-2001), then transmitted to the aforementioned network-node equipments using the control-signals. The management information of user topology (2-3909) is held and stored in the internal databases (2-701 to 704) and the external databases (2-801 to 804) connected to the network-node equipment used by the ID1 user, so as to administer the management information of user topology (2-3909) by the management unit (2-3105) in the aforementioned network-node equipments (2-301 to 304). The additional information (2-3910) by the link linking the specific user number of network-node equipment "2" and the specific user number of network-node equipment "4" is reflected to the management information of user topology (2-3909).

In FIG. 2-31, the display controlling unit (2-3909) in the network-node equipments (2-301 to 304) delivers the data of the aforementioned management information of user topology (2-3807) to the administrator console for the network-node equipment (2-3201), enabling it to be graphically displayed to the ID1 user. The diagram of topology status, the network-node equipment, and the connection structure are shown in the user window (2-3911), and a new logical path (2-3912) linking the specific user number of network-node equipment "1" <-> and the specific user number of network-node equipment "2" is displayed.

FIG. 2-32 shows the link usage charge information (2-3913) which is stored in the internal databases (2-701 to 704) and the external databases (2-801 to 804) connected to the network-node equipments (2-301 to 304) used by the ID1 user. Information of "year and month of usage", "increased/decreased number of network-node equipments", "number of increasing bandwidth", "total number of optical links of the wavelength", "discount" and "charge" is integrated in the data (2-3913) format. The item of the user ID1 is cut out from the information stored by month in the internal database (2-2301) and the external database (2-2401) connected to the central-management-equipment (2-2001) as the link usage charge information corresponding to the number of optical links of the network-node equipment in use, then delivered to the internal databases (2-701 to 704) and the external databases (2-801 to 804) connected to the network-node equipments (2-301 to 304) belonging to the user ID1, and shows the past usage status. Moreover charge to the user is performed. Here, the number of optical links of the wavelength is increased according to the bandwidth addition in the user ID1 on May, 2003. Therefore, the number of optical links of the wavelength becomes 16 in total. The change in the charge accompanied by this is shown (2-3914).

On the other hand, FIG. 2-33 shows the link usage charge information (2-3915) which is stored in the internal databases (2-701 to 704) and the external databases (2-801 to 804) connected to the network-node equipments (2-301 to 304) used by the ID2 user.

Information of "year and month of usage", "increased/decreased number of network-node equipments", "number of increasing bandwidth", "total number of optical links of the wavelength", "discount" and "charge" is integrated in the data (2-3915) format. The item of the user ID2 is cut out from the information stored by month in the internal database (2-2301) and the external database (2-2401) connected to the central-management-equipment (2-2001) as the link usage charge information corresponding to the number of optical links of the network-node equipment in use, then delivered to the internal databases (2-701 to 704) and the external databases (2-801 to 804) connected to the network-node equipments belonging to the user ID2, and shows the past usage status. Moreover charge to the user is performed. Here, it is shown that the discounted charge is applied since the resource of the wavelength tunable light source in the network-node equipment of the user ID2 is used on May, 2003 by the ID1 user who is independent of the ID2 user (2-3916). In the present embodiment, the unit of charge period is by each month, however it is not limited to this and the unit may be by each day or each year.

Thirty-Second Embodiment

FIG. 2-34 shows a management information of central controlled logical topology (2-4001) which is administered by the internal database (2-2301) and the external database (2-2401) connected to the central-management-equipment (2-2001), in the case where the ID user comprises only one single ring-shaped topology. Moreover, it is possible to graphically display the aforementioned management information of central controlled logical topology (2-4001) on the administrator console for the topology (2-3401) through the controlling unit (2-3304). As shown in FIG. 2-35, the graphical display comprises a management window for topology (2-3602) and an information view window for IDI user (2-4002).

FIG. 2-36 shows a management information of user topology (2-4003) administrated by the internal databases (2-701 to 704) and the external databases (2-801 to 804) which are connected to the network-node equipments used by the IDI user. In FIG. 2-37, the display controlling unit (2-3106) in the network-node equipments (2-301 to 304) delivers the data of the aforementioned management information of user topology (2-4003) to the administrator console for the network-node equipment (2-3201), enabling it to be graphically displayed to the ID1 user. The diagram of topology status, the network-node equipment, and the connection structure are shown in the user window (2-4004).

FIG. 2-38 shows a management information of central controlled logical topology (2-4005) which is administered by the internal database (2-2301) and the external database (2-2401) connected to the central-management-equipment (2-2001), when cutting off a failure network-node equipment, in the case where a failure occurs in the network-node equipment (specific management number of network-node equipment "4" and specific user number of network-node equipment "4") used by the ID1 user. As a result of the detachment, the number of optical links of the network-node equipment in the aforementioned network-node equipment (specific management number of network-node equipment "4" and specific user number of network-node equipment "4") becomes "0" and the status of the wavelength tunable light source in the network-node equipments (2-301 to 304) becomes "Off". Furthermore, in the ring-shaped topology, since the wavelength is rearranged in a network-node equipment adjacent to the failure network-node equipment by skipping the network-node equipment, the WDM signals will not reach to the network-node equipment constructing the failure network-node equipment. Therefore, the receiving status of the WDM signal becomes "NG" (2-4006).

In FIG. 2-39, the aforementioned management information of central controlled logical topology (2-4001) is graphically displayed on the administrator console for the topology (2-3401) through the display controlling unit (2-3304). The graphical display comprises; a management window for topology (2-3602) and an information view window for an ID1 user (2-4007).

FIG. 2-40 is link usage charge information (2-4009) calculated by the charge calculation unit (2-3305) in the central-management-equipment (2-2001). The information of characteristic "user ID", "year and month of usage" of each user ID, "increased/decreased number of network-node equipments" of each user ID, "number of increasing bandwidth" of each user ID, "total number of optical links of the wavelength" of each user ID, "discount" of each user ID, and "charge" of each user ID, are integrated in the data (2-4009) format, which is stored in the internal database (2-2301) and the external database (2-2401) connected to the central-management-equipment (2-2001) as the link usage charge information corresponding to the number of optical links of the network-node equipment in use. The data is administered by the management unit (2-3303) and delivered to the internal databases (2-701 to 704) and the external databases (2-801 to 804) which are connected to the network-node equipments (2-301 to 304) of each user ID by each month, and shows the past usage status. Moreover a charge guide is executed for the user. As a result of the detachment from the ring-shaped topology by the failure avoidance in the network-node equipment (specific management number of network-node equipment "4" and specific user number of network-node equipment "4"), the increased/decreased number of network-node equipments becomes "−1", the total number of optical links of the wavelength becomes "6", and the new charge due to the change in the total number of optical links becomes "F" (2-4010).

FIG. 2-41 shows a management information of user topology (2-4011) administered by the internal databases (2-701 to 704) and the external databases (2-801 to 804) which are connected to the network-node equipments (2-304-304) used by the ID1 user. Information related to the ID1 user is cut out from the management information of central controlled logical topology (2-4005) which is held in the internal database (2-2301) and the external database (2-2401) connected to the central-management-equipment (2-2001), then transmitted to the aforementioned network-node equipments (2-304-304) using the control-signals. The management information of user topology (2-3601) is held and stored in the internal databases (2-701 to 704) and the external databases (2-801 to 804) connected to the network-node equipments (2-304-304) used by the ID1 user, so as to administer the management information of user topology (2-4011) by the management unit (2-3105) in the aforementioned network-node equipments (2-301 to 304). Since the wavelength of the detached failure network-node equipment (specific user number of network-node equipment "4") is rearranged, the number of optical links of the network-node equipment in the specific user number of network-node equipment "4" becomes "0" (2-4012).

In FIG. 2-42, the display controlling unit (2-4011) in the network-node equipments (2-301 to 304) delivers the data of the aforementioned management information of user topology (2-3807) to the administrator console for the network-node equipment (2-3201), enabling it to be graphically displayed to the ID1 user. The diagram of topology status, the network-node equipment, and the connection structure are shown in the user window (2-4013), and the condition where the failure network-node equipment is detached is shown (2-4008).

FIG. 2-43 shows the link usage charge information (2-3913) which is stored in the internal databases (2-701 to 704) and the external databases (2-801 to 804) connected to the network-node equipments (2-301 to 304) used by the ID1 user. Information of "year and month of usage", "increased/decreased number of network-node equipments", "number of increasing bandwidth", "total number of optical links of the wavelength", "discount" and "charge" is integrated in the data (2-3913) format. The item of the user ID1 is cut out from the information stored by month in the internal database (2-2301) and the external database (2-2401) connected to the central-management-equipment (2-2001) as the link usage charge information corresponding to the number of optical links of the network-node equipment in use, then delivered to the internal databases (2-701 to 704) and the external databases (2-801 to 804) connected to the network-node equipments belonging to the user ID1, and shows the past usage status. Moreover charge to the user is performed. Here, the number of optical links of the wavelength is increased according to the failure avoidance in the user ID1 on May, 2003. Therefore, the number of optical links of the wavelength is decreased to 6 in total. The change in the charge accompanied by this is shown (2-4015).

Thirty-Third Embodiment

In the case where the traffic flow increases between specific network-node equipments, increasing the network load, and either one of the network-terminal administrators of the network-node equipment, or both, requests the central-management-equipment (2-2001) to increase the bandwidth between the network-node equipment, the bandwidth is increased as follows.

That is, the central-management-equipment (2-2001) issues a request to the internal database (2-2301) and the external database (2-2401), and performs a calculation in order to determine whether it is possible or not, and in the case where it is possible to increase the bandwidth between the network-node equipments by constructing a new rerouted wavelength path via another network-node equipment that is not directly connected to the network-node equipments, it notifies each of the network-node equipments of the new wavelength setting for establishing a new wavelength path between the network-node equipment for rerouting, and the above specified network-node equipments, to perform a new wavelength path setting, and updates the data stored in the internal database (2-2301) and the external database (2-2401).

Furthermore, the central-management-equipment (2-2001) references the internal database (2-2301) and the external database (2-2401), calculates and records the additional charge required for the new wavelength path, notifies the network-terminal administrator of the increase of the charge through the network-node equipment (2-301 to 304), calculates and records the decrease of the charge for the network-node equipment that provided the wavelength path, and notifies the network-terminal administrator of the decrease of the charge via the network-node equipment (2-301 to 304).

Thirty-Fourth Embodiment

In the case where the traffic flow increases between specific network-node equipments, increasing the network load, and either one of the network-terminal administrators of the network-node equipment, or both, requests the central-management-equipment (2-2001) to increase the bandwidth between the network-node equipment, the bandwidth is increased as follows.

That is, the central-management-equipment (2-2001) issues a request to the internal database (2-2301) and the external database (2-2401), and performs a calculation in order to determine whether it is possible or not, and in the case where it is possible to increase the bandwidth between the network-node equipments by constructing a new rerouted wavelength path by using unused wavelength in a network-node equipment that is not connected to the network-node equipments, and connected in another logical network topology, it notifies each of the network-node equipments of the new wavelength setting for establishing a new wavelength path between the network-node equipment for rerouting and the above specified network-node equipments to perform a new wavelength path setting, and updates the internal database (2-2301) and the external database (2-2401).

Furthermore, the central-management-equipment (2-2001) references the internal database (2-2301) and the external database (2-2401), calculates and records the additional charge required for the new wavelength path, notifies the network-terminal administrator of the charge through the network-node equipment (2-301 to 304), calculates and records the decrease of the charge for the network-node equipment that provided the wavelength path, and notifies the network-terminal administrator of the decrease of the charge via the network-node equipment (2-301 to 304).

Thirty-Fifth Embodiment

FIG. 4-1 is a structural diagram of a network-node equipment according to a thirty-fifth embodiment of the present invention, which describes the structure of a wavelength tunable transmitter and receiver unit comprising a wavelength tunable light source unit and a wavelength tunable optical receiver unit, and the structure of a control unit.

In the figure, 4-2501 denotes a piece of network-node equipment, 4-1601 denotes a network-terminal equipment, and 4-600a denotes a transmission path such as an optical fiber or the like.

The present embodiment shows a wavelength tunable light source unit comprising wavelength tunable light sources 4-1301, 1302, and 1303, and wavelength tunable semiconductor lasers, such as SSG-DBR lasers or the like, in the wavelength tunable light sources are modulated externally by modulators 4-1201, 1202, and 1203. However, this is not limiting, and it is also possible to use wavelength tunable semiconductor lasers that can be directly modulated. Furthermore, the construction may be such that optical elements installed in the wavelength tunable light source unit comprise either a device structure in which wavelength tunable light sources 4-1301, 1302, and 1303, and modulators 4-1201, 1202, and 1203 are connected in series or integrated with each other, or semiconductor lasers capable of being modulated directly, and these are connected in series to form L (where L is an integer greater than or equal to 2, and less than or equal to N)×N (where N is an integer greater than or equal to 2) switches, which are connected in series with N×1 optical couplers.

Moreover, the present embodiment shows that the wavelength tunable optical receiver unit comprises the wavelength tunable filters 4-1401 to 1403, and optical signals transmitted at preset wavelengths are input to a network-terminal equipment I/F 4-1701. However, this is not limiting, and the construction may be such that the wavelength tunable optical receiver unit comprises wavelength tunable filters and photo detectors, and furthermore E/O converters, connected in series, and the transmitted optical signals are received by the photo detectors, then converted to optical signals again in the E/O converters, and afterwards input to the network-terminal equipment I/F 4-1701.

A network-terminal equipment 4-1601 is provided with the network-terminal equipment interface (I/F) 4-1701, and this network-terminal equipment interface (I/F) 4-1701 is connected to the wavelength tunable transmitter and receiver unit 4-1105 provided in the network-node equipment 4-2501.

An optical signal output from the network-terminal equipment I/F 4-1701 located in the network-terminal equipment 4-1601 is converted to a data signal with wavelength bandwidth around the range of 1.5 μm arranged on an ITU grid, by the wavelength tunable light sources 4-1301 to 1303 and the modulators 4-1201 to 1203 arranged in the wavelength tunable transmitter and receiver unit 4-1105, and a plurality of data signals is combined by a 3×1 optical coupler 4-901, and passes through a WDM coupler 4-809a towards an arrayed waveguide grating (AWG) via a transmission path 4-600a such as an optical fiber.

The data signal delivered from the arrayed waveguide grating (AWG) reaches a WDM coupler 4-810a arranged in the network-node equipment 4-2501, and after being separated by an optical coupler 4-902 arranged in the wavelength tunable transmitter and receiver unit 4-1105, is transmitted through the wavelength tunable filter 4-1403 connected by an optical fiber, then reaches the network-terminal equipment I/F 4-1701 via optical fibers 4-1501 to 1503, and is terminated at optical receivers provided in the network-terminal equipment 4-1601, which are not shown in the figure. In addition, in the present embodiment, the wavelength tunable optical receiver unit comprises the optical receivers and the wavelength tunable filters 4-1401 to 1403 connected in series. However, the construction may be such that they are connected in series to form L×N switches and N×1 multiplexers connected in series.

The network-node equipment 4-2501 is provided with a network-node equipment control unit 4-1101. Moreover, the network-node equipment control unit 4-1101 is provided with: a control signal optical input/output port 4-1801 serving as an input/output interface for the above-described control signal; a monitor controlling unit 4-1901 and a wavelength controlling unit 4-2001, which monitor and control the wavelength tunable light sources 4-1301 to 1303 and the wavelength tunable filters 4-1401 to 1403; a system clock 4-2401 for keeping time; a clock time controlling unit 4-2101 for controlling the system clock 4-2401; a memory unit 4-2301 for storing software and a database of setup wavelength, which are described later; and a Central Processing Unit (CPU) 4-2201 for controlling them all.

The central management equipment 4-301 as shown in FIG. 4-2 is provided with: a control signal optical input/output port 4-2601 serving as an input/output interface for the above-described control signal; a wavelength resource database 4-2606 that defines the range of wavelengths that the wavelength tunable transmitter and receiver unit 4-1106 can output and receive; a failure recording database 4-2607 for recording failure information of the network-node equipment 4-2502; a system clock 4-2603 for keeping time; a clock time controlling unit 4-2602 for controlling the system clock 4-2603; a memory unit 4-2604 for storing software, which is described later; a Central Processing Unit (CPU) 4-2605 for controlling them all; and a display controlling unit 4-2608.

Here, "logical network topology" is abbreviated to "topology" in the following description.

The display controlling unit 4-2608 is connected to a topology administrator console 4-2609, receives information input manually from the topology administrator console 4-2609, and transmits information output by the central management equipment 4-301 to the topology administrator console 4-2609.

The control signal optical input/output port 4-1802 located in a network-node equipment control unit 4-1102 is connected to a WDM coupler 4-811 a via an optical fiber, and the transmission path used for sending and receiving control signals is shared with the optical fiber transmission path used for the data signals. Furthermore, the WDM coupler is connected to the concentrator switch 4-3012 via an optical fiber, an input/output port of the concentrator switch 4-3012 is connected to the control signal optical input/output port 4-2601 located in the central management equipment 4-301, and the optical path for control signals is directed towards the concentrator switch 4-3012 via a WDM coupler 4-812b. By so doing, the control signal optical input/output port 4-2601 located in the central management equipment 4-301, and the control signal optical input/output port 4-1802 located in the controlling unit of the network-node equipment 4-1101 to 1104 can be connected by relay via the concentrator switch 4-3012, thus enabling the control signal to be transmitted and received, and share the transmission path, such as an optical fiber, used for the data signal.

FIG. 4-2 and FIG. 4-3 are diagrams showing the transmission and reception of a control signal associated with clock-time information between the clock time controlling unit 4-2602 located in the central management equipment 4-301 and the clock time controlling unit 4-2102 located in the network-node equipment control unit 4-1102, and the processing flow.

When controlling the wavelength tunable light sources 4-1304 to 1306 and the wavelength tunable filters 4-1404 to 1406, contained in the wavelength tunable transmitter and receiver unit 4-1106 located in the network-node equipment 4-2502, in a system in which control information is transmitted to and received from the central management, equipment 4-301 each time a wavelength is changed, in the case where the number of network-node equipments increases, the control information also increases at the same time, thus the load on the central management equipment 4-301 increases. Therefore, in the present fiber optic communication system, information regarding wavelength change and change time are transmitted to the network-node equipment control unit 4-1102 along with the control signal in advance as described later, and when it reaches the change time, the network-node equipment control unit 4-1102 changes the wavelengths of the wavelength tunable light sources 4-1304 to 1306 and the wavelength tunable filters 4-1404 to 1406 autonomously. When doing this, the system clock 4-2603 located in the central management equipment 4-301 and the system clock 4-2402 located in the network-node equipment control unit 4-1102 need to be synchronized. In the present fiber optic communication system, the construction is such that a clock time controlling unit 4-2602 located in the central management equipment 4-301 is used as a clock-time distributing server, and a clock time controlling unit 4-2102 located in the network-node equipment control unit 4-1102 is used as a clock-time synchronizing client.

Firstly, the clock time controlling unit 4-2602 located in the central management. section 4-301 obtains the time from the system clock 4-2603 (4-3001, 3001s). The clock time controlling unit 4-2102 located in the network-node equipment control unit 4-1102 transmits clock-time query signals (4-3002a, 3004a and 3006a) to the clock time controlling unit 4-2602 located in the central management equipment 4-301 along with the above-described control signal, and on receiving them the clock time controlling unit 4-2602 transmits the clock-time information signals (4-3002a, 3004a and 3006a) to the clock time controlling unit 4-2102. The clock time controlling unit 4-2102 transmits clock-time query signals to the clock time controlling unit 4-2602 at random, and receives information of clock time (4-3002b, 3004b and 3006b, 4-3002s, 3004s and 3006s) in reply, thus avoiding a concentration of clock-time queuing which reduces the processing load on the central management equipment 4-301.

Clock-time is supplied to the system clock 4-2402 based on the information of clock time received by the clock time controlling unit 4-2102, and as a result, the clock times of the system clock 4-2603 located in the central management equipment 4-301 and the system clock 4-2402 located in the network-node equipment control unit 4-1102 are synchronized. Here, the present embodiment describes the clock time controlling unit 4-2602 located in the central management equipment 4-301 as a clock-time distributing server, and the clock time controlling unit 4-2102 located in the network-node equipment control unit 4-1102 as a clock-time querying and receiving client. However, the clock time controlling unit 4-2602 is not necessarily the clock-time distributing server, and either one of the clock time controlling unit 4-2602 and the clock time controlling unit 4-2102 may be the clock-time distributing server. Furthermore, it is possible to use network time protocol (NTP) for the control signal containing the clock-time control information. However, this is not limiting, and simple network time protocol (SNTP) or a unique clock-time control signal may also be used.

Figures 1, 2, 3, 4, 5:
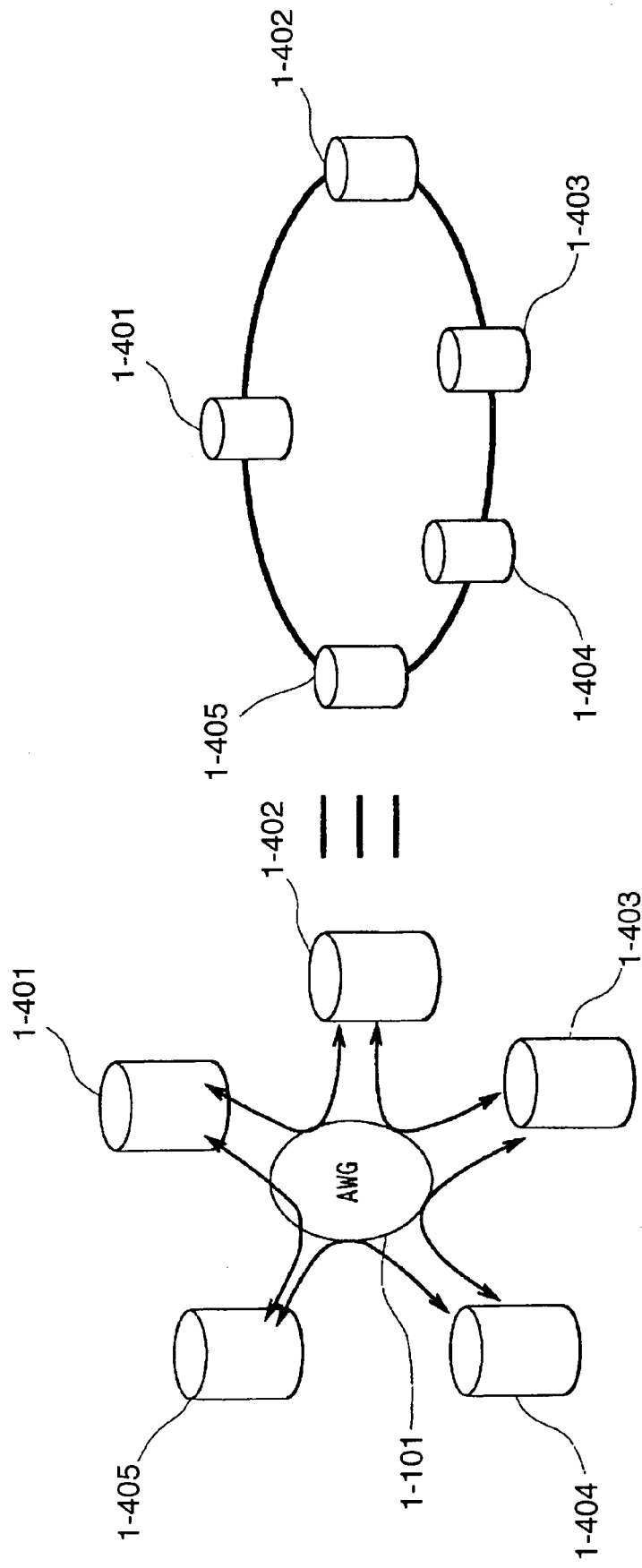
Figures 1, 2, 3, 4, 5, 6, 7, 8, 9:
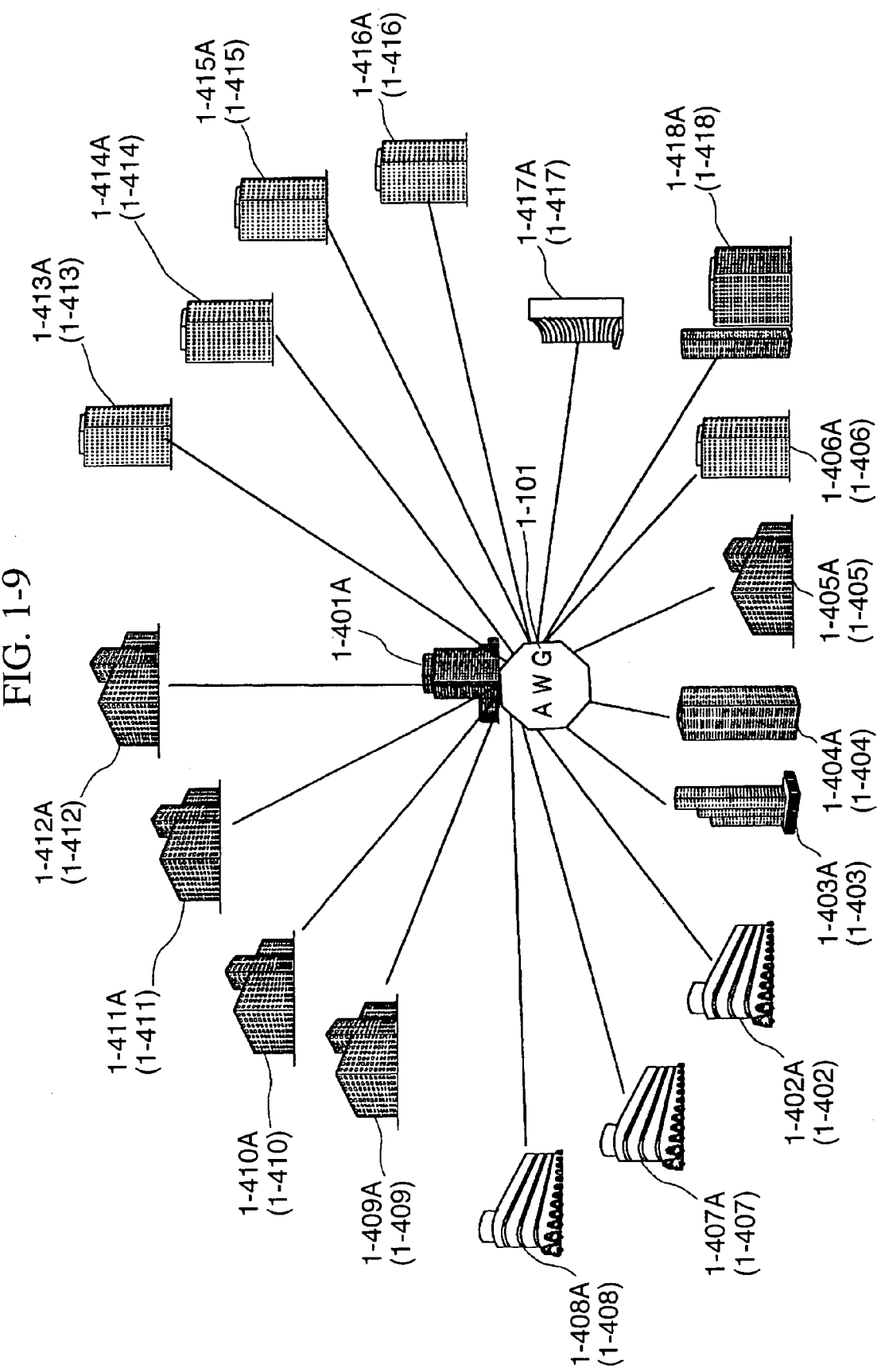
Figures 1, 2, 3, 4, 5, 6, 7, 8, 9, 10:
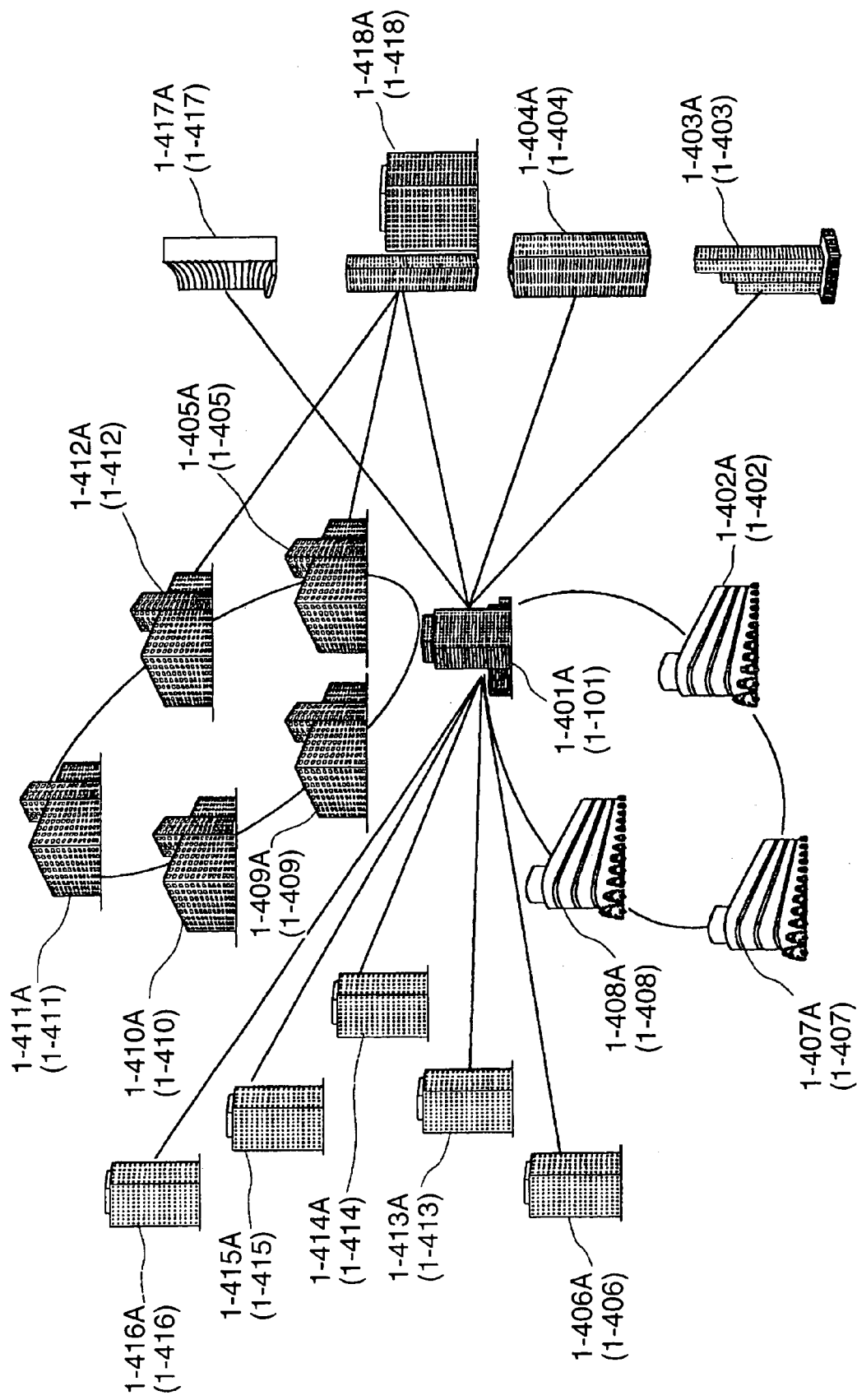
Figures 1, 2, 3, 4, 5, 6, 7, 8, 9, 10, 11:
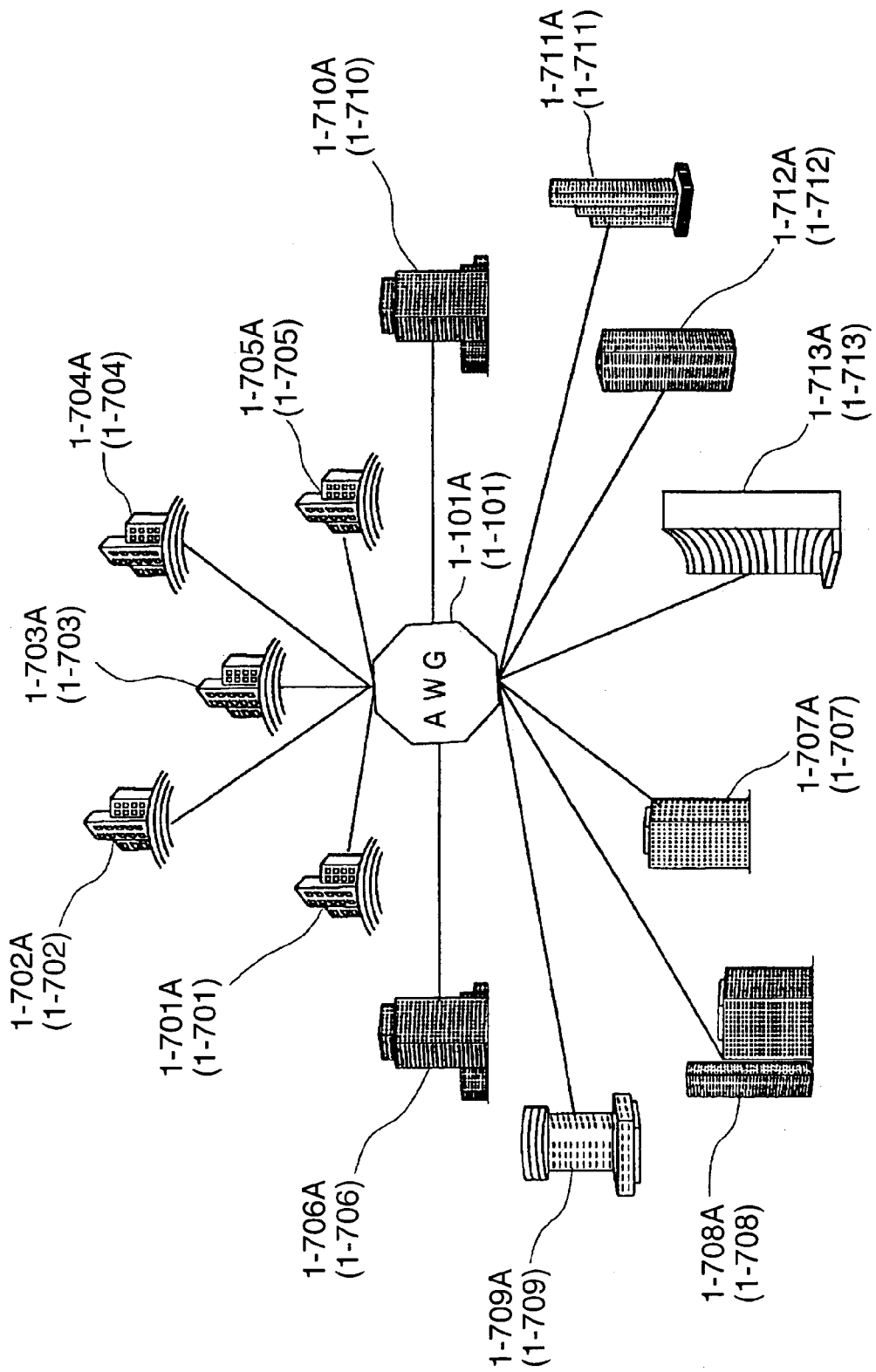
Figures 1, 2, 3, 4, 5, 6, 7, 8, 9, 10, 11, 12:
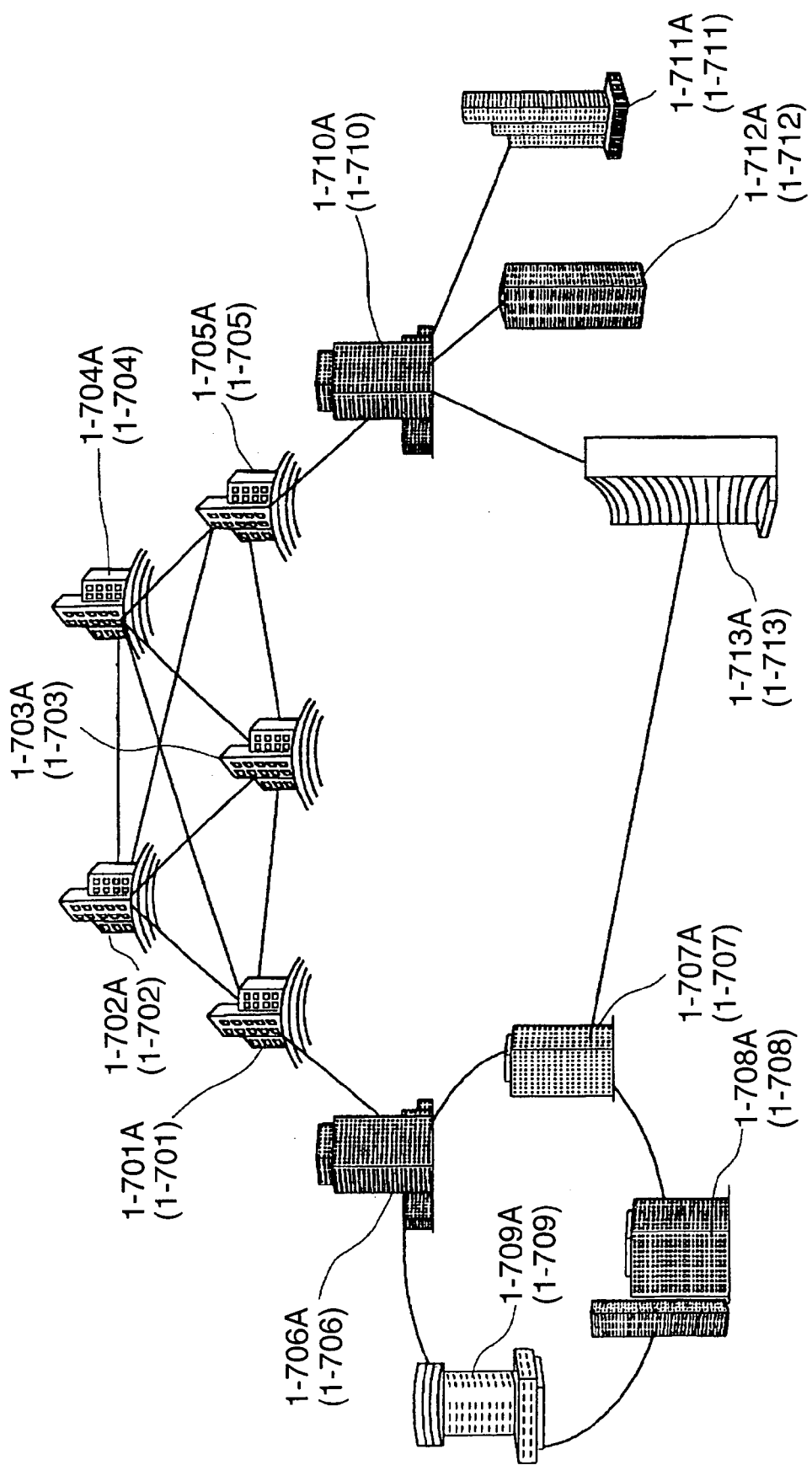
Figures 1, 2, 3, 4, 5, 6, 7, 8, 9, 10, 11, 12, 13:
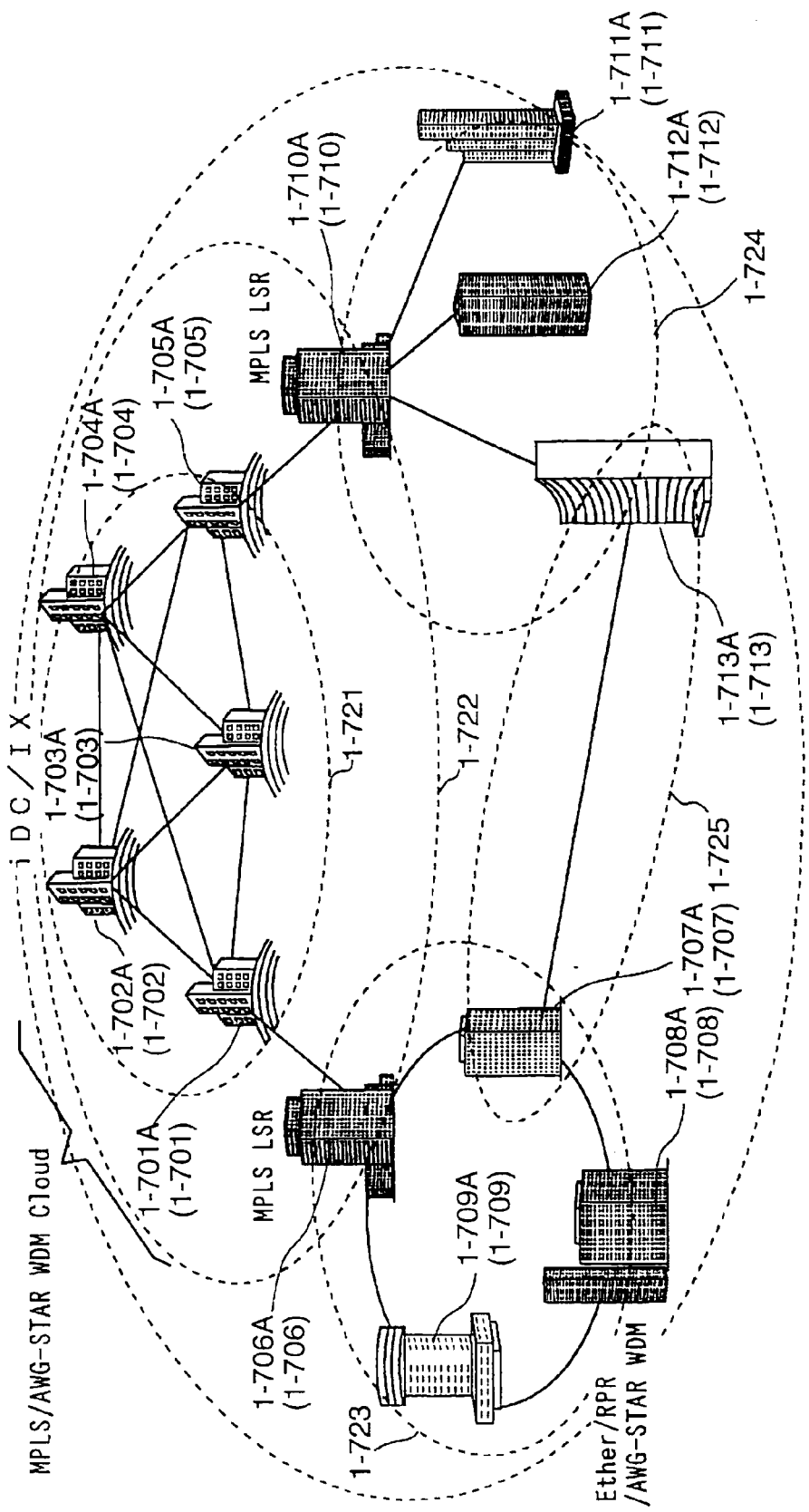
Figures 1, 2, 3, 4, 5, 6, 7, 8, 9, 10, 11, 12, 13, 14, 15:
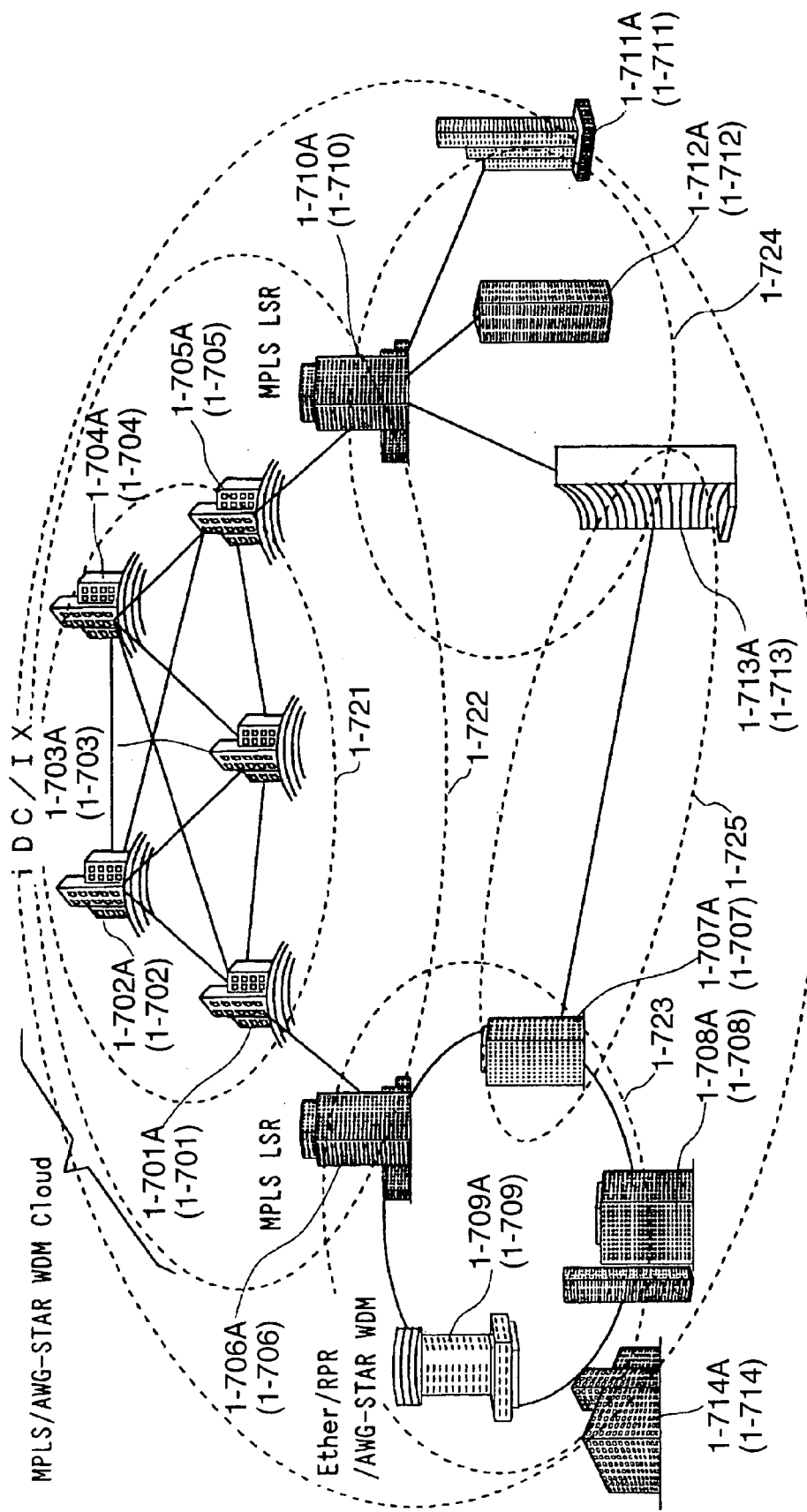
Figures 1, 2, 3, 4, 5, 6, 7, 8, 9, 10, 11, 12, 13, 14, 15, 16, 17:
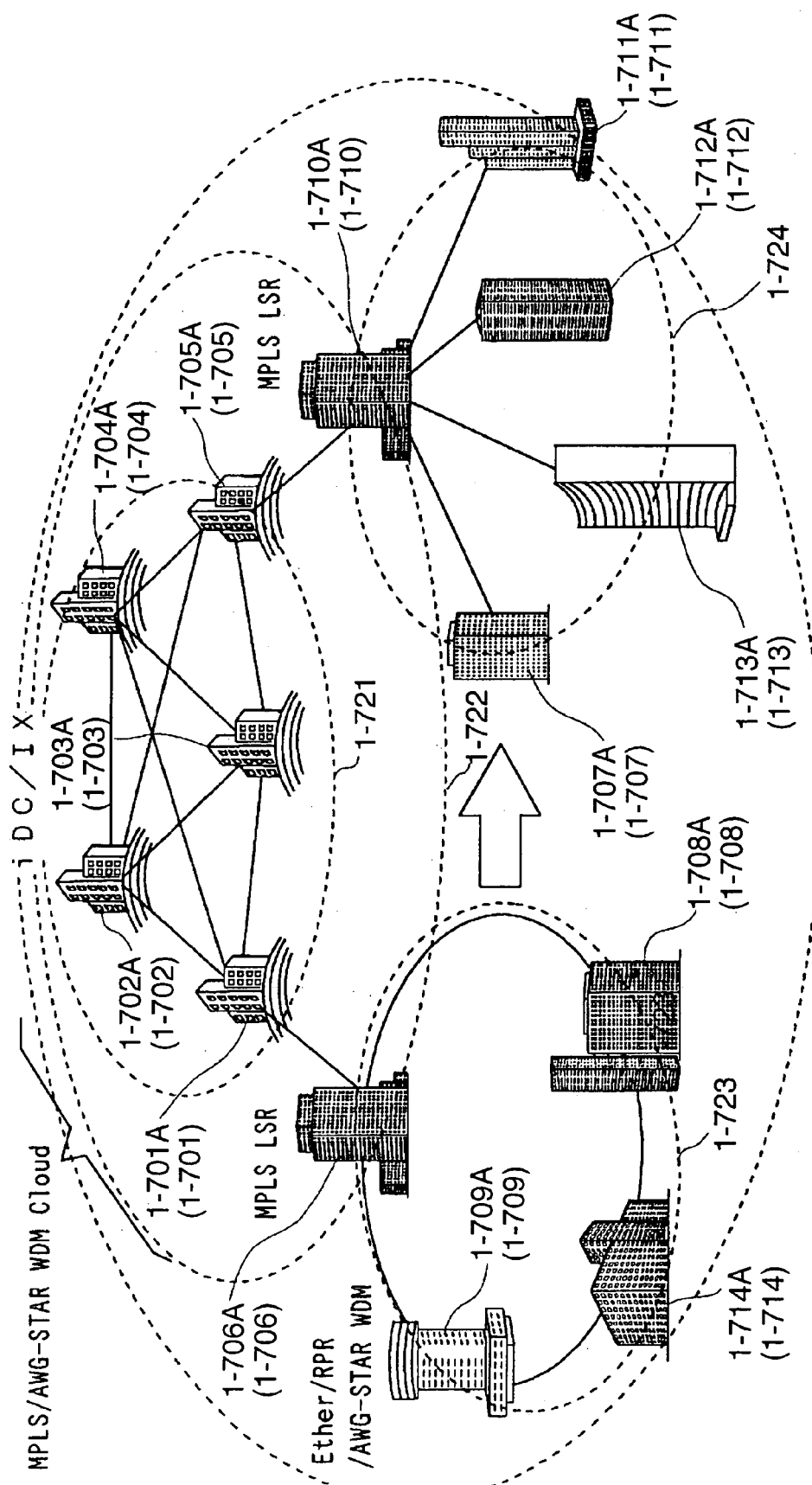
Figures 1, 2, 3, 4, 5, 6, 7, 8, 9, 10, 11, 12, 13, 14, 15, 16, 17, 18, 19:
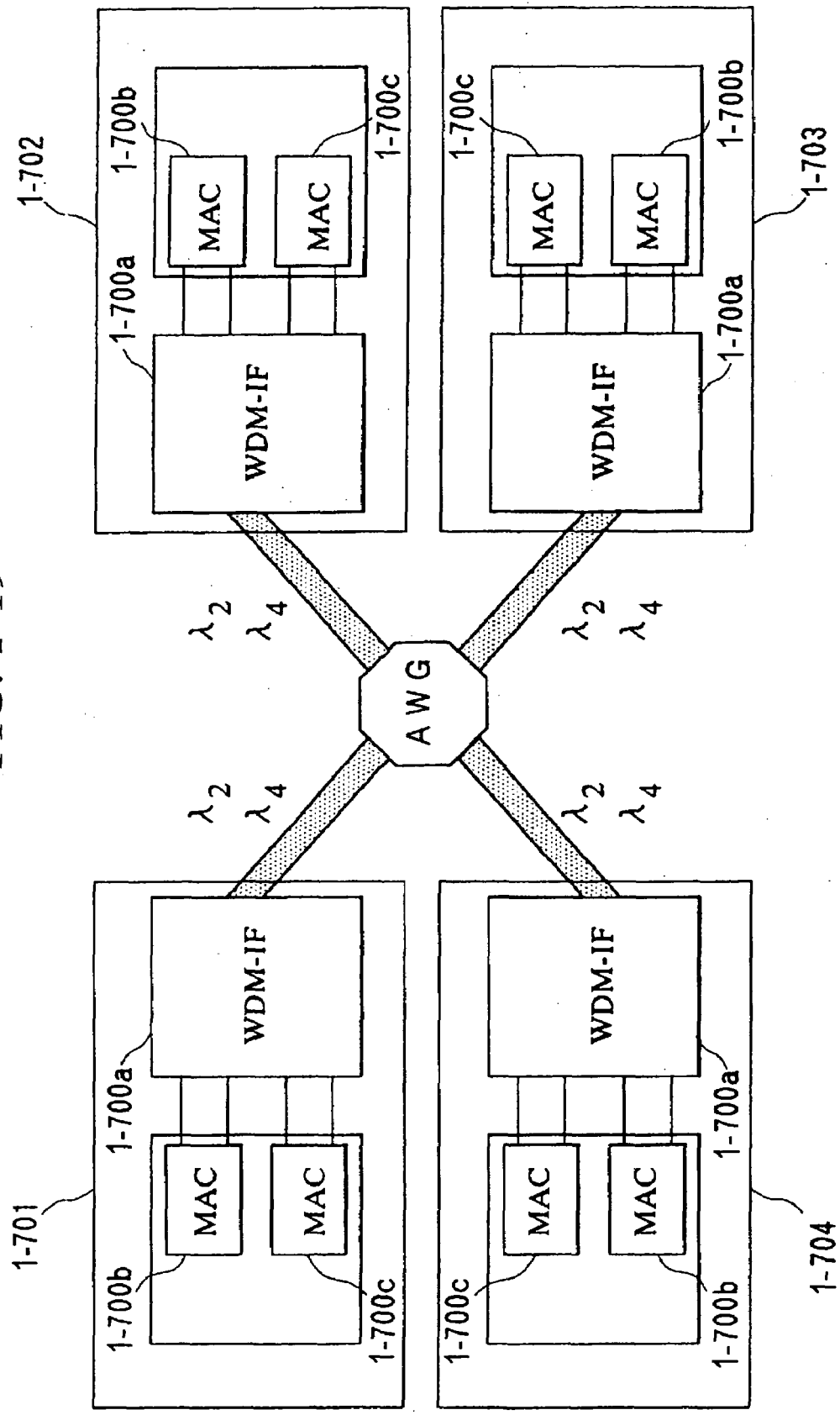
Figures 1, 2, 3, 4, 5, 6, 7, 8, 9, 10, 11, 12, 13, 14, 15, 16, 17, 18, 19, 20:
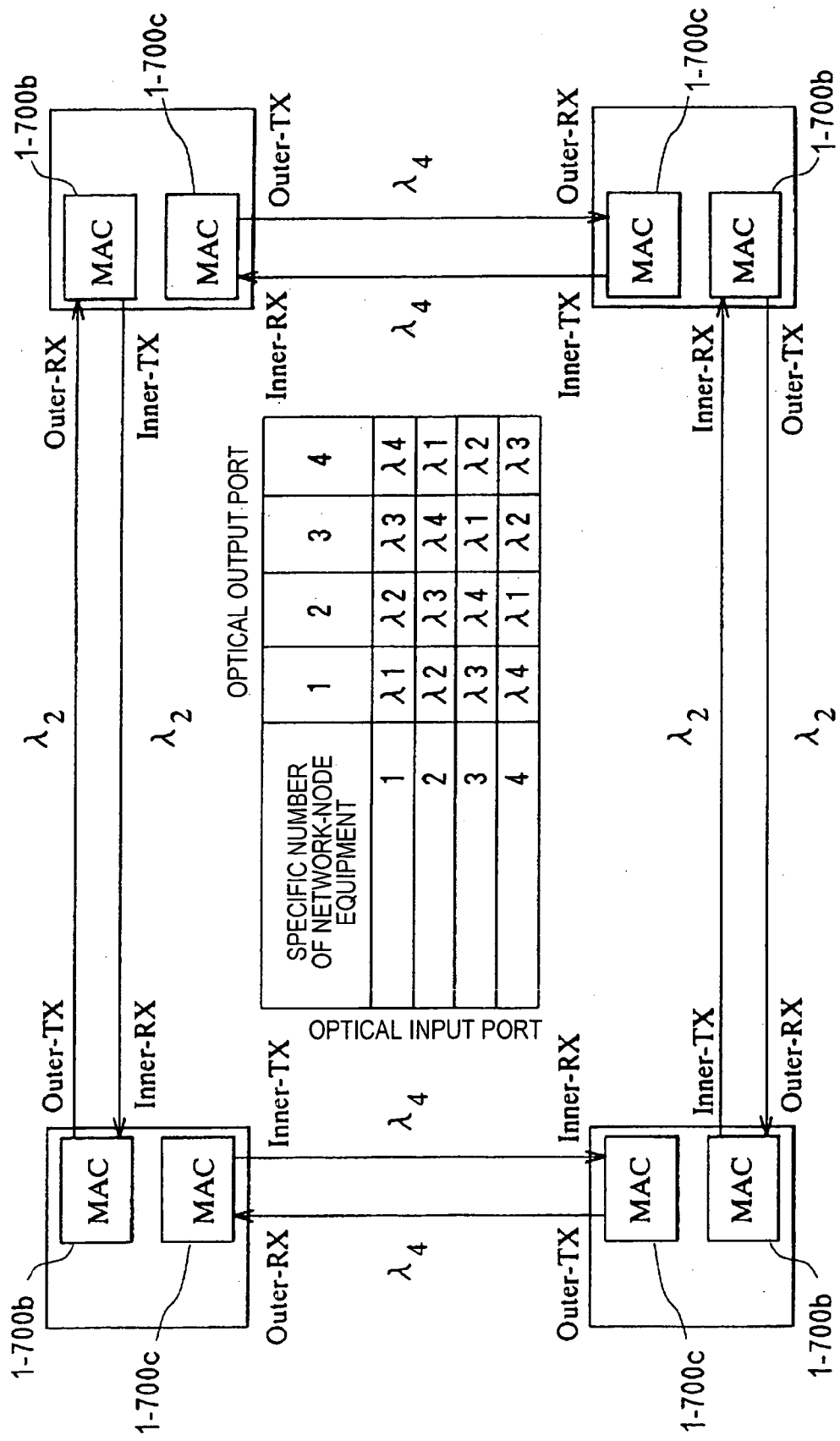
Figures 1, 2, 3, 4, 5, 6, 7, 8, 9, 10, 11, 12, 13, 14, 15, 16, 17, 18, 19, 20, 21:
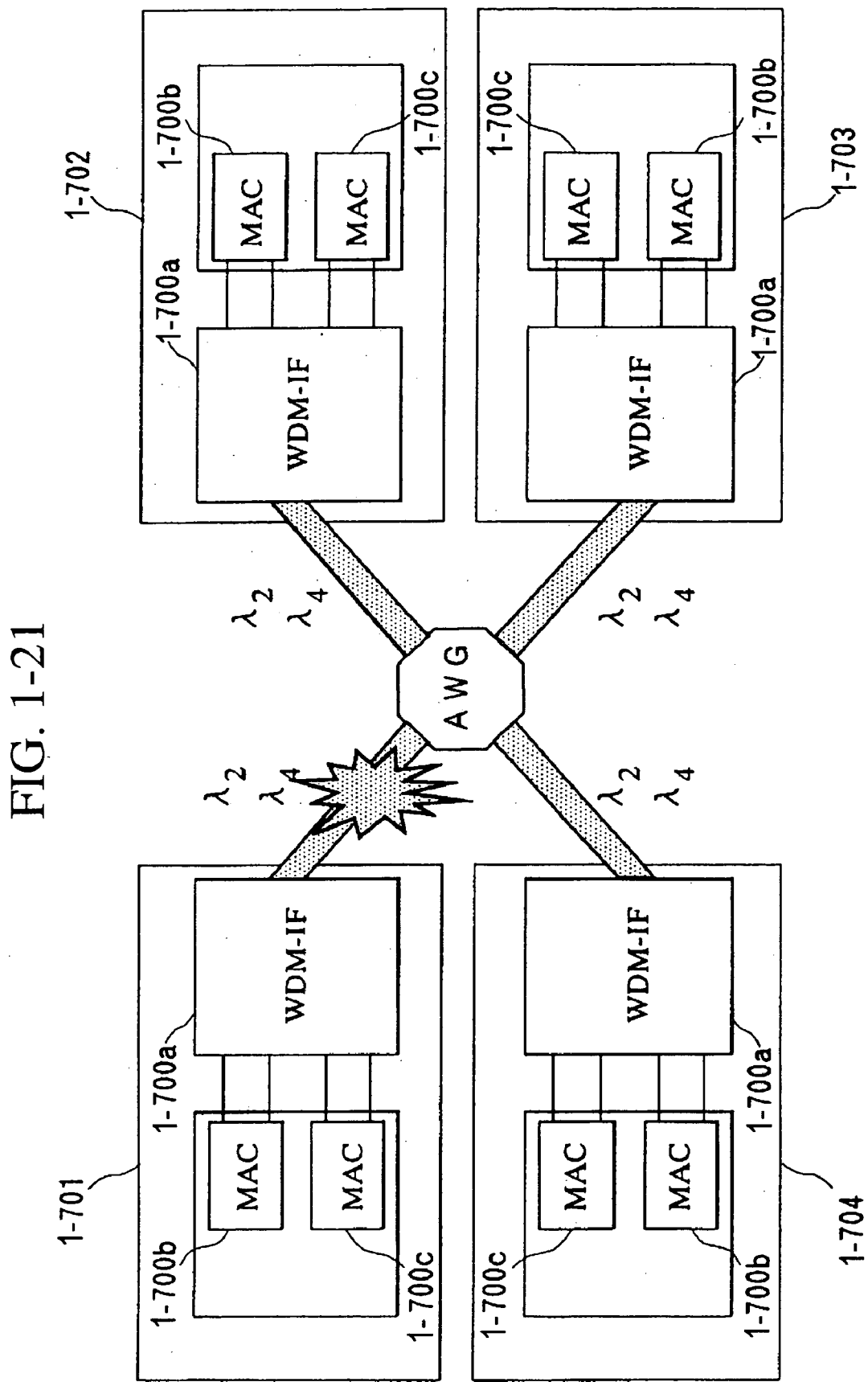
Figures 1, 2, 3, 4, 5, 6, 7, 8, 9, 10, 11, 12, 13, 14, 15, 16, 17, 18, 19, 20, 21, 22:
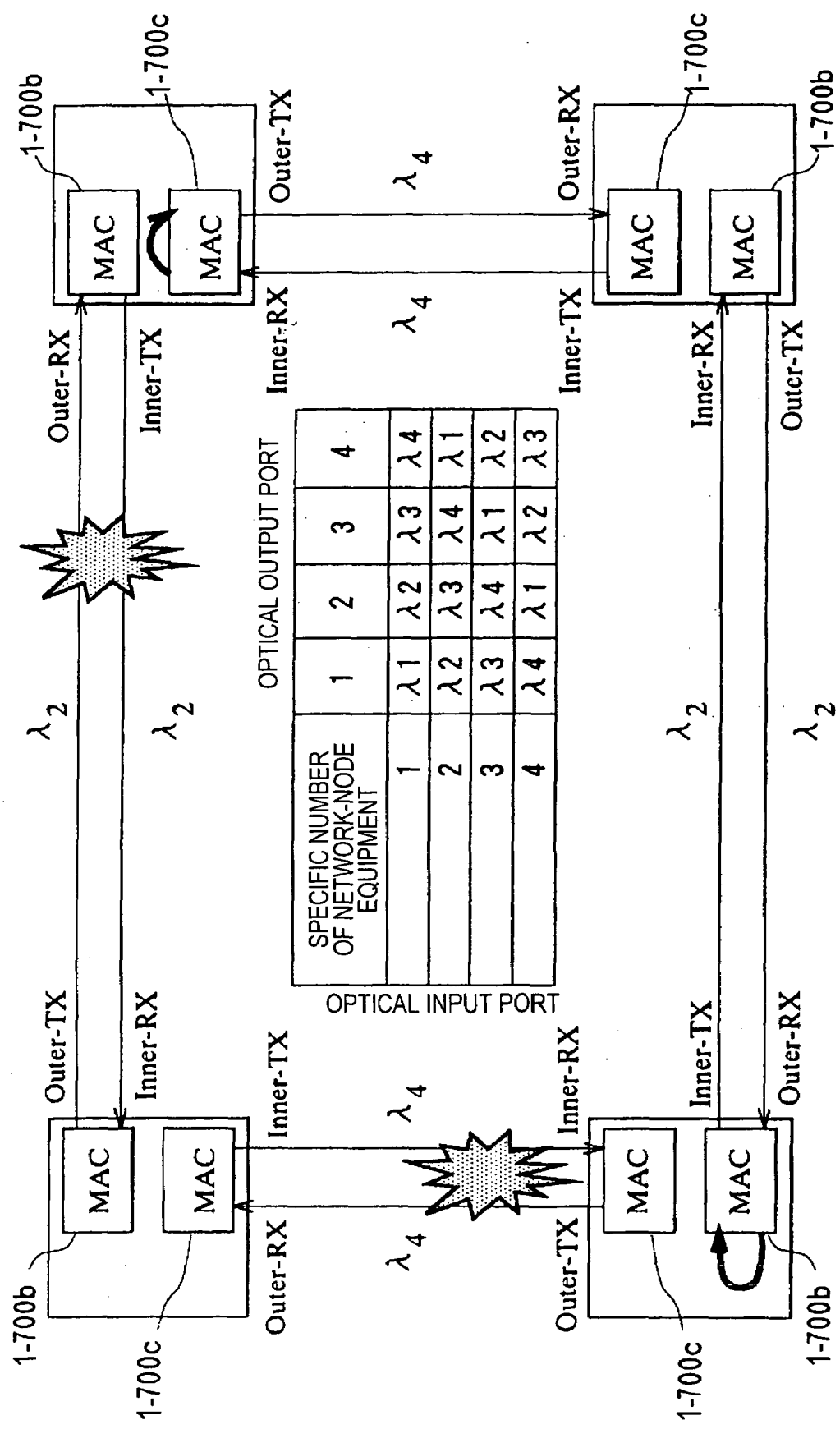
Figures 1, 2, 3, 4, 5, 6, 7, 8, 9, 10, 11, 12, 13, 14, 15, 16, 17, 18, 19, 20, 21, 22, 23:
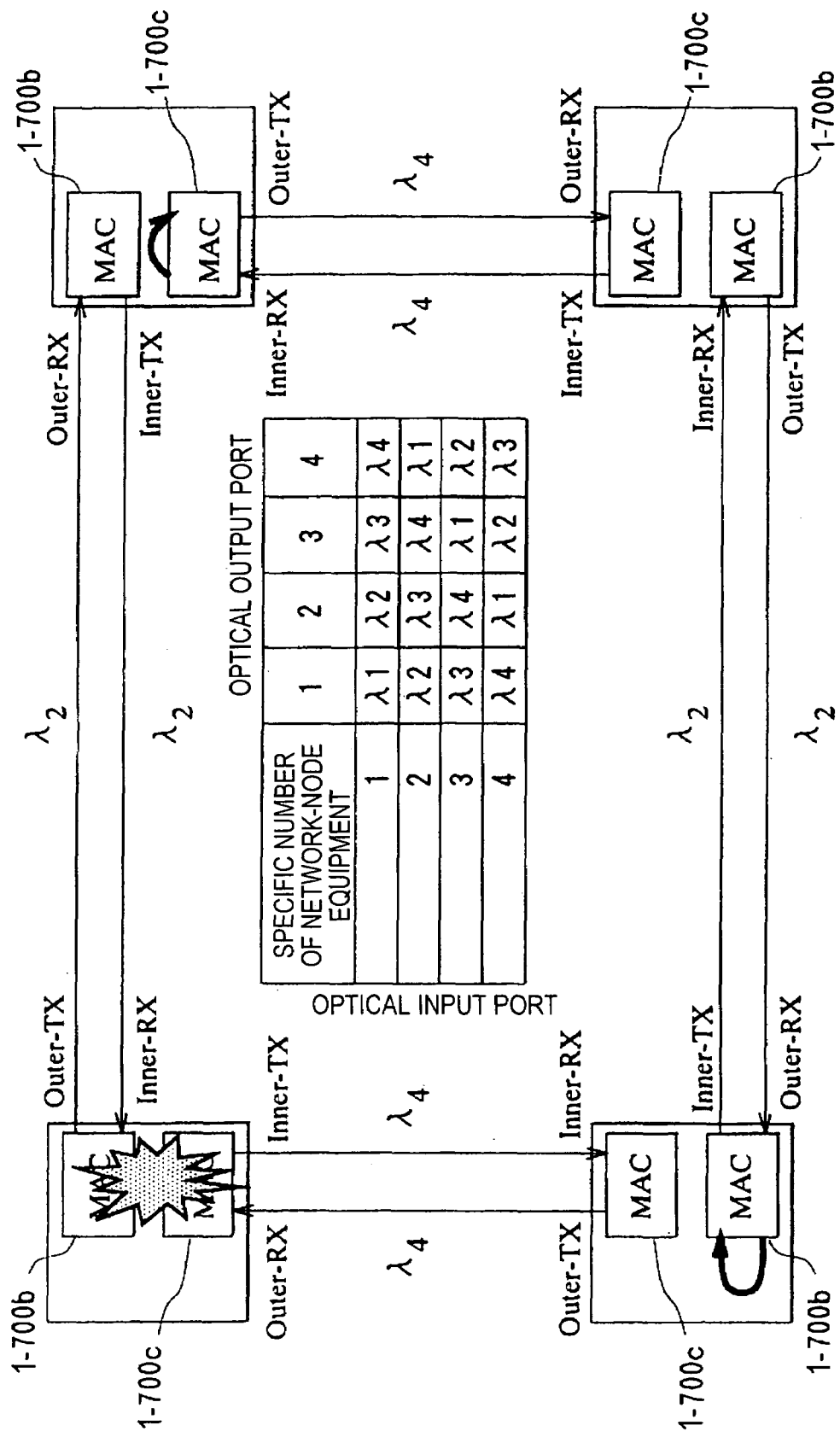
Figures 1, 2, 3, 4, 5, 6, 7, 8, 9, 10, 11, 12, 13, 14, 15, 16, 17, 18, 19, 20, 21, 22, 23, 24:
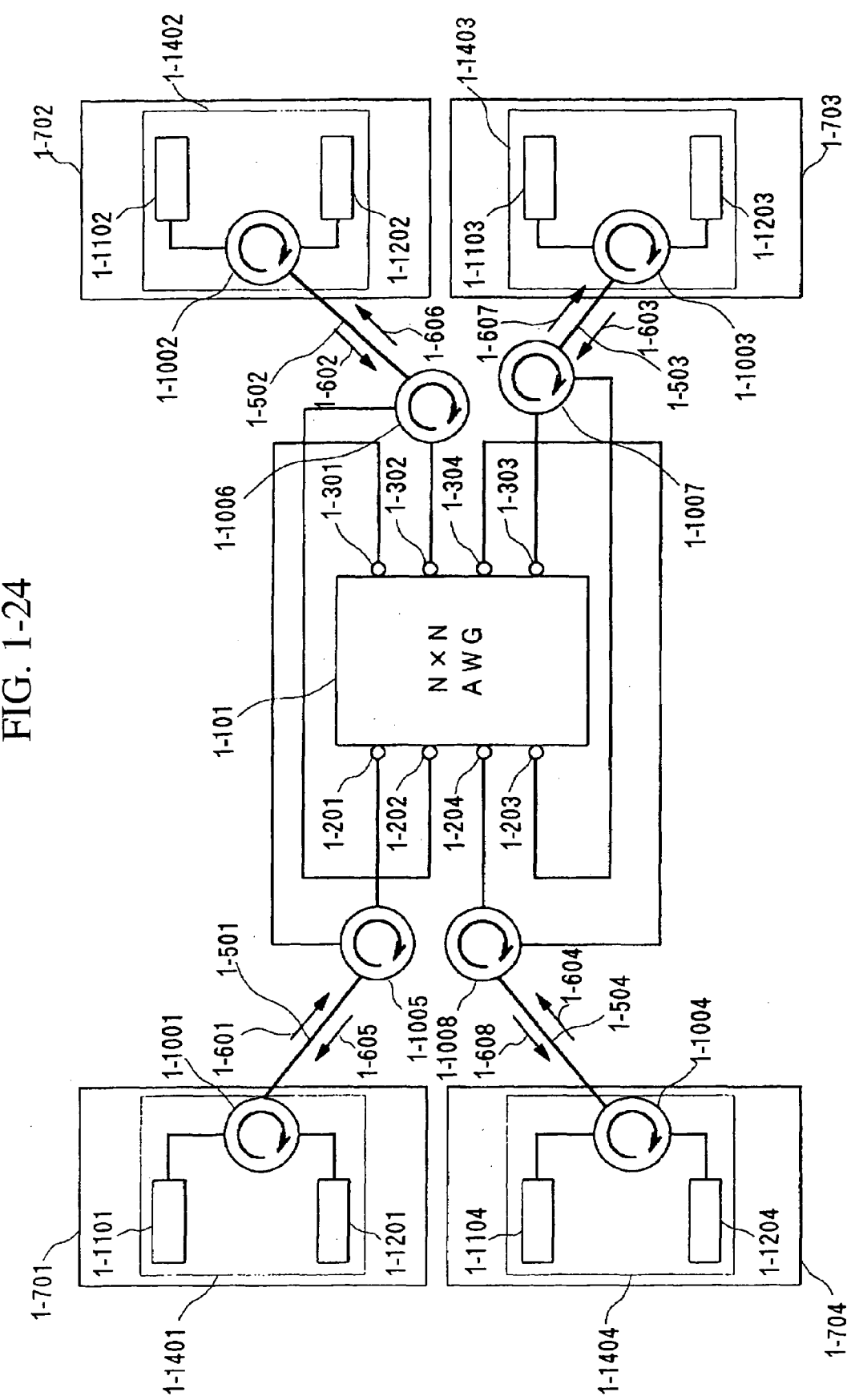
Figures 1, 2, 3, 4, 5, 6, 7, 8, 9, 10, 11, 12, 13, 14, 15, 16, 17, 18, 19, 20, 21, 22, 23, 24, 25, 26:
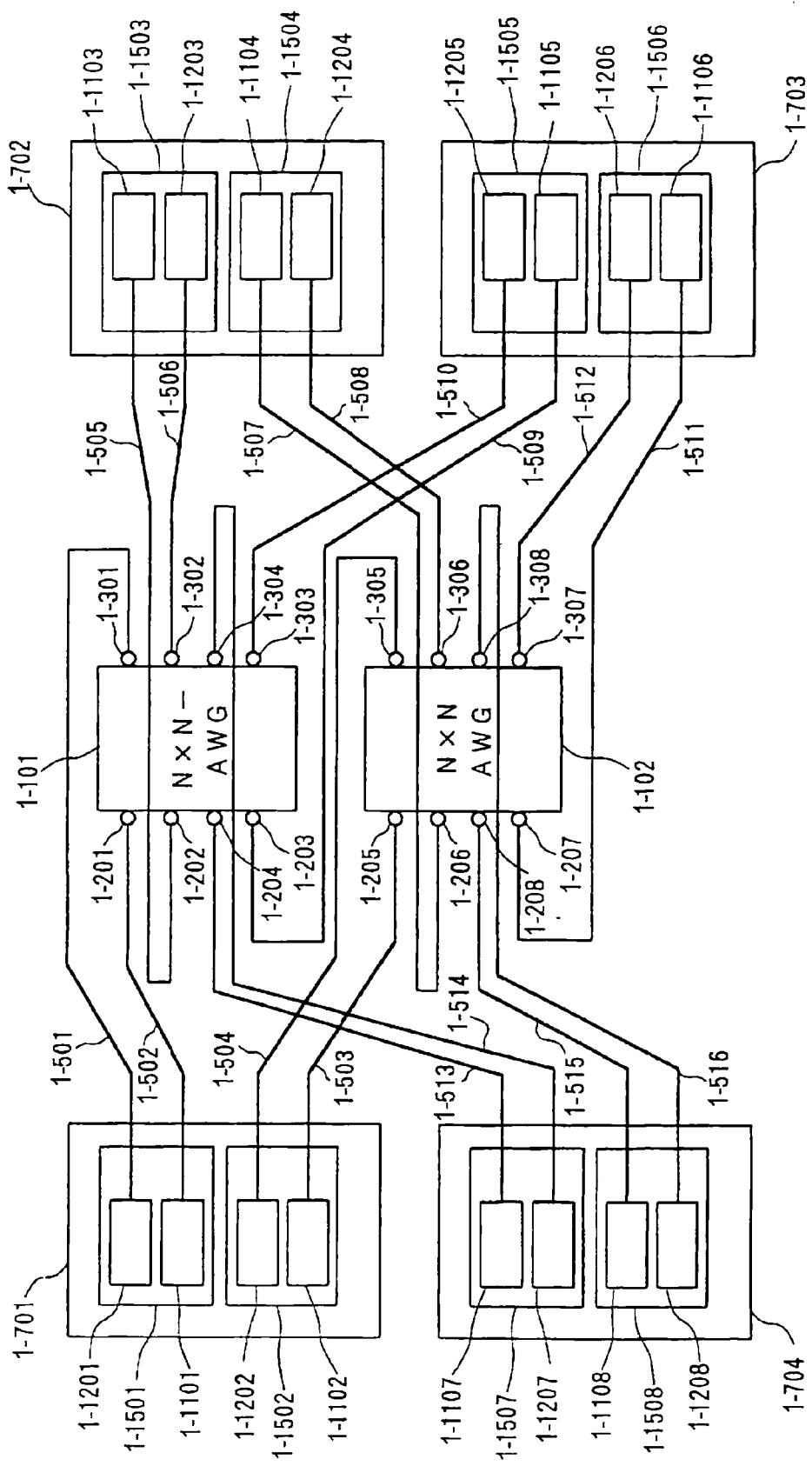
Figures 1, 2, 3, 4, 5, 6, 7, 8, 9, 10, 11, 12, 13, 14, 15, 16, 17, 18, 19, 20, 21, 22, 23, 24, 25, 26, 27:
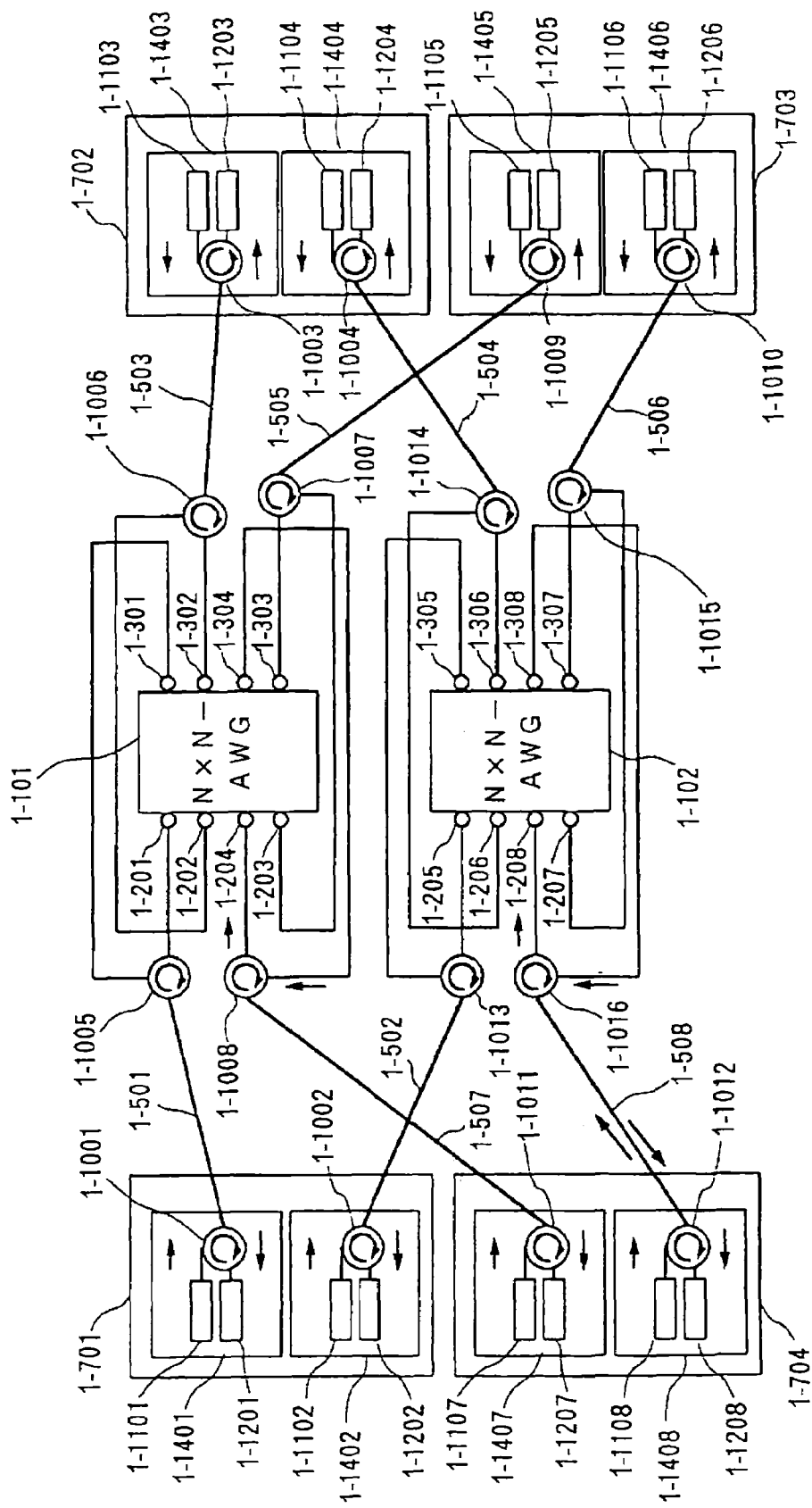
Figures 1, 2, 3, 4, 5, 6, 7, 8, 9, 10, 11, 12, 13, 14, 15, 16, 17, 18, 19, 20, 21, 22, 23, 24, 25, 26, 27, 28:
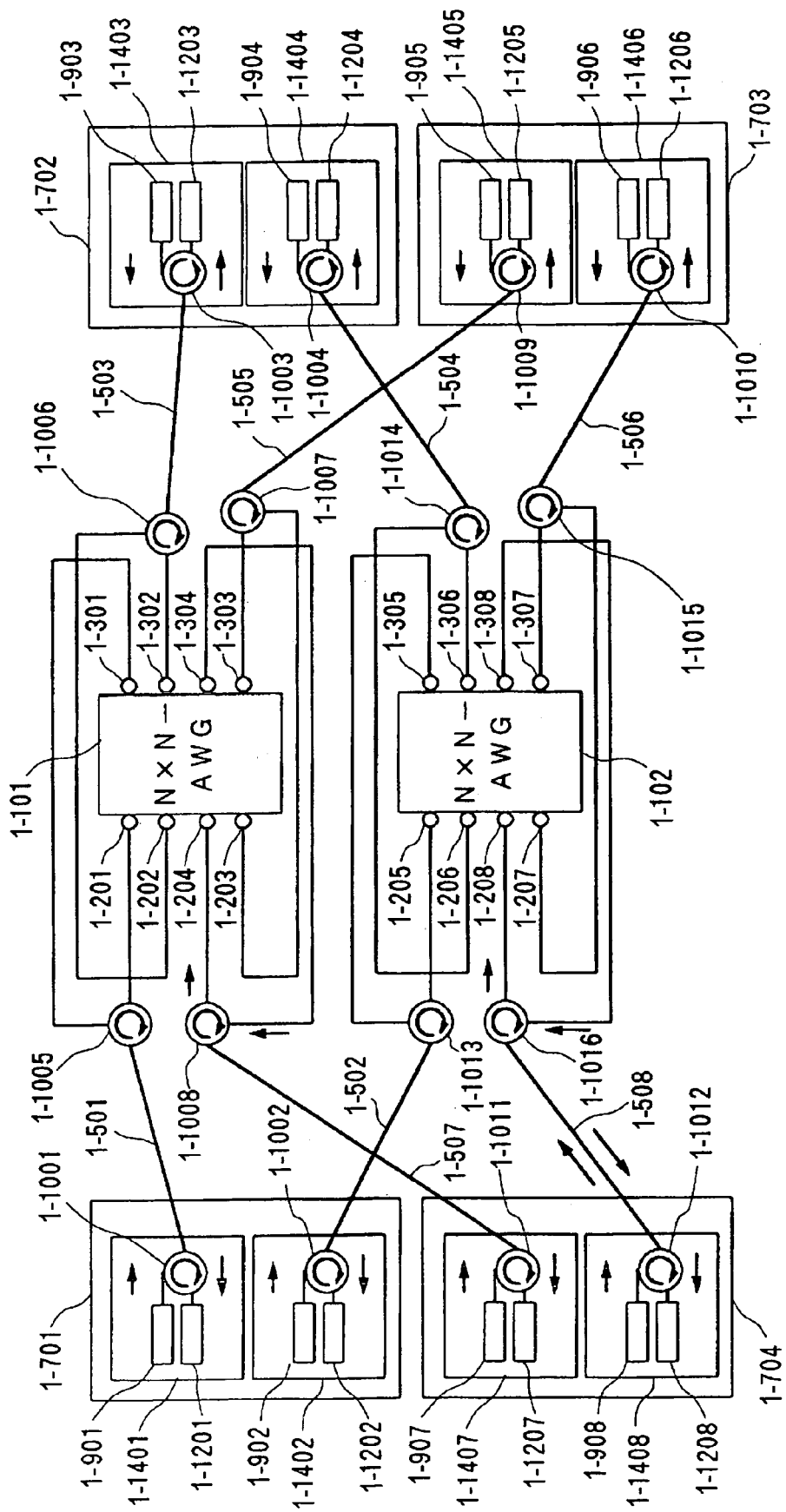
Figures 1, 2, 3, 4, 5, 6, 7, 8, 9, 10, 11, 12, 13, 14, 15, 16, 17, 18, 19, 20, 21, 22, 23, 24, 25, 26, 27, 28, 29:
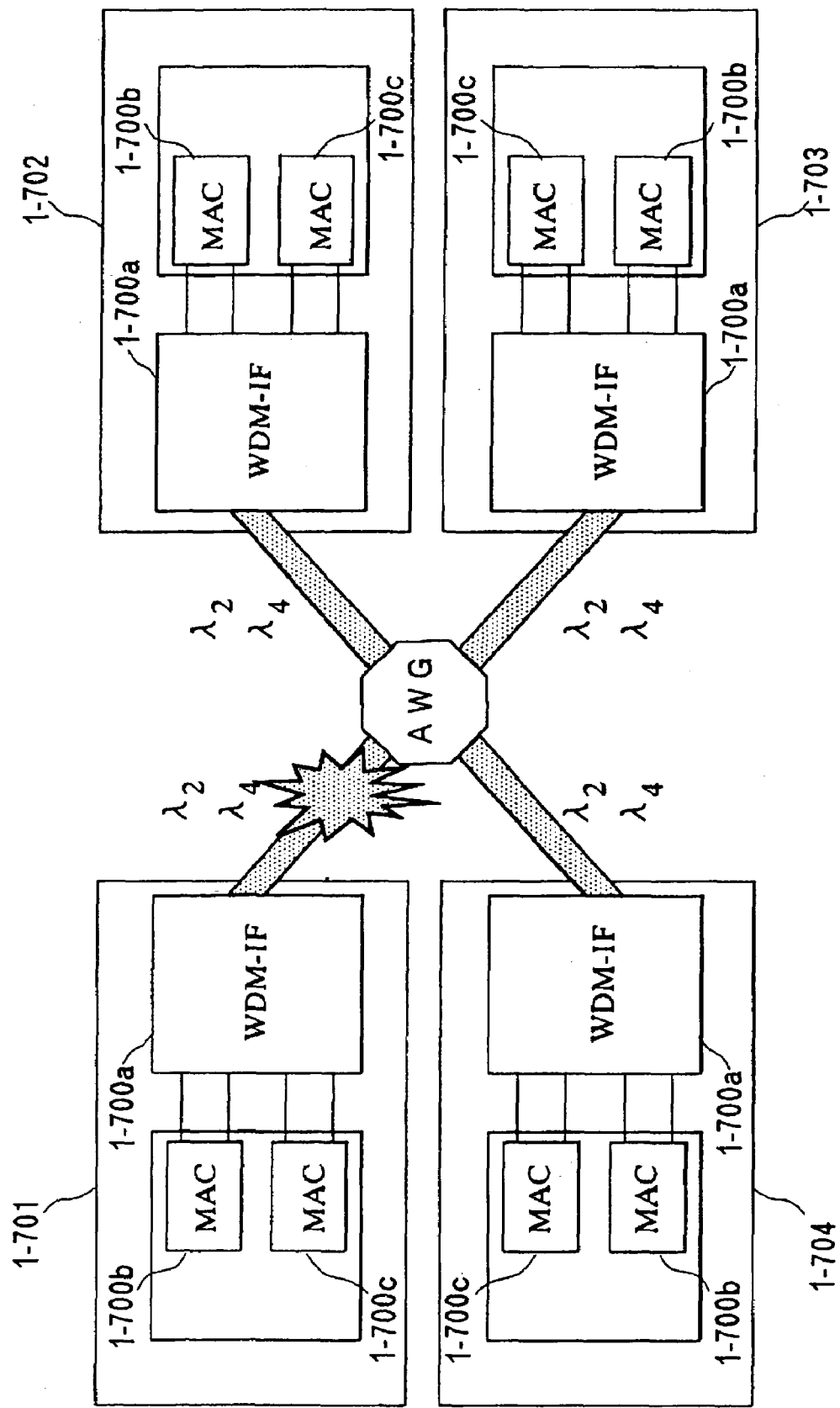
Figures 1, 2, 3, 4, 5, 6, 7, 8, 9, 10, 11, 12, 13, 14, 15, 16, 17, 18, 19, 20, 21, 22, 23, 24, 25, 26, 27, 28, 29, 30:
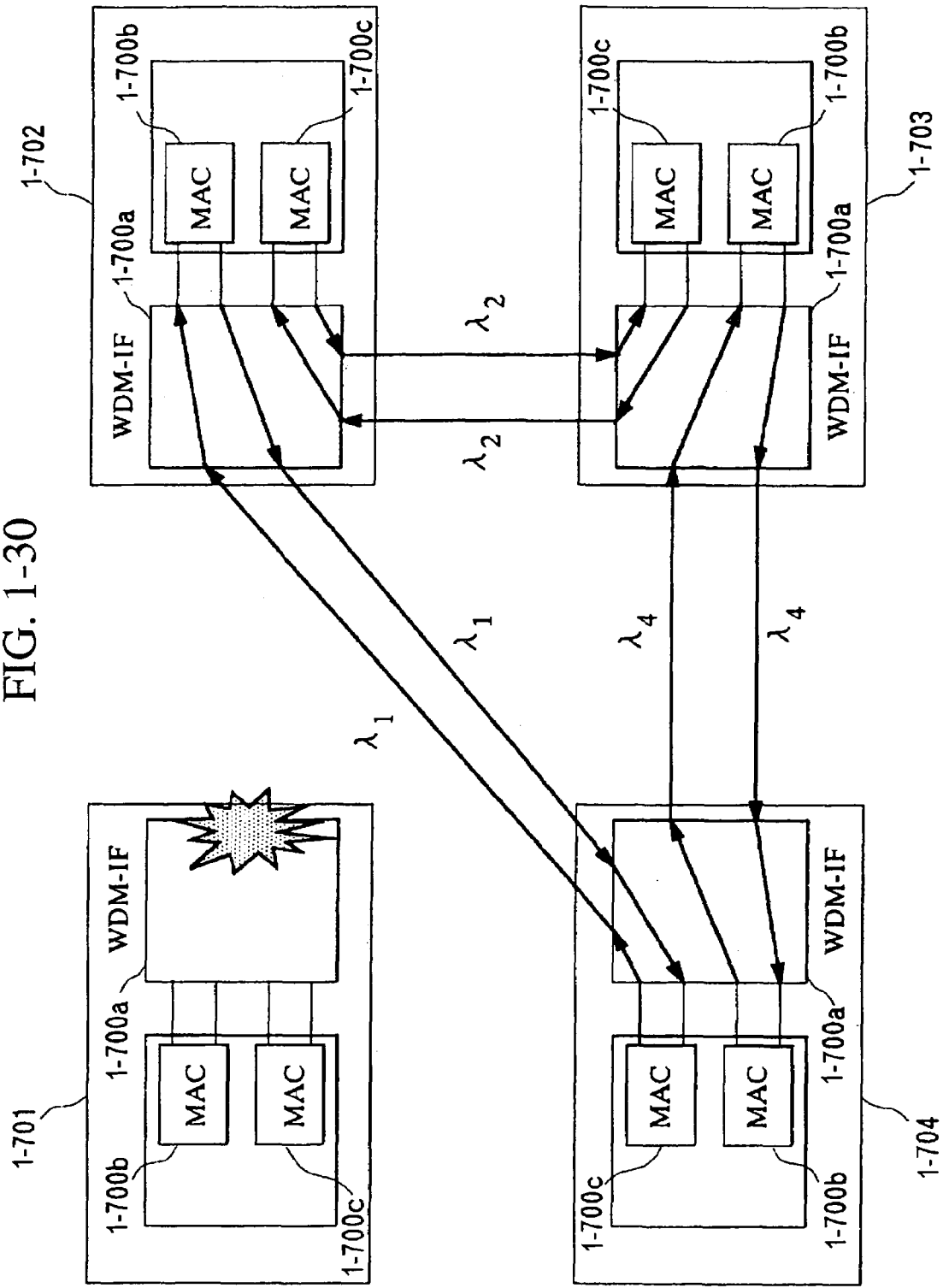
Figures 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31:
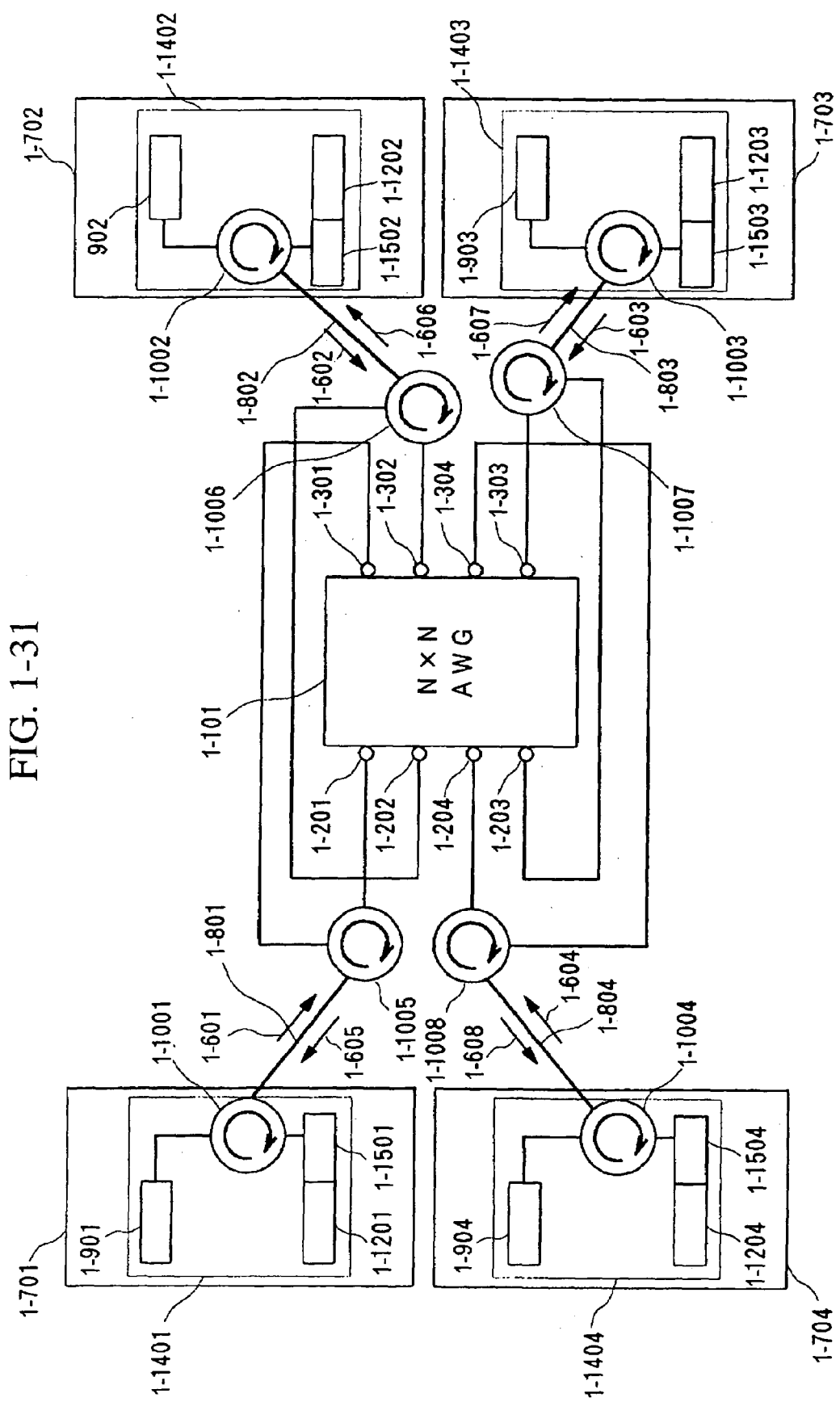
Figures 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32:
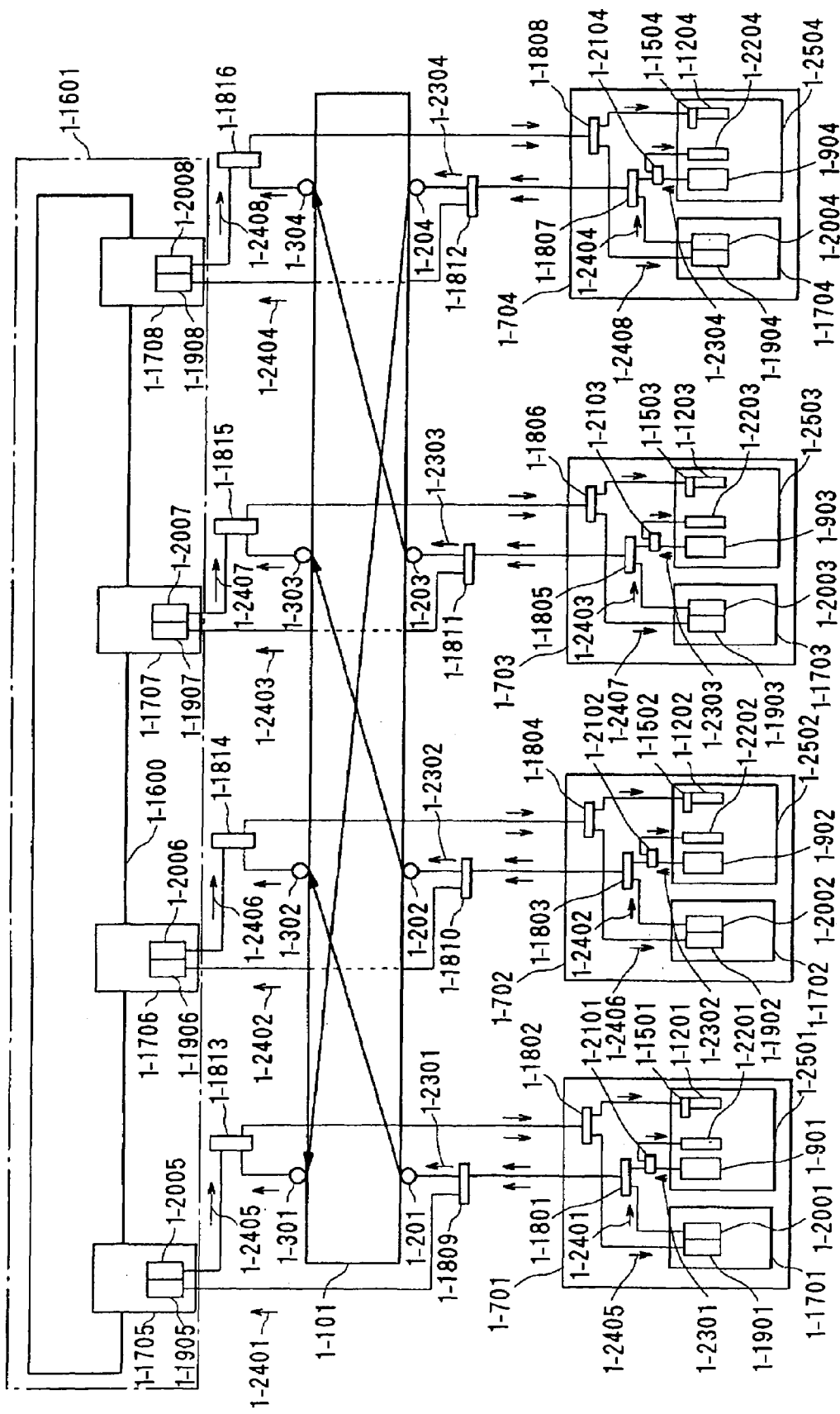
Figures 1, 2:
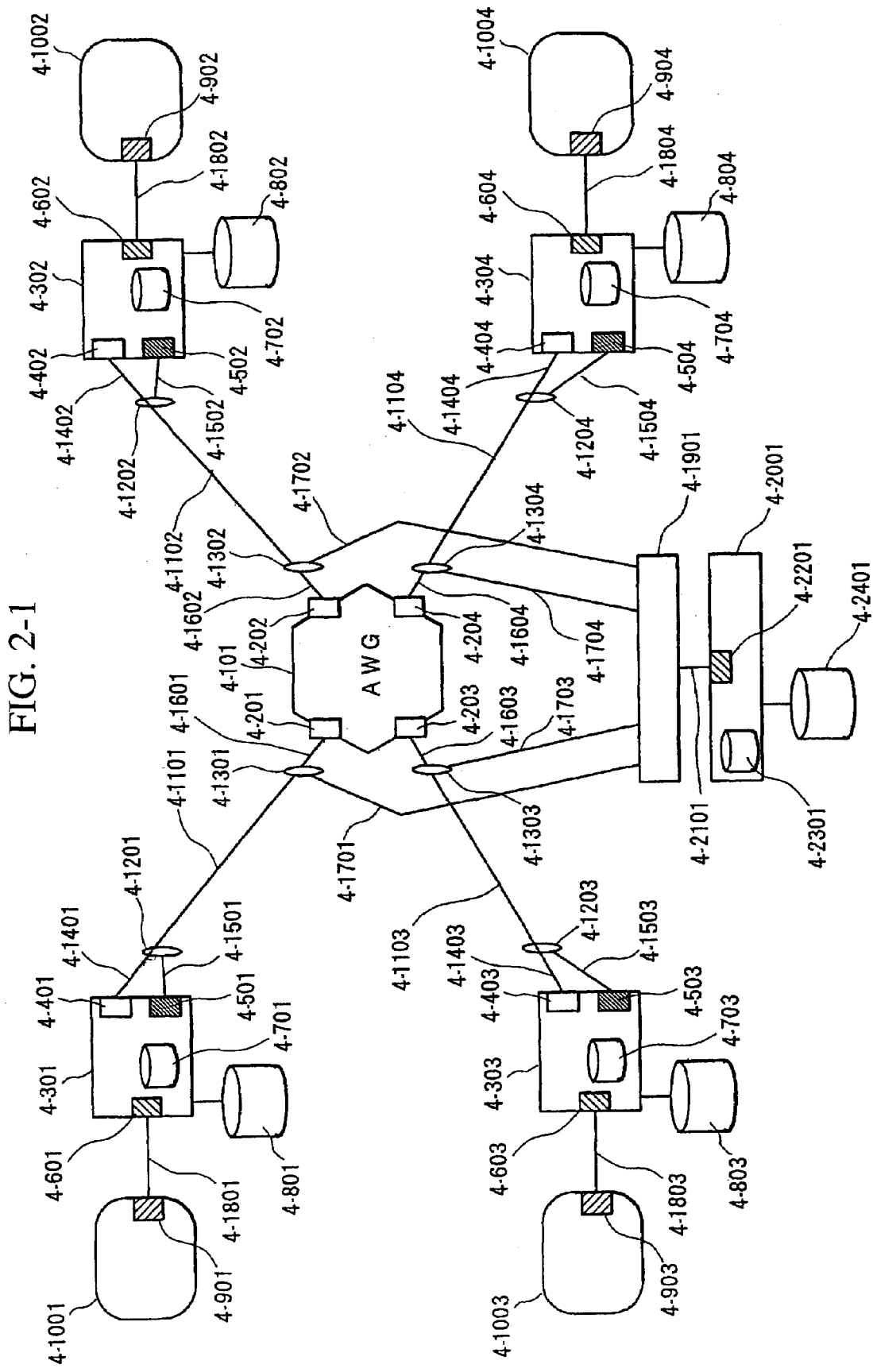
Figure 2:
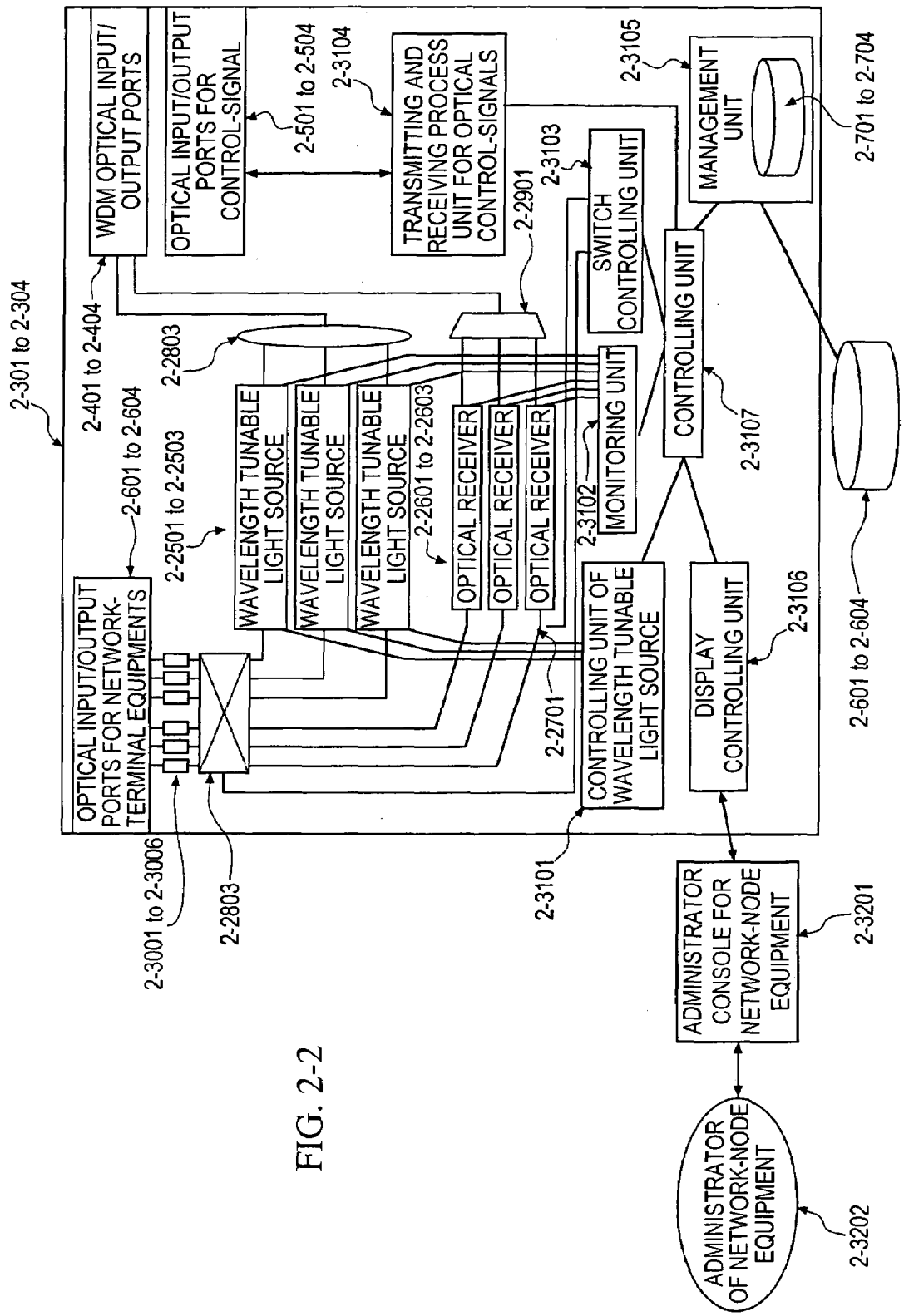
Figures 2, 3:
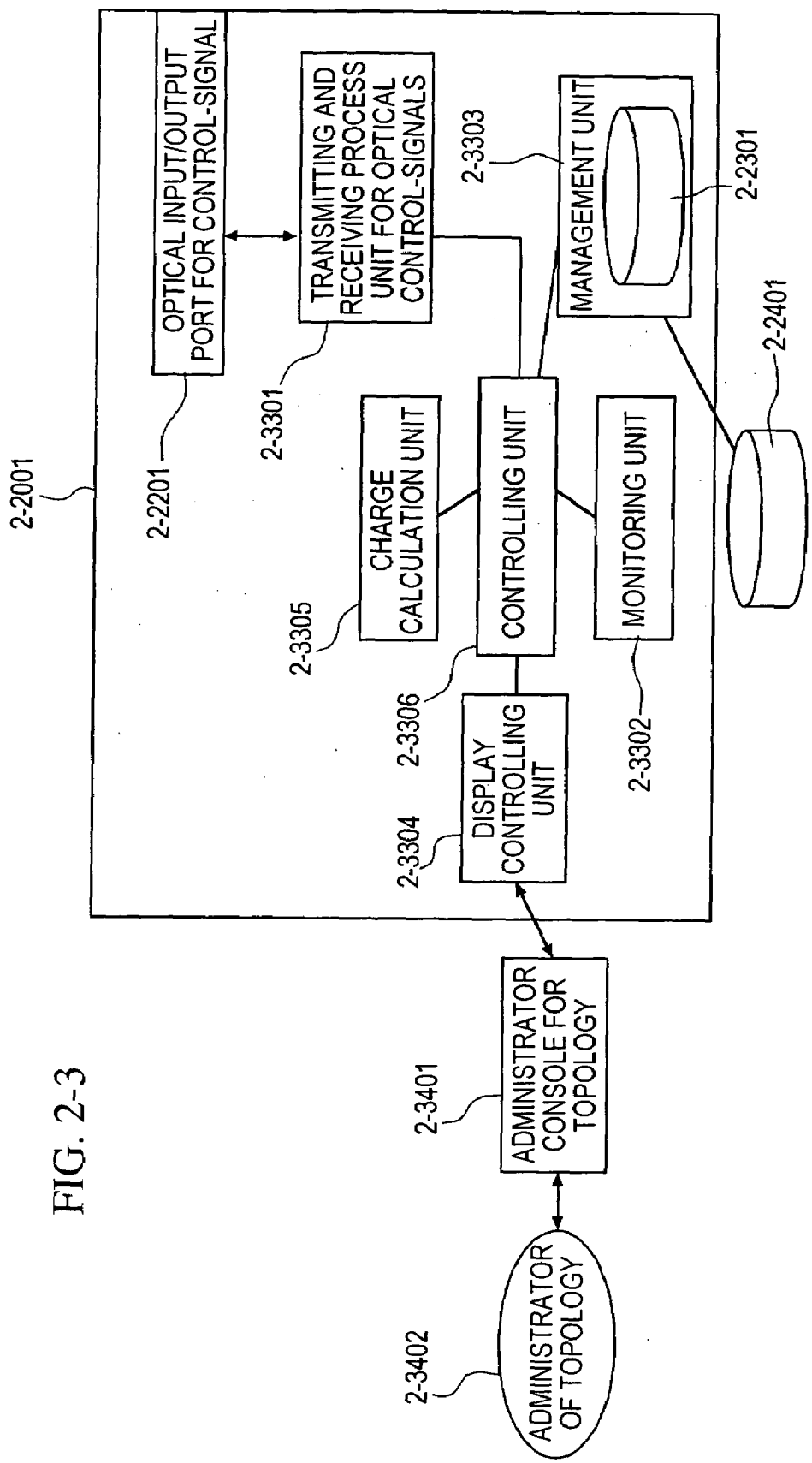
Figures 2, 3, 4, 5, 6, 7:
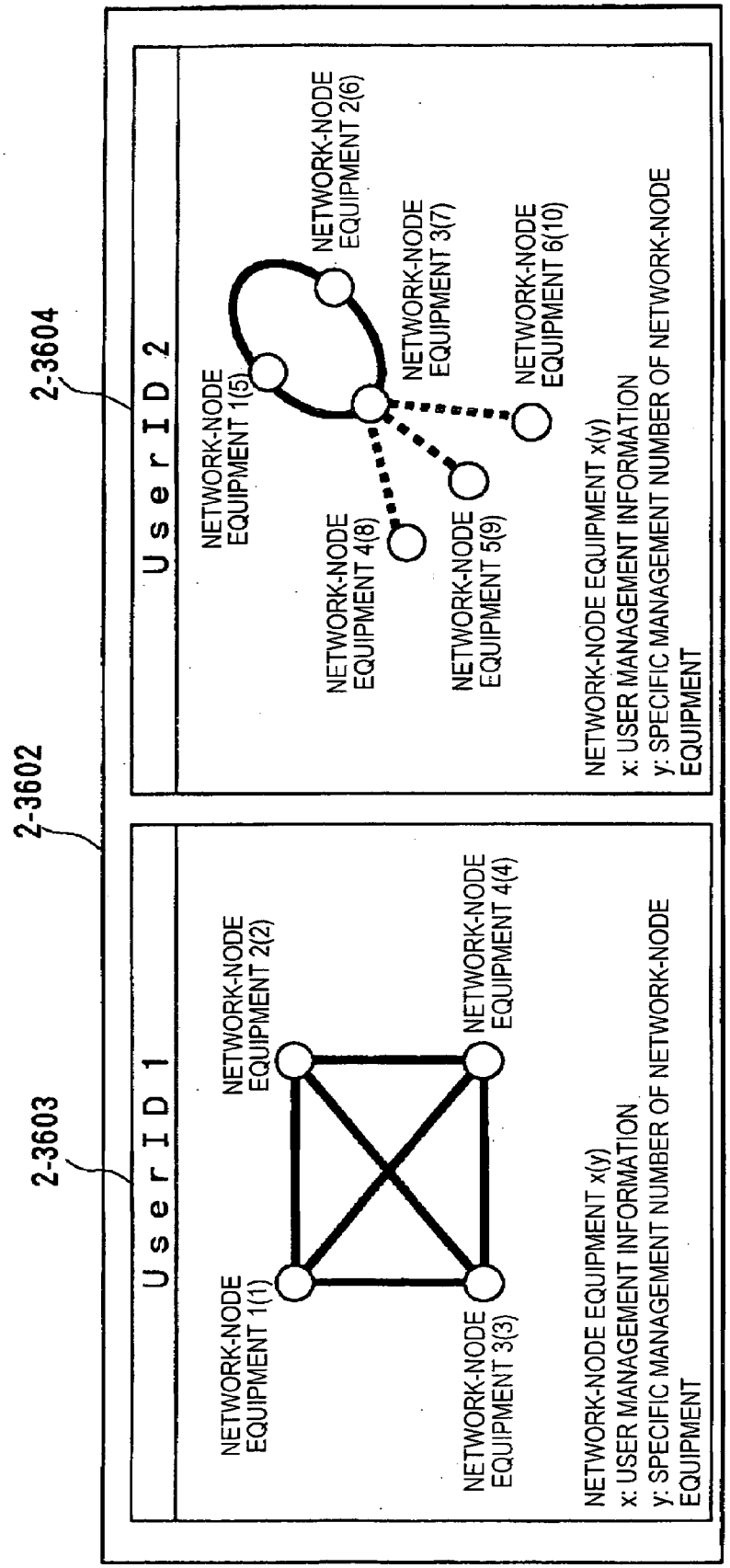
Figures 2, 3, 4, 5, 6, 7, 8, 9, 10:
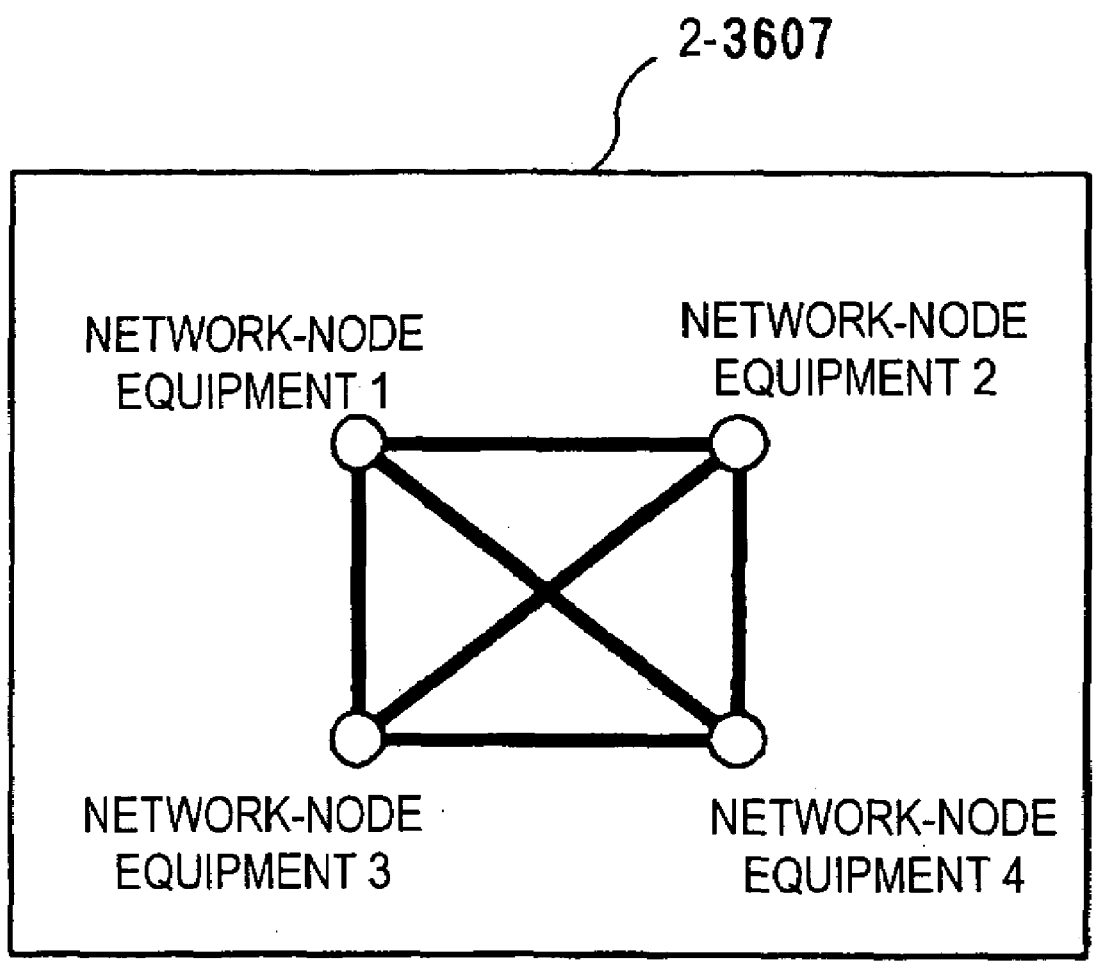
Figures 2, 3, 4, 5, 6, 7, 8, 9, 10, 11, 12, 13:
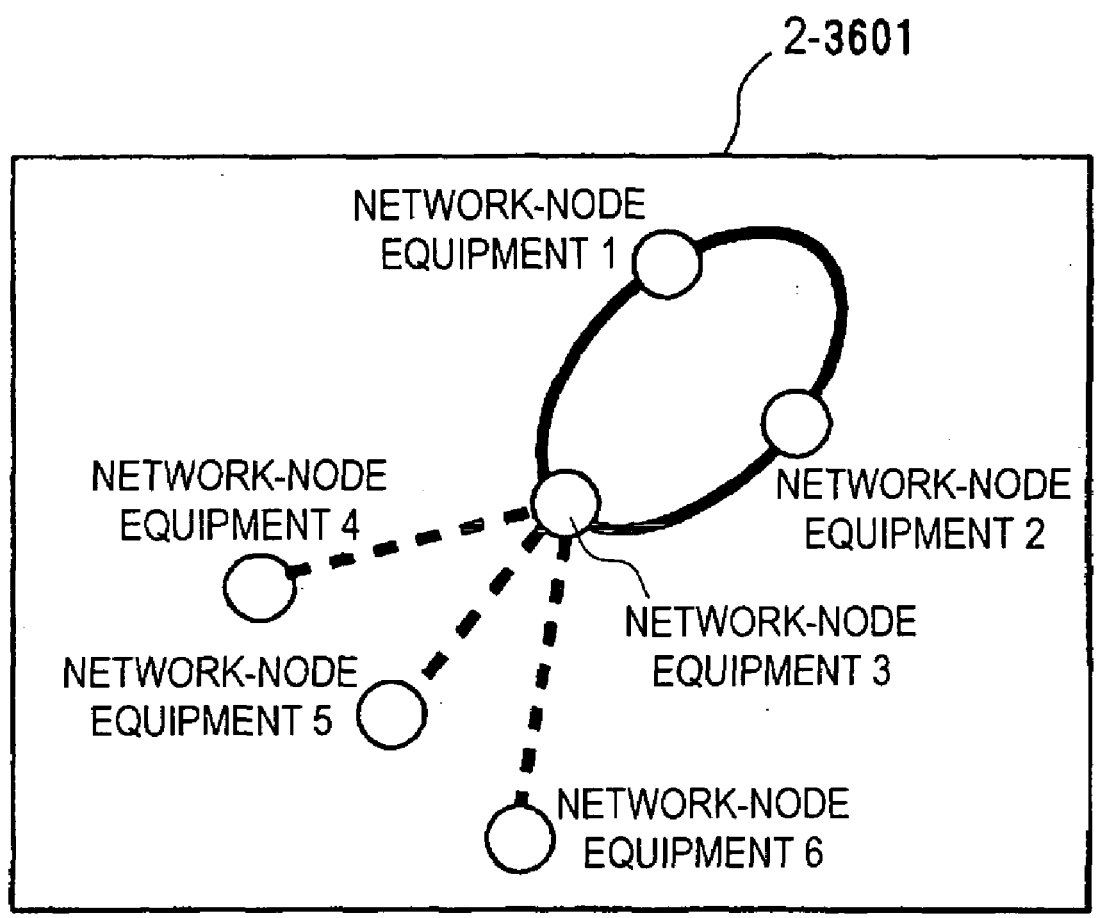
Figures 2, 3, 4, 5, 6, 7, 8, 9, 10, 11, 12, 13, 14, 15, 16:
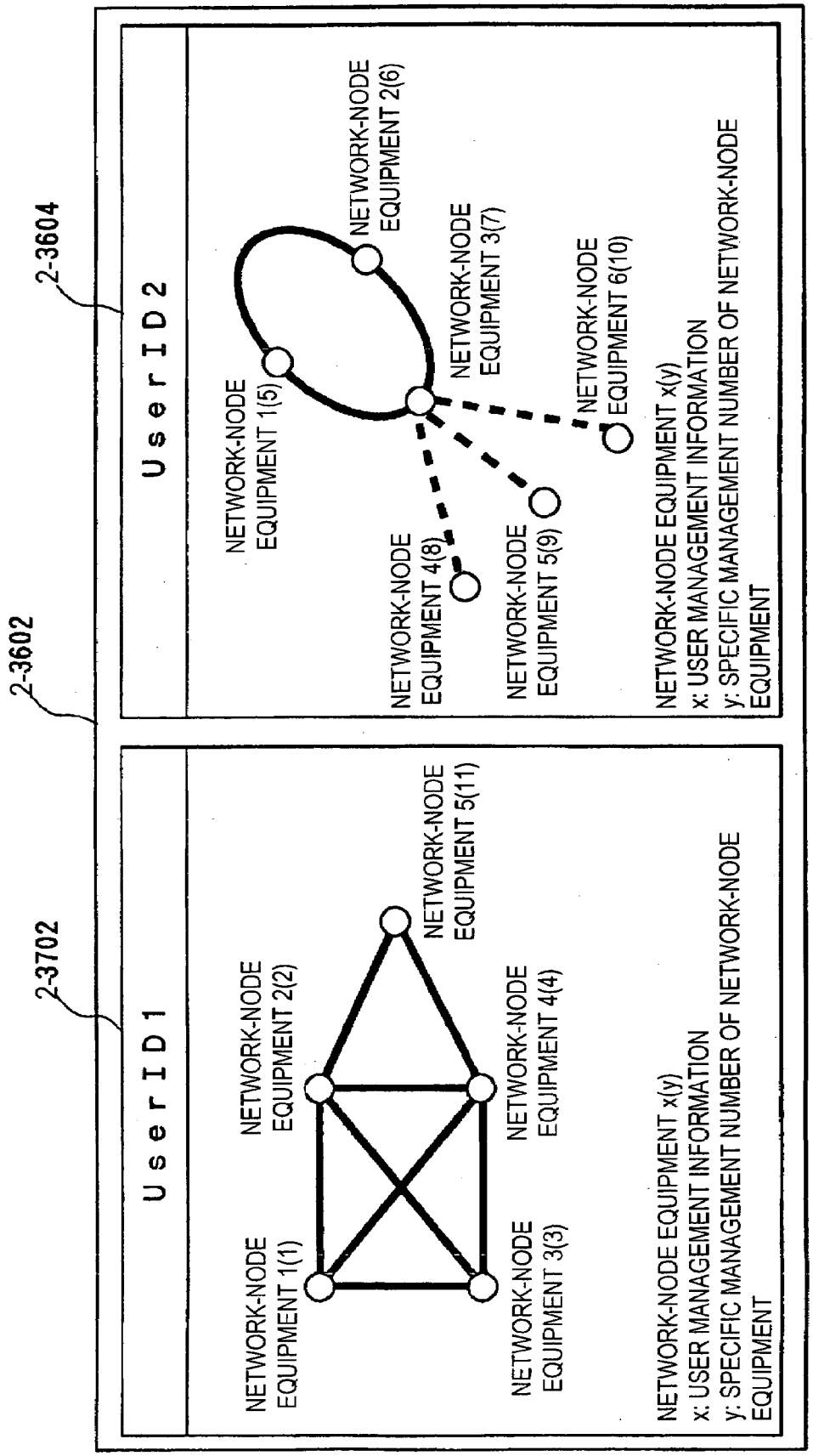
Figures 2, 3, 4, 5, 6, 7, 8, 9, 10, 11, 12, 13, 14, 15, 16, 17, 18, 19:
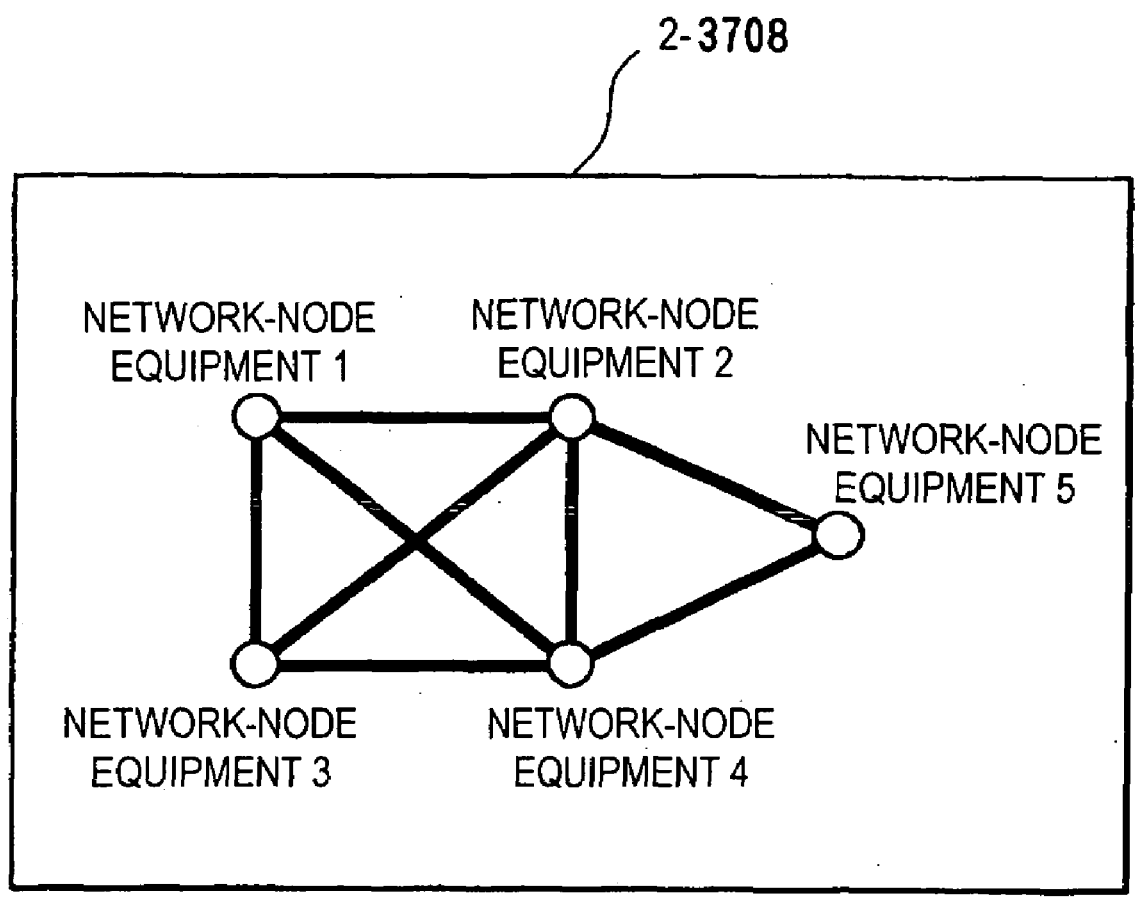
Figures 2, 3, 4, 5, 6, 7, 8, 9, 10, 11, 12, 13, 14, 15, 16, 17, 18, 19, 20, 21, 22:
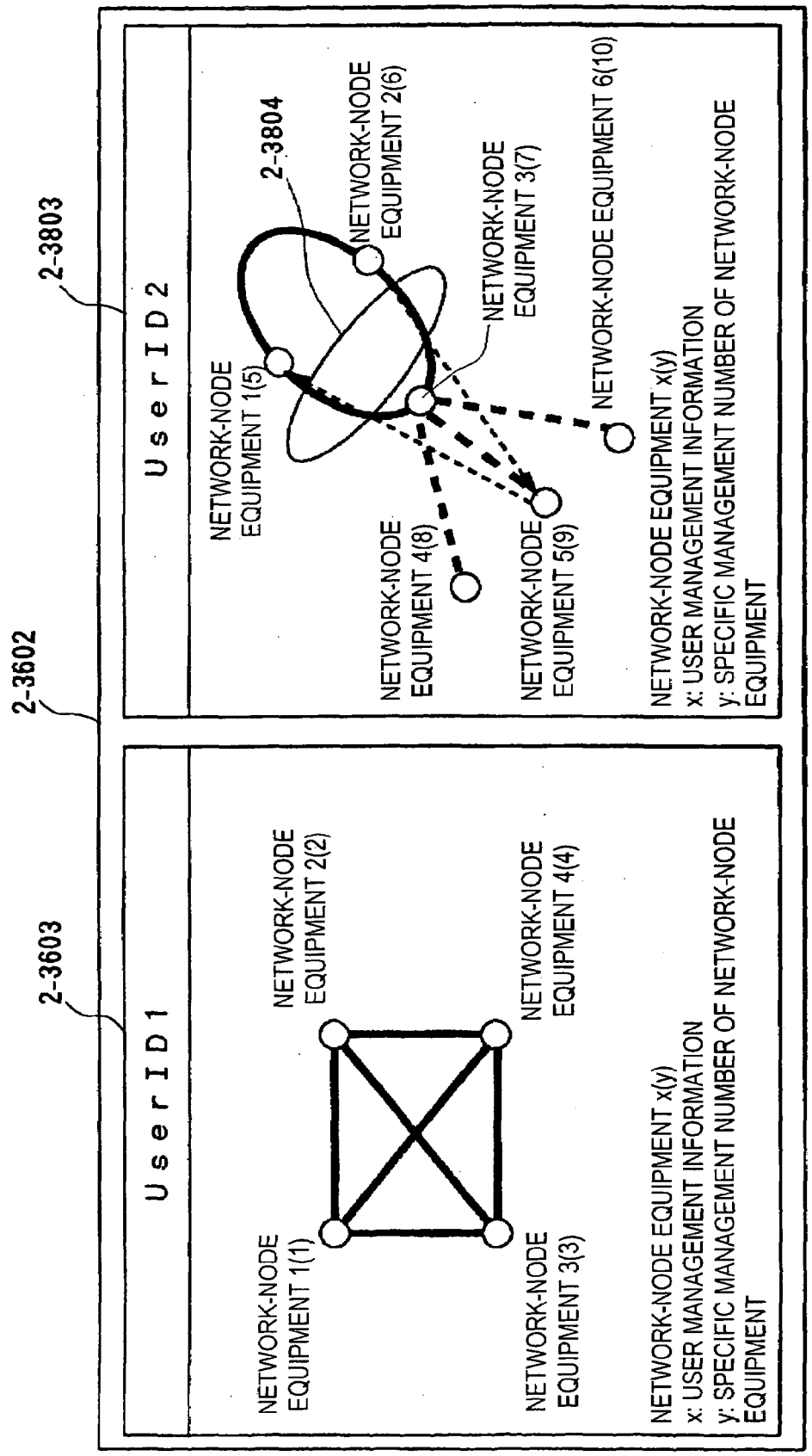
Figures 2, 3, 4, 5, 6, 7, 8, 9, 10, 11, 12, 13, 14, 15, 16, 17, 18, 19, 20, 21, 22, 23, 24, 25:
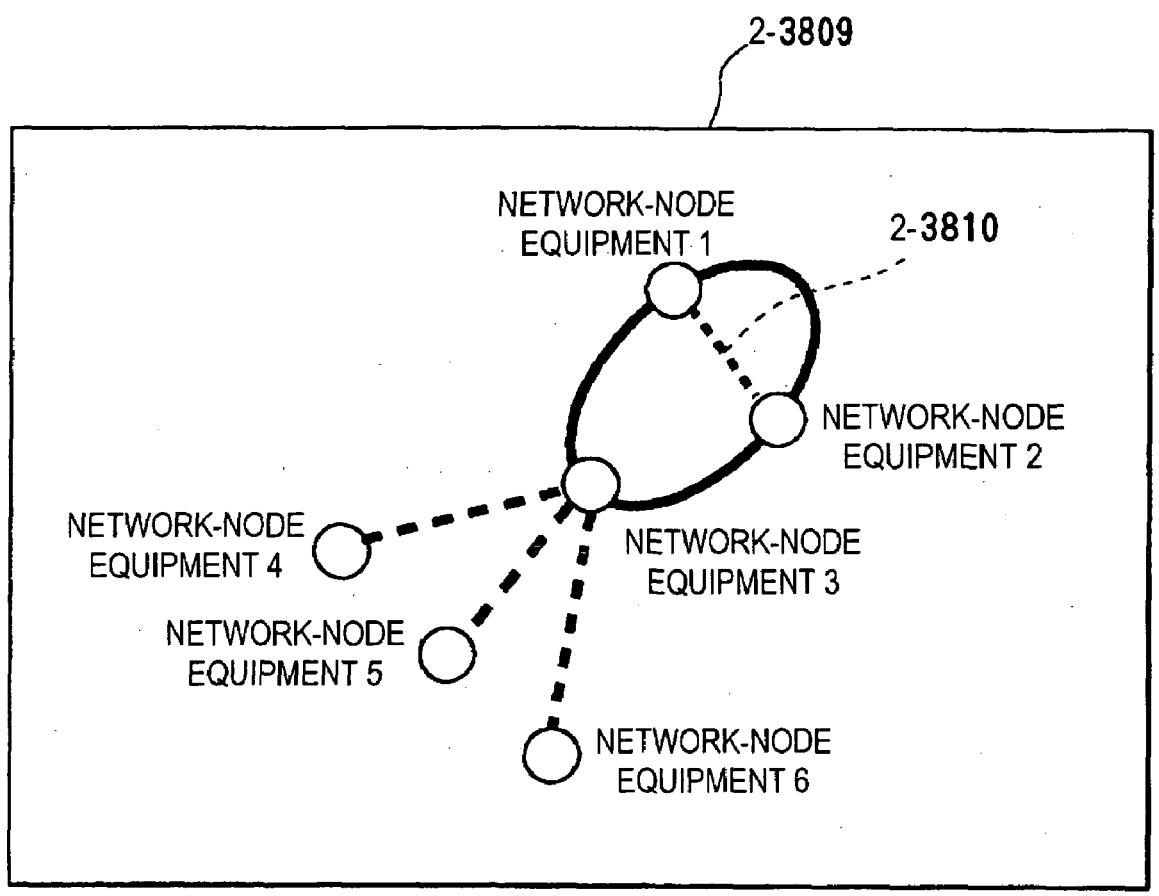
Figures 2, 3, 4, 5, 6, 7, 8, 9, 10, 11, 12, 13, 14, 15, 16, 17, 18, 19, 20, 21, 22, 23, 24, 25, 26, 27, 28:
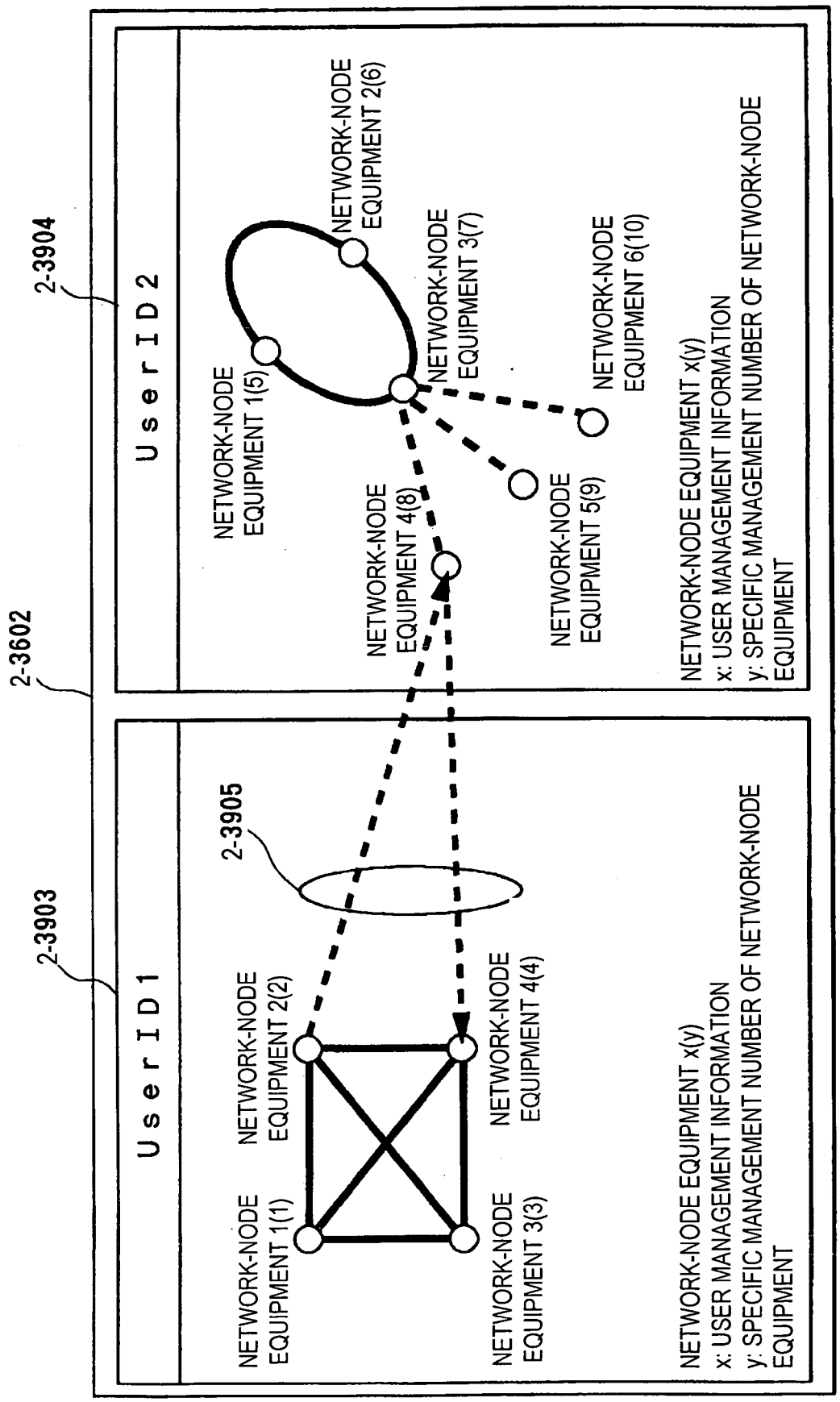
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31:
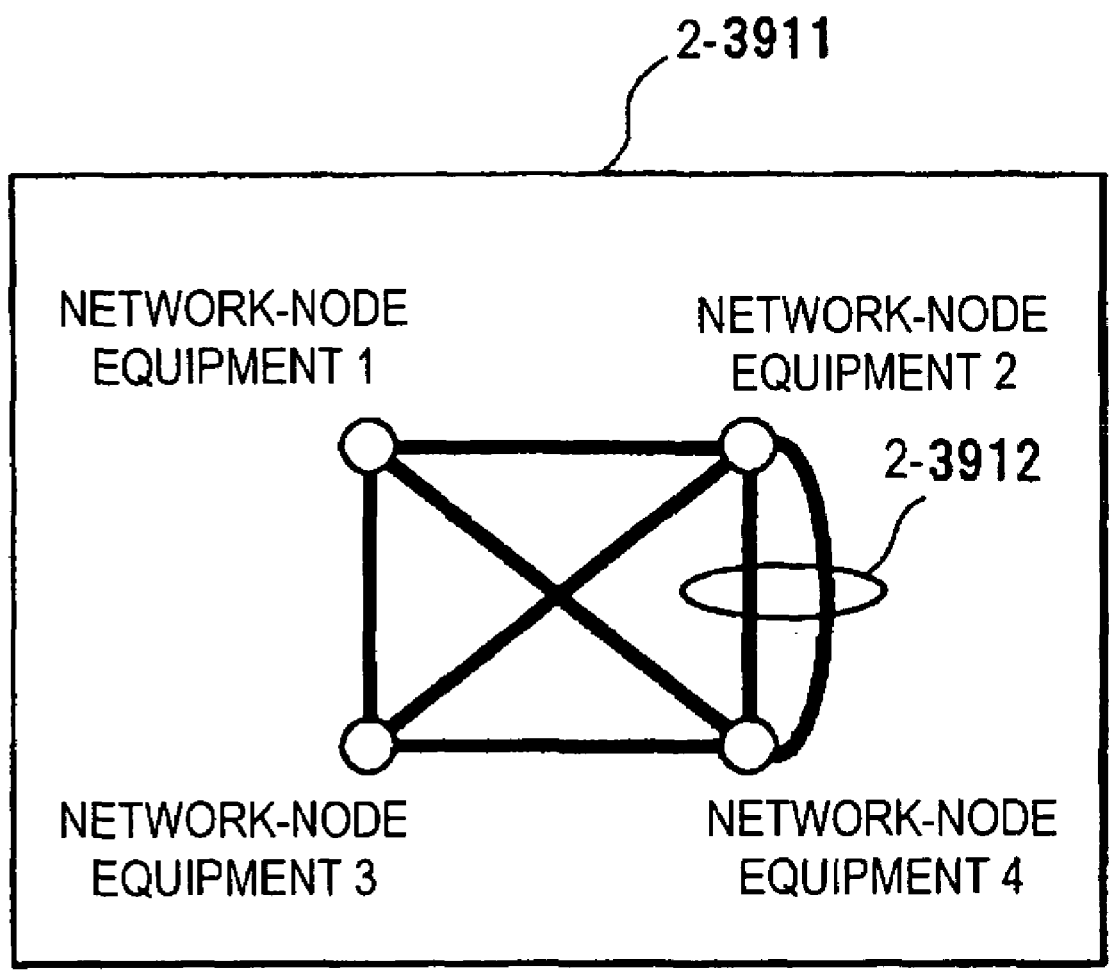
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35:
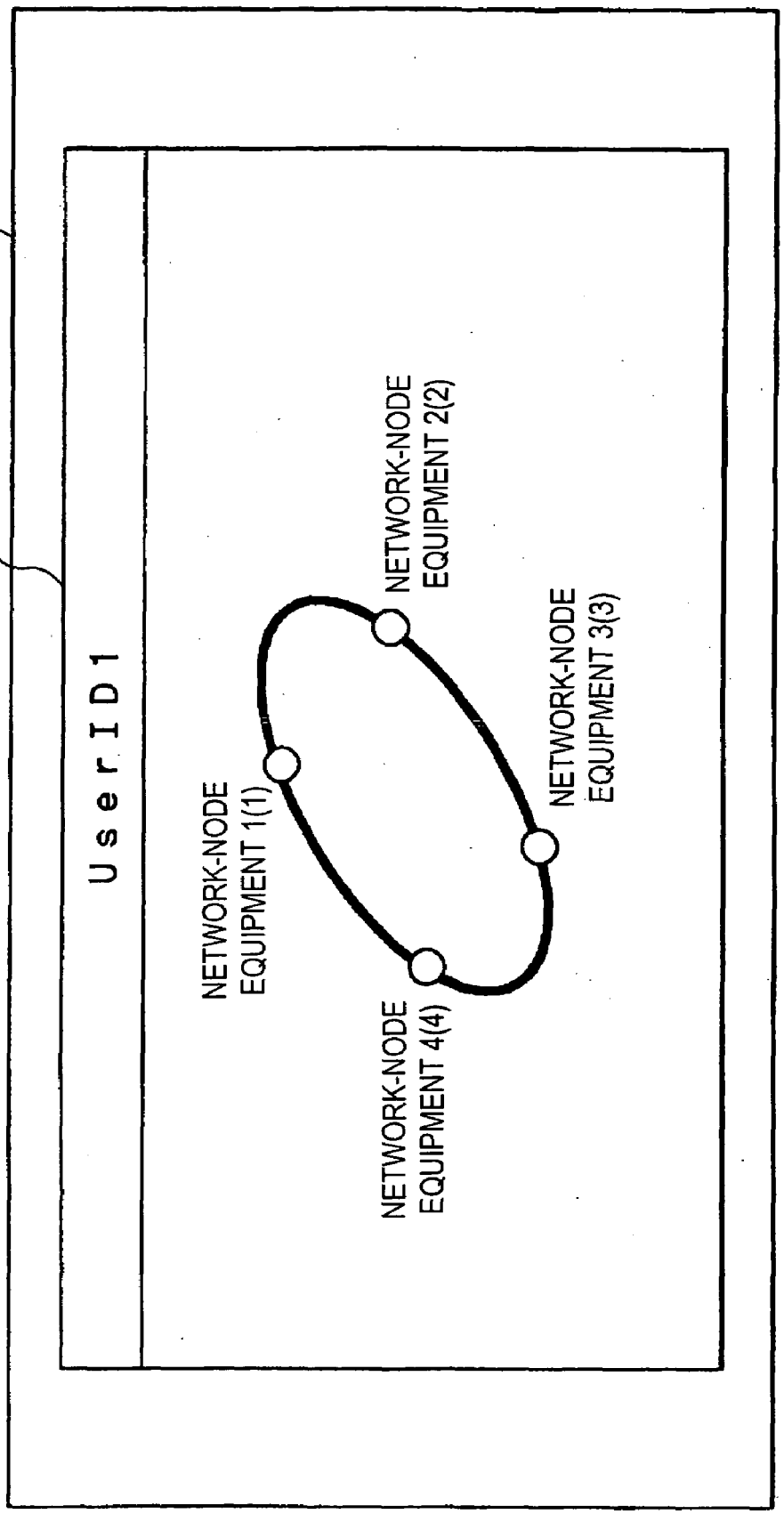
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37:
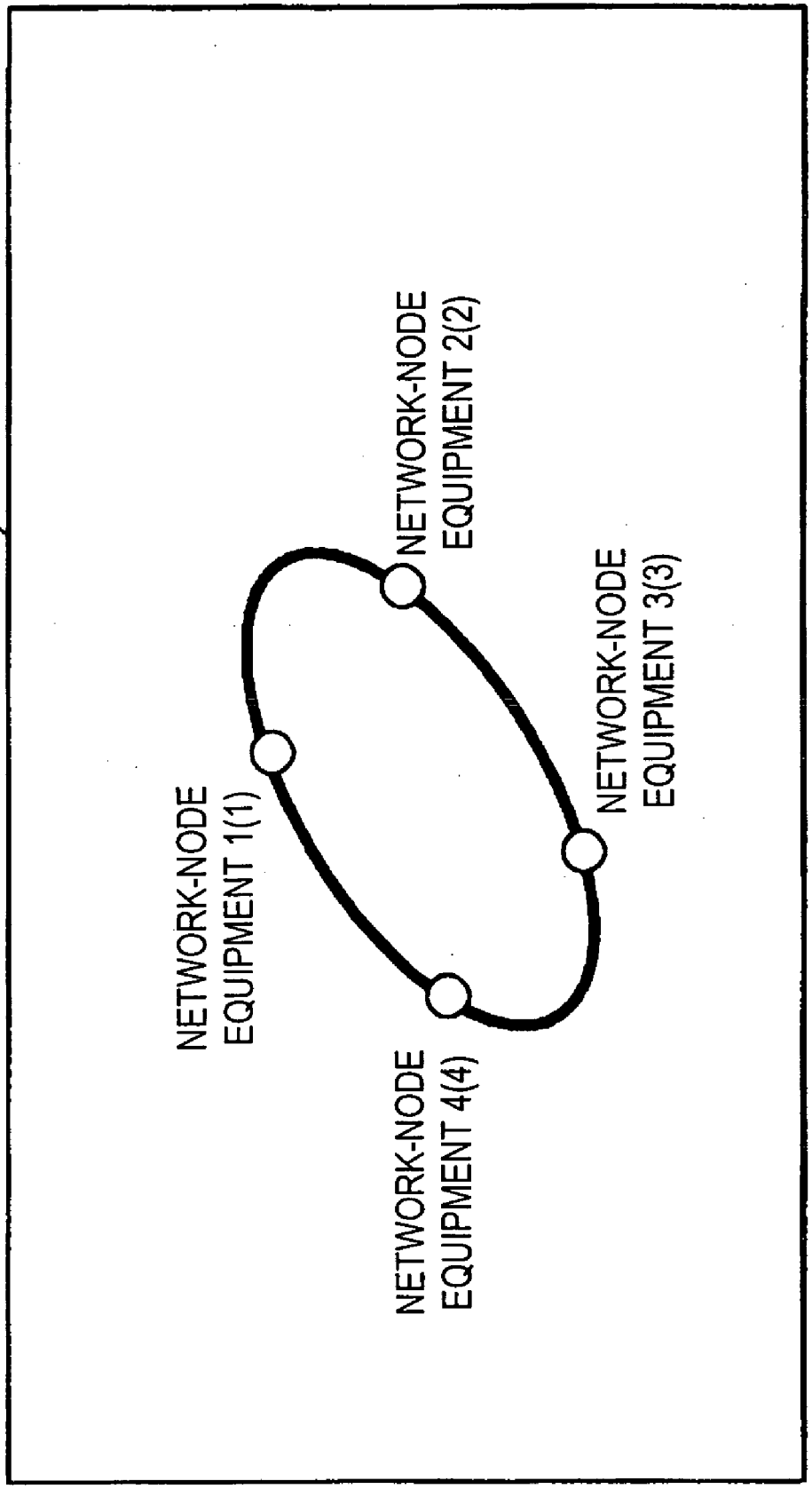
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39:
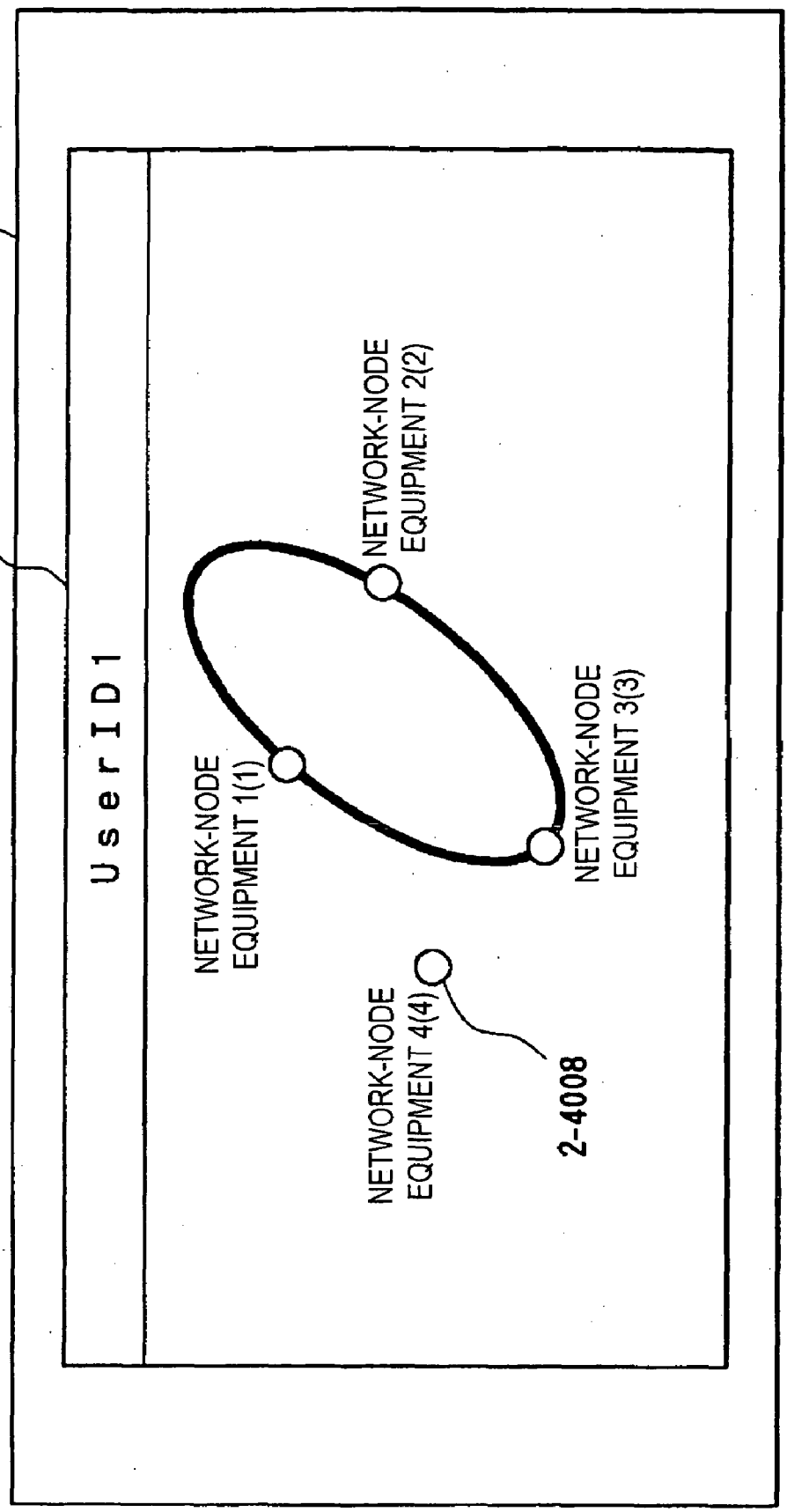
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42:
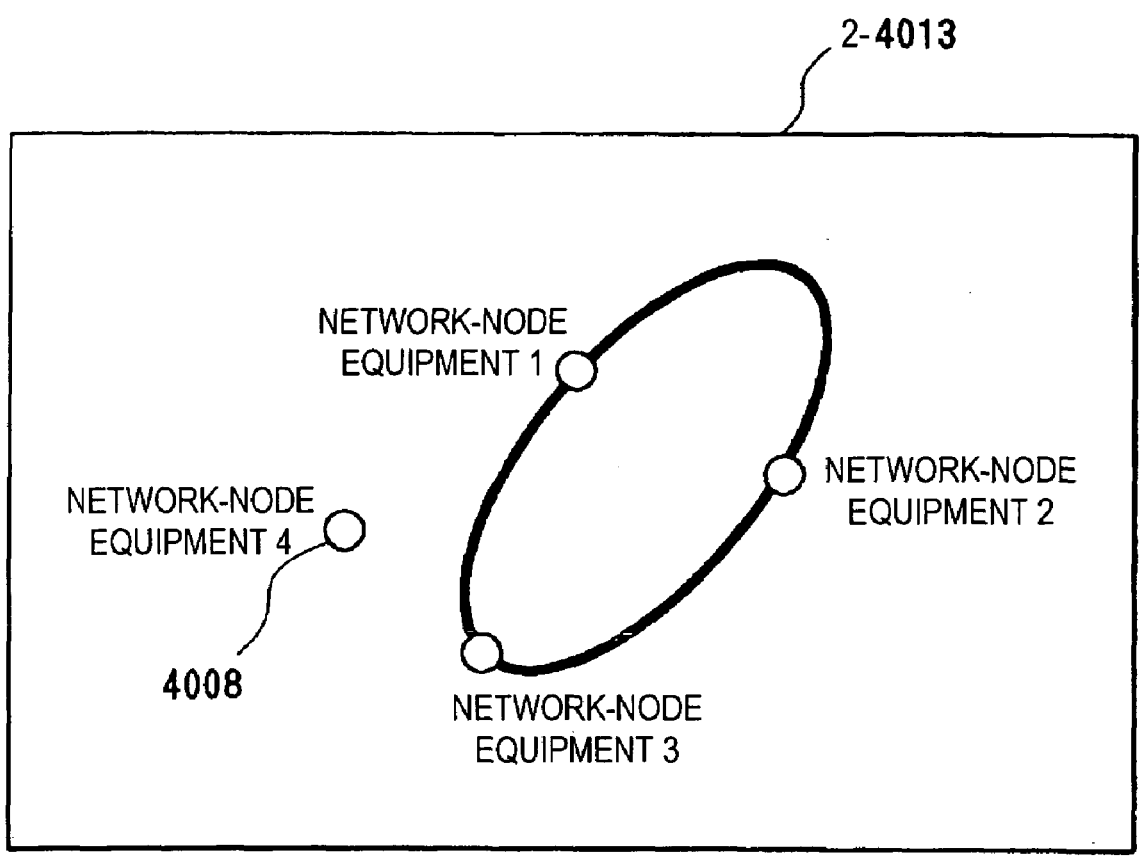
Figures 1, 3:
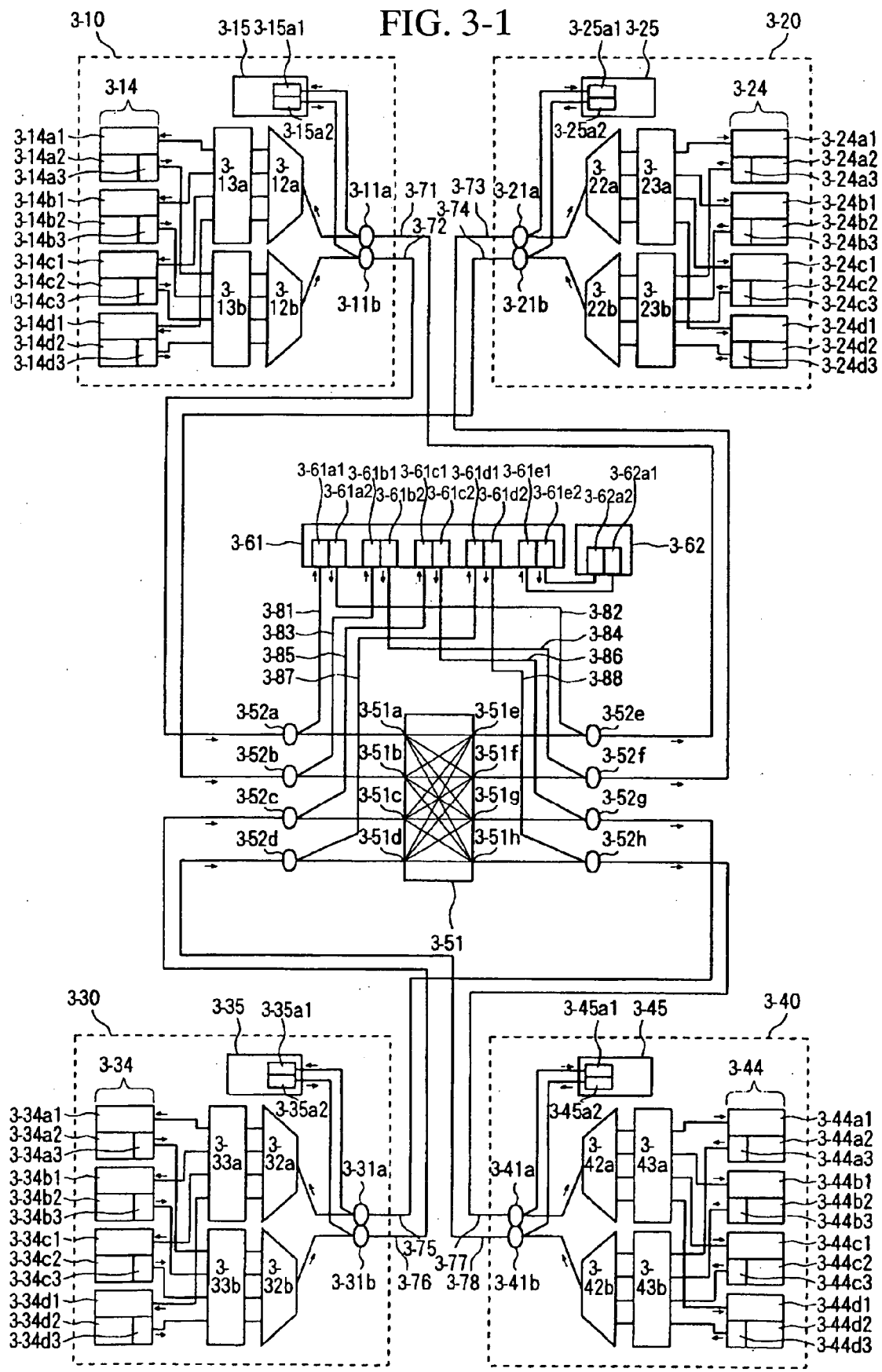
Figures 3, 4, 5, 6, 7, 8:
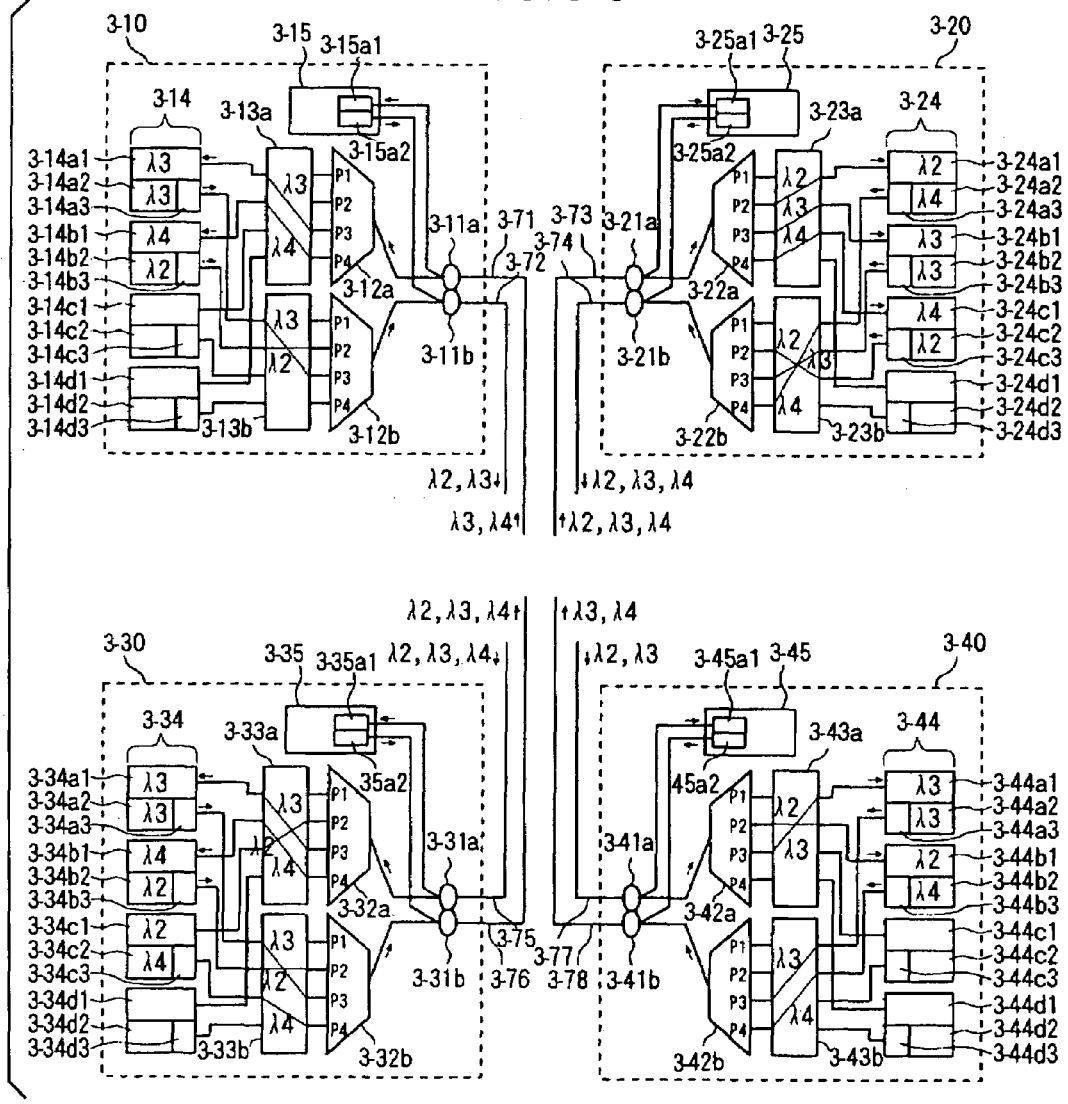
Figures 3, 4, 5, 6, 7, 8, 9:
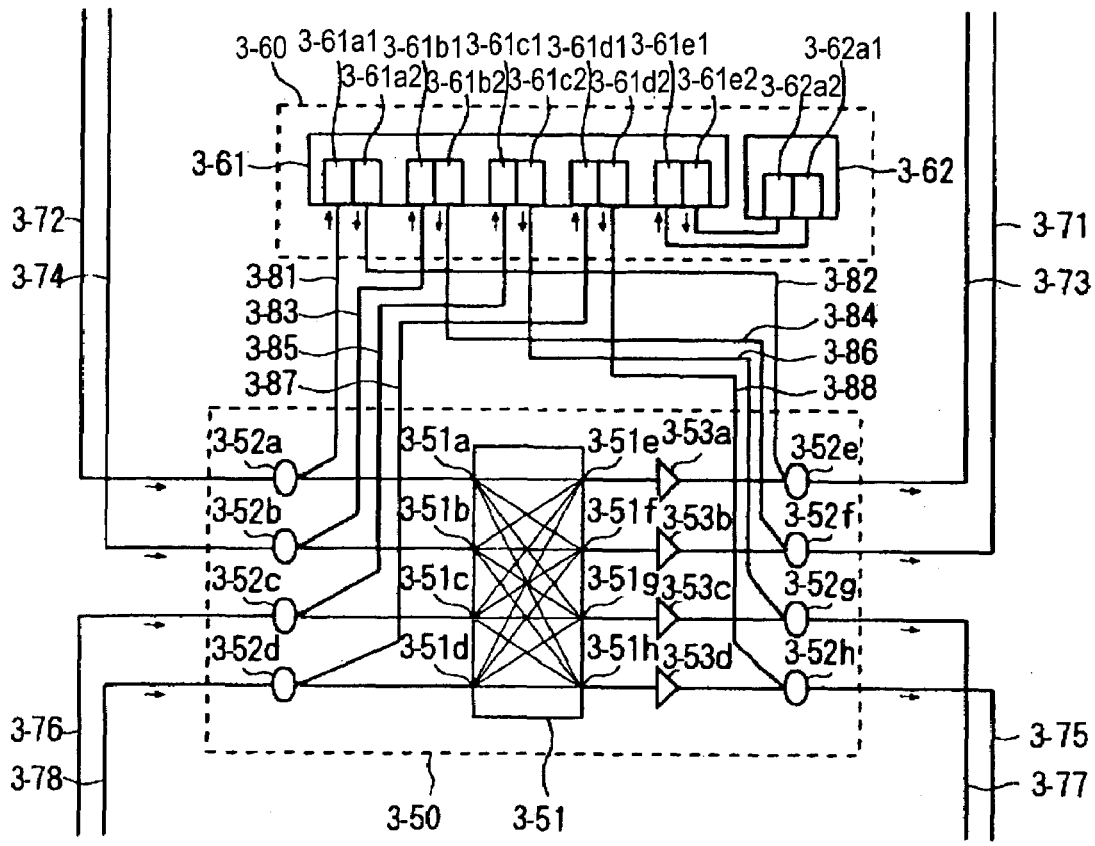
Figures 3, 4, 5, 6, 7, 8, 9, 10:
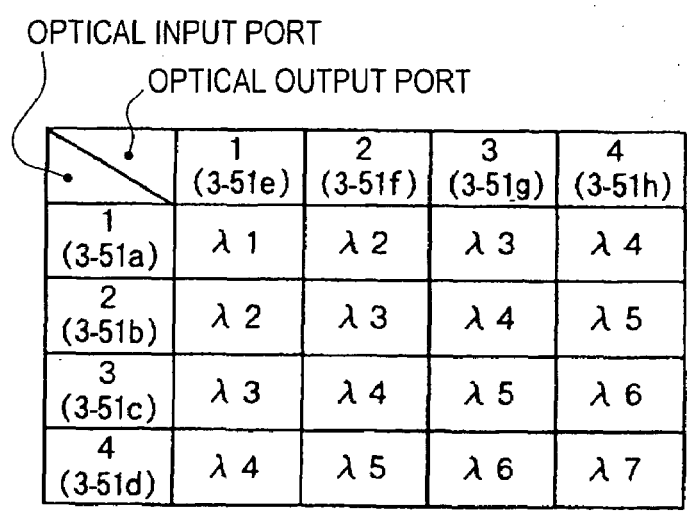
Figures 3, 4, 5, 6, 7, 8, 9, 10, 11:
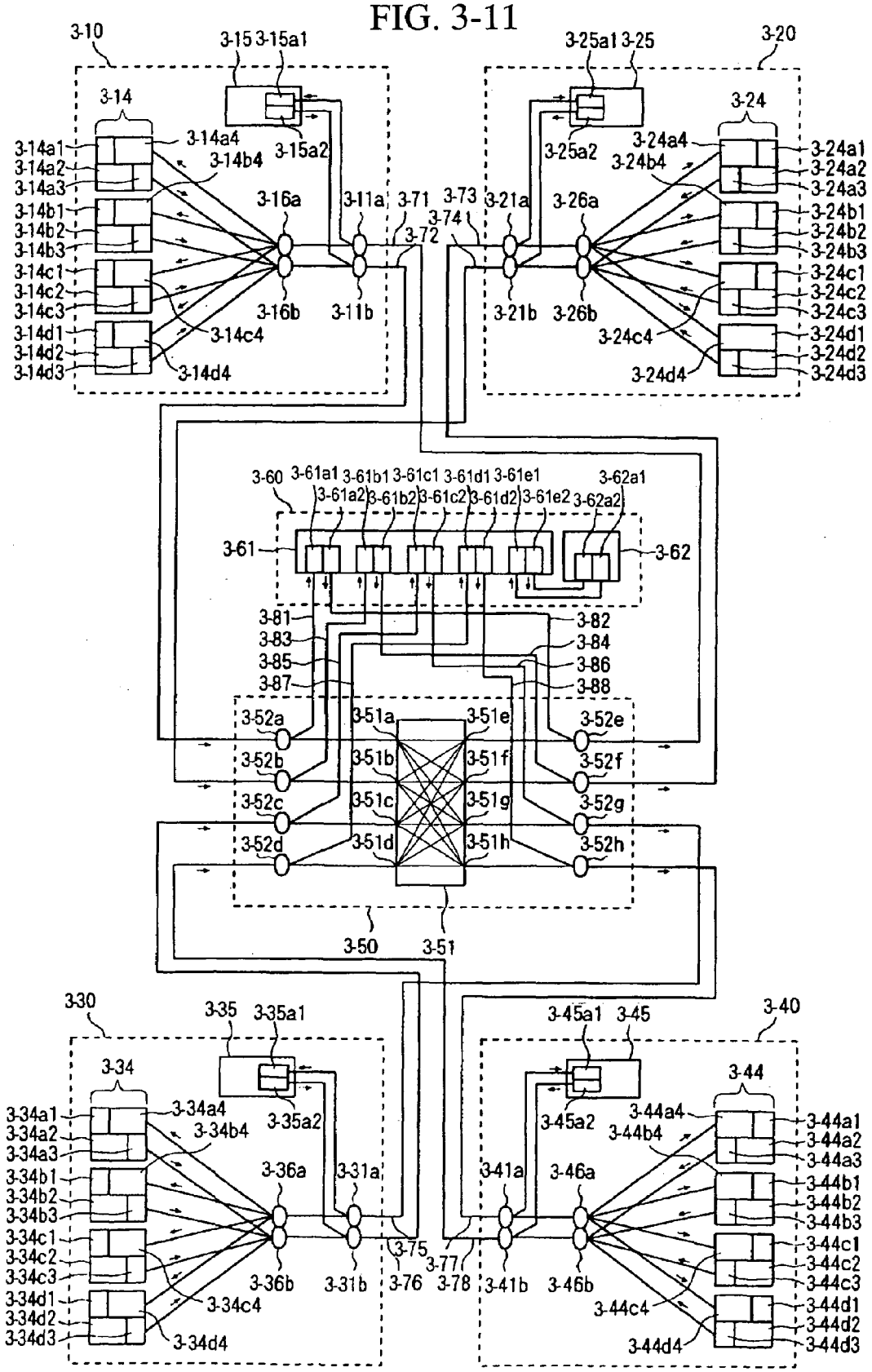
Figures 3, 4, 5, 6, 7, 8, 9, 10, 11, 12:
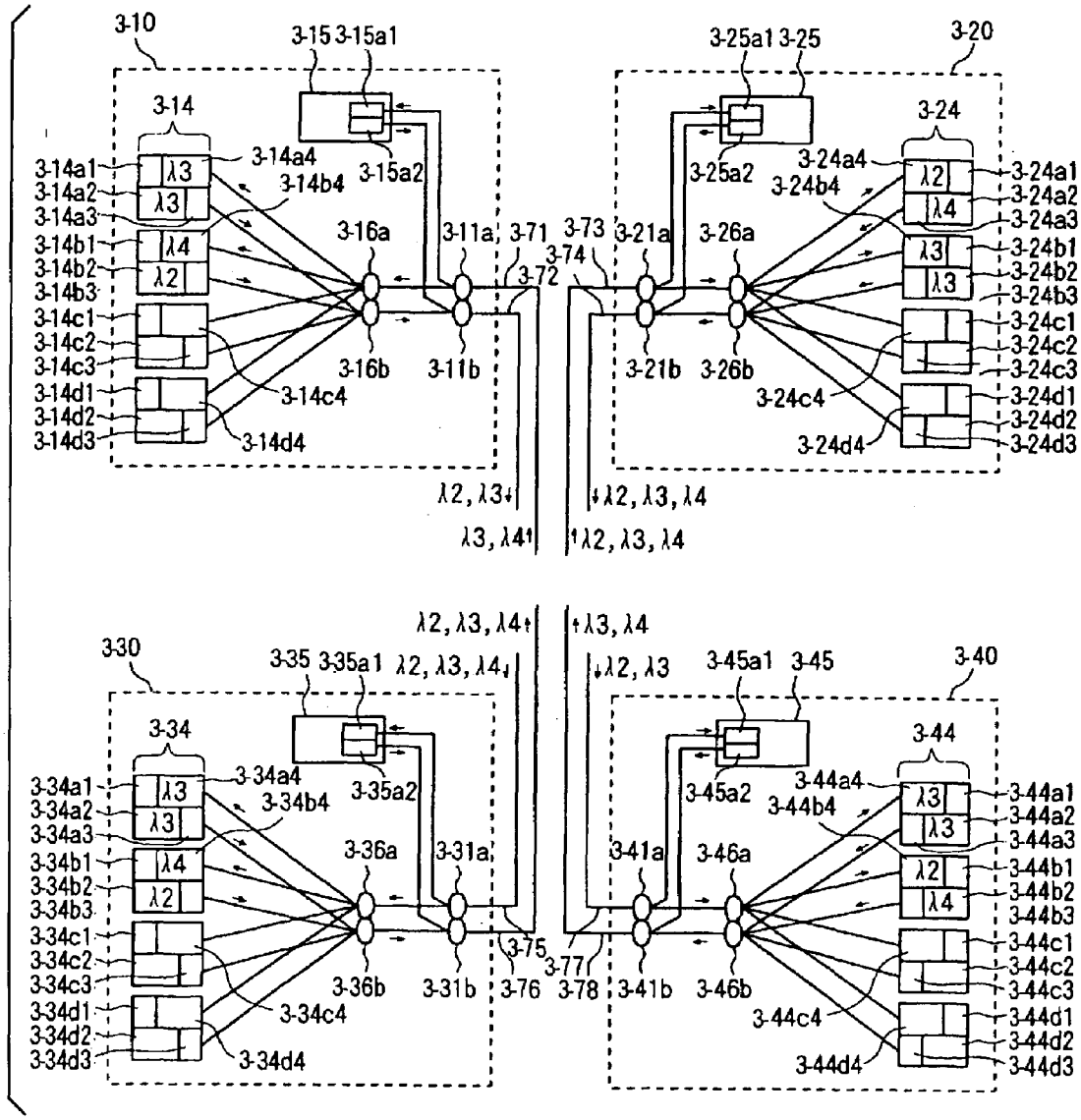
Figures 3, 4, 5, 6, 7, 8, 9, 10, 11, 12, 13:
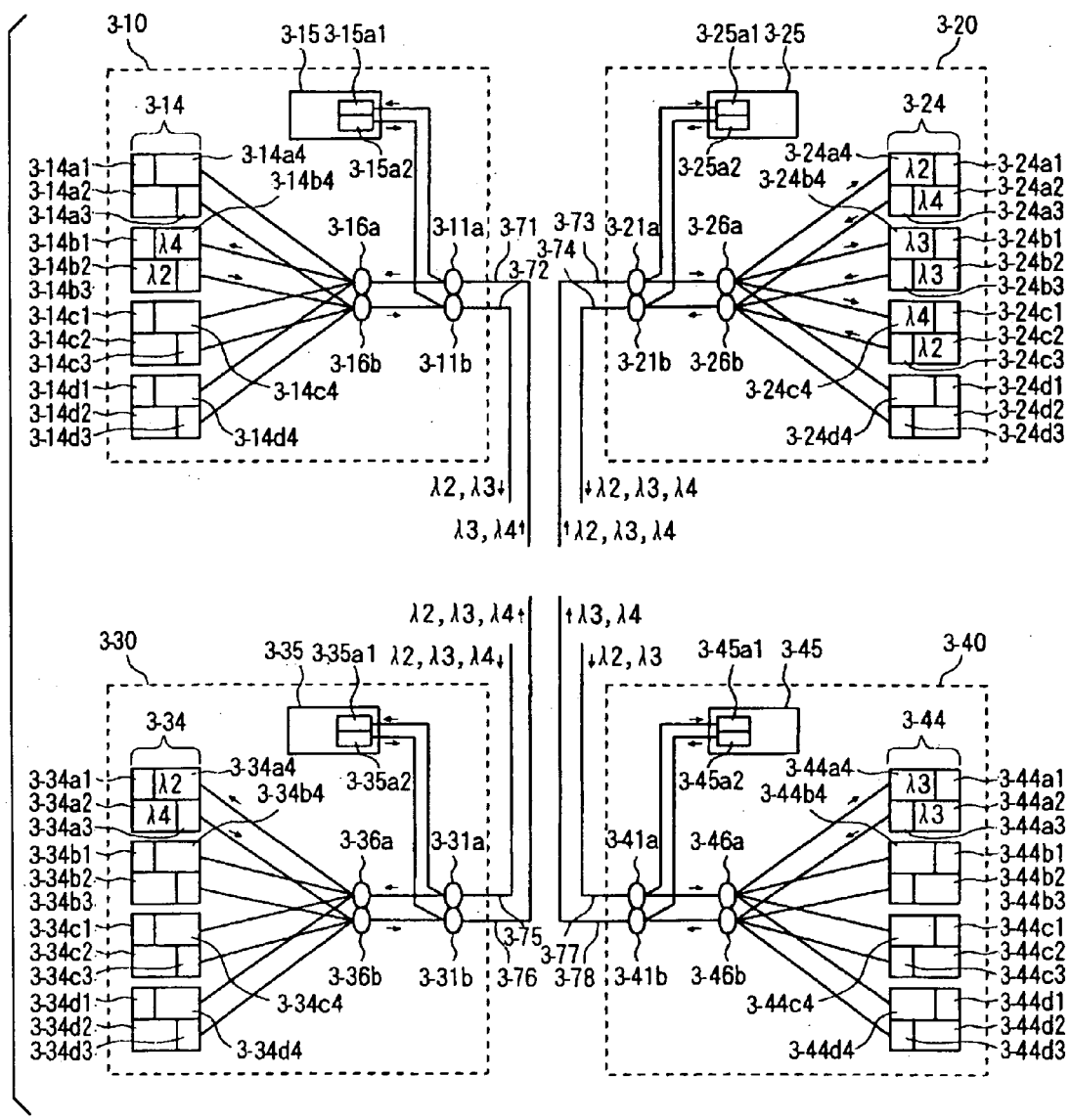
Figures 3, 4, 5, 6, 7, 8, 9, 10, 11, 12, 13, 14:
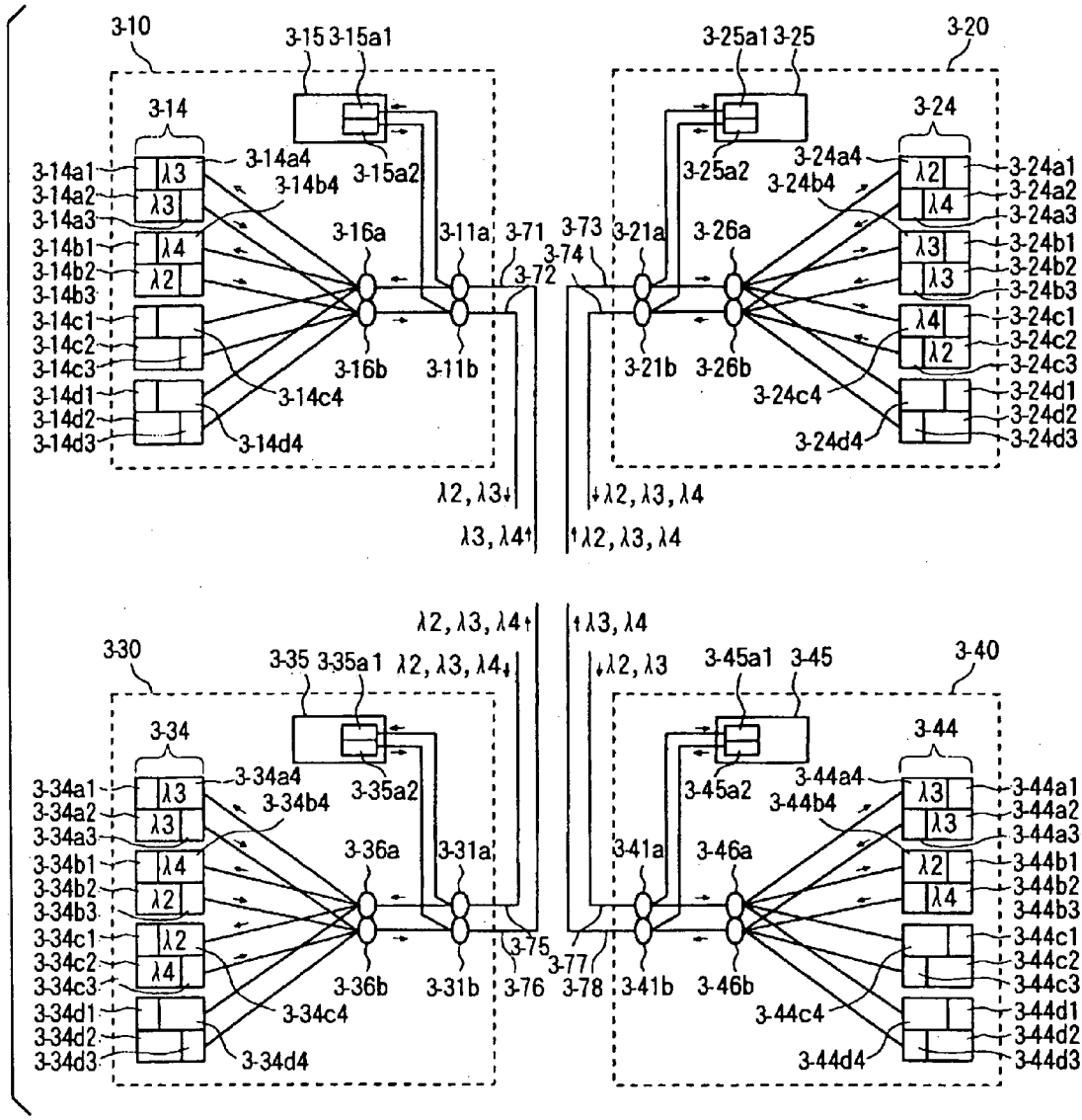
Figures 3, 4, 5, 6, 7, 8, 9, 10, 11, 12, 13, 14, 15:
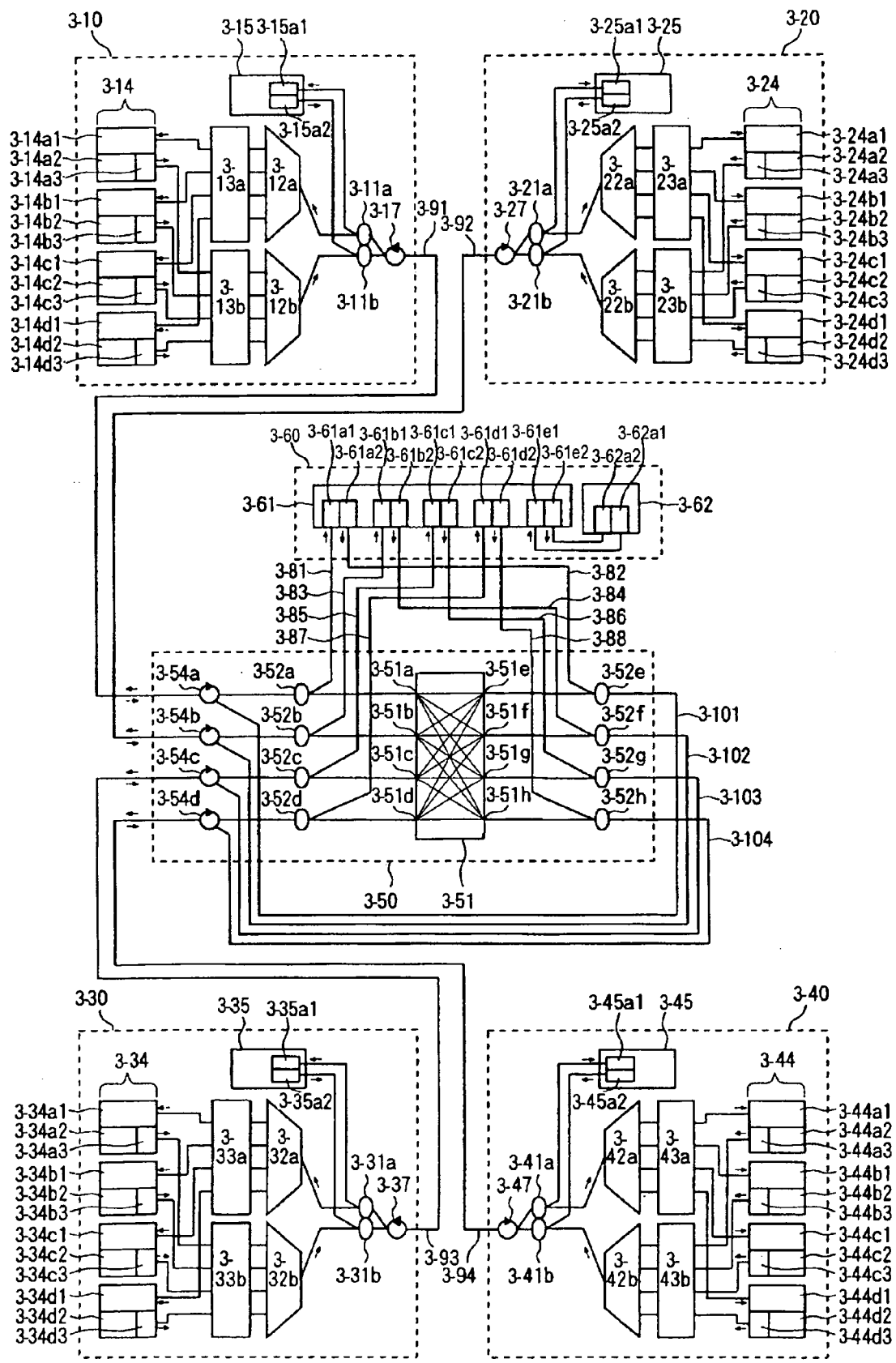
Figures 3, 4, 5, 6, 7, 8, 9, 10, 11, 12, 13, 14, 15, 16:
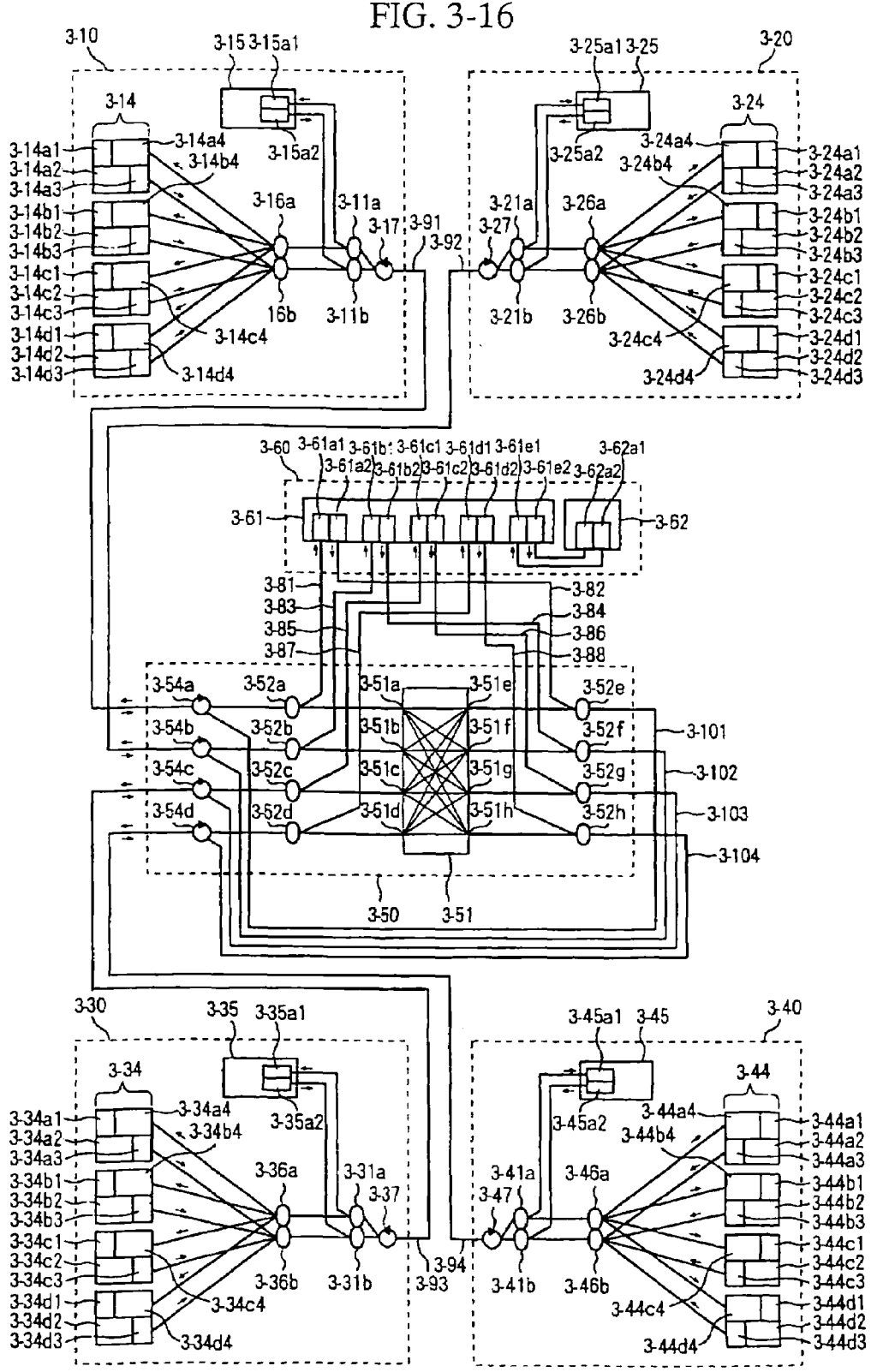
Figures 3, 4, 5, 6, 7, 8, 9, 10, 11, 12, 13, 14, 15, 16, 17:
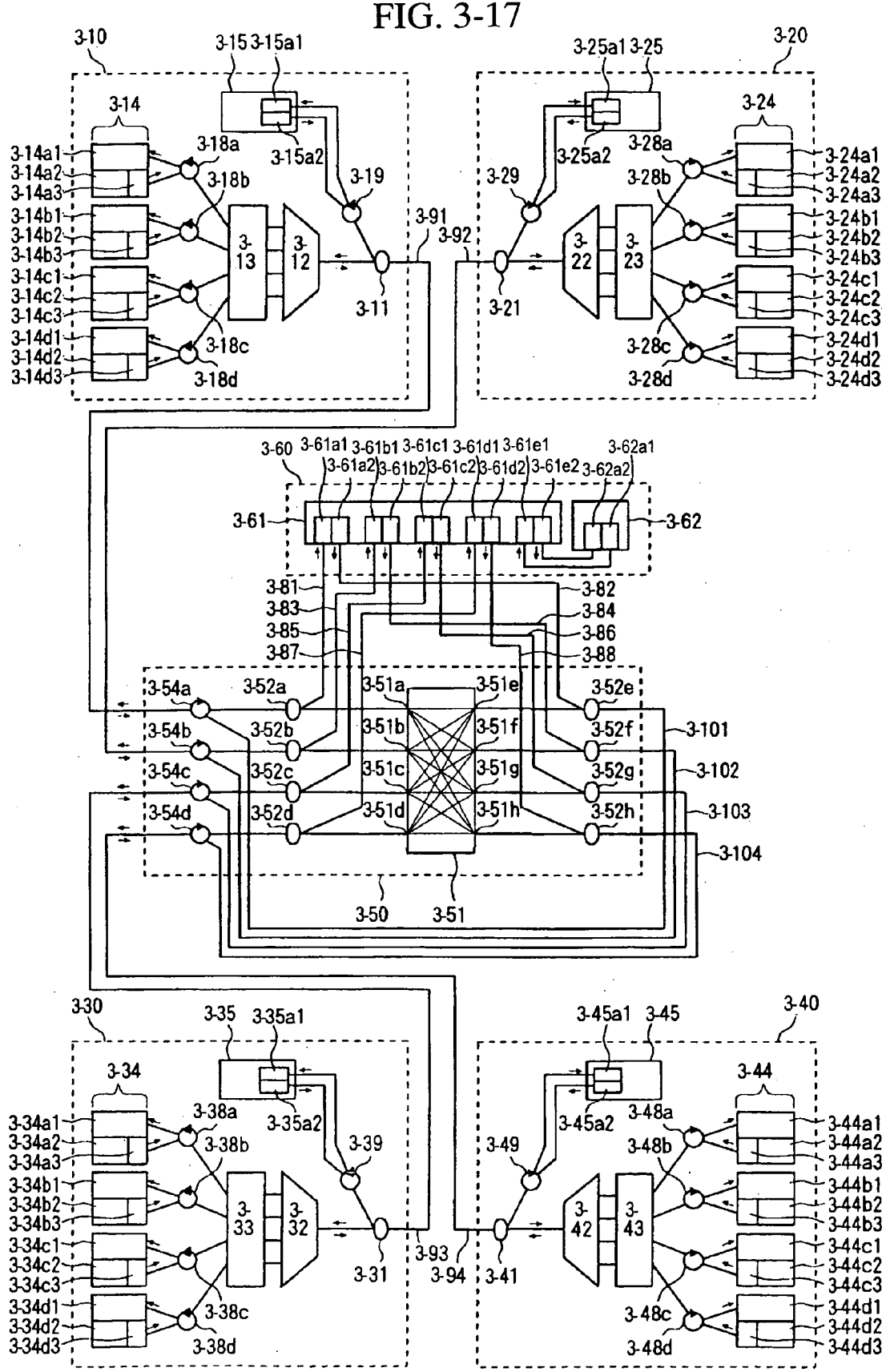
Figures 1, 4:
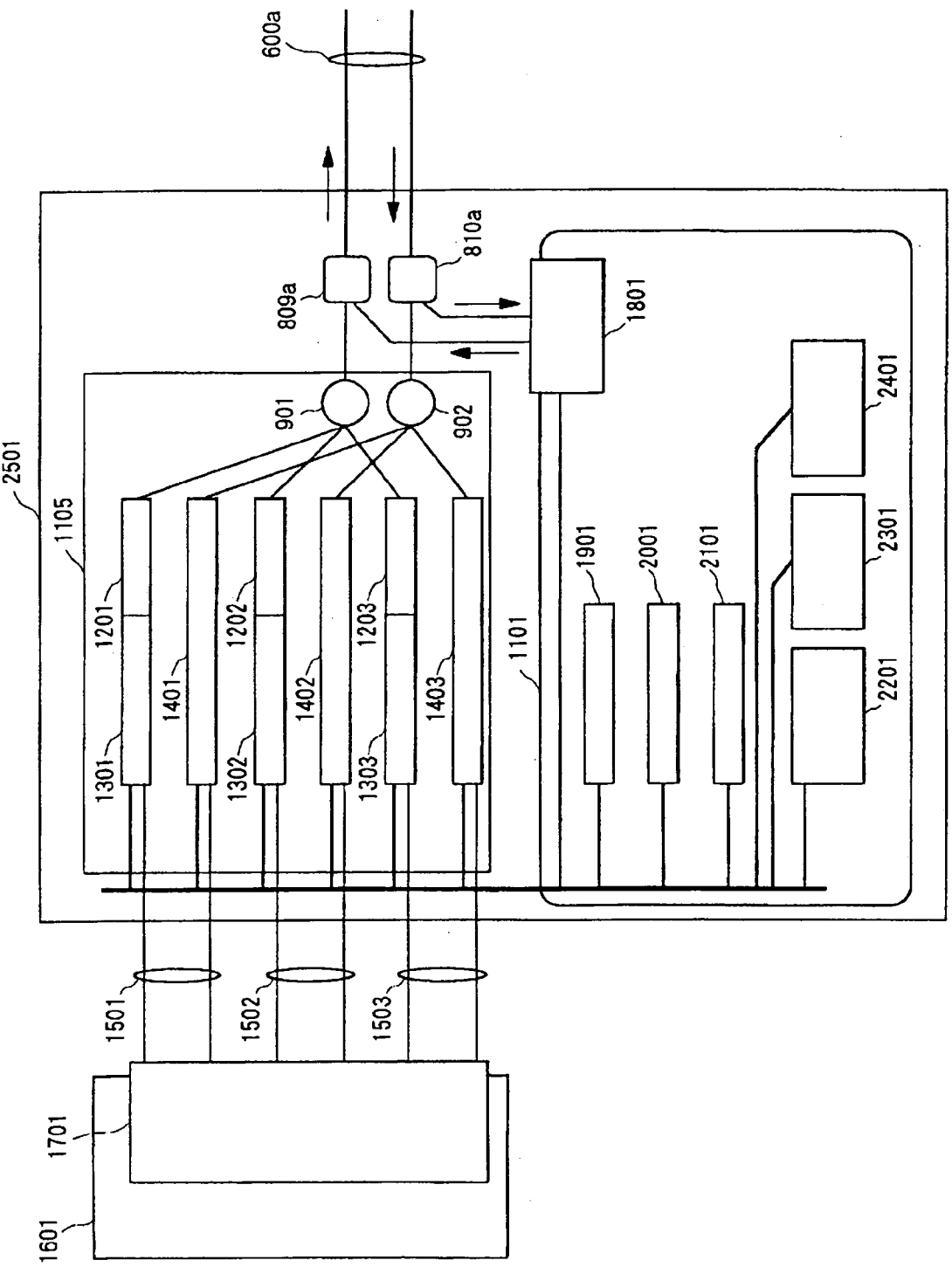
Figures 2, 4:
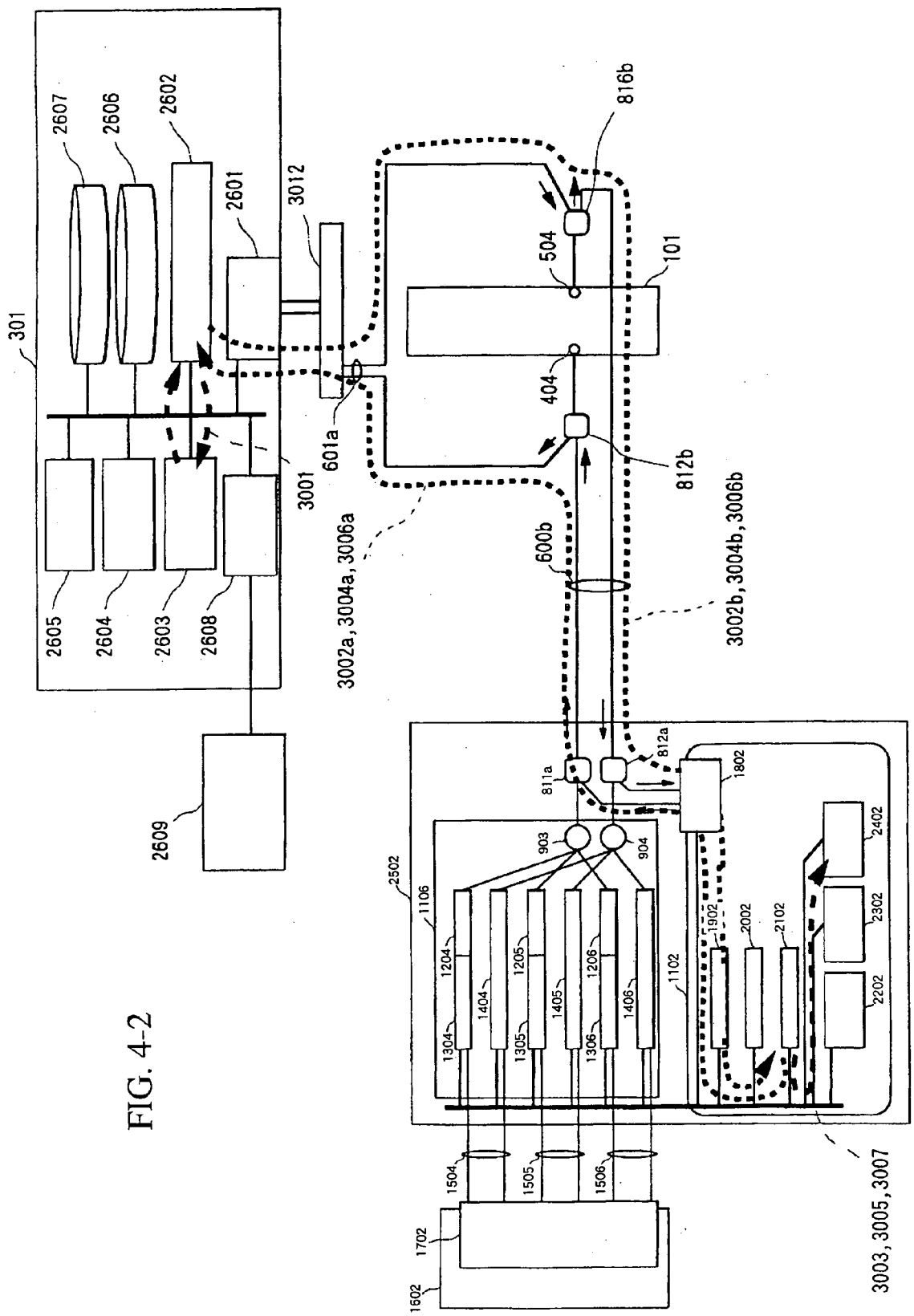
Figures 3, 4:
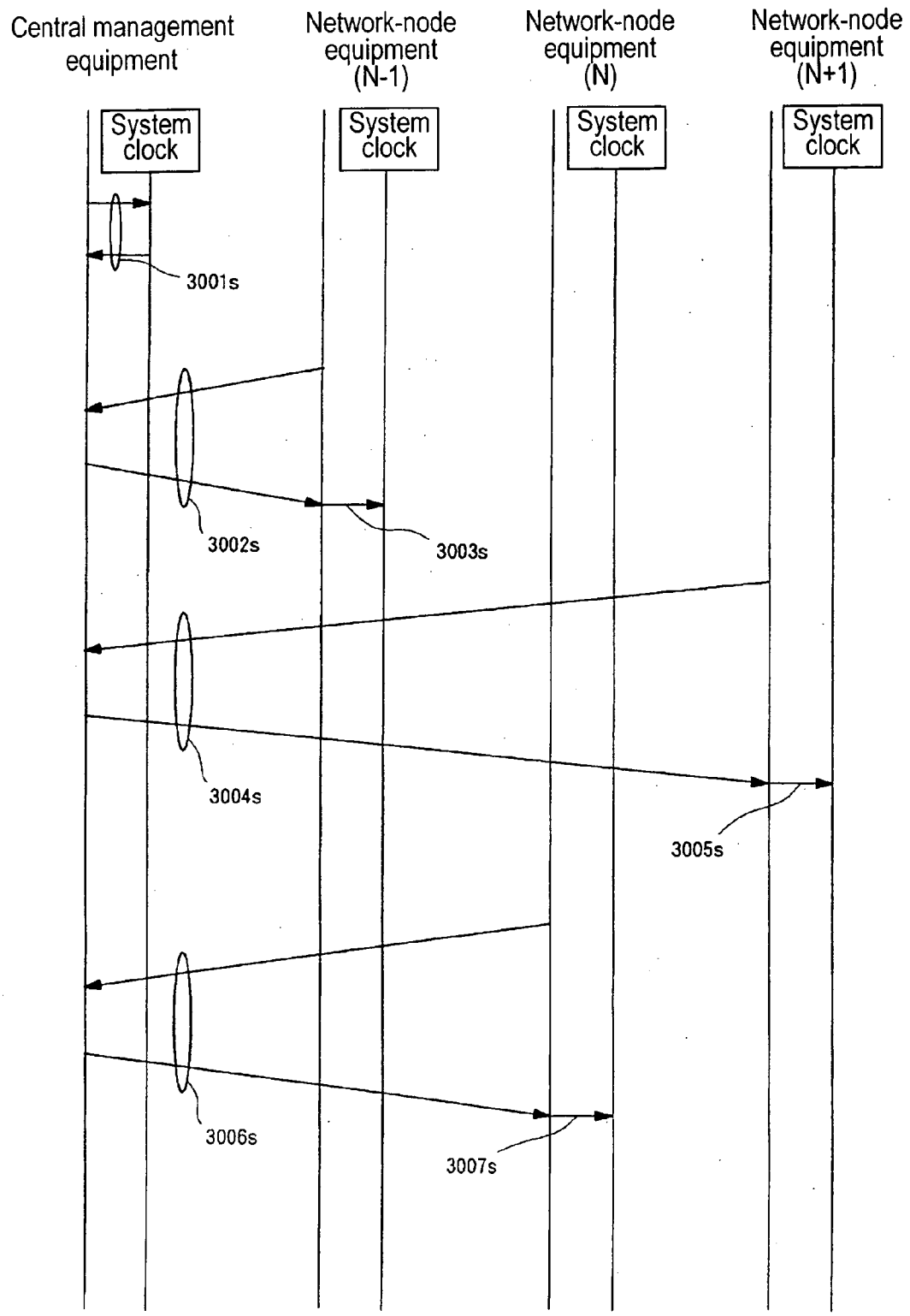
Figure 4:
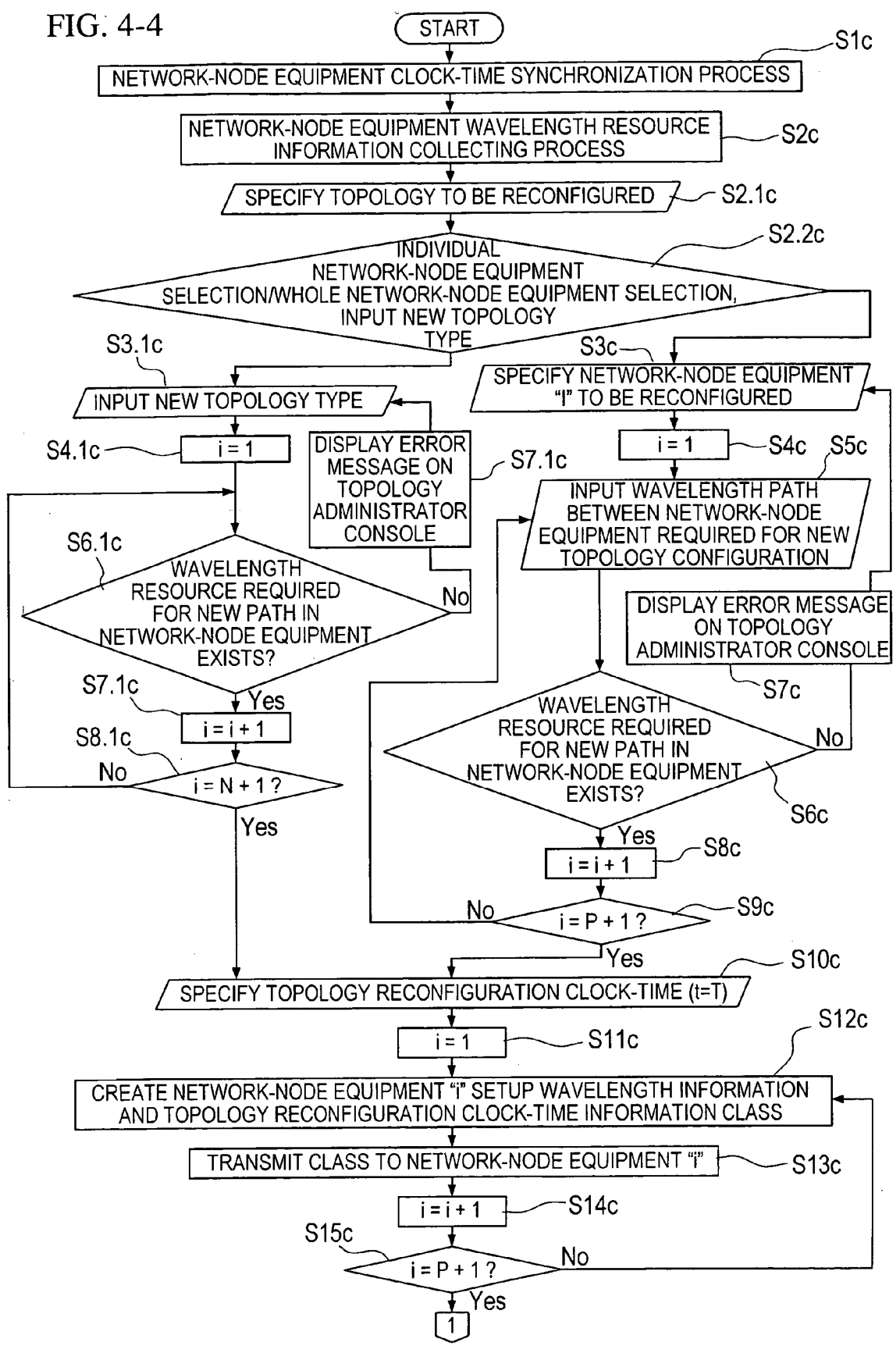
Figures 4, 5:
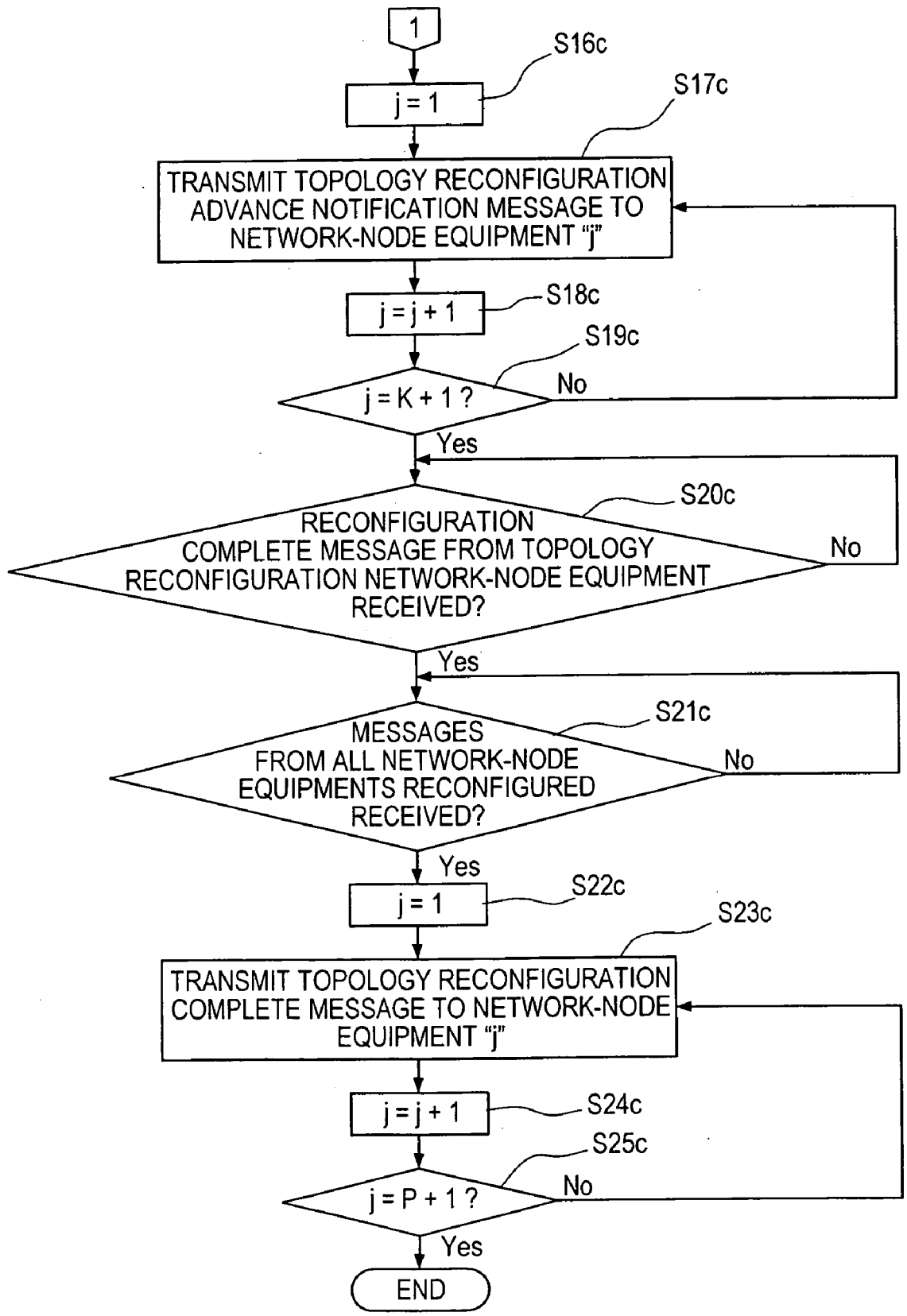
Figures 4, 5, 6:
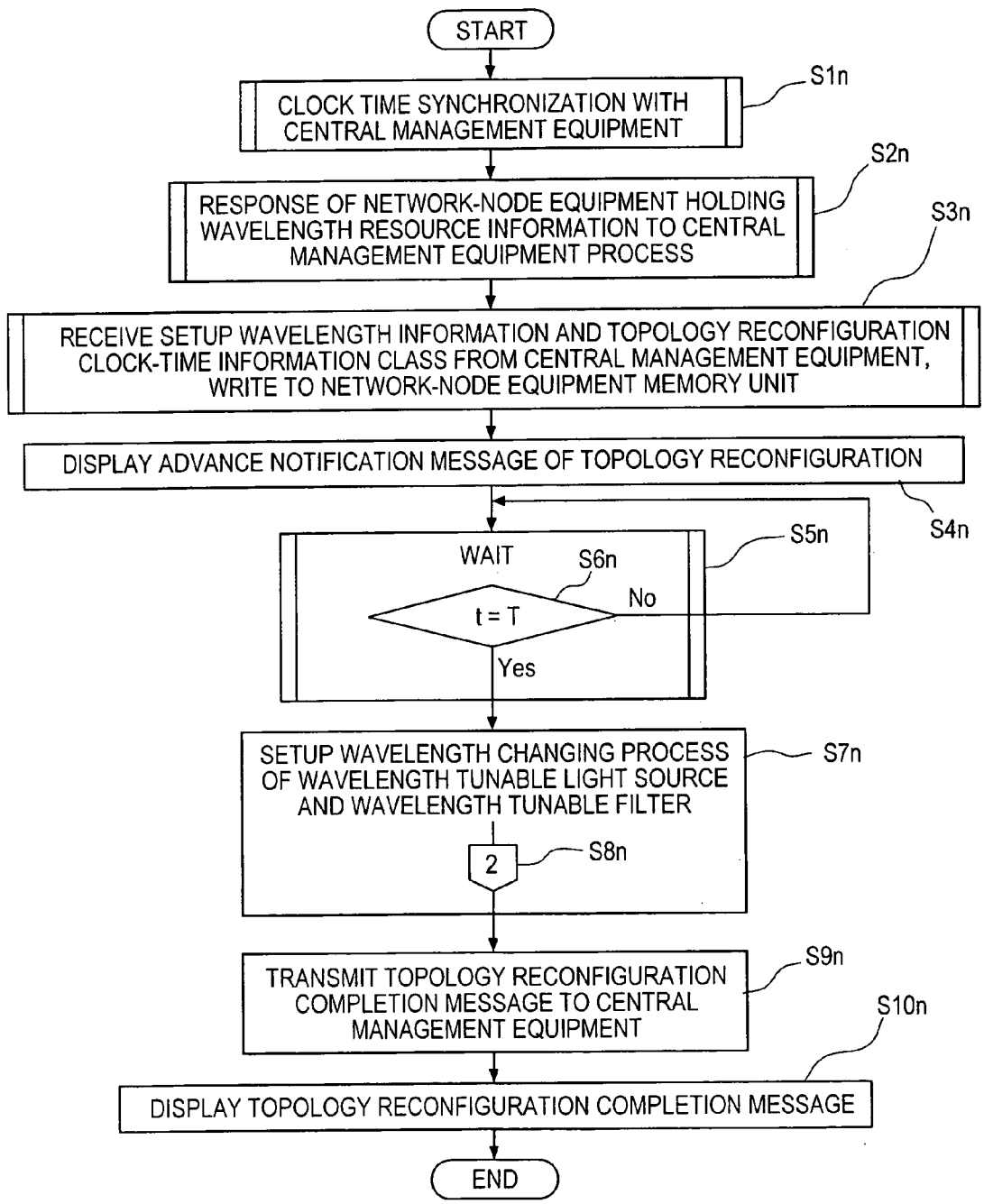
Figures 4, 5, 6, 7:
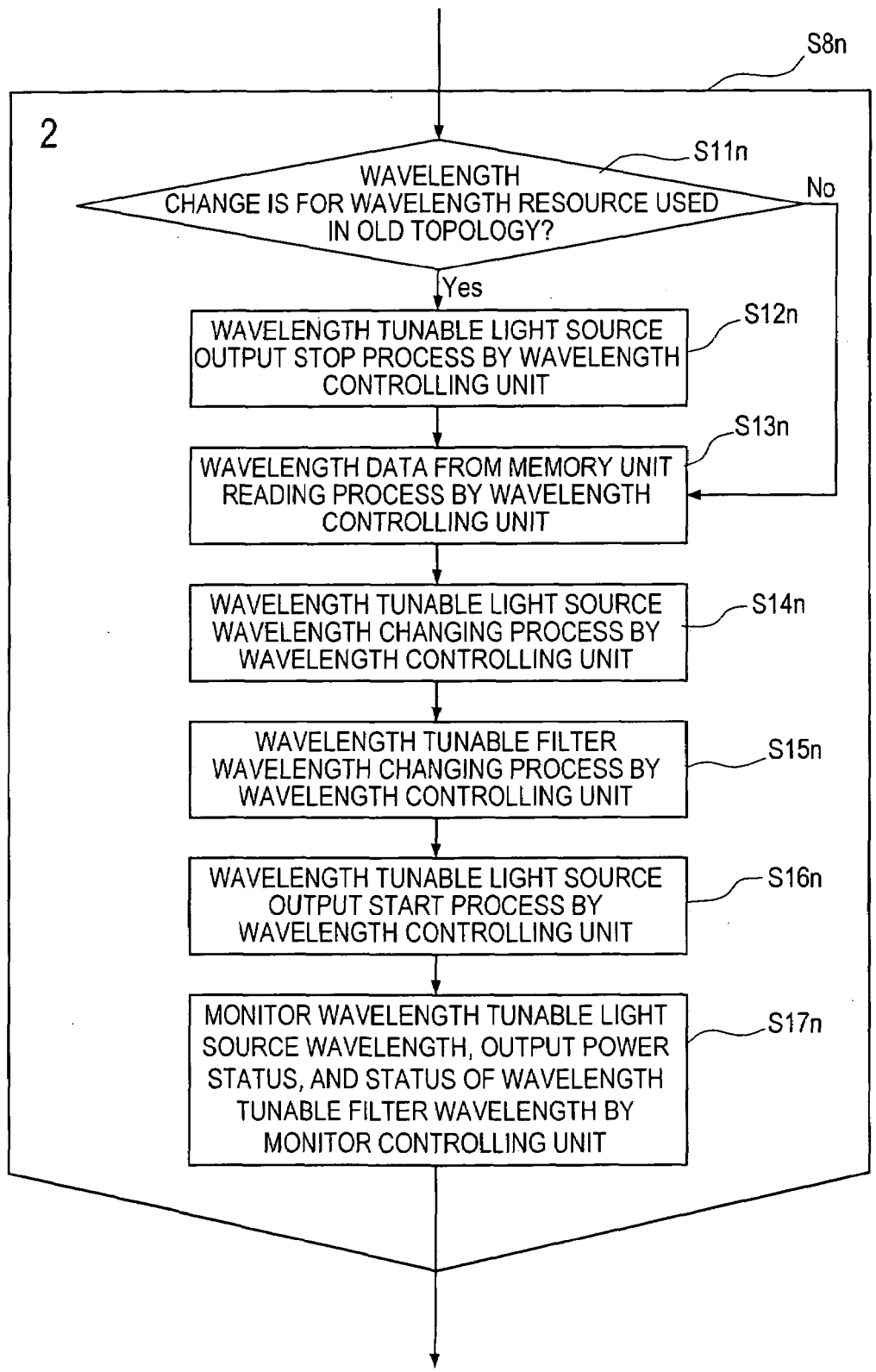
Figures 4, 5, 6, 7, 8:
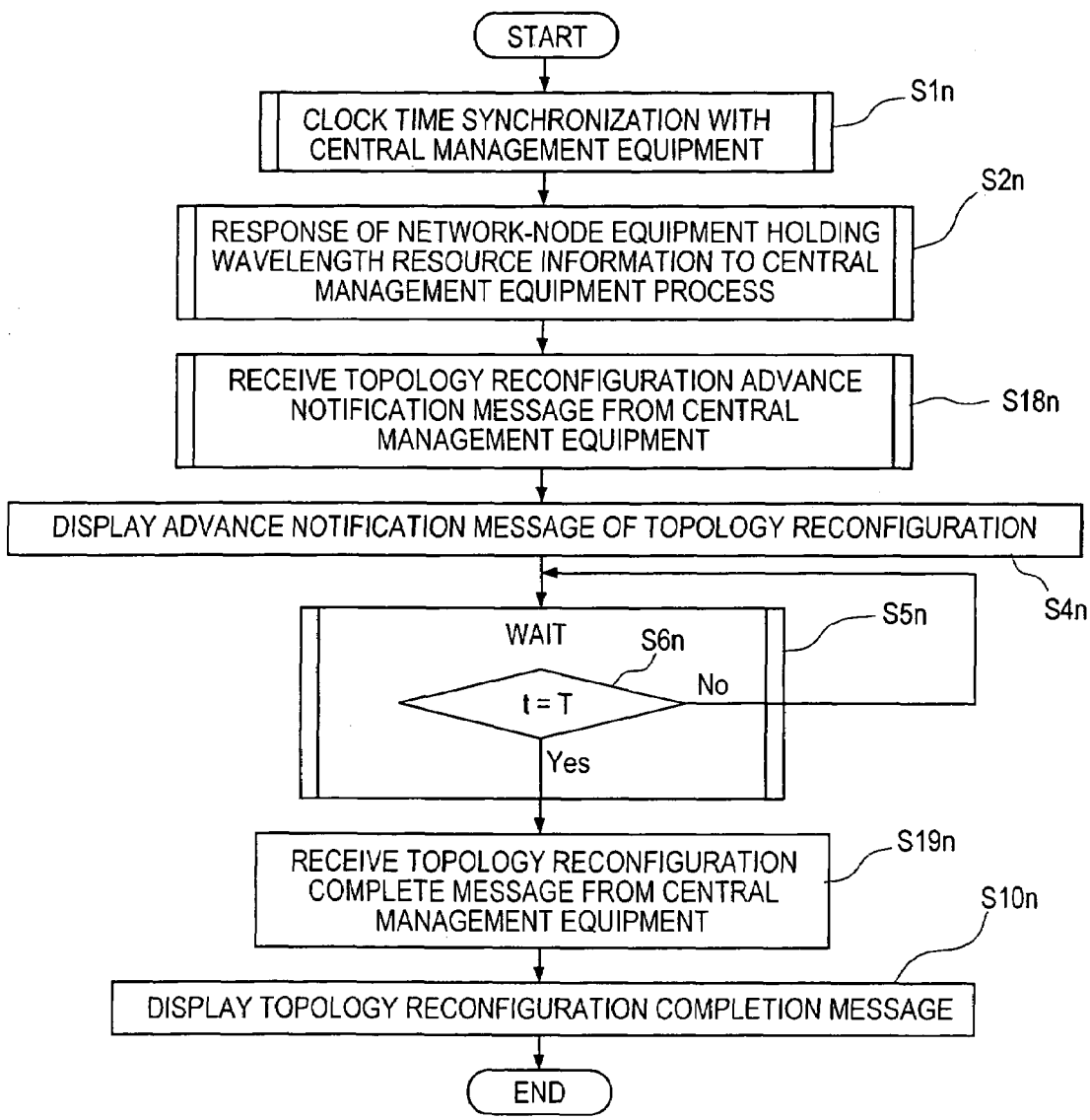
Figures 4, 5, 6, 7, 8, 9:
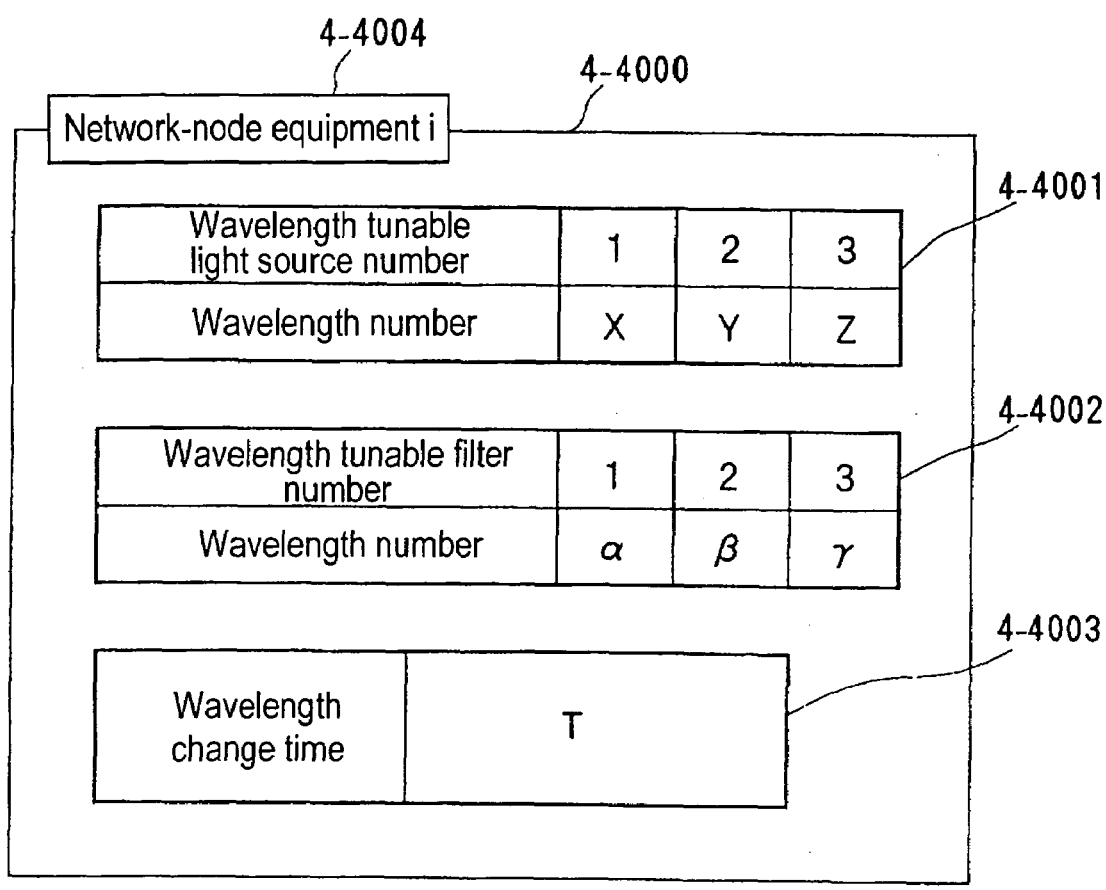
Figures 4, 5, 6, 7, 8, 9, 10:
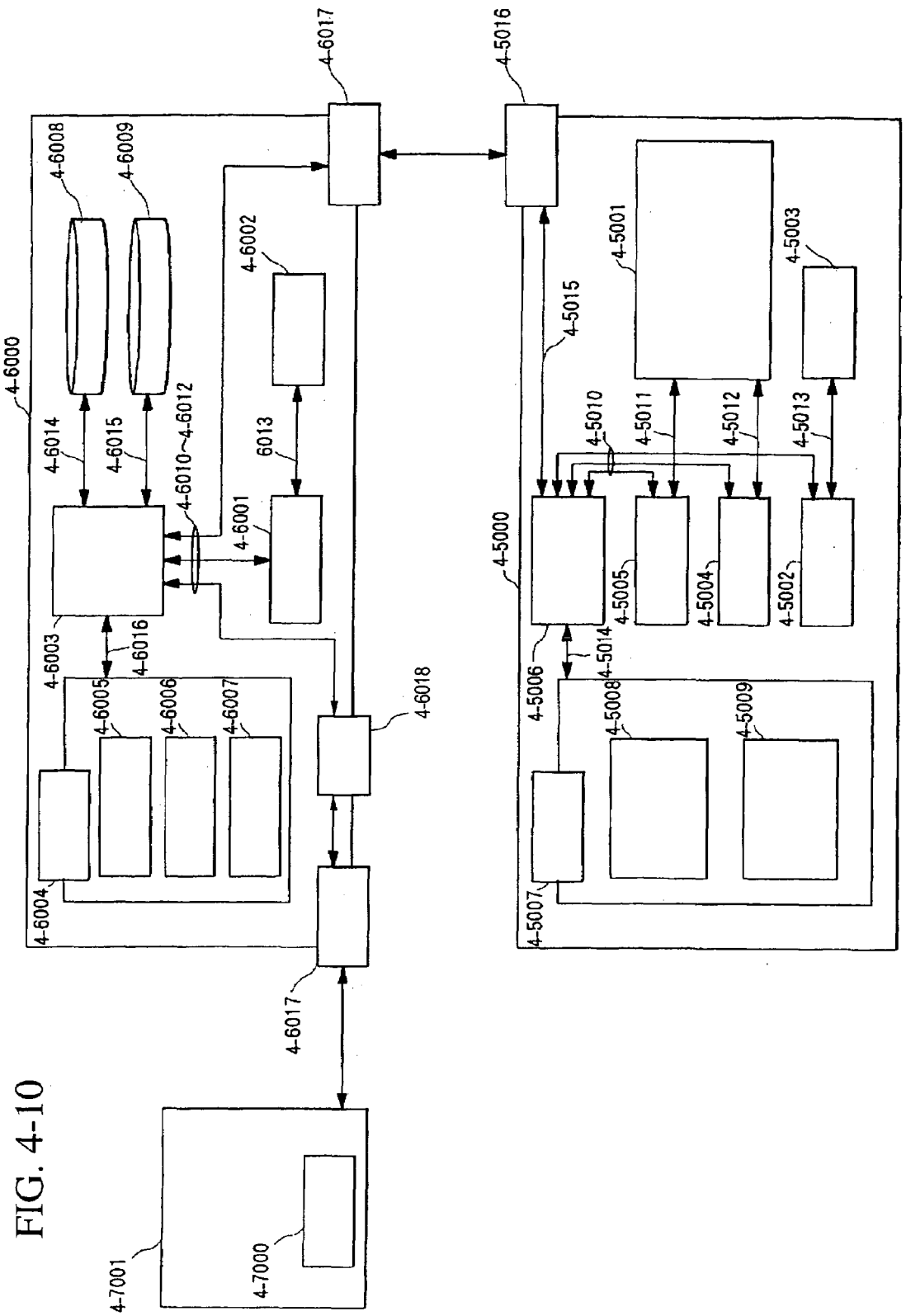
Figures 4, 5, 6, 7, 8, 9, 10, 11:
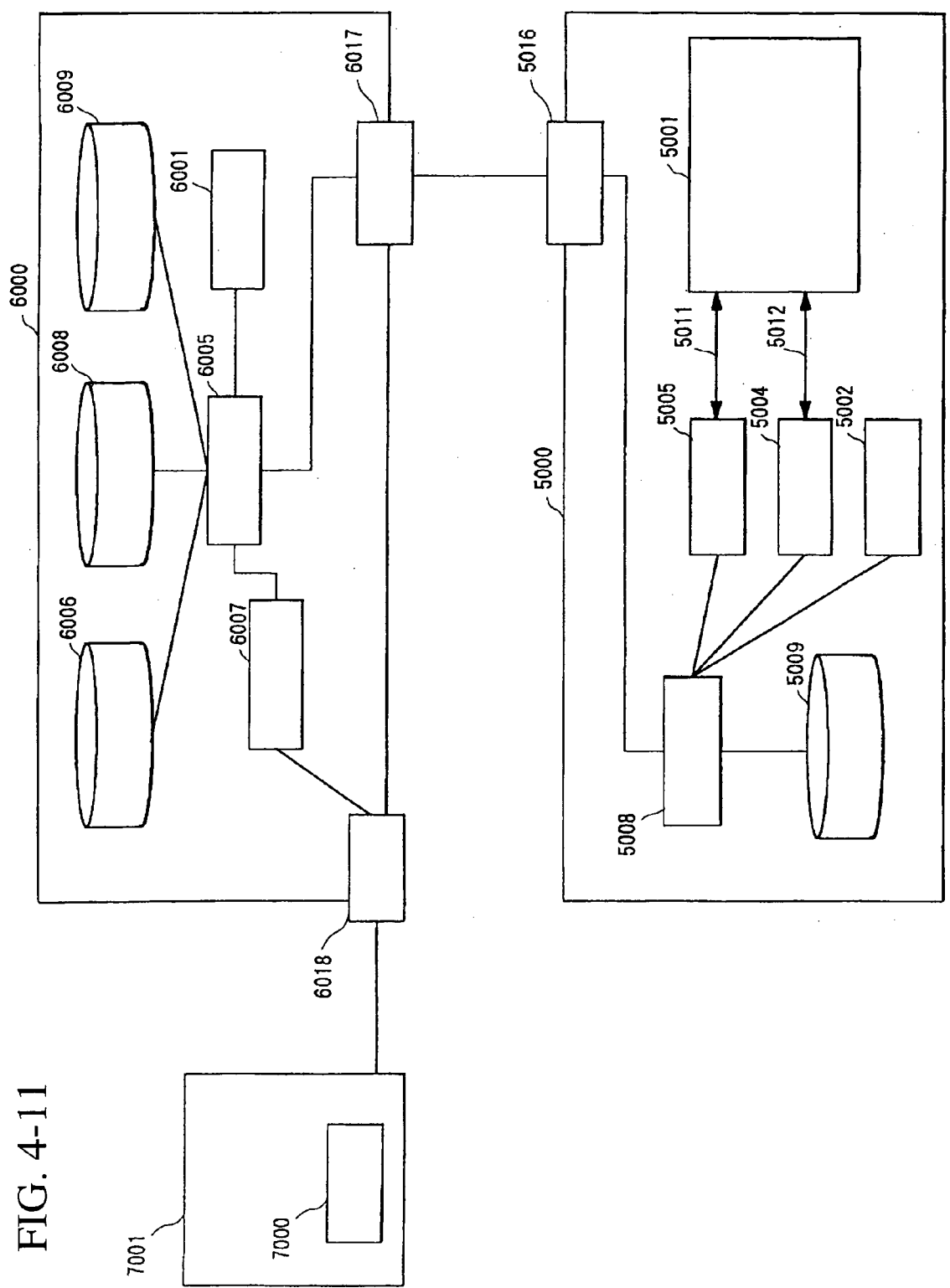
Figures 4, 5, 6, 7, 8, 9, 10, 11, 12, 13:
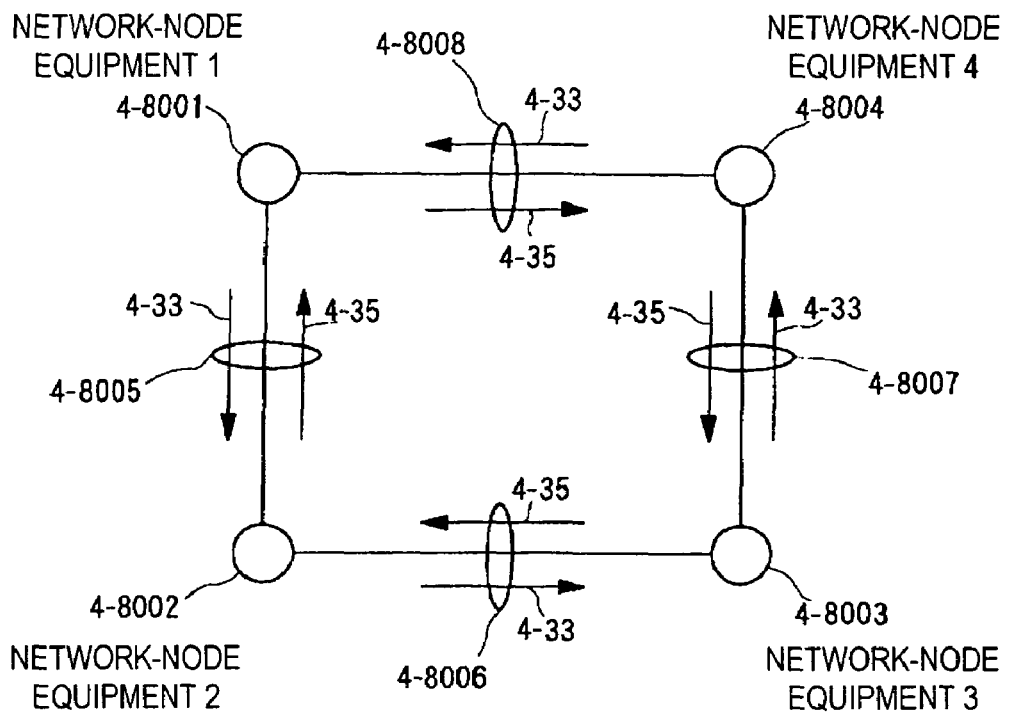
Figures 4, 5, 6, 7, 8, 9, 10, 11, 12, 13, 14, 15:
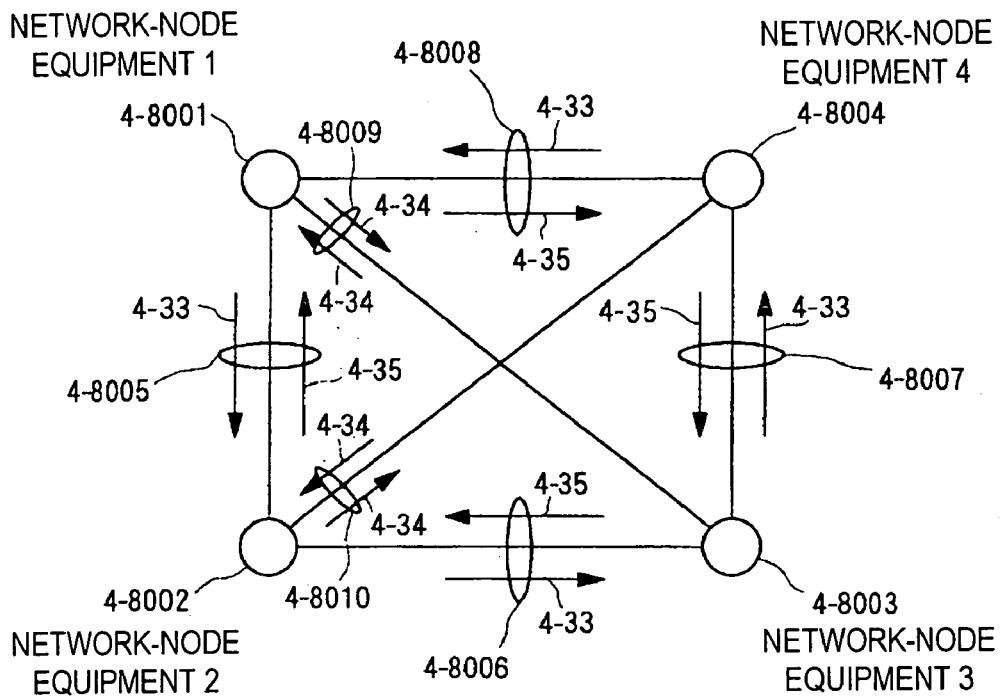
Figures 4, 5, 6, 7, 8, 9, 10, 11, 12, 13, 14, 15, 16:
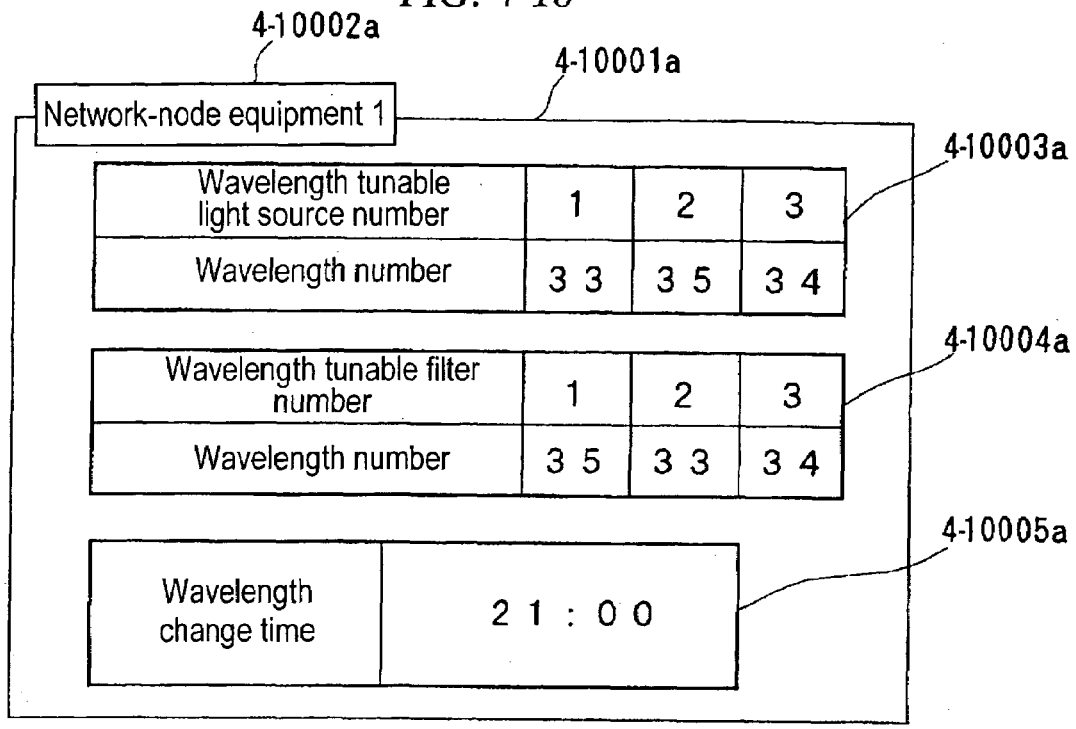
Figures 4, 5, 6, 7, 8, 9, 10, 11, 12, 13, 14, 15, 16, 17:
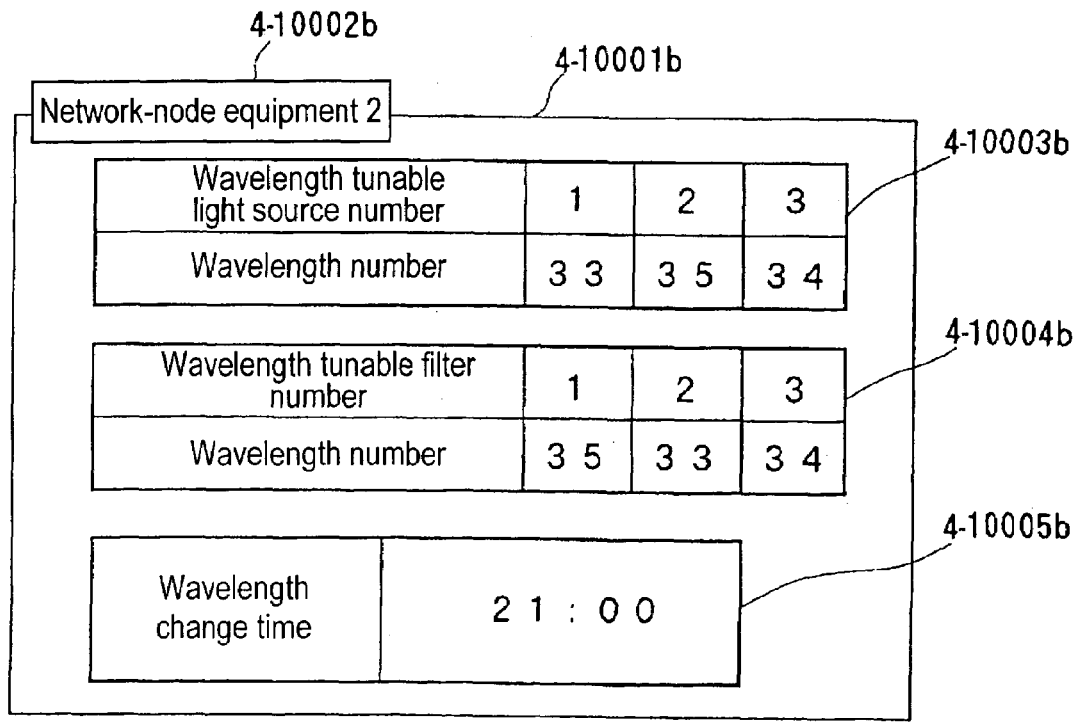
Figures 4, 5, 6, 7, 8, 9, 10, 11, 12, 13, 14, 15, 16, 17, 18:
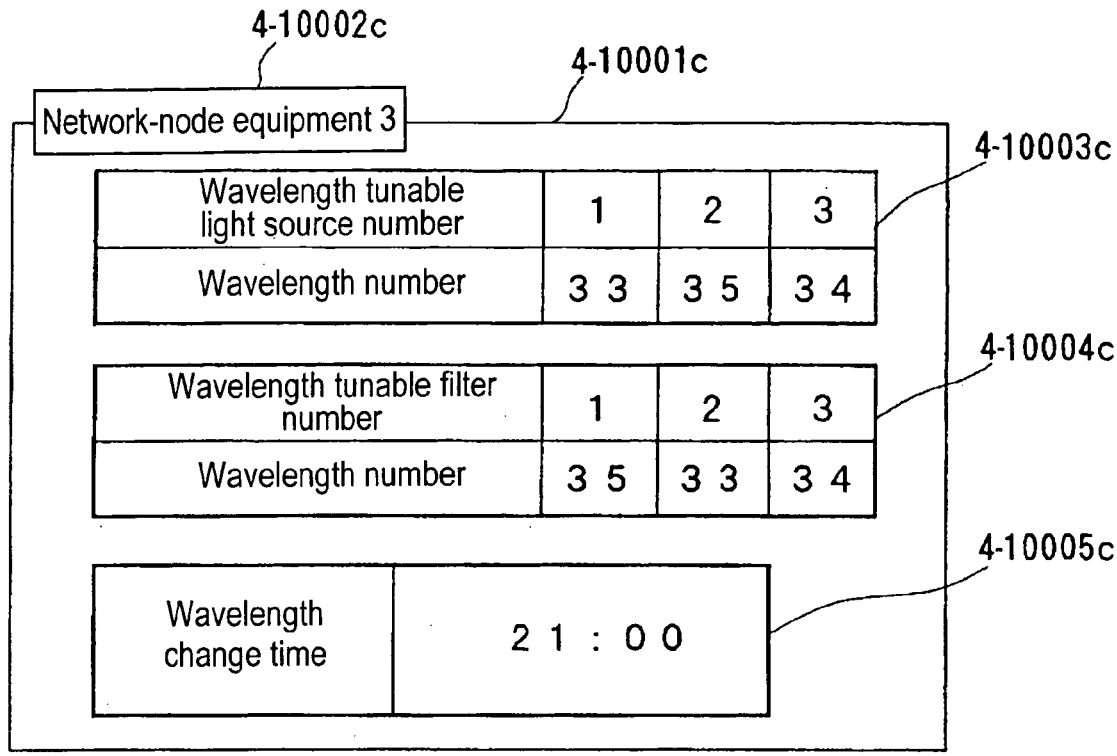
Figures 4, 5, 6, 7, 8, 9, 10, 11, 12, 13, 14, 15, 16, 17, 18, 19:
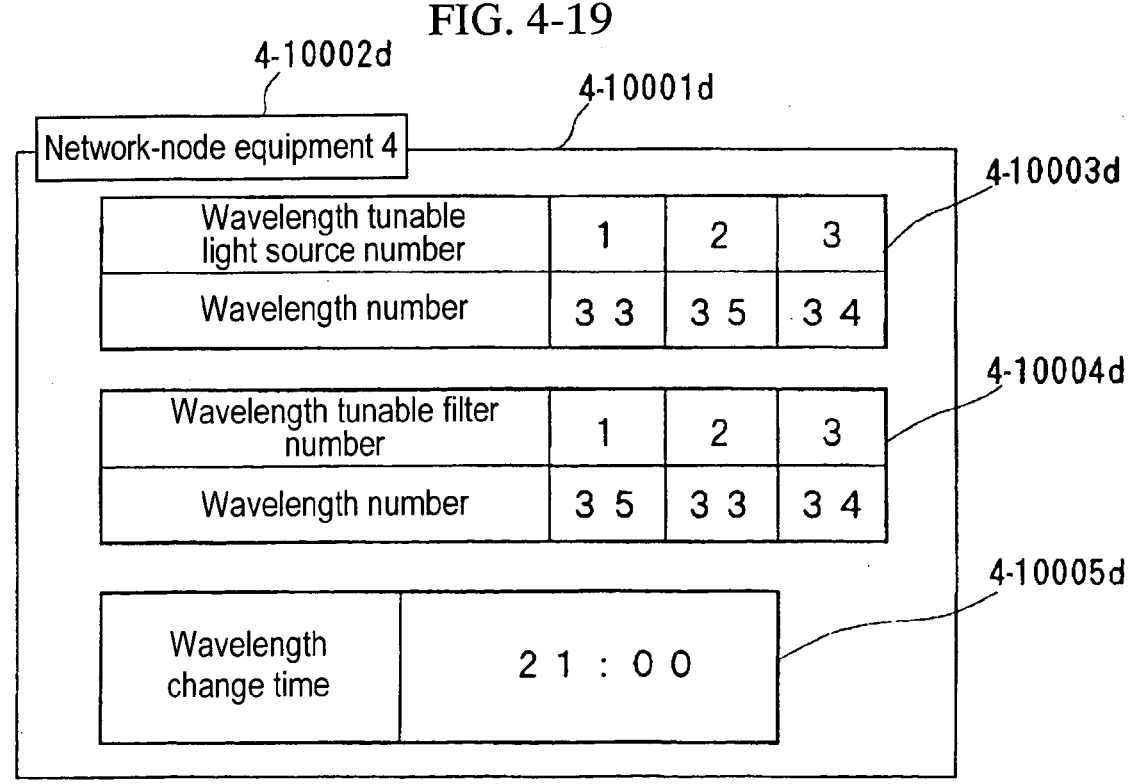
Figures 4, 5, 6, 7, 8, 9, 10, 11, 12, 13, 14, 15, 16, 17, 18, 19, 20:
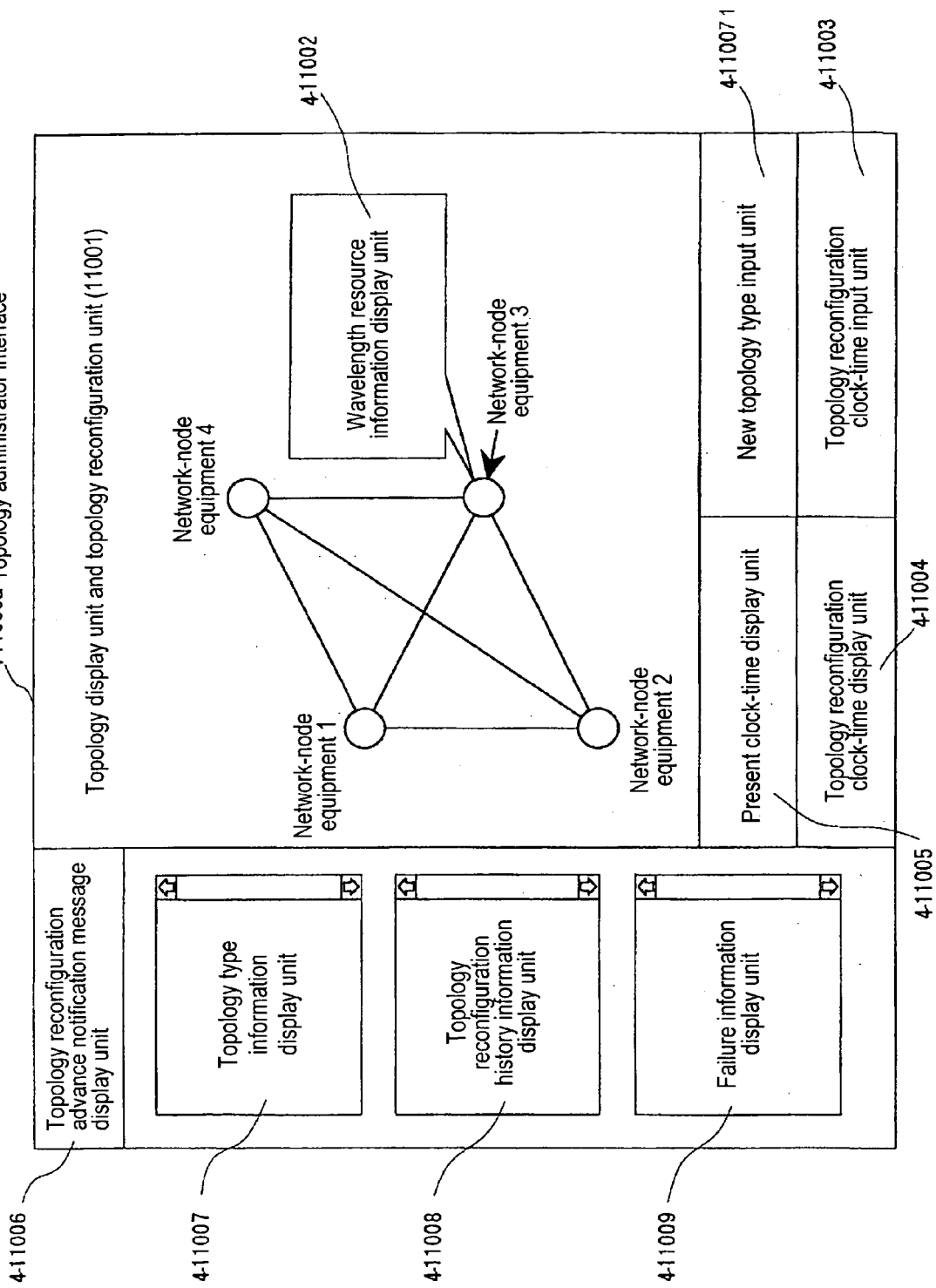
Figures 4, 5, 6, 7, 8, 9, 10, 11, 12, 13, 14, 15, 16, 17, 18, 19, 20, 21:
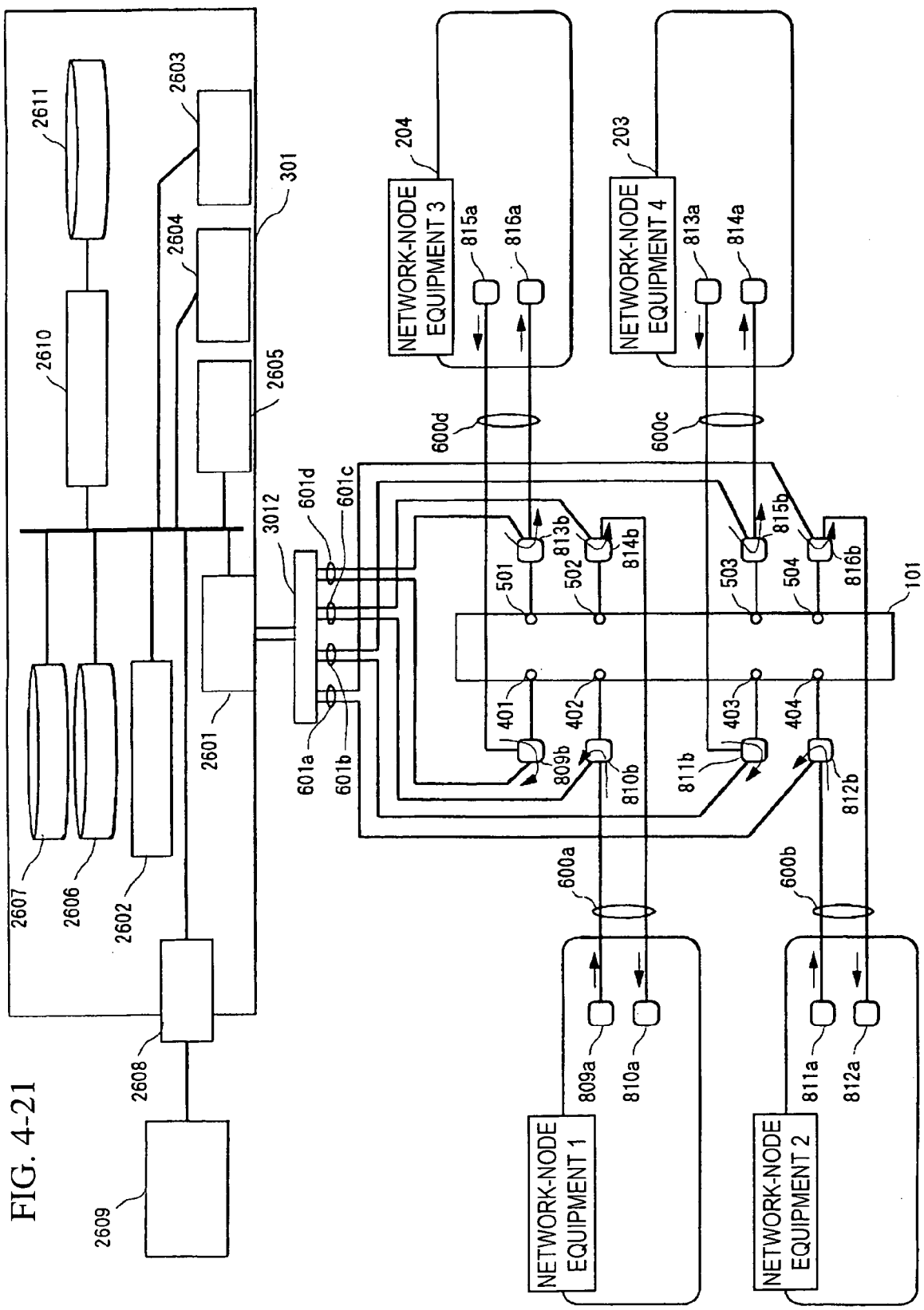
Figures 4, 5, 6, 7, 8, 9, 10, 11, 12, 13, 14, 15, 16, 17, 18, 19, 20, 21, 22:
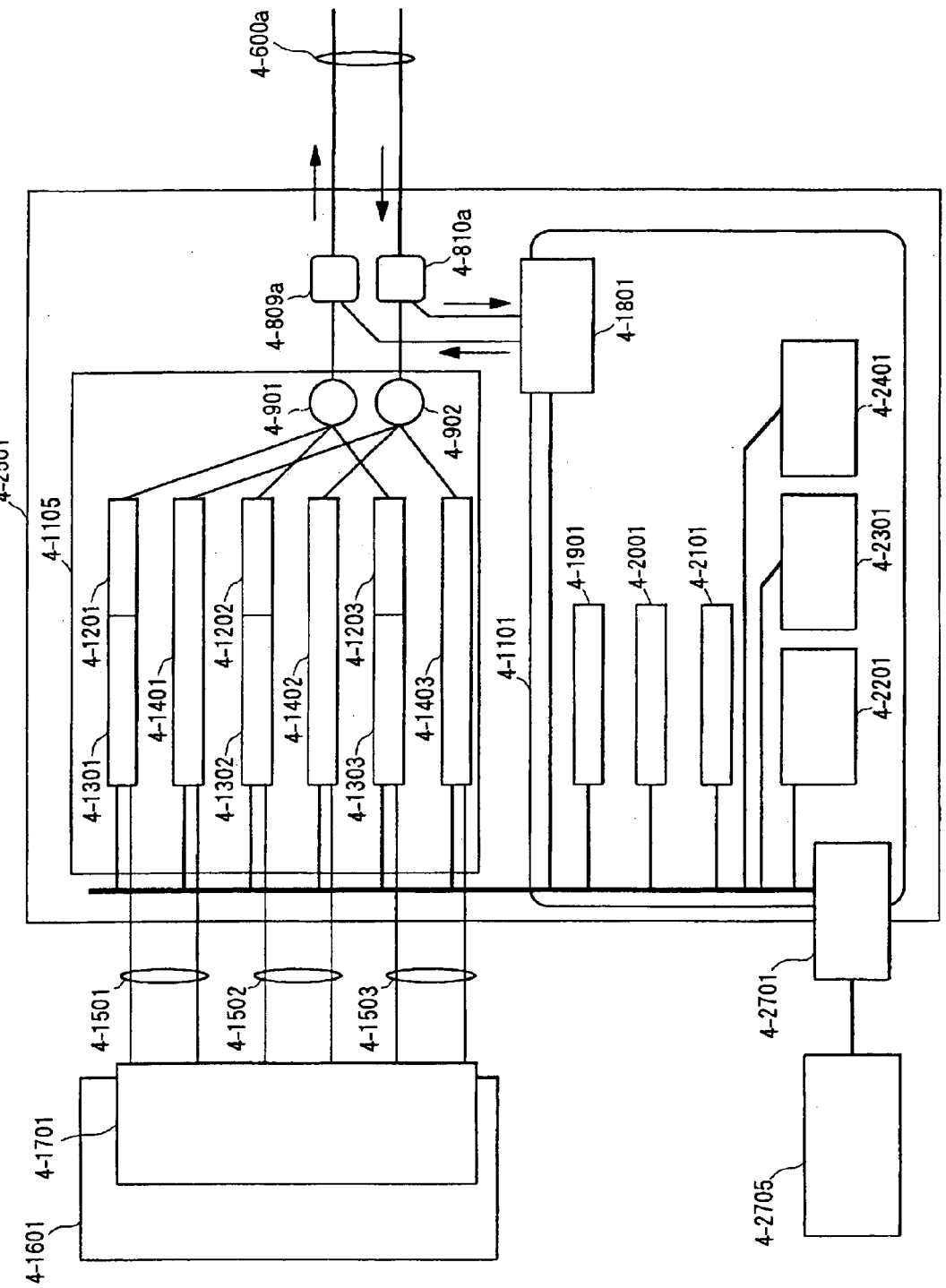
Figures 4, 5, 6, 7, 8, 9, 10, 11, 12, 13, 14, 15, 16, 17, 18, 19, 20, 21, 22, 23:
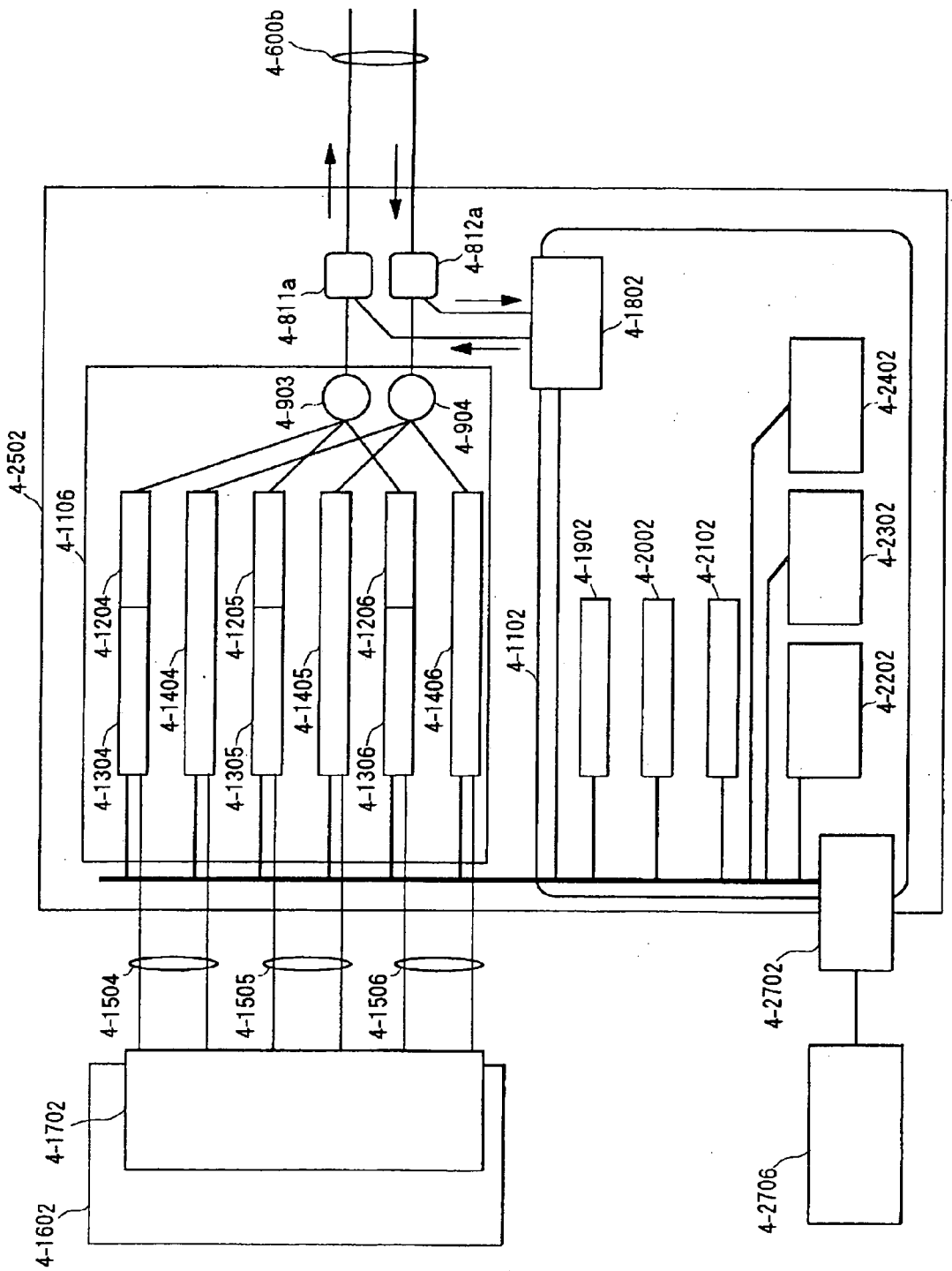
Figures 4, 5, 6, 7, 8, 9, 10, 11, 12, 13, 14, 15, 16, 17, 18, 19, 20, 21, 22, 23, 24:
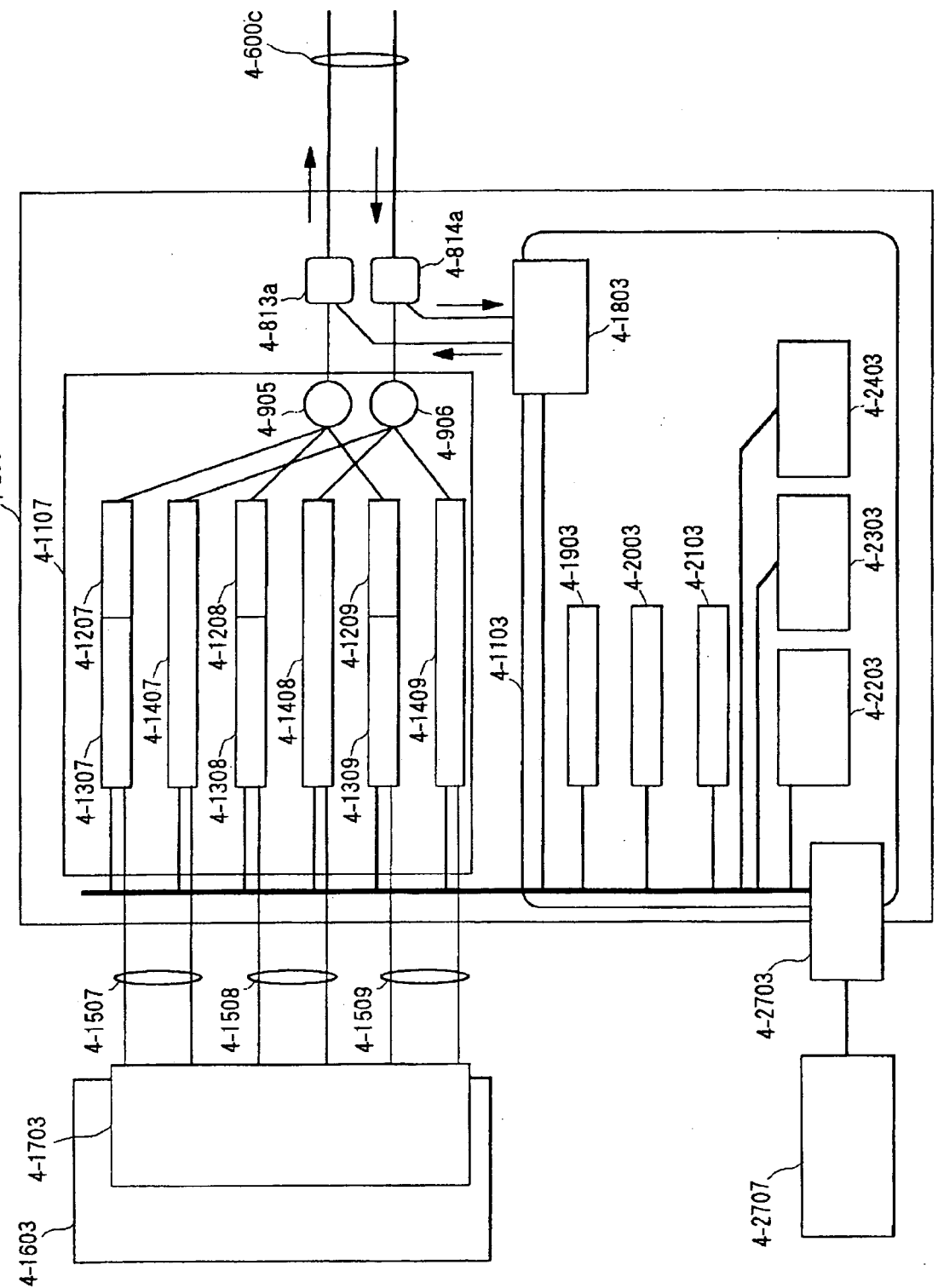
Figures 4, 5, 6, 7, 8, 9, 10, 11, 12, 13, 14, 15, 16, 17, 18, 19, 20, 21, 22, 23, 24, 25:
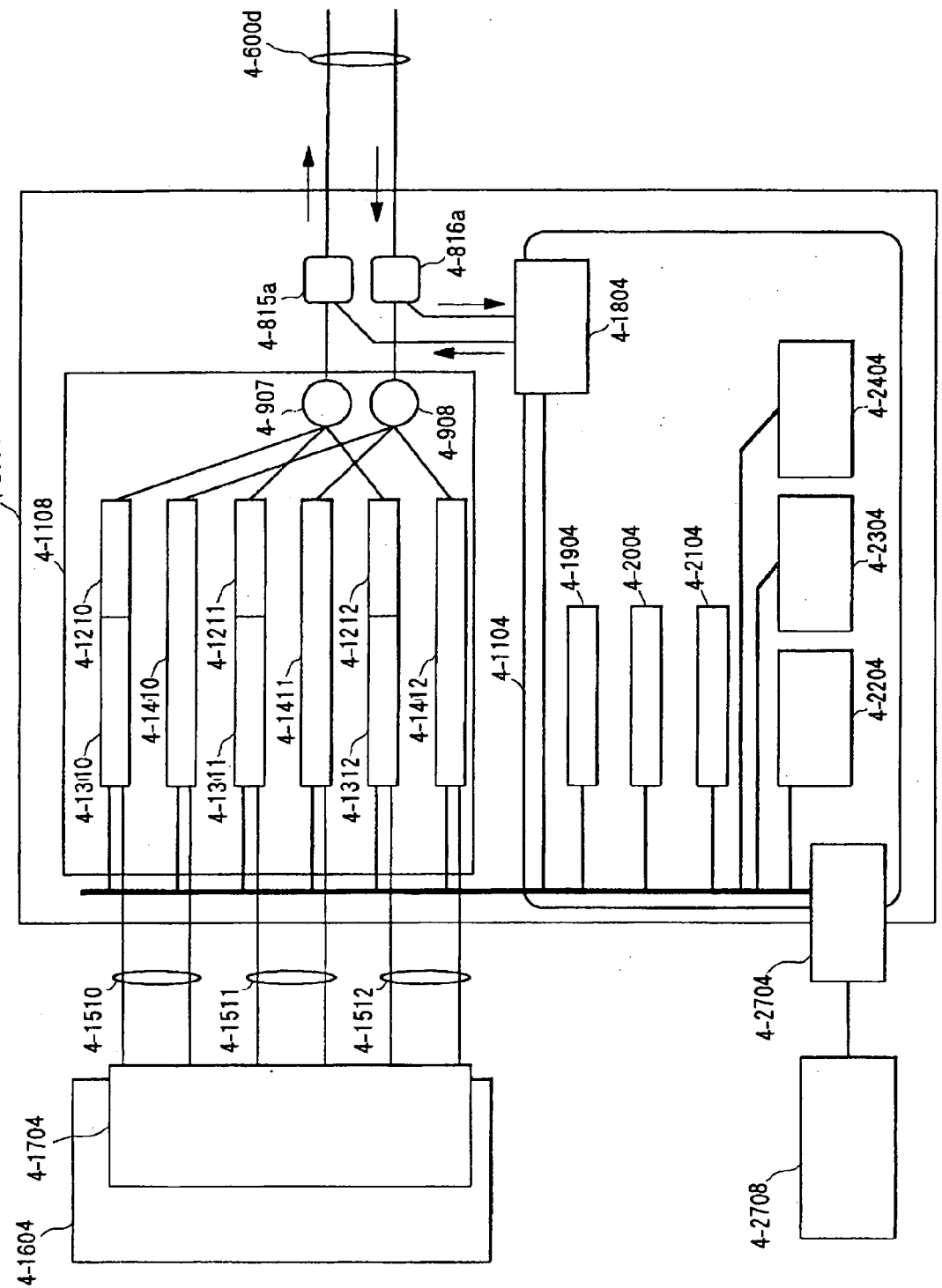
Figures 4, 5, 6, 7, 8, 9, 10, 11, 12, 13, 14, 15, 16, 17, 18, 19, 20, 21, 22, 23, 24, 25, 26:
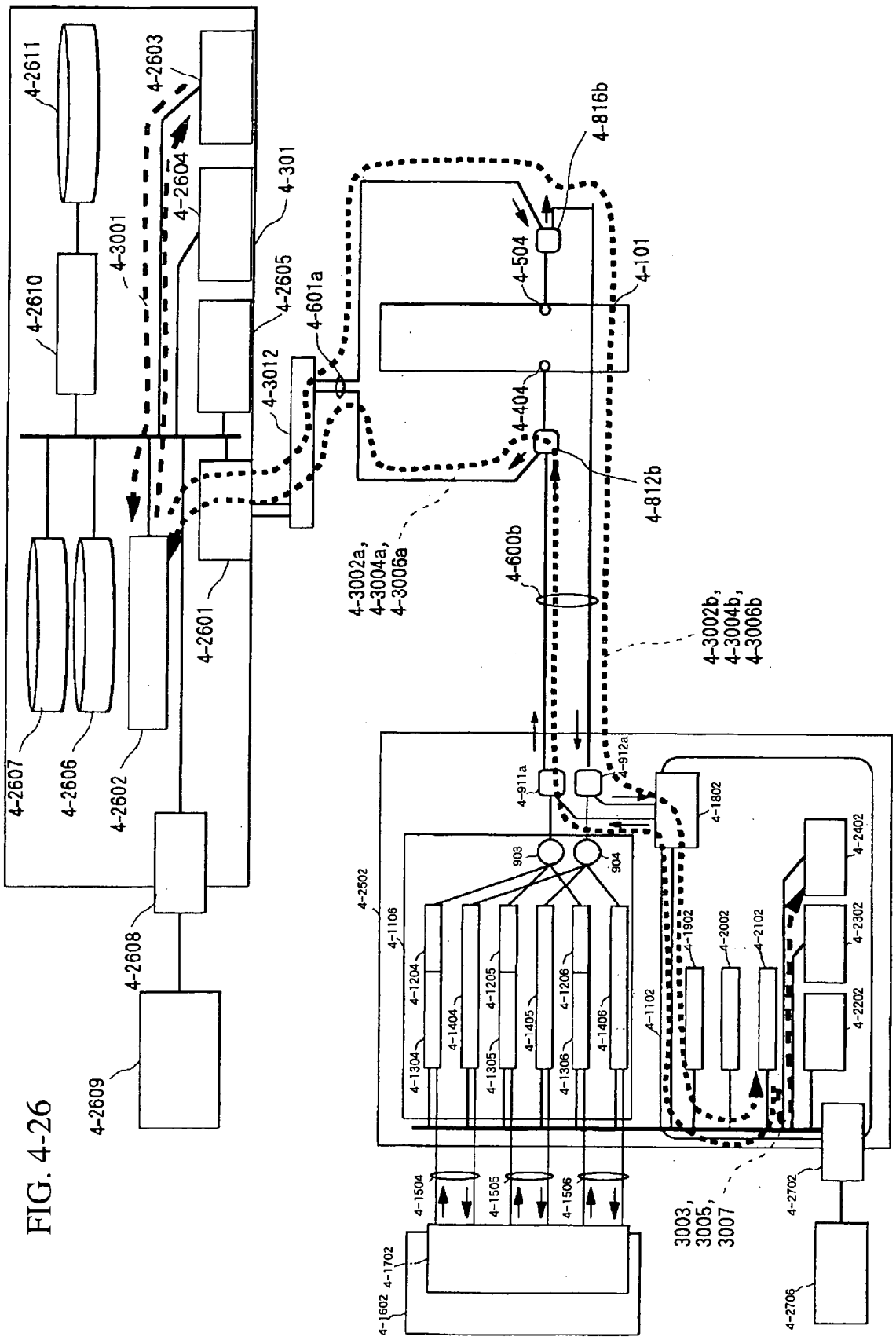
Figures 4, 5, 6, 7, 8, 9, 10, 11, 12, 13, 14, 15, 16, 17, 18, 19, 20, 21, 22, 23, 24, 25, 26, 27:
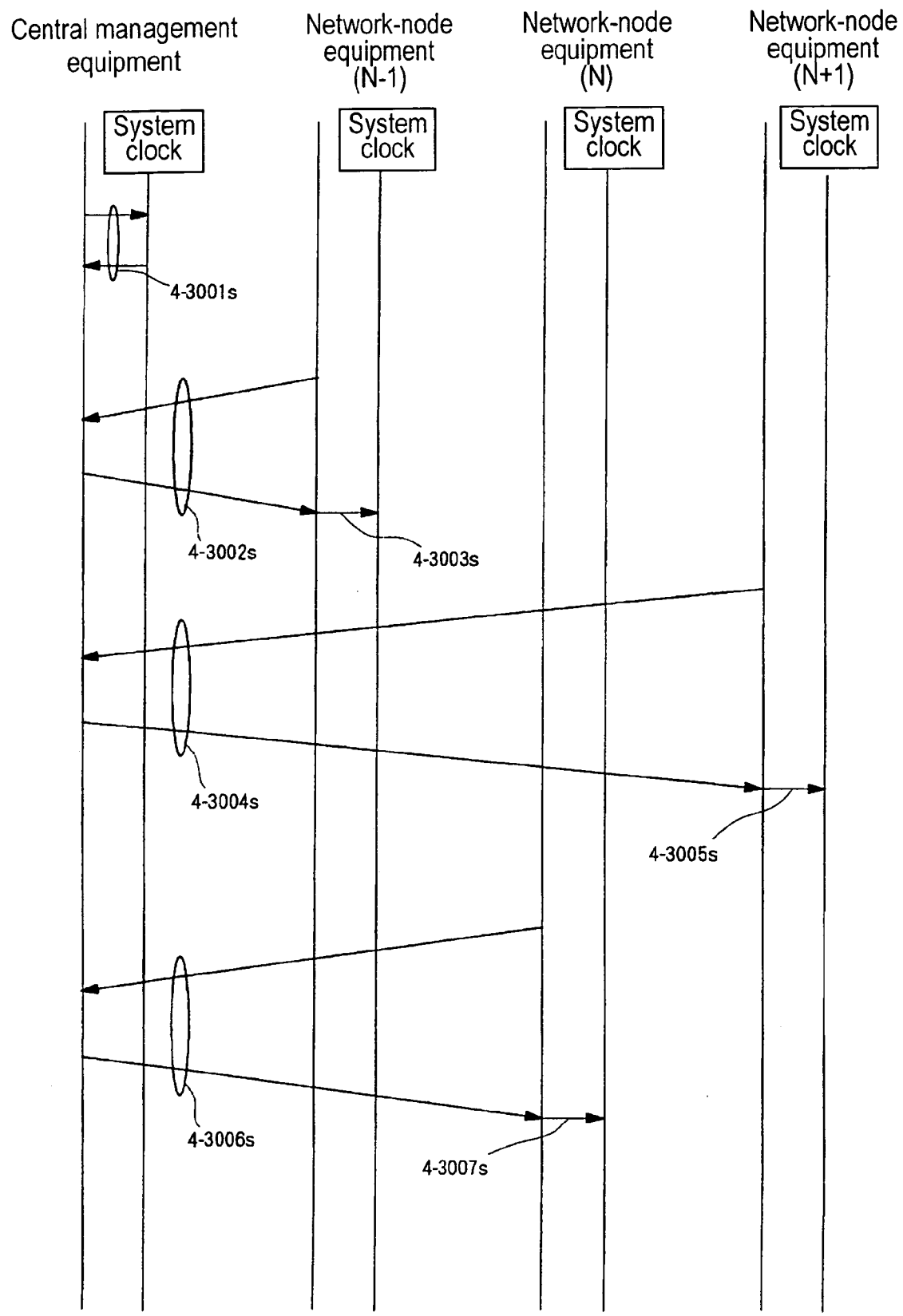
Figures 4, 5, 6, 7, 8, 9, 10, 11, 12, 13, 14, 15, 16, 17, 18, 19, 20, 21, 22, 23, 24, 25, 26, 27, 28:
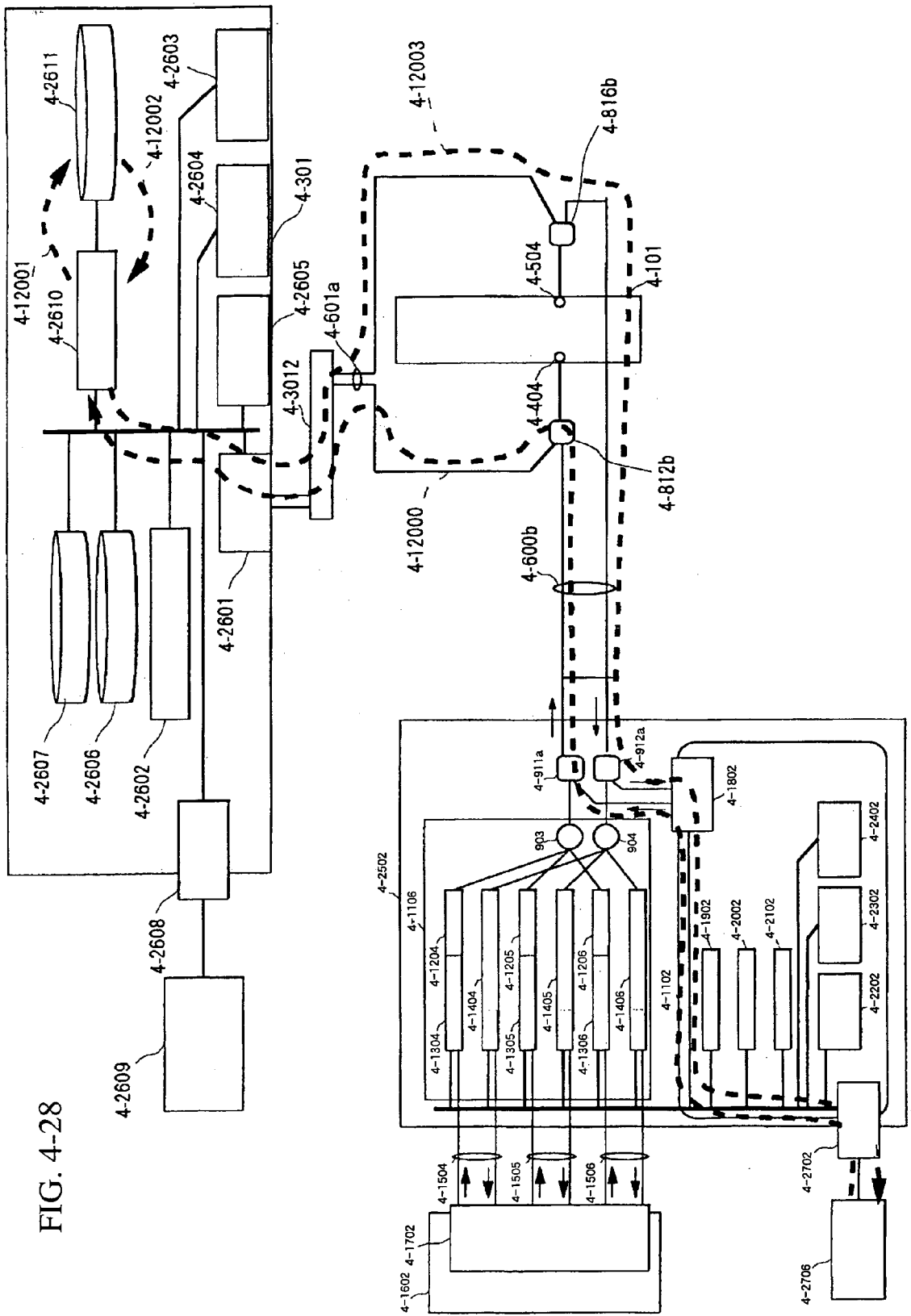
Figures 4, 5, 6, 7, 8, 9, 10, 11, 12, 13, 14, 15, 16, 17, 18, 19, 20, 21, 22, 23, 24, 25, 26, 27, 28, 29:
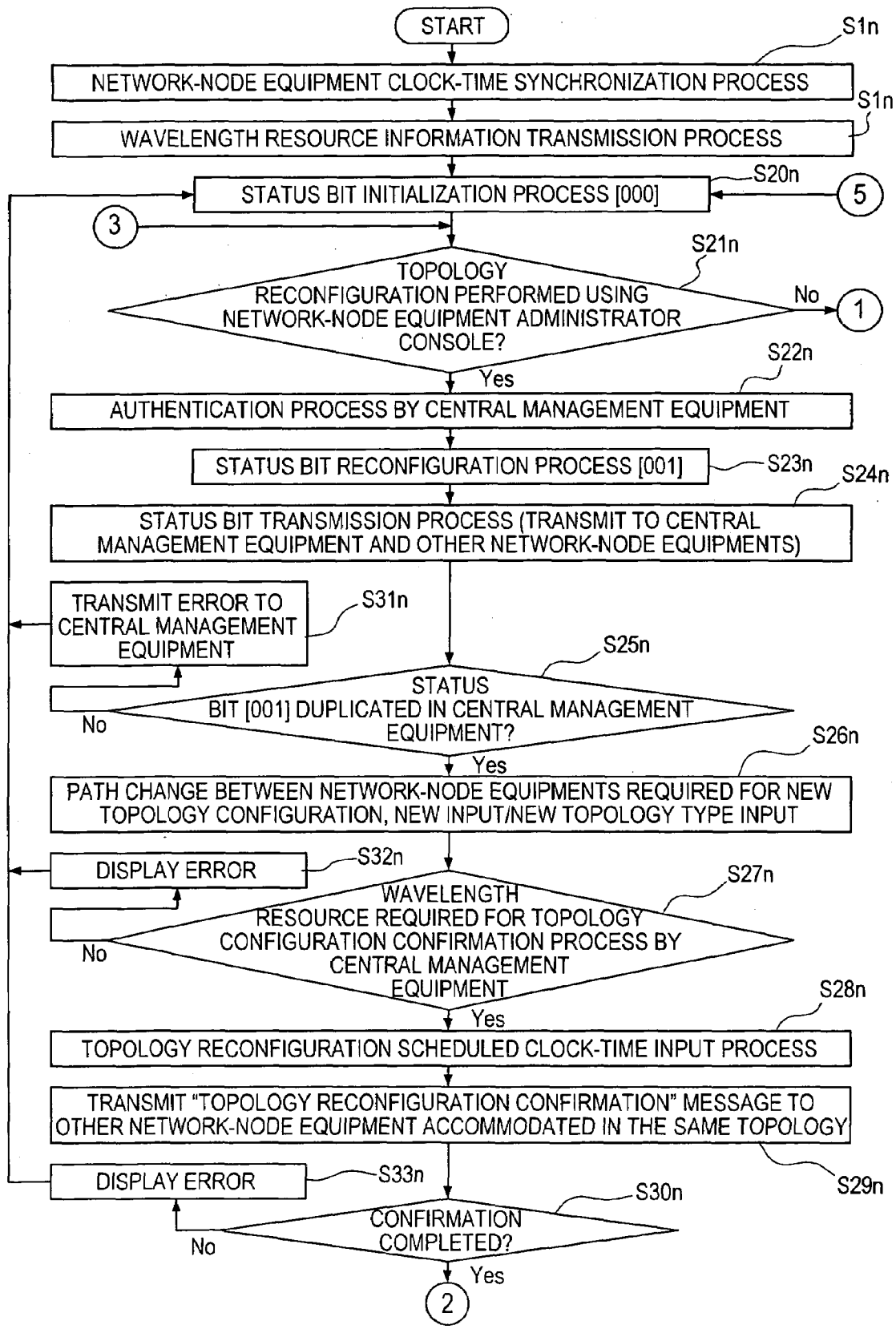
Figures 4, 5, 6, 7, 8, 9, 10, 11, 12, 13, 14, 15, 16, 17, 18, 19, 20, 21, 22, 23, 24, 25, 26, 27, 28, 29, 30:
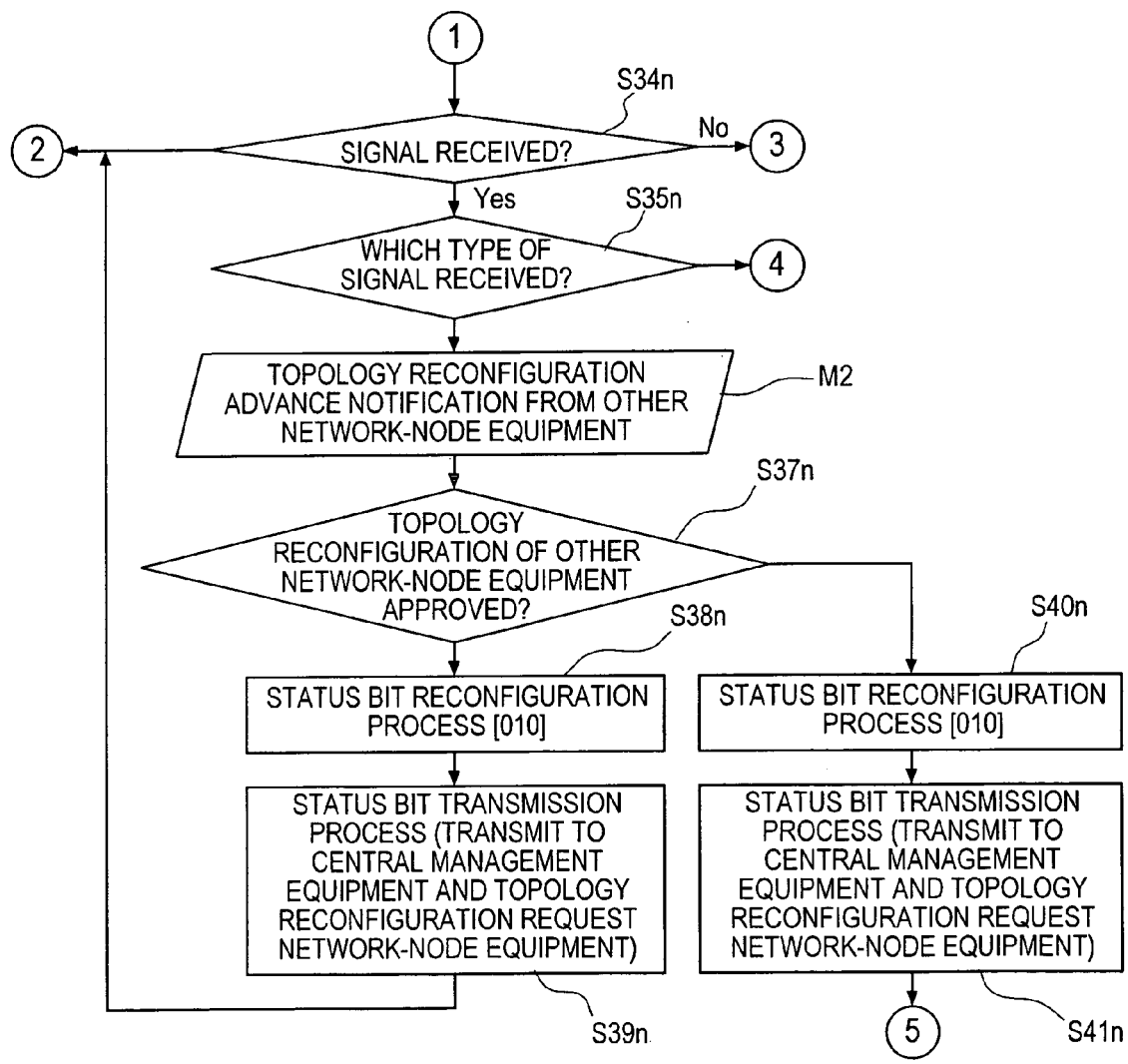
Figures 4, 5, 6, 7, 8, 9, 10, 11, 12, 13, 14, 15, 16, 17, 18, 19, 20, 21, 22, 23, 24, 25, 26, 27, 28, 29, 30, 31:
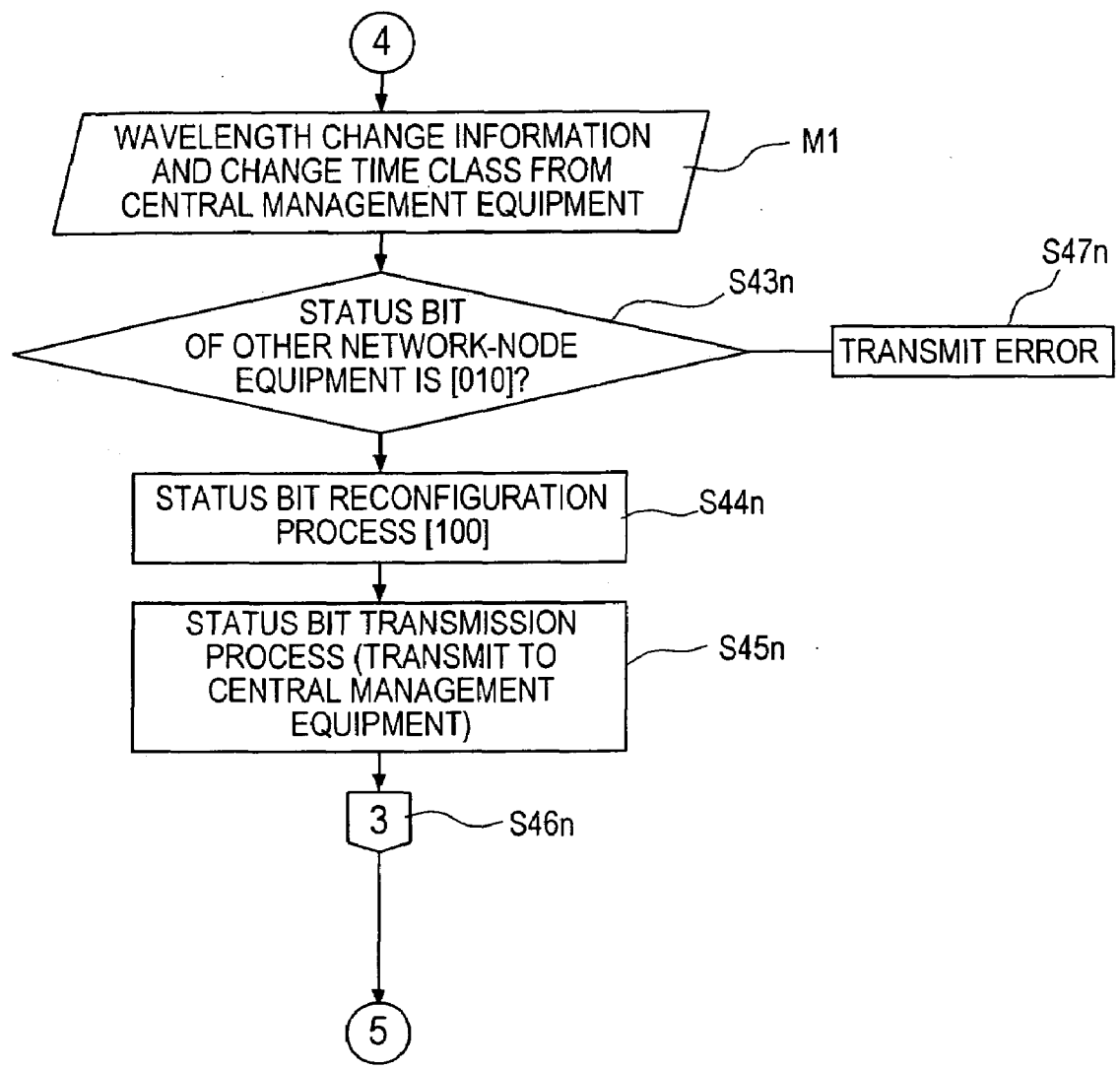
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32:
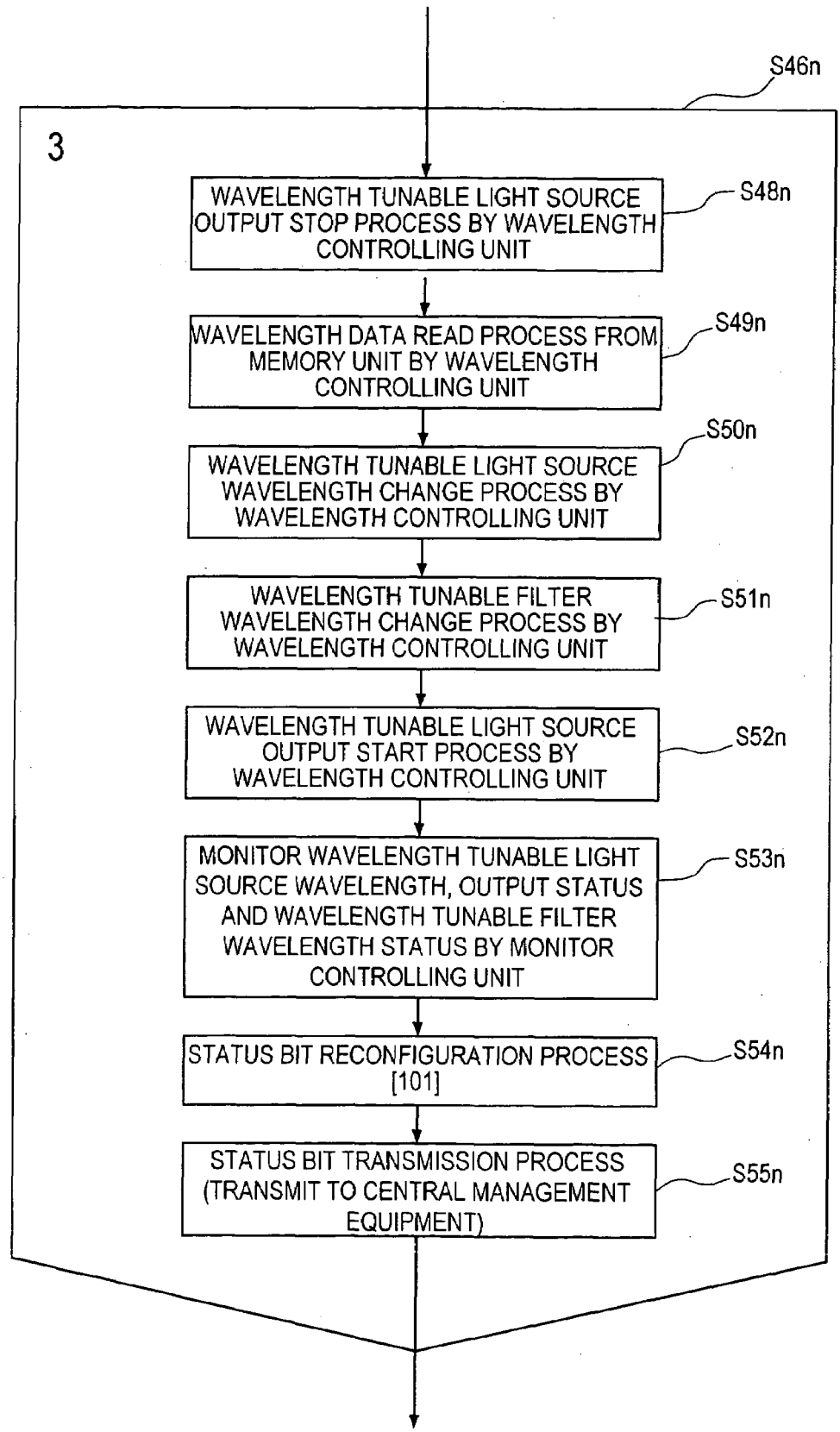
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34:
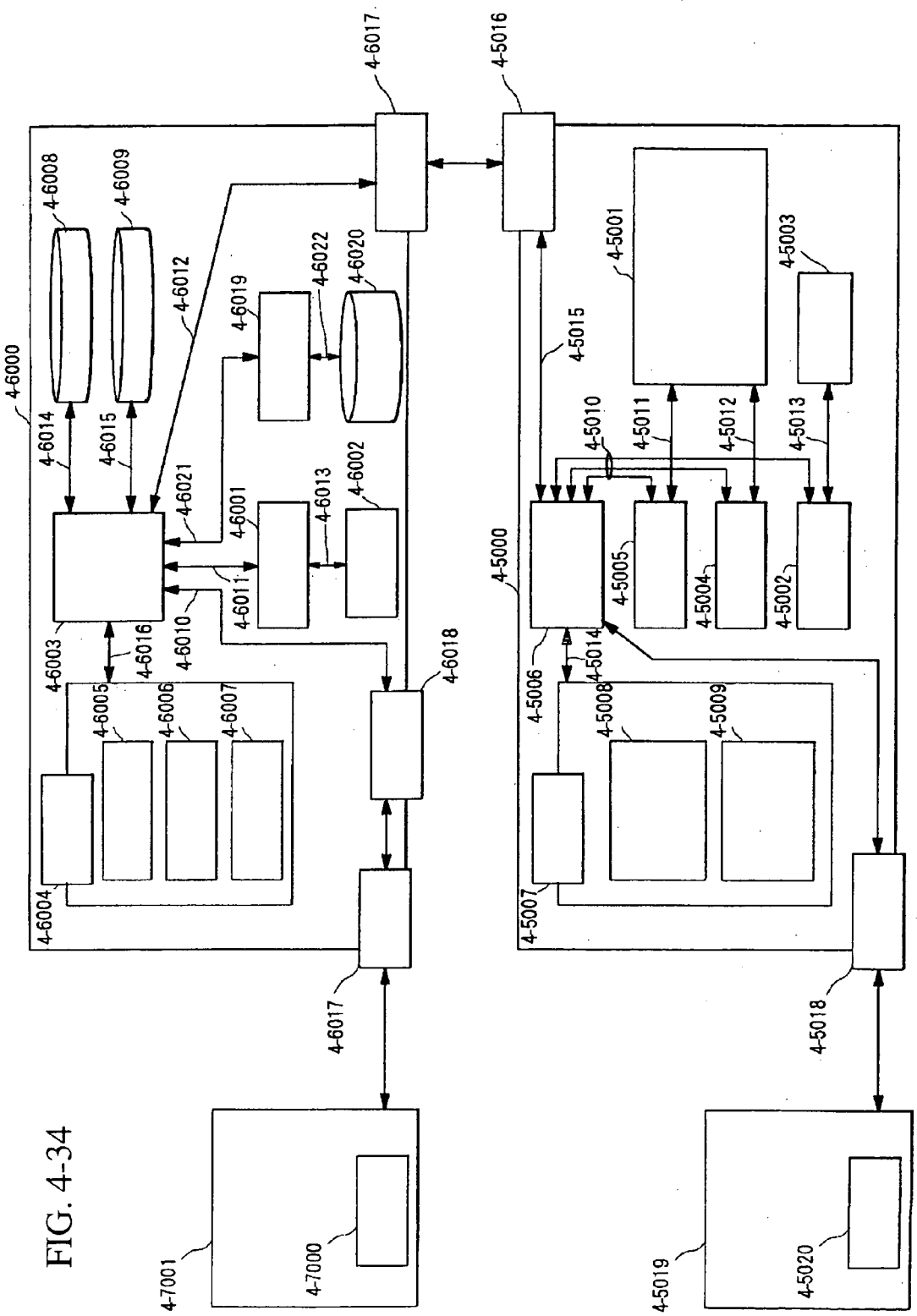
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35:
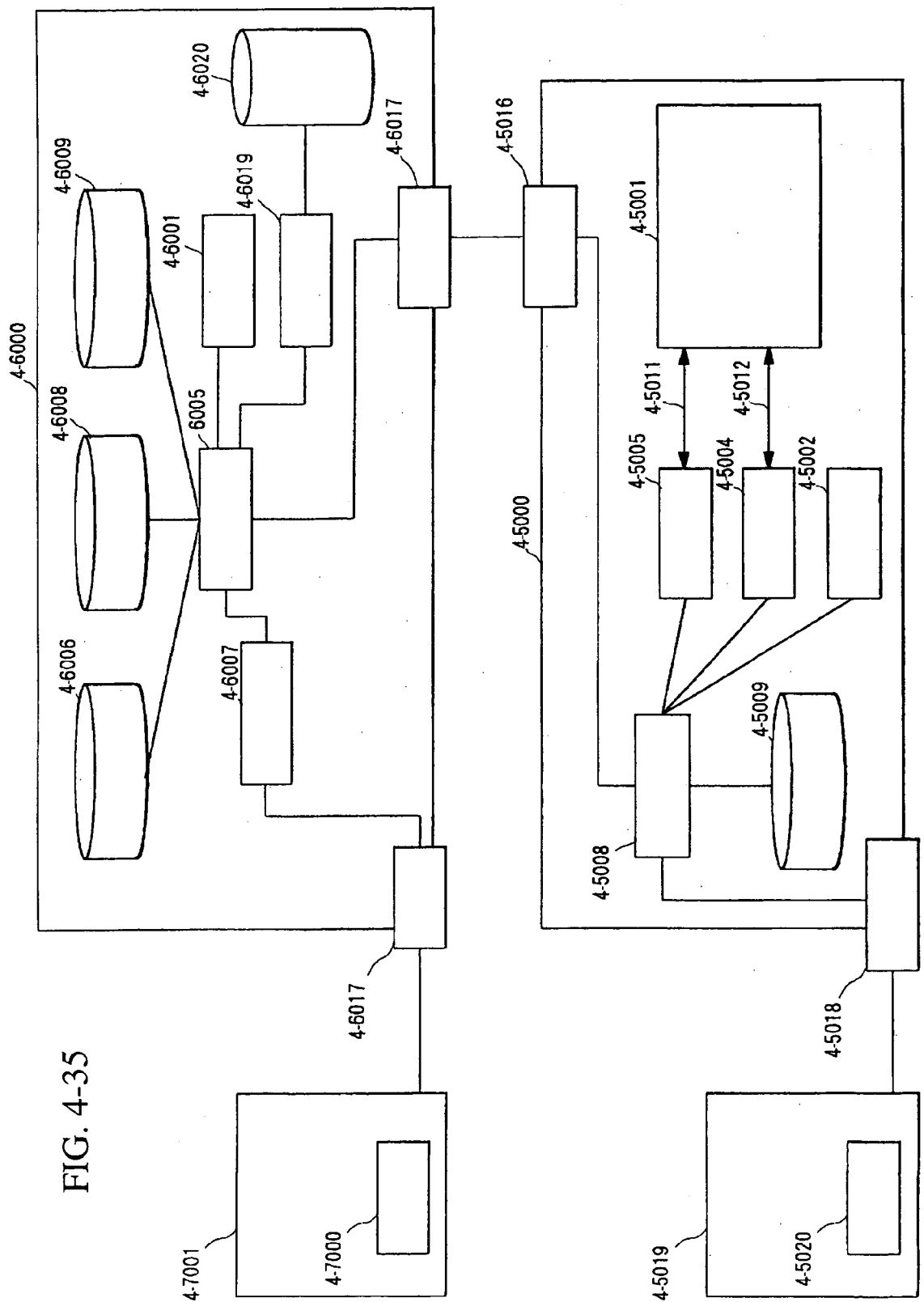
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36:
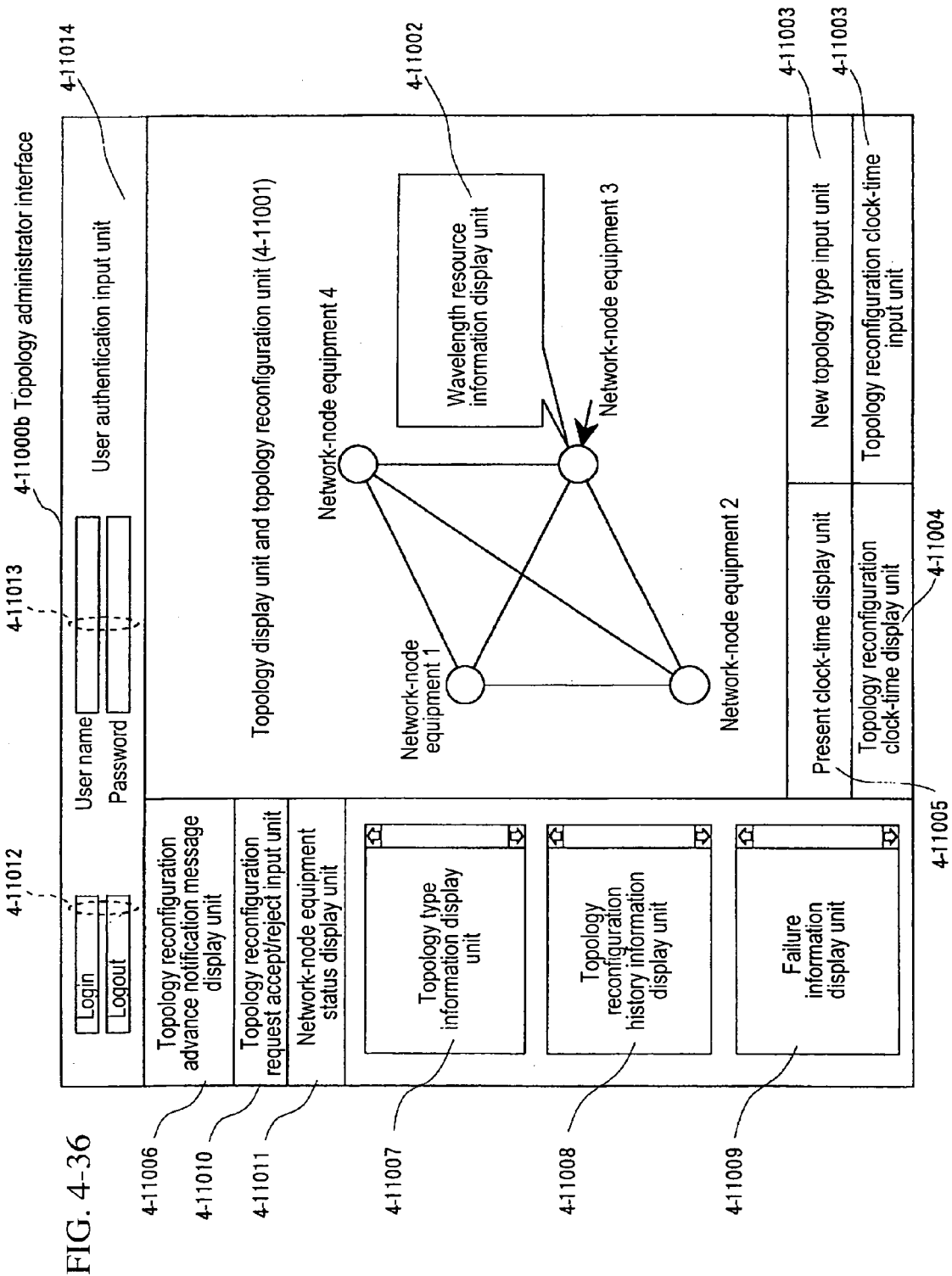
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37:
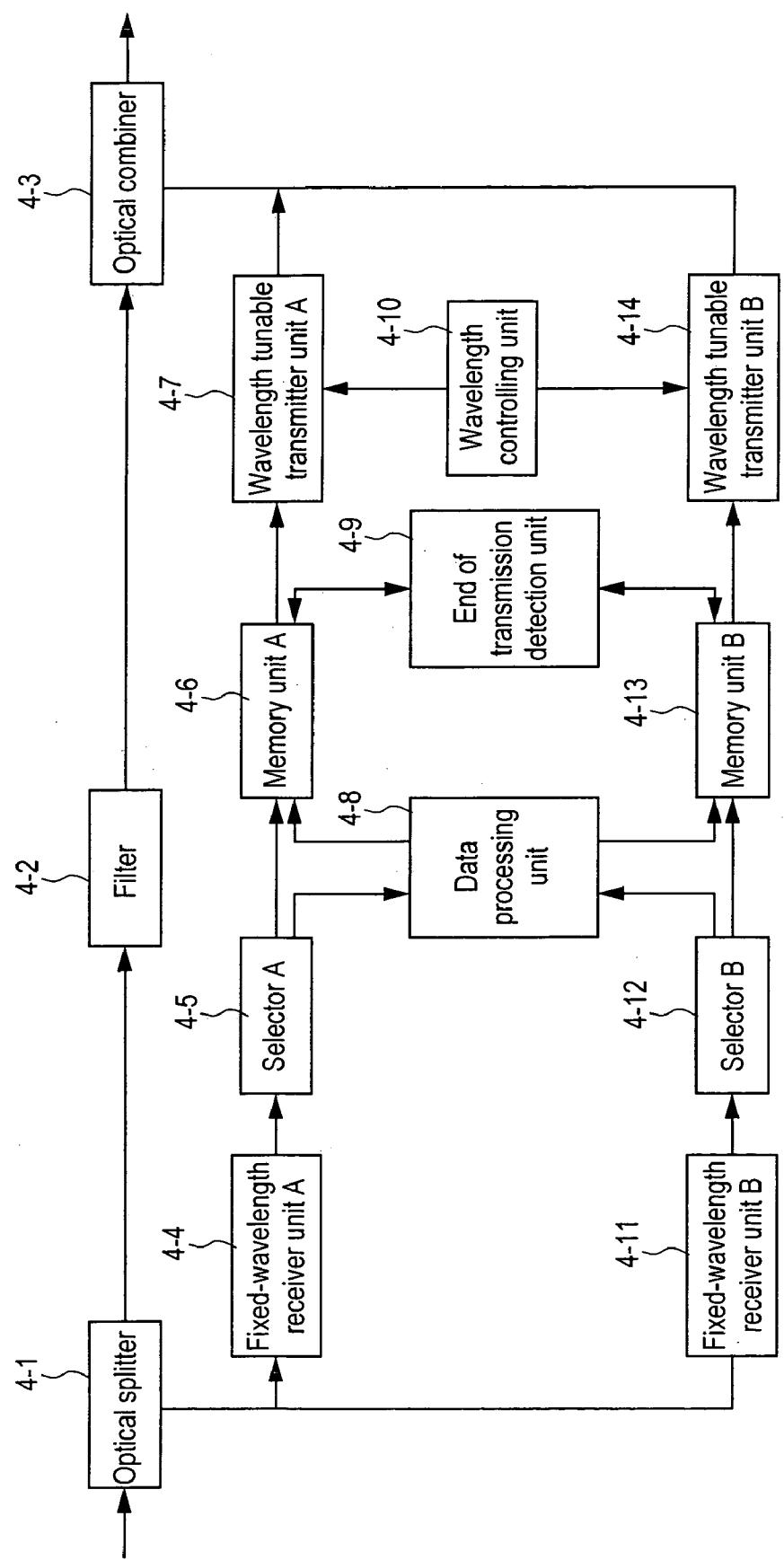

FIG. 4-4 and FIG. 4-5 are a flow chart associated with the processing of wavelength control in the central management equipment 4-301 at the time of topology reconfiguration. The present flow chart shows the program flow by a topology controlling agent described later, which is stored in the memory unit 4-2604.

Firstly, after performing step S1c, "network-node equipment clock-time synchronization process", being a process to synchronize the clock-time to the network-node equipment control unit 1102, step S2c, "network-node equipment wavelength resource information collecting process" is performed, which reads each of the wavelength ranges capable of being transmitted and received by the wavelength tunable light sources 4-1304 to 1306 and the wavelength tunable filters 1404 to 1406, located in the wavelength tunable transmitter and receiver unit 4-1106.

A person, being a topology administrator, performs step S2.1c, "specify topology to be reconfigured" for specifying a topology, being the topology object to be reconfigured, via the topology administrator console 4-2609, then performs step S2.2c, "individual network-node equipment selection/ whole network-node equipment selection, and new topology type input", for selecting either the case of assigning and inputting a specific network-node equipment, or reconfiguring all the network-node equipments to a new type of topology.

In the case where the assignment and input of a specific network-node equipment is selected by the topology administrator, step S3c, "specify network-node equipment "i" (where i is an integer less than or equal to P, where P≦N) to be reconfigured", is performed.

Subsequently, the person, being the topology administrator, performs step S5c, "input wavelength path between network-node equipment required for new topology configuration", for inputting the new reconfigured wavelength path to connect between the network-node equipments, being the topology reconfiguration, for P network-node equipments, being objects to be reconfigured, via the topology administrator console 2609 (S4c, S6c, S7c, S8c and S9c). However, at this time, step S6c is included for comparing with the wavelength resource information obtained in step S2c, "network-node equipment wavelength resource information collecting process", and in the case where the wavelength resource required to form the new wavelength path that the topology administrator inputs does not exist, step S7c, "error message display to the topology administrator console" is performed. Thus it is possible to attract the attention of the topology administrator. The determination in step S6c is made with reference to a wavelength allocation table 4-9000 (wavelength allocation table is described later) stored in a database of topology mapping with wavelength 6006 described later.

In the case where a new topology type for all pieces of the network-node equipment is selected in step S2.2c, the new topology type is input in step S3.1c for each of N network-node equipments, being objects to be reconfigured (S4.1c, S6.1c, S7.1c, S8.1c and S9c). However, at this time, step S6.1c is included for comparing with the wavelength resource information obtained in step S2c, "network-node equipment wavelength resource information collecting process", and in the case where the wavelength resource required to form the new wavelength path does. not exist, step S7.1c "error message display to the topology administrator console" is performed. Thus it is possible to attract the attention of the topology administrator.

The determination in step S6c is made with reference to a wavelength allocation table 4-9000 (wavelength allocation table is described later) stored in a database of topology mapping with wavelength 6006 described later.

Furthermore, subsequently, in a step "specify topology reconfiguration clock-time" (S9c), the person, being the topology administrator, inputs the scheduled topology reconfiguration clock-time (t=T), and the input of information regarding the topology reconfiguration terminates.

The new wavelength information for the network-node equipment whose topology is to be reconfigured, and the time at which the topology is to be reconfigured, are created and made into a class hierarchy in the central management equipment in step S11c, and are transmitted from the central management equipment to the network-node equipment in step S12c. This is performed for M network-node equipments to be reconfigured in step S9c, and steps S12c, S13c and S14c.

When a network-node equipment that is not an object whose topology is to be reconfigured, is connected to a network-node equipment whose topology is scheduled to be reconfigured, depending on the method in which the network-terminal equipment connected to the concerned piece of network-node equipment whose topology is not to be reconfigured is used, it can be considered that the network-node equipment, in which topology reconfiguration accompanying an update of the path information stored in the network-terminal equipment is not to be performed, is disconnected. Accordingly, network-node equipment in which topology reconfiguration is not to be performed is informed of the topology reconfiguration operation. Therefore, for a network-node equipment "j" (where j is an integer greater than or equal to 1, and less than or equal to K, where K=N-P), step S17c "send advance notification message of topology reconfiguration to the piece of network-node equipment 'j'", is performed, and in steps S17c, S18c and S19c, a message is transmitted to the network-node equipment whose topology is not to be reconfigured. The network-node equipment receiving the present message can transmit a Keep Alive signal for maintaining connectivity to the network-terminal equipment connected to the concerned network-node equipment. Thus it is possible to maintain connectivity of the concerned network-node equipment before and after topology reconfiguration.

The network-node equipments whose topology is to be reconfigured, which have received the aforementioned class hierarchy, transmit a message that the aforementioned class reception is completed to the central management equipment 4-301. In step S20c, the central management equipment 301 receives the class reception complete messages from the network-node equipments whose topology is to be reconfigured, and when the time that topology reconfiguration is to be performed has passed, in step S20c it starts receiving messages indicating the completion of the reconfiguration from the network-node equipments whose topology is reconfigured, as described later, and step S21c determines whether reconfiguration completion messages are received from all the network-node equipments whose topology reconfiguration is completed, or not. When step S21c is finished, steps S22c, S23c, S24c and S25 are performed to transmit a "topology reconfiguration for network-node equipment 'j' complete message" to all the network-node equipments whose topology is not to be reconfigured, and the process of topology reconfiguration in the central management equipment 301 is terminated.

FIG. 4-6 and FIG. 4-7 are flow charts associated with computer processing of wavelength control in the network-node equipment control unit 4-1102 at the time of topology reconfiguration. The present flow chart shows the flow of operations of a topology controlling agent as described later, which is stored in the memory unit 4-2302.

Firstly, in step S1n "clock time synchronization with central management equipment", a process is performed to synchronize the clock-times of the system clock 2402 located in the network-node equipment control unit 4-1102 and the system clock 4-2603 in the central management equipment 4-301. Subsequently, in step S2n, "response of network-node equipment holding wavelength resource information to the central management equipment process" is performed for the central management equipment 4-301.

Furthermore, in steps S11c to S14c, when a class indicating new wavelength information and scheduled topology reconfiguration clock-time is delivered to the network-node equipment control unit 1102, in step S3n "receive setup wavelength information and topology reconfiguration clock-time information class from the central management equipment 4-301, write to the network-node equipment memory unit", the information required for topology reconfiguration is recorded, and subsequently, step S4n "display advance notification message of topology reconfiguration" is performed, and steps S5n and S6n wait until the scheduled topology reconfiguration clock-time (T).

When the scheduled topology reconfiguration clock-time (T) is reached, a wavelength setup changing process of the wavelength tunable light source and the wavelength tunable filter is performed in steps S7n and S8n. In steps S7n and S8n, step S11n is performed to determine whether the wavelength change is for a wavelength path that has been used or not, and in the case where the change is for an existing wavelength path, in step S12n a wavelength tunable light source output stop process is performed by the wavelength controlling unit 4-2002, then step S13n is performed to read the new wavelength information stored in the memory unit 4-2302 by the wavelength controlling unit 4-2002. Alternatively, step S13n is performed after step S11n in the case of a change to a new, unused wavelength path for a wavelength tunable light source before topology reconfiguration, after being determined by step S11n.

After step S13n is performed, a wavelength tunable light source wavelength and wavelength tunable filter change process by the wavelength controlling unit 4-2002 is performed in steps S14n and S15n, and subsequently step S16n is performed to start the output of the wavelength tunable light source after the reconfiguration. Furthermore, step S17n is performed continuously to monitor the setup wavelength and output power status of the wavelength tunable light source, and the status of the wavelength tunable filter wavelength after the wavelength change, using a monitor controlling unit 4-1902. After a series of processing associated with wavelength setup, in step S9n a topology reconfiguration completion message is transmitted to the central management equipment 4-301, in step 10n a topology reconfiguration completion message is displayed, and the series of processing is terminated.

In this manner, in the wavelength change process in S8n, since the network-node equipment control unit 4-1102 performs the process autonomously with no transmission and reception of a control signal to and from the central management equipment 4-301, no load occurs on the central management equipment 4-301, thus enabling high speed topology reconfiguration.

FIG. 4-8 is a flow chart showing the flow of computer processing in the network-node equipment control unit 4-1102 located in the network-node equipment 4-2502, which is not an object whose topology is to be reconfigured. As described previously, even in the case where the network-node equipment 4-2502, which is not an object whose topology is to be reconfigured, has already been connected to network-node equipment 4-2502, being the topology object to be reconfigured, and there is no possibility of losing the connectivity between the two before and after the topology reconfiguration, then depending on the method in which the network-terminal equipment located in the network-node equipment 4-2502 is used, it can be considered that the network is disconnected at the time that the path information stored in the aforementioned network-terminal equipment 4-1602 is updated.

Accordingly, it is necessary to inform the network-node equipment 4-2502, whose topology is not to be reconfigured, of the topology reconfiguration operation. Therefore, after the processing in steps S1n and S2n, "synchronize clock-time with central management equipment", and "response of network-node equipment holding wavelength resource information to the central management equipment process", step S18n "receive advance notification message of topology reconfiguration from the central management equipment" is performed, and then step S4n "display advance notification message of topology reconfiguration is performed. The network-node equipment receiving the present message can transmit a Keep Alive signal for maintaining the connectivity to the network-terminal equipment 4-1602 connected, thus it is possible to maintain the connectivity of the concerned network-node equipment before and after topology reconfiguration.

Until topology reconfiguration clock-time T, steps S5n and S6n perform a waiting process, and after the clock-time T, step S19n "receive topology reconfiguration complete message from the central management equipment" is performed, and afterwards, step S10n "topology reconfiguration complete message display" is performed. In the case where the aforementioned Keep Alive signal is transmitted to the network-terminal equipment, the Keep Alive signal is stopped in step S10n.

FIG. 4-9 shows a class 4-4000 comprising setup wavelength information and topology reconfiguration clock-time for the topology reconfiguration network-node equipment "i", generated in step S11c. The class 4-4000 has four types of object: a network-node equipment number information object 4-4004; a wavelength tunable light source object 4-4001 having individual "wavelength tunable light source numbers" that specify a plurality of wavelength tunable light sources, and "wavelength numbers" indicating each of their output wavelengths; a wavelength tunable filter object 4-4002 having "wavelength tunable filter numbers" for specifying a plurality of wavelength tunable filters individually, and "wavelength numbers" indicating each of their transmission wavelengths; and a time object 4-4003 indicating the "wavelength change time".

FIG. 4-10 is a diagram showing the arrangement and physical connection state of each of the elements of the network-node equipment 2502, and the central management equipment 4-301. In FIG. 4-10, the network-node equipment 2502 is denoted by numeral 5000, and the central management equipment 4-301 is denoted by numeral 4-6000.

A memory unit 4-5007 provided in the network-node equipment 4-5000 has a topology controlling agent 4-5008 and a setup wavelength database 4-5009. The topology controlling agent 4-5008 recognizes the class 4-4000 transmitted from the central management equipment 4-6000 and instructs the wavelength controlling unit 4-5004 to change the wavelength, and recognizes the information obtained from the monitor controlling unit 4-5005 and transmits a message associated with the control to the central management equipment 4-6000. The setup wavelength database 4-5009 records and stores the wavelength range in which the wavelength tunable light source and the wavelength tunable filter located in the wavelength tunable transmitter and receiver unit 4-5001 can output and receive.

The network-node equipment 4-5000 is provided with a clock time controlling unit 4-5002, a system clock 4-5003, a wavelength controlling unit 4-5004, a monitor controlling unit 4-5005, and a control signal optical input/output port 4-5016, and each of them is connected to a Central Processing Unit (CPU) 4-5006 (4-5010, 5013, 5014 and 5015).

A wavelength tunable transmitter and receiver unit 4-5001 is connected to the wavelength controlling unit 4-5004 and the monitor controlling unit 4-5005 directly, and can control hardware without intervention of the Central Processing Unit (CPU) 4-5006. Similarly, the system clock 4-5003 is connected to the clock time controlling unit 4-5002 directly.

The central management equipment 4-6000 is provided with a memory unit 4-6004, a clock time controlling unit 4-6001, a failure recording database 4-6008, a wavelength resource database 4-6009, a control signal optical input/output port 4-6017, and a display controlling unit 4-6018 as described above with reference to FIG. 4-1, and each of them is connected to a Central Processing Unit (CPU) 4-6003 (4-6010 to 6012, 6014 and 6015). The memory unit 4-6004 is provided with a topology controlling agent 4-6005, a database of topology mapping with wavelength 4-6006, and a Hyper Text Transfer Protocol (HTTP) server 4-6007.

The topology controlling agent 4-6005 specifies the network-node equipment that requires a wavelength path change according to topology reconfiguration information transmitted via a topology administrator interface (I/F) 4-6017 and the display controlling unit 4-6018, simultaneously reads the wavelength after topology reconfiguration with reference to a wavelength allocation table 4-9000 (wavelength allocation table will be described later) stored in the database of topology mapping with wavelength 4-6006, and simultaneously combines it with the topology reconfiguration clock-time information to create class 4-4000. Furthermore, it reads information regarding the transmission capable wavelength range and reception capable wavelength range of each of the wavelength tunable light sources and the wavelength tunable filters, transmitted from the network-node equipment 4-5000, and records the information in the wavelength resource database 4-6009. Moreover, the topology controlling agent 4-6005 reads failure information transmitted from the network-node equipment 4-5000, and using the Central Processing Unit (CPU) 4-6003, the information is recorded in the failure recording database 4-6008 as database information, and information associated with wavelength resource that cannot be used is recorded in the wavelength resource database 4-6009.

The display controlling unit 4-6018 is connected to a topology administrator console 4-7001 via the topology administrator interface (I/F) 4-6017, and a person, being a topology administrator, transmits topology reconfiguration information to the central management equipment 4-6000 by operating a browser 4-7000 provided in the topology administrator console 4-7001. In the present embodiment, the monitor controlling unit 4-5005, the wavelength controlling unit 4-5004, and the clock time controlling unit 4-5002, located in the network-node equipment 4-5000, are located separately from the memory unit 4-5007. However, this is not limiting, and there is no difference in substance even if they are all located in the memory unit 4-5007. Similarly, the clock time controlling unit 4-6001, the failure recording database 4-6008, and the wavelength resource database 4-6009, located in the central management equipment 4-6000, are located separately from the memory unit 4-6004. However, this is not limiting, and there is no difference in substance even if they are all located in the memory unit 4-6004.

FIG. 4-11 is a diagram showing the logical connecting arrangement of each element with which the network-node equipment 4-5000, the central management equipment 4-6000, and the topology administrator console 4-7001 are provided in the present embodiment. The topology controlling agent 4-6005 that the central management equipment 4-6000 is provided with, and the topology controlling agent 4-5008 that the network-node equipment 4-5000 is provided with, are connected logically by control signals via the control signal optical input/output port 4-6017, and the control signal optical input/output port 4-5016. Furthermore, the topology administrator interface (I/F) 4-6018 that the central management equipment 4-6000 is provided with, connects the Hyper Text Transfer Protocol (HTTP) server 4-6007, and the browser that the topology administrator console 4-7001 is provided with, logically.

The HTTP server 4-6007 operates as a gateway for a person who operates the topology administrator console 4-7001 when controlling the present fiber optic communication system. Here, in the present embodiment, the browser 4-7000 is used as an interface to be used by the person who operates the HTTP server 4-6007 and the topology administrator console 4-7001 to perform the concerned gateway function. However, it is not necessary to use it in the form in which the present protocol is used, and a SNMP manager or a unique protocol server, having a gateway function using the Simple Network Management Protocol (SNMP), an Internet Engineering Task Force (IETF) standard, or a unique protocol, may be provided instead. Similarly, a unique interface may be provided instead of the browser 4-7000 in the topology administrator console 4-7001, to suit the SNMP manager or the unique protocol server.

FIG. 4-12 through FIG. 4-15 are diagrams showing the wavelengths required to perform reconfiguration from a logical ring network topology to a logical full mesh network topology in the present embodiment, or its reverse reconfiguration. Here, in the wavelength allocation of FIG. 4-12 through FIG. 4-15, a cyclic arrayed waveguide, grating (Arrayed Waveguide Grating: AWG) is used as an arrayed waveguide grating (AWG) 4-101.

When four network-node equipments 4-8001 to 8004 as shown in FIG. 4-12 are connected in a logical ring network topology configuration, the wavelengths of number 33 (4-9001, 9004, 9006 and 9007*a*) and the wavelengths of number 35 (4-9002, 9003, 9005 and 9008) as shown in a cyclic wavelength allocation table 4-9000 shown in FIG. 4-13 are applied in each network-node equipment, and each allocated to transmission and reception to form four wavelength links 4-8005 to 8008. Next, when the four network-node equipments 4-8001 to 8004 shown in FIG. 4-12 are connected in a logical full mesh network topology configuration, the wavelengths of number 34 (4-9009, 9010, 9010 and 9012) as shown in the wavelength allocation table 4-9000 shown in FIG. 4-15 are newly applied to each network-node equipment, and each allocated to transmission and reception to form two wavelength links 4-8009 and 8010. Here, in the present embodiment, as described previously, a uniform-loss and cyclic-frequency (ULCF) arrayed wavelength grating (AWG) is used. However, this is not limiting, and even in the case where there is no uniform-loss and cyclic-frequency (ULCF), it is possible to create the wavelength allocation table 4-9000, and it is possible to specify the wavelengths required when the network-node equipments are connected, thus enabling bi-directionally connected wavelength path links based on this.

FIG. 4-16 through FIG. 4-19 show classes 4-10001*a* to 10001*d* generated in step S11*c*, with reference to FIG. 4-4 and FIG. 4-5, at the time of reconfiguration from a logical ring network topology to a logical full mesh network topology as described with reference to FIG. 4-12 through FIG. 4-15. Since new wavelength tunable light sources and new wavelength tunable filters are used in all the network-node equipments from network-node equipment 2 to network-node equipment 4, a wavelength tunable light source number "3", and a wavelength tunable filter number "3" are used for wavelength tunable light source information 4-10003a to 10003d, and wavelength tunable filter information 4-10004a to 10004d. Since addition and change of wavelengths occurs in all the network-node equipments at the time of topology reconfiguration, the clock-times in wavelength change time information 4-10005a to 10005d are the same. The wavelength tunable light source information 4-10003a to 10003d, the wavelength tunable filter information 4-10004a to 10004d, the wavelength change time information 4-10005a to 10005d, and network-node equipment number information 4-10002a to 10002d, are transmitted from the central management equipment to the network-node equipment as the classes 4-10001a to 10001d.

FIG. 4-20 is a diagram showing the interface structure of the browser 4-7000 provided in the topology administrator consoles 4-2609 and 7001 in the present embodiment. As shown in FIG. 4-20, the interface is provided with; a topology display unit and a topology reconfiguration unit 4-11001, a new topology type input unit 4-11007.1, a topology reconfiguration clock-time input unit 4-11003, a topology reconfiguration clock-time display unit 4-11004, a present clock-time display unit 4-11005, a topology reconfiguration advance notification message display unit 4-11006, a topology type information display unit 4-11007, a topology reconfiguration history information display unit 4-11008, and a failure information display unit 4-11009.

At the time of topology reconfiguration, a person, being a topology administrator, specifies the network-node equipment displayed on the topology display unit and topology reconfiguration unit 4-11001, and in the case where a new wavelength path is constructed, it is performed by specifying two network-node equipments. After this is done, the topology controlling agent 4-6005 located in the central management equipment 4-6000 calculates the wavelength tunable light source number and the wavelength tunable filter number using a database of topology mapping with wavelength 4-6006, and transmits the wavelength numbers in a wavelength link using a Hyper Text Transport Protocol server (HTTP) server 4-6007 as a gateway.

In the case of reconfiguration to a new topology for all of the network-node equipment displayed on the topology display unit and topology reconfiguration unit 4-11001, it is performed by specifying the new topology in the new topology type input unit 4-11007.1. After this is done, the topology controlling agent 4-6005 located in the central management equipment 4-6000 calculates the. wavelength tunable light source number and the wavelength tunable filter number using the database of topology mapping with wavelength 4-6006, and transmits the wavelength numbers in a wavelength link using the Hyper Text Transport Protocol server (HTTP) server 4-6007 as a gateway.

Regarding the information associated with the new wavelength link obtained by the aforementioned calculation, by specifying network-node equipment displayed in the topology display unit and topology reconfiguration unit 4-11001, a wavelength resource information display unit 4-11002 appears, and the wavelength tunable light source number, the wavelength tunable filter number and the wavelength number in the wavelength link are displayed in the wavelength resource information display unit 4-11002. Thus it is possible for the interface with a person, being a topology administrator, to be kept within manageable proportions, which achieves a reduction in the workload at the time of topology reconfiguration.

Thirty-Sixth Embodiment

FIG. 4-21 through FIG. 4-25 are diagrams showing the structure of an fiber optic communication system of a thirty-sixth embodiment of the present invention. In the present embodiment, a person, being a network-node equipment administrator, can perform topology reconfiguration independently in the thirty-fifth embodiment, and all of the network-node equipments 4-2501 to 2504 are provided with network-node equipment administrator interfaces 4-2701 to 2704, and network-node equipment administrator consoles 4-2705 to 2708 connected thereto. By so doing, it is possible to construct topology reconfiguration control equipment by using only the central management equipment 4-301 or the central management equipment 4-301 and any of the network-node equipments 4-2501 to 2504. Furthermore, the central management equipment 4-301 is provided with an authentication unit 4-2610 and an authentication database 4-2611 for performing authentication operations when the administrator of the network-node equipment performs topology reconfiguration.

FIG. 4-26 and FIG. 4-27 are diagrams showing the transmission and reception of control signals associated with clock-time information between the clock time controlling unit 4-2602 located in the central management equipment 4-301 and the clock time controlling units 4-2101 to 2104 located in the network-node equipment control units 4-1101 to 1104, and the processing flow. When controlling the wavelength tunable light sources 4-1304 to 1306 and the wavelength tunable filters 4-1404 to 1406, contained in the wavelength tunable transmitter and receiver unit 4-1106 located in the network-node equipment 4-2502, in a system in which control information is transmitted to and received from the central management equipment 4-301 each time a wavelength is changed, in the case where the number of network-node equipments 4-2501 to 2504 increases, the control information also increases at the same time. Thus the load on the central management equipment 4-301 increases.

Therefore, in the present fiber optic communication system, information regarding wavelength change and change time are transmitted to the network-node equipment control unit 4-1102 along with the control signal in advance as described later, and when it reaches the change time, the network-node equipment control unit 4-1102 changes the wavelengths of the wavelength tunable light sources 4-1304 to 1306 and the wavelength tunable filters 4-1404 to 1406 autonomously.

When doing this, the system clock 4-2603 located in the central management equipment 4-301 and the system clock 4-2402 located in the network-node equipment control unit 4-1102 need to be synchronized. In the present fiber optic communication system, the construction is such that a clock time controlling unit 4-2602 located in the central management equipment 4-301 is used as a clock-time distributing server, and a clock time controlling unit 4-2102 located in the network-node equipment control unit 4-1102 is used as a clock-time synchronizing client.

Firstly, the clock time controlling unit 4-2602 located in the central management. section 4-301 obtains the time from the system clock 4-2603 (4-3001, 3001s). The clock time controlling unit 4-2102 located in the network-node equipment control unit 4-1102 transmits clock-time query signals (4-3002a, 3004a and 3006a) to the clock time controlling unit 4-2602 located in the central management equipment 4-301 along with the above-described control signal, and the clock time controlling unit 4-2602 transmits the clock-time information signals (4-3002b, 3004b, 4-3002s, 3004s and 3006s) to the clock time controlling unit 4-2102.

The clock time controlling unit 4-2102 transmits clock-time query signals to the clock time controlling unit 4-2602 at random, and also receives information of clock time (4-3002s, 3004s and 3006s), thus reducing the processing load on the central management equipment 4-301. Clock-time is supplied (4-3003, 3005, 3007, 4-3003s, 3005s and 3007s) to the system clock 4-2402 based on the information of clock time received by the clock time controlling unit 4-2302, and as a result, the system clock 4-2603 located in the central management equipment 4-301 and the system clock 4-2402 located in the network-node equipment control unit 4-1102 are synchronized.

Here, the present embodiment describes the clock time controlling unit 4-2602 located in the central management equipment 4-301 as a clock-time distributing server, and the clock time controlling unit 4-2102 located in the network-node equipment control unit 4-1102 as a clock-time querying and receiving client. However, the clock time controlling unit 4-2602 is not necessarily the clock-time distributing server, and either one of the clock time controlling unit 4-2602 and the clock time controlling unit 4-2102 may be the clock-time distributing server. Furthermore, it is possible to use network time protocol (NTP) for the control signal containing clock-time control information. However, this is not limiting, and simple network time protocol (SNTP) or a unique clock-time control signal may also be used.

FIG. 4-28 is a diagram showing the flow of authentication messages exchanged between network-node equipment administrator consoles 4-2705 to 2708, and an authentication unit 4-2610, provided in the network-node equipment 4-2501 to 2504, and the flow of sessions between the authentication unit 4-2610 and an authentication database 2611. The authentication message as shown in the present figure is delivered to an administrator authentication unit 4-2610, which functions as a LDAP server using an authentication protocol (Lightweight Directory Access Protocol: LDAP).

The administrator authentication unit 4-2610 performs query sessions 4-12001 and 12002 for querying the database 4-2611 in which information required for authentication of the network-node equipment administrator is stored, determines whether topology reconfiguration is authorized or not, and returns the results to the network-node equipment administrator consoles 4-2705 to 2708. Here, when performing authentication in the present embodiment, the aforementioned LDAP is used. However, this is not necessarily limiting. The authentication database 4-2611 may be included in the authentication unit 4-2610, and it is also possible for the authentication unit 4-2610 and the network-node equipment administrator consoles 4-2705 to 2708 to perform plain text password authentication using a plain text password.

FIG. 4-29 through FIG. 4-31 show flow charts of computer processing showing the operation of a topology controlling agent described later, stored in the memory units 4-2301 to 2304 located in the network-node equipment control units 4-1101 to 1104 provided in the network-node equipment 4-2501 to 2504. In the present embodiment, since topology reconfiguration may be performed by a person, being a network-node equipment administrator of any of the network-node equipments 4-2501 to 2504, then in the case where topology reconfiguration is delivered to the central management equipment 4-301 at the same time from different network-node equipments 4-2501 to 2504, contention control is required. In the present embodiment, in order to realize this control, the statuses of the network-node equipment 4-2501 to 2504 are defined by three bits, and comparison of the bit information is performed by the central management equipment 4-301. Here, the process of clock-time synchronization (Sn1) with the central management equipment 4-301, and the wavelength resource information transmission process (S2n), are performed similarly to the thirty-fifth embodiment.

Furthermore, when a person, being a network-node equipment administrator of a specific network-node equipment 4-2502 (here, it is network-node equipment 4-2502, but any network-node equipment is possible) performs topology reconfiguration, status bits "000", which are initialized in step S20n as shown in FIG. 4-29 through FIG. 4-31, are reconfigured to topology reconfiguration reserved status bits "001" in step S23n. Then in the subsequent step S24n, the status bits "001" are transmitted to the central management equipment 4-301 and the other network-node equipments 4-2501, 2503 and 2504, and furthermore, it is confirmed whether "001" is duplicated in the status bits of the other network-node equipments 4-2501, 2503 and 2504 or not in step S25c. Thus an operation is performed to avoid contention with topology reconfiguration operations by persons, being the network-node equipment administrators, of the other network-node equipment.

After it is determined to be "yes", being no contention in step S25n, it is now possible in step S26n to change the paths between network-node equipment, and input a new path, or input a new topology type for all of the network-node equipments, required for the new topology structure.

In step S26n, path input information is delivered to the central management equipment 4-301 after the path input, and at the same time, in the subsequent step S27n, it is confirmed by the central management equipment 4-301 whether the wavelength resource required for the path change to the new path exists. When there is no problem in the confirmation of wavelength resource, it is possible to input the topology reconfiguration clock-time in the network-node equipment in step S28n. At this time, a "topology reconfiguration confirmation" message is transmitted to the other network-node equipments 4-2501, 2503 and 2504 in step S29n. This is aimed at preventing the other network-node equipments 4-2501, 2503 and 2504 from performing forced topology reconfiguration using the network-node 4-2502, and the topology reconfiguration is rejected in a flow chart described later.

After the series of flow described above, the message is delivered from the central management equipment 4-301 to the network-node equipments 4-2501 through 2504. However, the content is determined in steps S34n and S35n, and in the case where the network-node equipments 4-2501 through 2504 determine that it is a "wavelength change information and change time class" message from the central management equipment 4-301, the network-node equipment control unit 4-1102 validates its status bits in step S43n. In the case of "yes", the network-node equipment status bits are changed to "100" in step S44n, the status bits are transmitted to the central management equipment 4-301 in step S45n, and control proceeds to step S46n for wavelength change.

On the other hand, when topology reconfiguration is performed by a person, being the network-node equipment administrator of the network-node equipment 4-2502, it is not desirable to the actual operation of the network, for the topology of the other network-node 4-2501, 2503 and 2504, having connectivity with the network-node equipment 4-2502, to be reconfigured by force. Accordingly, it is necessary to perform processing for determining whether to accept or reject topology reconfiguration in the other network-node 4-2501, 2503 and 2504. In the case where an "advance notification of topology reconfiguration message" M2 is received, the reception content is determined in step S35n, and subsequently it is determined whether topology reconfiguration is approved by the other network-node 4-2501, 2503 and 2504. In the case of approval, the network-node equipment status bits are changed to "010" in step S38n, the bits are transmitted to the central management equipment 4-301 in step S39n, and subsequently a signal is awaited from the central management equipment 4-301. When a new signal is received during this wait, and the signal is determined in step S35n to be a wavelength change information and change time class from the central management equipment 4-301, the network-node equipment control unit 1102 validates its status bits in step S43n, and in the case of "yes", the network-node equipment status bits are changed to "100" in step S44n, the status bits are transmitted to the central management equipment 4-301 in step S45n, and control proceeds to step S46n for wavelength change. Conversely, in the case where it is determined that topology reconfiguration is rejected by the other network-node equipments 4-2501, 2503 and 2504 in step S37n, the status bits are changed to "100" in step S40n, the status bits are transmitted to the central management equipment 4-301 in step S41n, and also transmitted to the network node that requested topology reconfiguration.

Afterwards control proceeds to step S46n, and the series of processing of steps S48n through S55n as shown in FIG. 4-32 is performed in the network-node equipment control unit 4-1102. That is, in steps S48n through S55n, the network-node equipment control unit 4-1102 performs a wavelength tunable light source output stop process, a wavelength data reading process, a wavelength tunable light source wavelength changing process, a wavelength tunable filter wavelength changing process, a wavelength tunable light source output start process, a status monitoring process, a status bit changing process, and a status bit transmission process. However, since the status of the network-node equipment is controlled by bits, differently from the case of the thirty-fifth embodiment, when wavelength change is completed, and a wavelength path is formed, the status bits are changed to "101" in step S54n, and subsequently, the bits are transmitted to the central management equipment 4-301 in step S55n.

FIG. 4-33 is a diagram showing a table 4-12000 describing the status bits 4-12001 of the network-node equipment, and their corresponding network-node equipment statuses 4-12002. Six statuses are expressed by the status bits 4-12001 using three bits, and topology reconfiguration contention control at the time of a topology reconfiguration request from any network-node equipment 4-2501 through 2504 is performed using the status bits 4-12001. In the present embodiment, when the status bits 4-12001 are "000", the network-node equipment status 4-12002 is "initial status", and when the status bits 4-12001 are "001", "010", "011", "100" and "101", the network-node equipment status 4-12002 is "topology reconfiguration reserved status", "completion of acceptance of topology reconfiguration request from other network-node equipment status", "rejection of topology reconfiguration request from other network-node equipment status", "completion of reception of wavelength and change clock-time class status", and "completion of change to new wavelength status", respectively.

FIG. 4-34 is a diagram showing the arrangement and physical connection state of each of the elements of the network-node equipments 4-2501 through 2504, and the central management equipment 4-301. In FIG. 4-34, the network-node equipments 4-2501 through 2504 are denoted by numeral 4-5000, and the central management equipment 4-301 is denoted by numeral 4-6000.

The network-node equipment 4-5000 is provided with a network-node equipment administrator interface (I/F) 4-5018, and is connected to a network-node equipment administrator console 4-5019. A browser 4-5020 is provided in the network-node equipment administrator console 4-5019, and it is possible for a person, being the network-node equipment administrator, to perform topology reconfiguration operation using the browser 4-5020.

Furthermore, the memory unit 4-5007 provided in the network-node equipment 4-5000 has a topology controlling agent 4-5008 that recognizes the class 4-4000 transmitted from the central management equipment 4-6000 at the time of topology reconfiguration, instructs the wavelength controlling unit 4-5004 to change the wavelength, and also recognizes information obtained from the monitor controlling unit 4-5005, and transmits it to the central management equipment 4-6000. Furthermore, it is provided with a setup wavelength database 4-5009, which records the wavelength range in which the wavelength tunable light source and the wavelength tunable filter located in the wavelength tunable transmitter and receiver unit 4-5001 can output and receive.

Moreover, the network-node equipment 4-5000 is provided with a clock time controlling unit 4-5002, a system clock 4-5003, a wavelength controlling unit 4-5004, a monitor controlling unit 4-5005, and a control signal optical input/output port 4-5016, and each of them is connected to a Central Processing Unit (CPU) 4-5006 (4-5010, 5013, 5014 and 5015). A wavelength tunable transmitter and receiver unit 4-5001 is connected to the wavelength controlling unit 4-5004 and the monitor controlling unit 4-5005 directly, and can control hardware without intervention of the Central Processing Unit (CPU) 4-5006. Similarly, the system clock 4-5003 is connected to the clock time controlling unit 4-5002 directly, and can control hardware without intervention of the Central Processing Unit (CPU) 4-5006.

The central management equipment 4-6000 is provided with a memory unit 4-6004, a clock time controlling unit 4-6001, an authentication unit 4-6019, an authentication database 4-6020, a failure recording database 4-6008, a wavelength resource database 4-6009, a control signal optical input/output port 4-6017, and a display controlling unit 4-6018 as described above with reference to FIG. 4-1, and each of them is connected to a Central Processing Unit (CPU) 4-6003 (4-6010 to 6012, 6014 and 6015).

The memory unit 4-6004 is provided with a topology controlling agent 4-6005, a database of topology mapping with wavelength 4-6006, and a Hyper Text Transfer Protocol (HTTP) server 4-6007.

The topology controlling agent 4-6005 specifies the network-node equipment that requires a wavelength path change according to topology reconfiguration information transmitted via a control signal optical input/output port 4-6017, simultaneously reads the wavelength after the reconfiguration from the database of topology mapping with wavelength 4-6006, and simultaneously combines it with the topology reconfiguration clock-time information transmitted via the topology administrator I/F 4-6017 or the control signal optical input/output port 4-6017 to create class 4-4000. Furthermore, it reads information regarding the transmission capable wavelength range and reception capable wavelength range of each of the wavelength tunable light sources and the wavelength tunable filters, a plurality of which is provided in the wavelength tunable transmitter and receiver unit 4-5001, transmitted from the network-node equipment 4-5000, creates a database of the information using the Central Processing Unit (CPU) 4-6003, and records it in the wavelength resource database 4-6009.

Moreover, the topology controlling agent 4-6005 reads failure information transmitted from the network-node equipment 4-5000, and using the Central Processing Unit (CPU) 4-6003, the information is recorded in the failure recording database 4-6008 as database information. Here, before a person, being a network-node equipment administrator, performs a topology reconfiguration operation, the authentication unit 4-6019 is accessed via the browser 4-5020 provided in the network-node equipment administrator console 4-5019, and the name of the network-node equipment administrator and his password are verified by the authentication database 4-6020 to authenticate the network-node equipment administrator.

The display controlling unit 4-6018 is connected to a topology administrator console 4-7001, and a person, being a topology administrator, transmits topology reconfiguration information to the central management equipment 4-6000 by operating the browser 4-7000 provided in the topology administrator console 4-7001.

In the present embodiment, the monitor controlling unit 4-5005, the wavelength controlling unit 4-5004, and the clock time controlling unit 4-5002, located in the network-node equipment 4-5000, are located separately from the memory unit 4-5007. However, this is not limiting, and there is no difference in substance even if they are all located in the memory unit 4-5007. Similarly, the clock time controlling unit 4-6001, the authentication unit 4-6019, the authentication database 4-6020, the failure recording database 4-6008, and the wavelength resource database 4-6009, located in the central management equipment 4-6000, are located separately from the memory unit 4-6004. However, this is not limiting, and there is no difference in substance even if they are all located in the memory unit 4-6004.

FIG. 4-35 is a diagram showing the logical connecting arrangement of each element provided in the network-node equipment 4-5000, the central management equipment 4-6000, and the topology administrator console 4-7001 in the present embodiment. The topology controlling agent 4-6005 provided in the central management equipment 4-6000, and the topology controlling agent 4-5008 provided in the network-node equipment 4-5000, are connected logically and directly by control signals via the control signal optical input/output port 4-6017, and the control signal optical input/output port 4-5016.

Furthermore, the topology administrator (I/F) 4-6017 that the central management equipment 4-6000 is connected to, connects the Hyper Text Transfer Protocol (HTTP) server 4-6007, and the browser 4-7000 that the topology administrator console 4-7001 is provided with, logically.

Furthermore, the browser 4-5020, which is provided in the network-node equipment administrator console 4-5019 connected to the network-node equipment 4-5000, is connected to the Hyper Text Transfer Protocol server 4-6007 via the network-node equipment administrator interface (I/F) 4-5018, the topology controlling agent 4-5008, the control signal optical input/output port 4-5016, and the control signal optical input/output port 4-6017.

The HTTP server 4-6007 operates as a gateway, when controlling the present fiber optic communication system, for a person who operates the topology administrator console 4-7001, and a person who operates the network-node equipment administrator console 4-5019. Here, in the present embodiment, the browser 4-7000 is used as an interface to be used by the person who operates the topology administrator console 4-7001. However, it is not necessary to use it in the form in which the present protocol is used, and a SNMP manager or a unique protocol server, having a gateway function using the Simple Network Management Protocol (SNMP), an Internet Engineering Task Force (IETF) standard, or a unique protocol, may be provided. Similarly, a unique interface may be provided instead of the browser 4-7000 in the topology administrator console 4-7001, to suit the SNMP manager or the unique protocol server.

FIG. 4-36 shows the interface structure of the browser 4-5020 provided in the network-node equipment administrator consoles 4-2705 to 2708, and 5019. The interface is provided with a topology display unit and a topology reconfiguration unit 4-11001, a new topology type input unit 4-11007.1, a topology reconfiguration clock-time input unit 4-11003, a topology reconfiguration clock-time display unit 4-11004, a present clock-time display unit 4-11005, a topology reconfiguration advance notification message display unit 4-11006, a topology type information display unit 4-11007, a topology reconfiguration history information display unit 4-11008, a failure information display unit 4-11009, a topology reconfiguration request accept or reject input unit 4-11010, and a network-node equipment status display unit 4-11011.

At the time of topology reconfiguration, a person, being a network-node equipment administrator, specifies network-node equipment displayed on the topology display unit and topology reconfiguration unit 4-11001, and in the case where a new wavelength path is constructed, two network-node equipments are specified, a result is transmitted to the topology controlling agent 4-6005 provided in the central management equipment 4-6000, and the topology controlling agent 4-6005 calculates the wavelength tunable light source number, the wavelength tunable filter number, and the wavelength number in the wavelength link, which must be calculated, using the database of topology mapping with wavelength 4-6006.

In the case of reconfiguration to a new topology for all of the network-node equipments displayed on the topology display unit and topology reconfiguration unit 4-11001, it is performed by specifying the new topology in the new topology type input unit 4-11007.1. After this is done, the topology controlling agent 4-6005 located in the central management equipment 4-6000 calculates the wavelength tunable light source number and the wavelength tunable filter number using the database of topology mapping with wavelength 4-6006, and transmits the wavelength numbers in a wavelength link using the Hyper Text Transport Protocol server (HTTP) server 4-6007 as a gateway.

At the time of topology reconfiguration, in the case where the wavelength resource in the network-node equipment is sufficient, since it can be calculated, "001" is transmitted to the network-node equipment status display unit 4-11011 as the network-node equipment status bits 4-12000 as a calculation completion message (FIG. 4-33), to inform the person, being the network-node equipment administrator, of the "topology reconfiguration reserved status". Subsequently, the person, being the network-node equipment administrator, inputs a topology reconfiguration required clock-time to the topology reconfiguration clock-time input unit 4-11003, and the input content is transmitted to the topology controlling agent 4-6005 provided in the central management equipment 4-6000. On the other hand, in the case where a topology reconfiguration request is issued by a person, being a network-node equipment administrator of the other network-node equipment, the present interface enables an input of whether the topology reconfiguration request accept or reject input unit 4-11010 accepts or rejects it.

Here, by specifying network-node equipment displayed in the topology display unit and topology reconfiguration unit 4-11001, the wavelength resource information display unit 4-11002 appears, and the wavelength tunable light source number, wavelength tunable filter number, and the wavelength number in the wavelength link are displayed in the wavelength resource information display unit 4-11002. Thus it is possible for the interface with a person, being a topology administrator, to be kept within manageable proportions, which achieves a reduction in the workload at the time of topology reconfiguration. Here, the interface structure of the browser 4-7000 provided in the topology administrator console 4-2609 and 7001 is a console for controlling the whole of the fiber optic communication system, and thus is the same as in FIG. 4-20.

According to the fiber optic communication system in the first and second embodiments, since it is possible to reconfigure network-node equipment, being a communication partner, or its topology, dynamically by changing an optical signal path dynamically using the wavelength tunable light sources 4-1304 through 1306, optical switches, or the wavelength tunable filters 4-1404 through 14061, located in the network-node equipment 4-2501 through 2504, in a network in which a data signal and a control signal can be transmitted and received between the network-node equipment 4-2501 through 2504 and the arrayed waveguide grating (AWG) 4-101 through the same optical transmission path, it is possible to perform topology reconfiguration easily from the central management equipment 4-301, which manages the whole network, or the network-node equipment 4-2501 through 2504.

Furthermore, it is possible to perform contention control of topology reconfiguration requests from any of the network-node equipments 4-2501 through 2504, and it is possible to reconfigure the topology at high speed at a specified clock-time scheduled by clock time synchronization of all the network-node equipment 4-2501 through 2504.

Moreover, it is possible to construct the fiber optic communication system by using the central management equipment 4-301, and the network-node equipments 4-2501 through 2504.

Furthermore, it is possible to construct the above-described system easily by using a computer program in the central management equipment 4-301, and the network-node equipments 4-2501 through 2504, and it is possible to deliver the computer program easily by creating an information storage medium capable of being read by computer, in which the computer program is stored.

Here, the first through the thirty-sixth embodiments are only specific examples, and the present invention is not limited to the above-described embodiments.

What is claimed is:

1. A fiber optic communication system comprising: an arrayed waveguide grating (AWG) that has N optical input ports (where N is an integer greater than or equal to 2) and N optical output ports, and that has a routing function that routes from an input port to an output port in accordance with a wavelength of an optical signal that has been inputted into the input port, and M (where M is an integer no smaller than 2, nor greater than an integer N) network-node equipments connected via optical transmission paths so as to form a geometrically star-shaped physical star topology having the AWG in the center, wherein said network-node equipments comprise a device of wavelength switching that switches the wavelength of said optical signals in order to dynamically change a logical network topology that indicates a geometrical form of routes of the optical signals used for transmitting/receiving data (hereunder referred to as optical signals) between network-node equipments.

2. A fiber optic communication system according to claim 1, wherein said network-node equipments belong to at least one or more logical network topologies, and configure two or more mutually independent logical network topologies.

3. A fiber optic communication system according to claim 1, wherein said wavelength switching device switches wavelengths of optical signals when connecting or transferring the network-node equipments belonging to a predetermined logical network topology, to another logical network topology.

4. A fiber optic communication system according to claim 1, wherein a logical network topology is configured with two or more network-node equipments, and said wavelength switching device switches wavelengths of optical signals so that at a predetermined time, all of said two or more network-node equipments configure a new logical network topology that is different from said logical network topology.

5. A fiber optic communication system according to claim 1, wherein said logical network topology configures at least one kind of either: a ring-shaped logical network topology having geometrically a ring shape, a star-shaped logical network topology having a star shape, and a mesh-shaped logical network topology having a mesh shape, or configures a logical network topology that is a combination of these.

6. A fiber optic communication system according to any one of claims 1 to 5, wherein said wavelength switching device comprises a wavelength tunable light source unit capable of changing the wavelength of an output signal, and a wavelength tunable optical receiver unit capable of selecting the wavelength of a receiving optical signal; and said wavelength tunable light source unit comprises L (L being an integer no smaller than 2, nor greater than M) optical elements installed therein, said optical elements comprising an elemental structure in which a wavelength tunable laser and a modulator are connected in series or mutually integrated, or comprising a semiconductor laser diode with direct modulation capability, and being connected by an L×1 optical coupler; and said wavelength tunable optical receiver unit comprises L (L being an integer no smaller than 2, nor greater than M) optical elements installed therein, said optical elements comprising an optical receiver and a wavelength tunable filer connected in series with the optical receiver and passing only a predetermined wavelength, and being connected to an L×1 optical coupler.

7. A fiber optic communication system according to any one of claims 1 to 5, wherein said wavelength switching device comprises a wavelength tunable light source unit capable of changing the wavelength of an output signal, and a wavelength tunable optical receiver unit capable of selecting the wavelength of a receiving optical signal; and said wavelength tunable light source unit comprises L (L being an integer no smaller than 2, nor greater than M) optical elements installed therein, said optical elements comprising an elemental structure in which a wavelength tunable laser and a modular are connected in series or mutually integrated, or comprising a semiconductor laser diode with direct modulation capability, and being connected in series to L×N switches and N×1 combiners which are connected in series, and said wavelength tunable optical receiver unit comprises L (L is an integer no smaller than 2, nor greater than M) optical receivers installed therein, said optical receivers being connected in series to the L×N switches and the N×1 combiners.

8. A fiber optic communication system according to claim 6, wherein said network-node equipment comprises: L (L is an integer no smaller than 2, nor greater than M) optical signal in/output ports of network terminals that are connectable to network-terminal equipments, said optical signal in/output ports of network terminals comprising optical signal input ports of network terminals and optical signal output ports of network terminals;

L O/E converters that convert optical signals from the L optical signal input ports of network terminals into electrical signals;

an E/O converter that converts into optical signals, output electrical signals from the L receivers that constitute said wavelength tunable optical receiver unit; and optical waveguides such as optical fibers by which output electrical signals from the L O/E converters are inputted to said wavelength tunable light source unit, and by which the converted optical signals are outputted from the L optical signal output ports of network terminals.

9. A fiber optic communication system according to claim 6, wherein said network-node equipment comprises L (L being an integer no smaller than 2, nor greater than M) optical signal in/output ports of network terminals that are connectable to network-terminal equipments, said optical signal in/output ports of network terminals comprising optical signal input ports of network terminals and optical signal output ports of network terminals; and said L optical signal input ports of network terminals are connected in series to L O/E converters which convert optical signals into electrical signals, and to 2L×2L switches; and said L optical signal output ports of network terminals are connected in series to L E/O converters which convert electrical signals into optical signals, and to said 2L×2L electrical switches; and furthermore said 2L×2L electrical switches are connected to said wavelength tunable light source unit, and to said wavelength tunable optical receiver unit; and by predetermined operation of said 2L×2L electrical switches, optical signals delivered to said network-node equipment from said arrayed waveguide grating (AWG) are wavelength converted in said network-node equipment without being transmitted to network-node terminals that are physically connected to said network-node equipments, and are re-transmitted to said arrayed waveguide grating (AWG).

10. A fiber optic communication system according to claim 7, wherein said network-node equipment comprises: L (L is an integer no smaller than 2, nor greater than M) optical signal in/output ports of network terminals that are connectable to network-terminal equipments, said optical signal in/output ports of network terminals comprising optical signal input ports of network terminals and optical signal output ports of network terminals;

L O/E converters that convert optical signals from the L optical signal input ports of network terminals into electrical signals;

an E/O converter that converts into optical signals, output electrical signals from the L receivers that constitute said wavelength tunable optical receiver unit; and optical waveguides such as optical fibers by which output electrical signals from the L O/E converters are inputted to said wavelength tunable light source unit, and by which the converted optical signals are outputted from the L optical signal output ports of network terminals.

11. A fiber optic communication system according to claim 7, wherein said network-node equipment comprises L (L being an integer no smaller than 2, nor greater than M) optical signal in/output ports of network terminals that are connectable to network-terminal equipments, said optical signal in/output ports of network terminals comprising optical signal input ports of network terminals and optical signal output ports of network terminals; and said L optical signal input ports of network terminals are connected in series to L O/E converters which convert optical signals into electrical signals, and to 2L×2L switches; and said L optical signal output ports of network terminals are connected in series to L E/O converters which convert electrical signals into optical signals, and to said 2L×2L electrical switches; and furthermore said 2L×2L electrical switches are connected to said wavelength tunable light source unit, and to said wavelength tunable optical receiver unit; and by predetermined operation of said 2L×2L electrical switches, optical signals delivered to said network-node equipment from said arrayed waveguide grating (AWG) are wavelength converted in said network-node equipment without being transmitted to network-node terminals that are physically connected to said network-node equipments, and are re-transmitted to said arrayed waveguide grating (AWG).

12. A fiber optic communication system according to claim 1, wherein each of said network-node equipments and said arrayed waveguide grating comprise an optical circulator that changes the directions of input light signals and output light signals, and input/output ports of the optical circulator provided for said network-node equipments are respectively connected to said wavelength tunable optical receiver unit and said wavelength tunable light source unit via optical waveguides such as optical fibers, and input/output ports of the optical circulator provided for said arrayed waveguide grating (AWG) are respectively connected to an optical output port and an optical input port of the AWG, and by respectively connecting common ports of the optical circulators provided for said network-node equipments and said AWG via optical waveguides such as single-core optical fibers, each of the network-node equipments and the AWG are respectively connected via optical waveguides such as single-core optical fibers.

13. A fiber optic communication system according to claim 1, wherein said arrayed waveguide grating (AWG) has uniform-loss and cyclic-frequency (ULCF).

14. A fiber optic communication system according to claim 1, wherein said network-node equipment has two different wavelength paths connected to said arrayed waveguide grating (AWG), and a ring-shaped logical network topology is formed as said logical network topology having two or more of said network-node equipments.

15. A fiber optic communication system according to claim 14, wherein each of said network-node equipments that configure said ring-shaped logical network topology has two communication channels that allow backward communication,
and said device of wavelength switching. when one of the communication channels is disconnected, switches the wavelength of an optical signal so as to form a new ring-shaped logical network topology, so that the optical signal, which is inputted from the other communication channel to be outputted to said one communication channel, is transmittable back to said the other communication channel.

16. A fiber optic communication system according to claim 14, wherein each of said network-node equipments belonging to said ring-shaped logical network topology has two communication channels that allow backward communication, and
said device of wavelength switching, when communication with a network-node equipment that communicates using one communication channel fails, switches the wavelengths of an optical signal so as to configure a new ring-shaped logical network topology, so that the network-node equipment experiencing communication failure is bypassed, and communication with an arbitrary network-node equipment is established.

17. A fiber optic communication system according to claim 1, further comprising a central-management-equipment, and wherein
said central-management-equipment includes a controlling device that transmits to said network-node equipment a control signal that includes information of changing wavelength, and that receives a control signal that includes information of communication status from said network-node equipment, and
said device of wavelength switching of the network-node equipment switches the wavelength of an optical signal based on said control signal received from said central-management-equipment.

18. A fiber optic communication system according to claim 17, wherein the wavelength of the control signal that is transmitted and received on each of said network-node equipments is set to be of a different wavelength bandwidth to that of said optical signal, and
said network-node equipment comprises a WDM coupler having an optical combiner that combines said optical signal and the optical signal of said control signal, and an optical splitter that splits the combined signal of said optical signal and the optical signal of said control signal into said optical signal and the optical signal of said control signal; and
said arrayed waveguide grating (AWG) comprises a WDM coupler having an optical combiner that combines the optical signal of the control signal from the central-management-equipment and the optical signal of the signal outputted from the arrayed waveguide grating (AWG). and an optical splitter that splits the combined signal of said optical signal transmitted from each network-node and the optical signal of said control signal into said optical signal and the optical signal of said control signal, and the optical transmission path that said optical signal uses is also shared as an optical transmission path for said control signal.

19. A fiber optic communication system according to claim 17, wherein between said network-node equipment and said central-management-equipment, said control signal is transmitted physically separated from the communication channel that transmits said optical data signal.

20. A fiber optic communication system according to claim 17, wherein said network-node equipment further comprises:
a node database that is provided in at least one of either inside or outside of the equipment and that stores wavelength data, and
a device of updating the data of said node database when the wavelength of said optical signal has been switched; and
said central-management-equipment further comprises a central database that is provided in at least one of either inside or outside of the equipment and that stores wavelength data of all of said network-node equipments, and
a device of updating the data of said central database when the wavelength used between said network-node equipments change.

21. A fiber optic communication system according to claim 20, wherein said network-node equipment has a device of storing in said node database information on: available wavelength bandwidth, all wavelengths currently in use, transmitting optical power status and receiving optical power status of the optical signal of each wavelength, connection status between said network-node equipments, and logical network topology currently connected; and notifying said information to said central-management-equipment in response to a request therefrom.

22. A fiber optic communication system according to claim 20, wherein said network-node equipment has a device of always monitoring the transmitting optical power status and receiving optical power status of the optical signal of each wavelength, and detecting an abnormality and notifying said central-management-equipment, if an abnormality in these statuses occurs; and
said central-management-equipment comprises a device of detecting abnormality in the connection status between all of said network-node equipments, and the transmitting optical power status and receiving optical power status of the optical signal of each wavelength of said wavelength tunable light source unit, and of sharing the abnormal status information with all of said network-node equipments.

23. A fiber optic communication system according to claim 20, wherein said central-management-equipment comprises a device which,
when a control signal is received including a request for a network-node equipment currently connected to a logical network topology to change connection to another different logical network topology, determines whether or not to conform by querying said central database and performing a computation, and
if the result of said determination is to conform,
transmits a control signal including notification of disengagement and wavelength reconfiguration of said network-node equipment to all of said network-node equipments within the logical network topology to which the network-node equipment that launched said request of logical network topology connection change is connected, and
transmits a control signal including notification of the joining of said network-node equipment and wavelength reconfiguration to all of the network-node equipments within the logical network topology to which the network-node equipment that launched said request of logical network topology connection change, is to be connected.

24. A fiber optic communication system according to claim 20, wherein said central-management-equipment comprises at least one of either;
  a device which, when the amount of traffic between specific network-node equipments increases and a network load is generated, and a control signal including a request for a bandwidth increase between said network-node equipments is received, determines whether or not said request for a bandwidth increase is possible by querying said central database and performing a computation to form a new wavelength path, and transmits a control signal including notification of wavelength reconfiguration to set a rerouting wavelength path that is configured by routing through other network-node equipments to which said network-node equipment has not been connected, to each of the network-node equipments to perform setting of said rerouting wavelength path;
  or a device which, when the amount of traffic between specific network-node equipments increases and a network load is generated and a control signal including a request for a bandwidth increase between said network-node equipments is received, determines whether or not said request for a bandwidth increase is possible by querying said central database and performing a computation to form a new wavelength path, and transmits a control signal including notification of wavelength reconfiguration for providing a new rerouting wavelength path, by using a wavelength that has not been used by the network-node equipment connected to another logical network topology to which the said network-node equipment is not connected, to each of the network-node equipments to perform setting of said rerouting wavelength path.

25. A fiber optic communication system according to any one of claims 19 to 24, wherein
  said network-node equipment further comprises:
  a device of synchronizing the clock time of each of the network-node equipments; and
  a device of information-storing that stores new information of changing wavelength of the optical signals, and the information of reconfiguring time of the logical network topology including the time at which wavelength change should be executed, and said device of wavelength switching switches the wavelengths of the optical signals at a predetermined time in accordance with said information of reconfiguring time of the logical network topology and said information of changing wavelength.

26. A fiber optic communication system according to any one of claims 19 to 24, wherein
  said central-management-equipment further comprises a device of distributing clock time information that distributes clock time information to each of said network-node equipments;
  said controlling unit comprises a device of generating new information of changing wavelength of the optical signals of each of said network-node equipments, and information of reconfiguring time of the logical network topology including the time the wavelength change should be executed, and transmitting them separately or all together to said network-node equipment;
  said network-node equipment comprises:
  a device of adjusting clock time that adjusts its own clock time in accordance with the information of clock time distributed from said central-management-equipment, and
  a device of information-storing that receives and stores said information of changing wavelength and said information of reconfiguring time of the logical network topology transmitted from said central-management-equipment; and
  said device of wavelength switching switches the wavelength of the optical signals at a predetermined time in accordance with said information of reconfiguring time of the logical network topology and said information of changing wavelength.

27. A fiber optic communication system according to any one of claims 19 to 24, wherein
  a specific network-node equipment among said network-node equipments comprises a device of distributing clock time information that distributes clock time information to other network-node equipments;
  said other network-node equipments comprise a device of adjusting clock time that adjusts their own clock time in accordance with the clock time information distributed from said specific network-node equipment;
  said specific network-node equipment comprises a device of generating information of changing wavelength of the optical signals of said network-node equipment, and information of reconfiguring time of the logical network topology including the time the wavelength change should be executed, and transmitting them separately or all together to said network-node equipments; and
  said other network-node equipments comprise a device of information-storing that stores the information of changing wavelength and the information of reconfiguring time of the logical network topology received from said specific network-node equipment; and
  said device of wavelength switching of the other network-node equipments switches the wavelengths of the optical signals at a predetermined time in accordance with said information of reconfiguring time of the logical network topology and said information of changing wavelength.

28. A fiber optic communication system according to claim 25, wherein
  said central-management-equipment further comprises a device of distributing clock time information that distributes clock time information to each of said network-node equipments;
  said controlling unit comprises a device of generating new information of changing wavelength of the optical signals of each of said network-node equipments, and information of reconfiguring time of the logical network topology including the time the wavelength change should be executed, and transmitting them separately or all together to said network-node equipment;
  said network-node equipment comprises:
  a device of adjusting clock time that adjusts its own clock time in accordance with the information of clock time distributed from said central-management-equipment, and
  a device of information-storing that receives and stores said information of changing wavelength and said information of reconfiguring time of the logical network topology transmitted from said central-management-equipment; and said device of wavelength switching switches the wavelength of the optical signals at a predetermined time in accordance with said information of reconfiguring time of the logical network topology and said information of changing wavelength.

29. A fiber optic communication system according to claim 25, wherein a specific network-node equipment among said network-node equipments comprises a device of distributing clock time information that distributes clock time information to other network-node equipments;

said other network-node equipments comprise a device of adjusting clock time that adjusts their own clock time in accordance with the clock time information distributed from said specific network-node equipment;

said specific network-node equipment comprises a device of generating information of changing wavelength of the optical signals of said network-node equipment, and information of reconfiguring time of the logical network topology including the time the wavelength change should be executed, and transmitting them separately or all together to said network-node equipments; and said other network-node equipments comprise a device of information-storing that stores the information of changing wavelength and the information of reconfiguring time of the logical network topology received from said specific network-node equipment; and said device of wavelength switching of the other network-node equipments switches the wavelengths of the optical signals at a predetermined time in accordance with said information of reconfiguring time of the logical network topology and said information of changing wavelength.

30. A central-management-equipment that is connected to M (where M is an integer no smaller than 2, nor greater than an integer N) network-node equipments connected via optical transmission paths and configured so as to form a geometrically star-shaped physical star topology having in the center an arrayed waveguide grating (AWG) that has N optical input ports (where N is an integer greater than or equal to 2) and N optical output ports and a routing function that routes from an input port to an output port in accordance with a wavelength of an optical signal that has been inputted into the input port, wherein said central-management-equipment comprises a device of controlling that transmits to said network-node equipments a control signal that includes information of changing wavelength of the optical signals and the device of controlling causes the switching of the wavelength of the optical signals, and receives from said network-node equipments a control signal that includes information of communication status, in order to dynamically change a logical network topology that indicates a geometrical form of routes of the optical signals used for transmitting/receiving data (hereunder referred to as optical signals) between said network-node equipments.

31. A network-node equipment that is connected to M (M is an integer greater than or equal to 1 and less than or equal to N−1) other network-node equipments via an arrayed waveguide grating (AWG) that has N (N is an integer greater than or equal to 2) optical input ports and N optical output ports and a routing function that routes from an input port to an output port in accordance with a wavelength of an optical signal that has been inputted into the input port, comprising:

a device of synchronizing clock time that synchronizes the clock time of each of the other network-node equipments, a device of information-storing that stores new information of changing wavelength of optical signals, for dynamically changing a logical network topology that indicates a geometrical form of routes of the optical signals used for transmitting/receiving data between other network-node equipments (hereunder referred to as optical signals), and information of reconfiguring time of the logical network topology that includes the time at which changing wavelength should be executed; and a device of wavelength switching that switches a wavelength of the optical signals in accordance with said information of changing wavelength and said information of reconfiguring time of the logical network topology.

* * * * *